US012802568B2

(12) United States Patent
Sharma Banjade et al.

(10) Patent No.: US 12,802,568 B2
(45) Date of Patent: Nov. 17, 2026

(54) DYNAMIC CONTEXTUAL ROAD OCCUPANCY MAP PERCEPTION FOR VULNERABLE ROAD USER SAFETY IN INTELLIGENT TRANSPORTATION SYSTEMS

(71) Applicant: Intel Corporation, Santa Clara, CA (US)

(72) Inventors: Vesh Raj Sharma Banjade, Portland, OR (US); Kathiravetpillai Sivanesan, Portland, OR (US); Satish C. Jha, Portland, OR (US); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 347 days.

(21) Appl. No.: 17/801,006

(22) PCT Filed: Dec. 21, 2020

(86) PCT No.: PCT/US2020/066483
§ 371 (c)(1),
(2) Date: Aug. 19, 2022

(87) PCT Pub. No.: WO2021/194590
PCT Pub. Date: Sep. 30, 2021

(65) Prior Publication Data

US 2023/0095384 A1 Mar. 30, 2023

Related U.S. Application Data

(60) Provisional application No. 63/033,597, filed on Jun. 2, 2020, provisional application No. 62/994,471, filed on Mar. 25, 2020.

(51) Int. Cl.
*B60W 30/09* (2012.01)
*G01C 21/00* (2006.01)
(Continued)

(52) U.S. Cl.
CPC ....... *G08G 1/161* (2013.01); *G08G 1/096725* (2013.01); *G08G 1/096791* (2013.01);
(Continued)

(58) Field of Classification Search
None
See application file for complete search history.

(56) References Cited

U.S. PATENT DOCUMENTS 10,074,280 B2 9/2018 Bai et al.
10,147,320 B1 12/2018 Ellis
(Continued)

FOREIGN PATENT DOCUMENTS

DE 102016205661 A1 * 10/2017 ............ G08G 1/166
EP 4088267 11/2022
(Continued)

OTHER PUBLICATIONS

Espacenet Translation of DE 102016205661 A1, Zydek, 2016, pp. 1-7 (Year: 2016).*
(Continued)

*Primary Examiner* — Adam D Tissot
*Assistant Examiner* — Michael T Silva
(74) *Attorney, Agent, or Firm* — Banner & Witcoff, Ltd.

(57) ABSTRACT

Disclosed embodiments include technologies for improving safety mechanisms in computer assisted and/or automated driving (CA/AD) vehicles for protecting vulnerable road users (VRUs). Embodiments include Dynamic Contextual Road Occupancy Map (DCROM) for Perception aspects for VRU safety. Other embodiments are described and/or claimed.

20 Claims, 25 Drawing Sheets

(51) Int. Cl.

| | |
|---|---|
| ***G01S 17/89*** | (2020.01) |
| ***G08G 1/0967*** | (2006.01) |
| ***G08G 1/16*** | (2006.01) |
| ***H04W 4/40*** | (2018.01) |
| ***H04W 4/90*** | (2018.01) |

(52) U.S. Cl.

CPC .............. *G08G 1/166* (2013.01); *H04W 4/40* (2018.02); *H04W 4/90* (2018.02)

(56) References Cited

U.S. PATENT DOCUMENTS

| | | | | |
|---|---|---|---|---|
| 10,235,882 | B1 | 3/2019 | Aoude et al. | |
| 2014/0163858 | A1* | 6/2014 | Richardson | G06N 7/02 706/52 |
| 2014/0191884 | A1 | 7/2014 | Maeda et al. | |
| 2014/0288822 | A1 | 9/2014 | Morrison et al. | |
| 2016/0381538 | A1 | 12/2016 | Tan et al. | |
| 2017/0120904 | A1* | 5/2017 | Kentley | G01S 17/875 |
| 2017/0123428 | A1 | 5/2017 | Levinson et al. | |
| 2018/0012370 | A1* | 1/2018 | Aghamohammadi | G06F 18/251 |
| 2018/0096605 | A1 | 4/2018 | Bai et al. | |
| 2020/0249356 | A1* | 8/2020 | Huang | G05D 1/0231 |
| 2020/0365029 | A1* | 11/2020 | Kourous-Harrigan | G08G 1/167 |
| 2021/0103285 | A1* | 4/2021 | Philbin | G05D 1/617 |
| 2021/0131823 | A1* | 5/2021 | Giorgio | G06V 10/803 |
| 2021/0197805 | A1* | 7/2021 | Robbel | G06V 10/764 |
| 2021/0341603 | A1* | 11/2021 | Park | G06N 3/04 |
| 2021/0354690 | A1* | 11/2021 | Yershov | G01S 17/89 |
| 2022/0383749 | A1* | 12/2022 | Ishikawa | G08G 1/166 |
| 2022/0383750 | A1 | 12/2022 | Sharma Banjade et al. | |

FOREIGN PATENT DOCUMENTS

| | | | | | |
|---|---|---|---|---|---|
| JP | 2015081022 | A | * | 4/2015 | B60K 31/0008 |
| KR | 10-2017-0047143 | A | | 5/2017 | |
| KR | 20170047143 | A | * | 5/2017 | |
| WO | 2021141770 | | | 7/2021 | |
| WO | 2021194590 | | | 9/2021 | |

OTHER PUBLICATIONS

International Search Report and Written Opinion mailed Apr. 5, 2021 for International Patent Application No. PCT/US2020/066483, 17 pages.

International Preliminary Report On Patentability mailed Oct. 6, 2022 for International Patent Application No. PCT/US2020/066483, 11 pages.

U.S. Appl. No. 17/761,141, filed Mar. 16, 2022, Intelligent Transport System Vulnerable Road User Clustering, User Profiles, and Maneuver Coordination Mechanisms.

"U.S. Appl. No. 17/761,141, Non Final Office Action mailed Jan. 26, 2024", 20 pgs.

"European Application Serial No. 20912428.8, Extended European Search Report mailed Dec. 4, 2023", 9 pgs.

"ETSI 103 300-1 v2.1.1", Intelligent Transport System (ITS);Vulnerable Road Users (VRU) awareness;Part 1: Use Cases definition;Release 2, (Sep. 2019), 74 pgs.

"U.S. Appl. No. 17/761,141, Preliminary Amendment filed Mar. 16, 2022", 10 pgs.

"International Application Serial No. PCT US2020 066473, International Search Report mailed Apr. 22, 2021", 4 pgs.

"International Application Serial No. PCT US2020 066473, Written Opinion mailed Apr. 22, 2021", 5 pgs.

"Intelligent Transport System (ITS); Vulnerable Road Users (VRU) awareness; Part 2: Functional Architecture and Requirements definition Release 2", Draft ETSI TS 103 300-2 V0.3.2, (2109-12), 81 pgs.

"International Application Serial No. PCT US2020 066473, International Preliminary Report on Patentability mailed Jul. 21, 2022", 7 pgs.

"U.S. Appl. No. 17/761,141, Response filed Apr. 26, 2024 to Non Final Office Action mailed Jan. 26, 2024", 17 pgs.

"European Application Serial No. 20912428.8, Response filed Apr. 11, 2024 to Extended European Search Report mailed Dec. 4, 2023", 17 pgs.

"ETSI TS 103 300-2 V2.1.1", Intelligent Transport System (ITS);Vulnerable Road Users (VRU) awareness;Part 2: Functional Architecture and Requirements definition; Release 2, (May 2020), 71 pgs.

"U.S. Appl. No. 17/761,141, Final Office Action mailed May 24, 2024", 28 pgs.

"U.S. Appl. No. 17/761,141, Response filed Jul. 24, 2024 to Final Office Action mailed May 24, 2024", 18 pgs.

"European Application Serial No. 20912428.8, Communication Pursuant to Article 94(3) EPC mailed Jul. 26, 2024", 7 pgs.

"U.S. Appl. No. 17/761,141, Advisory Action mailed Aug. 2, 2024", 3 pgs.

ETSI, "Intelligent Transport System (ITS); Vulnerable Road Users (VRU) awareness; Part 2: Functional Architecture and Requirements definition; Release 2", ETSI TS 103 300-2 V2.1.1, [Online]. Retrieved from the Internet: URL: https: www.etsi.org deliver etsi_ts 103300_103399 10330002 02.01.01_60 ts_10330002v020101p.pdf, (May 2020), 71 pgs.

Fbconsulting, S. A., "Draft—TS 103 300-2 v0.3.0—VRU Architecture", ETSI Draft; Itswg1 (19)000108R1, European Telecommunications Standards Institute (ETSI), 650, Route Des Lucioles ; F-06921 Sophia-Antipolis ; France, vol. WG Its, [Online]. Retrieved from the Internet: URL:docbox.etsi.org ITS ITSWG1 05-CONTRIBUTIONS 2019 ITSWG1 (19)000108r1_Draft_-_TS_103_300-2_v0_3_0_-_VRU_Architecture ITS-00186v032.docx, (Dec. 13, 2019), 1-81.

Mengying, Ren, "A mobility-based scheme for dynamic clustering in vehicular ad-hoc networks (VANETs)", Vehicular Communications, vol. 9,, (Jul. 1, 2017), 233-241.

* cited by examiner

DYNAMIC CONTEXTUAL ROAD OCCUPANCY MAP PERCEPTION FOR VULNERABLE ROAD USER SAFETY IN INTELLIGENT TRANSPORTATION SYSTEMS

RELATED APPLICATIONS

The present application is a national phase entry under 37 U.S.C. § 371 of Int'l App. No. PCT/US2020/066483, filed Dec. 21, 2020, which designated, among various States, the United States of America, and which claims priority to U.S. Provisional App. No. 62/994,471 filed Mar. 25, 2020 ("['471]"), and U.S. Provisional App. No. 63/033,597 filed Jun. 2, 2020 ("['597]"), the contents of each of which areis hereby incorporated by reference in their entireties and for all purposes.

TECHNICAL FIELD

Embodiments described herein generally relate to edge computing, network communication, and communication system implementations, and in particular, to connected and computer-assisted (CA)/autonomous driving (AD) vehicles, Internet of Vehicles (IoV), Internet of Things (IoT) technologies, and Intelligent Transportation Systems.

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS. These RATs may need to coexist in one or more communication channels, such as those available in the 5.9 Gigahertz (GHz) band. Existing RATs do not have mechanisms to coexist with one another and are usually not interoperable with one another.

Cooperative Intelligent Transport Systems (C-ITS) have been developed to enable an increase in traffic safety and efficiency, and to reduce emissions and fuel consumption. The initial focus of C-ITS was on road traffic safety and especially on vehicle safety. Recent efforts are being made to increase traffic safety and efficiency for vulnerable road users (VRUs), which refers to both physical entities (e.g., pedestrians) and/or user devices (e.g., mobile stations, etc.) used by physical entities. Regulation (EU) No 168/2013 of the European Parliament and of the Council of 15 Jan. 2013 on the approval and market surveillance of two- or three-wheel vehicles and quadricycles ("EU regulation 168/2013") provides various examples of VRUs.

Computer-assisted and/or autonomous driving (AD) vehicles ("CA/AD vehicles") are expected to reduce VRU-related injuries and fatalities by eliminating or reducing human-error in operating vehicles. However, to date CA/AD vehicles can do very little about detection, let alone correction of the human-error at VRUs' end, even though it is equipped with a sophisticated sensing technology suite, as well as computing and mapping technologies.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
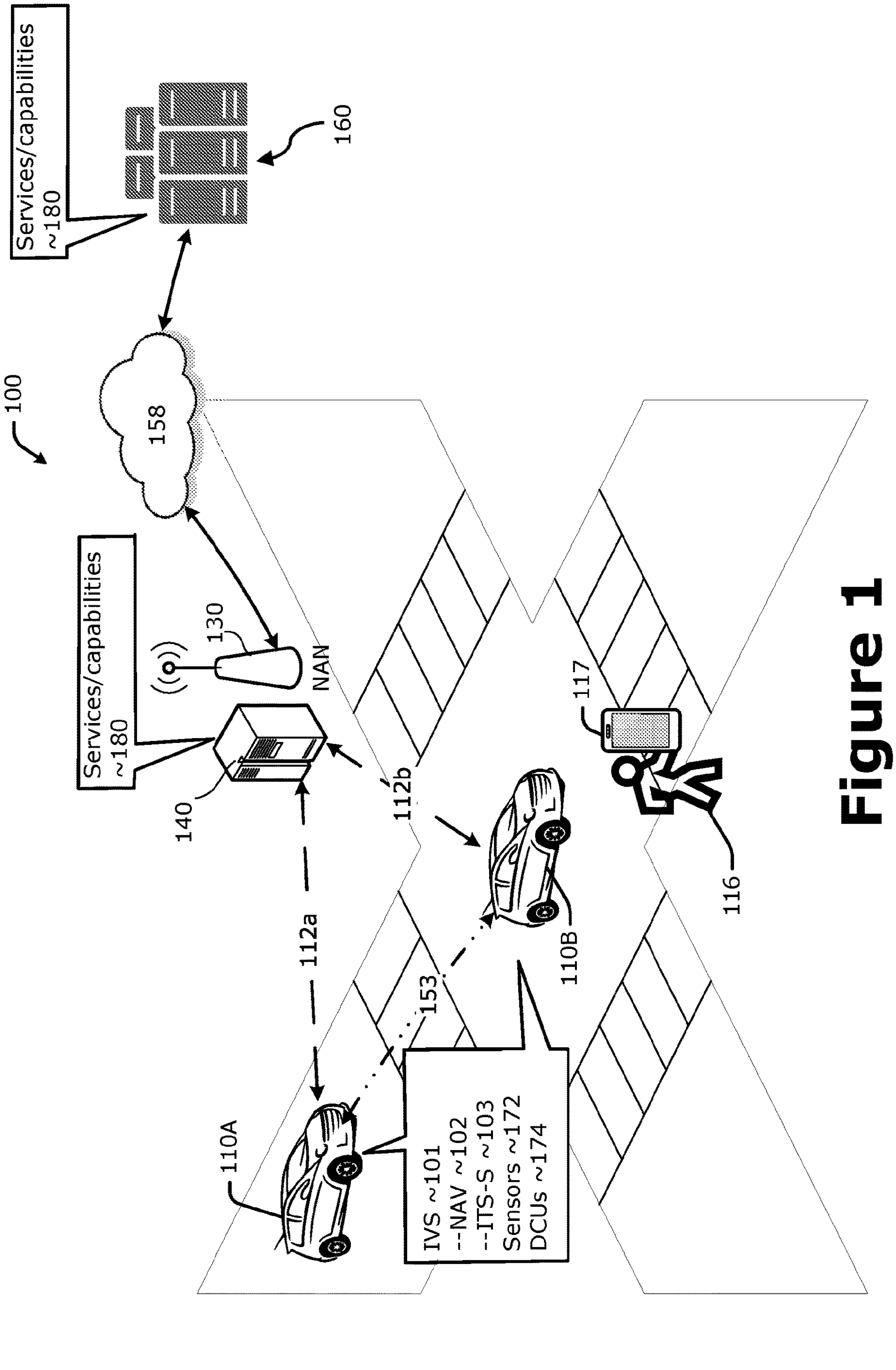
FIG. 1 illustrates an operative arrangement in which various embodiments may be practiced.

The operation and control of vehicles is becoming more autonomous over time, and most vehicles will likely become fully autonomous in the future. Vehicles that include some form of autonomy or otherwise assist a human operator may be referred to herein as "computer-assisted or autonomous driving" vehicles. Computer-assisted or autonomous driving (CA/AD) vehicles may include Artificial Intelligence (AI), machine learning (ML), and/or other like self-learning systems to enable autonomous operation and/or provide driving assistance capabilities. Typically, these systems perceive their environment (e.g., using sensor data) and perform various actions to maximize the likelihood of successful vehicle operation.

The Vehicle-to-Everything (V2X) applications (referred to simply as "V2X") include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X applications can use co-operative awareness to provide more intelligent services for end-users. This means that entities, such as vehicle stations or vehicle user equipment (vUEs) including such as CA/AD vehicles, roadside infrastructure or roadside units (RSUs), application servers, and pedestrian devices (e.g., smartphones, tablets, etc.), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like.

One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, etc.). Elements of ITS are standardized in various standardization organizations, both on an international level and on regional levels. Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since the present embodiments are applicable to any number of different RATs (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM), and/or other wireless communication technologies.

FIG. 1 illustrates an overview of an environment 100 for incorporating and using the embodiments of the present disclosure. As shown, for the illustrated embodiments, the example environment includes vehicles 110A and 10B (collectively "vehicle 110"). Vehicles 110 includes an engine, transmission, axles, wheels and so forth (not shown). The vehicles 110 may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. as used herein refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 110 shown by FIG. 1 may represent motor vehicles of varying makes, models, trim, etc.

For illustrative purposes, the following description is provided for deployment scenarios including vehicles 110 in a 2D freeway/highway/roadway environment wherein the vehicles 110 are automobiles. However, the embodiments described herein are also applicable to other types of vehicles, such as trucks, busses, motorboats, motorcycles, electric personal transporters, and/or any other motorized devices capable of transporting people or goods. Also, embodiments described herein are applicable to social networking between vehicles of different vehicle types. The embodiments described herein may also be applicable to 3D deployment scenarios where some or all of the vehicles 110 are implemented as flying objects, such as aircraft, drones, UAVs, and/or to any other like motorized devices.

For illustrative purposes, the following description is provided for example embodiments where the vehicles 110 include in-vehicle systems (IVS) 101, which are discussed in more detail infra. However, the vehicles 110 could include additional or alternative types of computing devices/systems such as smartphones, tablets, wearables, laptops, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, engine management system, and the like that may be operable to perform the various embodiments discussed herein. Vehicles 110 including a computing system (e.g., IVS 101) as well as the vehicles referenced throughout the present disclosure, may be referred to as vehicle user equipment (vUE) 110, vehicle stations 110, vehicle ITS stations (V-ITS-S) 110, computer assisted (CA)/autonomous driving (AD) vehicles 110, and/or the like.

Each vehicle 110 includes an in-vehicle system (IVS) 101, one or more sensors 172, and one or more driving control units (DCUs) 174. The IVS 100 includes a number of vehicle computing hardware subsystems and/or applications including, for example, various hardware and software elements to implement the ITS architecture of FIG. 10. The vehicles 110 may employ one or more V2X RATs, which allow the vehicles 110 to communicate directly with one another and with infrastructure equipment (e.g., network access node (NAN) 130). The V2X RATs may refer to 3GPP cellular V2X RAT (e.g., LTE, 5G/NR, and beyond), a WLAN V2X (W-V2X) RAT (e.g., DSRC in the USA or ITS-G5 in the EU), and/or some other RAT such as those discussed herein. Some or all of the vehicles 110 may include positioning circuitry to (coarsely) determine their respective geolocations and communicate their current position with the NAN 130 in a secure and reliable manner. This allows the vehicles 110 to synchronize with one another and/or the NAN 130. Additionally, some or all of the vehicles 110 may be computer-assisted or autonomous driving (CA/AD) vehicles, which may include artificial intelligence (AI) and/or robotics to assist vehicle operation.

Figure 13:
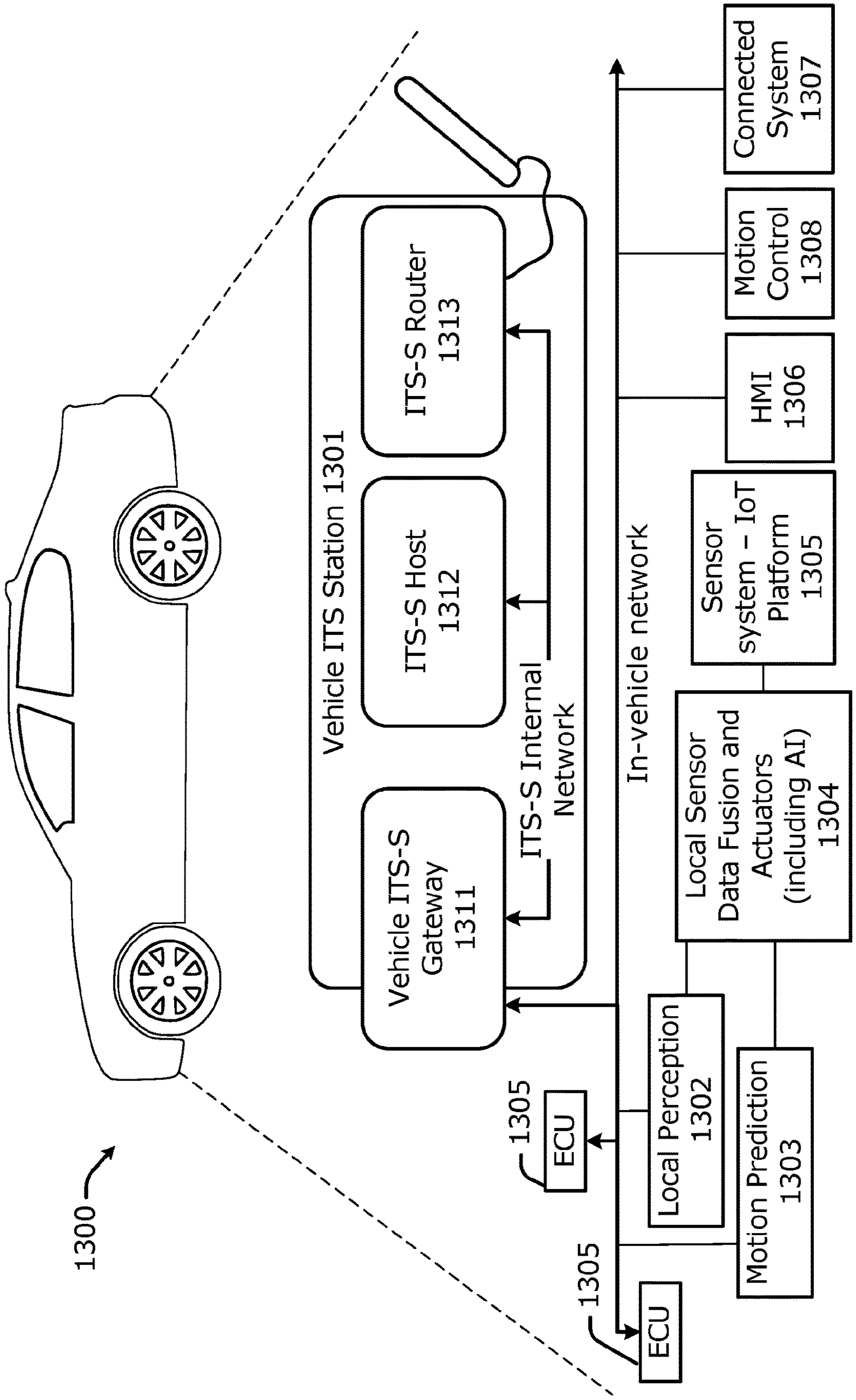
FIG. 13 depicts an example vehicle ITS station (V-ITS-S) in a vehicle system according to various embodiments.

The IVS 101 includes the ITS-S 103, which may be the same or similar to the ITS-S 1301 of FIG. 13. The IVS 101 may be, or may include, Upgradeable Vehicular Compute Systems (UVCS) such as those discussed infra. As discussed herein, the ITS-S 103 (or the underlying V2X RAT circuitry on which the ITS-S 103 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

Except for the UVCS technology of the present disclosure, IVS 101 and CA/AD vehicle 110 otherwise may be any one of a number of in-vehicle systems and CA/AD vehicles, from computer-assisted to partially or fully autonomous vehicles. Additionally, the IVS 101 and CA/AD vehicle 110 may include other components/subsystems not shown by FIG. 1 such as the elements shown and described throughout the present disclosure. These and other aspects of the underlying UVCS technology used to implement IVS 101 will be further described with references to remaining FIGS. 10-15.

In addition to the functionality discussed herein, the ITS-S 1301 (or the underlying V2X RAT circuitry on which the ITS-S 1301 operates) is capable of measuring various signals or determining/identifying various signal/channel characteristics. Signal measurement may be performed for cell selection, handover, network attachment, testing, and/or other purposes. The measurements/characteristics collected by the ITS-S 1301 (or V2X RAT circuitry) may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 130 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215 v16.1.0 (2020-04), IEEE 802.11, Part 11: "Wireless LAN Medium Access Control (MAC) and Physical Layer (PHY) specifications, IEEE Std.", and/or the like. The same or similar measurements may be measured or collected by the NAN 130.

The subsystems/applications may also include instrument cluster subsystems, front-seat and/or back-seat infotainment subsystems and/or other like media subsystems, a navigation subsystem (NAV) 102, a vehicle status subsystem/application, a HUD subsystem, an EMA subsystem, and so forth. The NAV 102 may be configurable or operable to provide navigation guidance or control, depending on whether vehicle 110 is a computer-assisted vehicle, partially or fully autonomous driving vehicle. NAV 102 may be configured with computer vision to recognize stationary or moving objects (e.g., a pedestrian, another vehicle, or some other moving object) in an area surrounding vehicle 110, as it travels enroute to its destination. The NAV 102 may be configurable or operable to recognize stationary or moving objects in the area surrounding vehicle 110, and in response, make its decision in guiding or controlling DCUs of vehicle 110, based at least in part on sensor data collected by sensors 172.

The DCUs 174 include hardware elements that control various systems of the vehicles 110, such as the operation of the engine, the transmission, steering, braking, etc. DCUs 174 are embedded systems or other like computer devices that control a corresponding system of a vehicle 110. The DCUs 174 may each have the same or similar components as devices/systems of Figures 1774 discussed infra, or may be some other suitable microcontroller or other like processor device, memory device(s), communications interfaces, and the like. Individual DCUs 174 are capable of communicating with one or more sensors 172 and actuators (e.g., actuators 1774 of FIG. 17). The sensors 172 are hardware elements configurable or operable to detect an environment surrounding the vehicles 110 and/or changes in the environment. The sensors 172 are configurable or operable to provide various sensor data to the DCUs 174 and/or one or more AI agents to enable the DCUs 174 and/or one or more AI agents to control respective control systems of the vehicles 110. Some or all of the sensors 172 may be the same or similar as the sensor circuitry 1772 of FIG. 17. Further, each vehicle 110 is provided with the RSS embodiments of the present disclosure. In particular, the IVS 101 may include or implement a facilities layer and operate one or more facilities within the facilities layer.

IVS 101, on its own or in response to user interactions, communicates or interacts with one or more vehicles 110 via interface 153, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, etc.). Other technologies could be used, such as Bluetooth/Bluetooth Low Energy (BLE) or the like. In various embodiments, the vehicles 110 may exchange ITS protocol data units (PDUs) or other messages of the example embodiments with one another over the interface 153.

IVS 101, on its own or in response to user interactions, communicates or interacts with one or more remote/cloud servers 160 via NAN 130 over interface 112 and over network 158. The NAN 130 is arranged to provide network connectivity to the vehicles 110 via respective interfaces 112 between the NAN 130 and the individual vehicles 110. The NAN 130 is, or includes, an ITS-S, and may be a roadside ITS-S (R-ITS-S). The NAN 130 is a network element that is part of an access network that provides network connectivity to the end-user devices (e.g., V-ITS-Ss 110 and/or VRU ITS-Ss 117). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 130. This virtualized framework allows the freed-up processor cores of the NAN 130 to perform other virtualized applications, such as virtualized applications for the VRU/V-ITS-S embodiments discussed herein.

Environment 100 also includes VRU 116, which includes a VRU ITS-S 117. The VRU 116 is a non-motorized road users as well as L class of vehicles (e.g., mopeds, motorcycles, Segways, etc.), as defined in Annex I of EU regulation 168/2013 (see e.g., International Organization for Standardization (ISO) D., "Road vehicles—Vehicle dynamics and road-holding ability—Vocabulary", ISO 8855 (2013) (hereinafter "[ISO8855]")). A VRU 116 is an actor that interacts with a VRU system 117 in a given use case and behavior scenario. For example, if the VRU 116 is equipped with a personal device, then the VRU 116 can directly interact via the personal device with other ITS-Stations and/or other VRUs 116 having VRU devices 117. The VRU ITS-S 117 could be either pedestrian-type VRU (see e.g., P-ITS-S 1401 of FIG. 14) or vehicle-type (on bicycle, motorbike) VRU. The term "VRU ITS-S" as used herein refers to any type of VRU device or VRU system. Before the potential VRU can even be identified as a VRU, it may be referred to as a non-VRU and considered to be in IDLE state or inactive state in the ITS.

If the VRU 116 is not equipped with a device, then the VRU 116 interacts indirectly, as the VRU 116 is detected by another ITS-Station in the VRU system 117 via its sensing devices such as sensors and/or other components. However, such VRUs 116 cannot detect other VRUs 116 (e.g., a bicycle). In ETSI TS 103 300-2 V0.3.0 (2019-12) ("[TS103300-2]"), the different types of VRUs 116 have been categorized into the following four profiles:

- VRU Profile-1: Pedestrians (pavement users, children, pram, disabled persons, elderly, etc.)
- VRU Profile-2: Bicyclists (light vehicles carrying persons, wheelchair users, horses carrying riders, skaters, e-scooters, Segways, etc.), and
- VRU Profile-3: Motorcyclists (motorbikes, powered two wheelers, mopeds, etc.).
- VRU Profile-4: Animals posing safety risk to other road users (dogs, wild animals, horses, cows, sheep, etc.).

These profiles further define the VRU functional system and communications architectures for VRU ITS-S 117. For robustly supporting the VRU profile awareness enablement, embodiments herein provide VRU related functional system requirements, protocol and message exchange mechanisms including, but not limited to, VAMs [TS103300-2]. Additionally, the embodiments herein also apply to each VRU device type listed in Table 0-1 (see e.g., [TS103300-2]).

TABLE 0-1

| VRU Type | Description |
|---|---|
| VRU-Tx | VRU device 117 is equipped with transmitter only and can broadcast beacon messages about the VRU 116 |
| VRU-Rx | VRU device 117 is equipped with a receiver only and application to receive message from other ITS-Ss and capable of warning/notifying the VRU 116 |
| VRU-St | VRU device 117 contains and ITS-S including both VRU-Tx and VRU-Rx capabilities |

A VRU 116 can be equipped with a portable device (e.g., device 117). The term "VRU" may be used to refer to both a VRU 116 and its VRU device 117 unless the context dictates otherwise. The VRU device 117 may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

A "VRU system" (e.g., VRU ITS-S 117) comprises ITS artefacts that are relevant for VRU use cases and scenarios such as those discussed herein, including the primary components and their configuration, the actors and their equipment, relevant traffic situations, and operating environments. The terms "VRU device," "VRU equipment," and "VRU system" refers to a portable device (e.g., mobile stations such as smartphones, tablets, wearable devices, fitness tracker, etc.) or an IoT device (e.g., traffic control devices) used by a VRU 116 integrating ITS-S technology, and as such, the VRU ITS-S 117 may include or refer to a "VRU device," "VRU equipment," and/or "VRU system".

The VRU systems considered in the present disclosure are Cooperative Intelligent Transport Systems (C-ITS) that comprise at least one Vulnerable Road User (VRU) and one ITS-Station with a VRU application. The ITS-S can be a Vehicle ITS-Station or a Road side ITS-Station that is processing the VRU application logic based on the services provided by the lower communication layers (Facilities, Networking & Transport and Access layer (see e.g., ETSI EN 302 665 V1.1.1 (2010-09) ("[EN302665]")), related hardware components, other in-station services and sensor sub-systems. A VRU system may be extended with other VRUs, other ITS-S and other road users involved in a scenario such as vehicles, motorcycles, bikes, and pedestrians. VRUs may be equipped with ITS-S or with different technologies (e.g., IoT) that enable them to send or receive an alert. The VRU system considered is thus a heterogeneous system. A definition of a VRU system is used to identify the system components that actively participate in a use case and behavior scenario. The active system components are equipped with ITS-Stations, while all other components are passive and form part of the environment of the VRU system.

The VRU ITS-S 117 may operate one or more VRU applications. A VRU application is an application that extends the awareness of and/or about VRUs and/or VRU clusters in or around other traffic participants. VRU applications can exist in any ITS-S, meaning that VRU applications can be found either in the VRU itself or in non-VRU ITS stations, for example cars, trucks, buses, road-side stations or central stations. These applications aim at providing VRU-relevant information to actors such as humans directly or to automated systems. VRU applications can increase the awareness of vulnerable road users, provide VRU-collision risk warnings to any other road user or trigger an automated action in a vehicle. VRU applications make use of data received from other ITS-Ss via the C-ITS network and may use additional information provided by the ITS-S own sensor systems and other integrated services.

In general, there are four types of VRU equipment 117 including non-equipped VRUs (e.g., a VRU 116 not having a device); VRU-Tx (e.g., a VRU 116 equipped with an ITS-S 117 having only a transmission (Tx) but no reception (Rx) capabilities that broadcasts awareness messages or beacons about the VRU 116); VRU-Rx (e.g., a VRU 116 equipped with an ITS-S 117 having only an Rx (but no Tx) capabilities that receives broadcasted awareness messages or beacons about the other VRUs 116 or other non-VRU ITS-Ss); and VRU-St (e.g., a VRU 116 equipped with an ITS-S 117 that includes the VRU-Tx and VRU-Rx functionality). The use cases and behavior scenarios consider a wide set of configurations of VRU systems 117 based on the equipment of the VRU 116 and the presence or absence of V-ITS-S 110 and/or R-ITS-S 130 with a VRU application. Examples of the various VRU system configurations are shown by table 2 of ETSI TR 103 300-1 v2.1.1 (2019-09) ("[TR103 300-1]").

The message specified for VRUs 116/117 is the VRU awareness message (VAM). VAMs are messages transmitted from VRU ITSs 117 to create and maintain awareness of VRUs 116 participating in the VRU/ITS system. VAMs are harmonized in the largest extent with the existing Cooperative Awareness Messages (CAM) defined in [EN302637-2]. The transmission of the VAM is limited to the VRU profiles specified in clause 6.1 of [TS103300-2] The VAMs contain all required data depending on the VRU profile and the actual environmental conditions. The data elements in the VAM should be as described in Table 0-2.

TABLE 0-2

VAM data elements

| Parameter | Comments |
|---|---|
| VAM header including VRU identifier | The VRU ID is a unique identifier of a VRU 116/117 within the coverage region of an ITS-S such as an R-ITS-S 130. |
| VRU position | The VRU position is a unique position, set of coordinates, geolocation, Geo-Area, etc., associated with a VRU's physical location in 2D or 3D plane |
| (VAM) Generation time | A timestamp of VAM generation; the time required for a VAM generation refers to the time difference between time at which a VAM generation is triggered and the time at which the VAM is delivered to the networking & transport layer. |
| VRU Profile | profiles derived from the use cases and analysis in clause 7.2 of [TR103300-1] |
| VRU type | For example, VRU profile is pedestrian, VRU type is infant, animal, adult, child, etc. |
| VRU cluster identifier (ID) | Random and/or locally unique ID of a VRU cluster; locally unique in that it is different from any cluster identifier in a VAM received by the VBS in the last timeClusterUniquenessThreshold time. |
| VRU cluster position | The reference position of a VRU cluster, which refers to a ground position at the center point of the face side of the first VRU bounding box. |
| VRU cluster dimension | geographical size and/or bounding box size |
| VRU cluster size | number of members in the cluster |
| VRU size class | mandatory if outside a VRU cluster, optional if inside a VRU cluster |
| VRU weight class | mandatory if outside a VRU cluster, optional if inside a VRU cluster |
| VRU speed | Velocity of an individual VRU or coherent speed of a VRU cluster; speed in moving direction and/or speed accuracy of the originating ITS-S, |
| VRU direction | Heading and/or heading accuracy of the originating ITS-S with regards to the true north or some other geodetic direction. |
| VRU orientation | The angle of a VRU with respect to its longitudinal axis with regards to WGS84 north or true north. |
| Predicted trajectory | succession of way points |
| Predicted velocity | including 3D heading and average speed |
| Heading change indicators | turning left or turning right indicators |
| Hard braking indicator | Indicator alerting drivers/riders of any hard braking that is performed by vehicles or vehicle VRUs in front. |

NOTE:
"M" stands for "mandatory" which means that the data element is always included in the VAM message.
"O" stands for "optional" which means that the data element can be included in the VAM message.
"C" stands for "conditional" which means that the data element is included in the VAM message under certain conditions The VRU system 117 supports the flexible and dynamic triggering of messages with generation intervals from X milliseconds (ms) at the most frequent, where X is a number (e.g., X=100 ms). The VAMs frequency is related to the VRU motion dynamics and chosen collision risk metric as discussed in clause 6.5.10.5 of [TS103300-3].

The number of VRUs 116 operating in a given area can get very high. In some cases, the VRU 116 can be combined with a VRU vehicle (e.g., rider on a bicycle or the like). In order to reduce the amount of communication and associated resource usage (e.g., spectrum requirements), VRUs 116 may be grouped together into one or more VRU clusters. A VRU cluster is a set of two or more VRUs 116 (e.g., pedestrians) such that the VRUs 116 move in a coherent manner, for example, with coherent velocity or direction and within a VRU bounding box. A "coherent cluster velocity" refers to the velocity range of VRUs 116 in a cluster such that the differences in speed and heading between any of the VRUs in a cluster are below a predefined threshold. A "VRU bounding box" is a rectangular area containing all the VRUs 116 in a VRU cluster such that all the VRUs in the bounding box make contact with the surface at approximately the same elevation.

VRU clusters can be homogeneous VRU clusters (e.g., a group of pedestrians) or heterogeneous VRU clusters (e.g., groups of pedestrians and bicycles with human operators). These clusters are considered as a single object/entity. The parameters of the VRU cluster are communicated using VRU Awareness Messages (VAMs), where only the cluster head continuously transmits VAMs. The VAMs contain an optional field that indicates whether the VRU 116 is leading a cluster, which is not present for an individual VRUs (e.g., other VRUs in the cluster should not transmit VAM or should transmit VAM with very long periodicity). The leading VRU also indicates in the VAM whether it is a homogeneous cluster or heterogeneous, the latter one being of any combination of VRUs. Indicating whether the VRU cluster is heterogeneous and/or homogeneous may provide useful information about trajectory and behaviors prediction when the cluster is disbanded.

The use of a bicycle or motorcycle will significantly change the behavior and parameters set of the VRU using this non-VRU object (or VRU vehicle such as a "bicycle"/"motorcycle"). A combination of a VRU 116 and a non-VRU object is called a "combined VRU." VRUs 116 with VRU Profile 3 (e.g., motorcyclists) are usually not involved in the VRU clustering.

A VAM contains status and attribute information of the originating VRU ITS-S 117. The content may vary depending on the profile of the VRU ITS-S 117. A typical status information includes time, position, motion state, cluster status, and others. Typical attribute information includes data about the VRU profile, type, dimensions, and others. The generation, transmission and reception of VAMs are managed by the VRU basic service (VBS) (see e.g., FIGS. 10-11). The VBS is a facilities layer entity that operates the VAM protocol. The VBS provides the following services: handling the VRU role, sending and receiving of VAMs to enhance VRU safety. The VBS also specifies and/or manages VRU clustering in presence of high VRU 116/117 density to reduce VAM communication overhead. In VRU clustering, closely located VRUs with coherent speed and heading form a facility layer VRU cluster and only cluster head VRU 116/117 transmits the VAM. Other VRUs 116/117 in the cluster skip VAM transmission. Active VRUs 116/117 (e.g., VRUs 116/117 not in a VRU cluster) send individual VAMs (called single VRU VAM or the like). An "individual VAM" is a VAM including information about an individual VRU 116/117. A VAM without a qualification can be a cluster VAM or an individual VAM.

The Radio Access Technologies (RATs) employed by the NAN 130, the V-ITS-Ss 110, and the VRU ITS-S 117 may include one or more V2X RATs, which allow the V-ITS-Ss 110 to communicate directly with one another, with infrastructure equipment (e.g., NAN 130), and with VRU devices 117. In the example of FIG. 1, any number of V2X RATs may be used for V2X communication. In an example, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 112*a* and the WLAN V2X RAT may utilize an air interface 112*b*. The access layer for the ITS-G5 interface is outlined in ETSI EN 302 663 V1.3.1 (2020-01) (hereinafter "[EN302663]") and describes the access layer of the ITS-S reference architecture 1000. The ITS-G5 access layer comprises IEEE 802.11-2016 (hereinafter "[IEEE80211]") and IEEE 802.2 Logical Link Control (LLC) (hereinafter "[IEEE8022]") protocols. The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03). In embodiments, the NAN 130 or an edge compute node 140 may provide one or more services/capabilities 180.

In V2X scenarios, a V-ITS-Ss 110 or a NAN 130 may be or act as a RSU or R-ITS-S 130, which refers to any transportation infrastructure entity used for V2X communications. In this example, the RSU 130 may be a stationary RSU, such as an gNB/eNB-type RSU or other like infrastructure, or relatively stationary UE. In other embodiments, the RSU 130 may be a mobile RSU or a UE-type RSU, which may be implemented by a vehicle (e.g., V-ITS-Ss 110), pedestrian, or some other device with such capabilities. In these cases, mobility issues can be managed in order to ensure a proper radio coverage of the translation entities.

In an example implementation, RSU 130 is a computing device coupled with radio frequency circuitry located on a roadside that provides connectivity support to passing V-ITS-Ss 110. The RSU 130 may also include internal data storage circuitry to store intersection map geometry, traffic statistics, media, as well as applications/software to sense and control ongoing vehicular and pedestrian traffic. The RSU 130 provides various services/capabilities 180 such as, for example, very low latency communications required for high speed events, such as crash avoidance, traffic warnings, and the like. Additionally or alternatively, the RSU 130 may provide other services/capabilities 180 such as, for example, cellular/WLAN communications services. In some implementations, the components of the RSU 130 may be packaged in a weatherproof enclosure suitable for outdoor installation, and may include a network interface controller to provide a wired connection (e.g., Ethernet) to a traffic signal controller and/or a backhaul network. Further, RSU 130 may include wired or wireless interfaces to communicate with other RSUs 130 (not shown by FIG. 1)

In arrangement 100, V-ITS-S 110*a* may be equipped with a first V2X RAT communication system (e.g., C-V2X) whereas V-ITS-S 110*b* may be equipped with a second V2X RAT communication system (e.g., W-V2X which may be DSRC, ITS-G5, or the like). In other embodiments, the V-ITS-S 110*a* and/or V-ITS-S 110*b* may each be employed with one or more V2X RAT communication systems. In these embodiments, the RSU 130 may provide V2X RAT translation services among one or more services/capabilities 180 so that individual V-ITS-Ss 110 may communicate with one another even when the V-ITS-Ss 110 implement different V2X RATs. According to various embodiments, the RSU

130 (or edge compute node 140) may provide VRU services among the one or more services/capabilities 180 wherein the RSU 130 shares CPMs, MCMs, VAMs DENMs, CAMs, etc., with V-ITS-Ss 110 and/or VRUs for VRU safety purposes including RSS purposes. The V-ITS-Ss 110 may also share such messages with each other, with RSU 130, and/or with VRUs. These messages may include the various data elements and/or data fields as discussed herein.

In this example, the NAN 130 may be a stationary RSU, such as an gNB/eNB-type RSU or other like infrastructure. In other embodiments, the NAN 130 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 130 that enables the connections 112 may be referred to as a "RAN node" or the like. The RAN node 130 may comprise ground stations (e.g., terrestrial access points) or satellite stations providing coverage within a geographic area (e.g., a cell). The RAN node 130 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 130 is embodied as a NodeB, evolved NodeB (eNB), or a next generation NodeB (gNB), one or more relay nodes, distributed units, or Road Side Unites (RSUs). Any other type of NANs can be used. Additionally, the RAN node 130 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc.

The network 158 may represent a network such as the Internet, a wireless local area network (WLAN), or a wireless wide area network (WWAN) including proprietary and/or enterprise networks for a company or organization, a cellular core network (e.g., an evolved packet core (EPC) network, a NextGen Packet Core (NPC) network, a 5G core (5GC), or some other type of core network), a cloud computing architecture/platform that provides one or more cloud computing services, and/or combinations thereof. As examples, the network 158 and/or access technologies may include cellular technology such as LTE, MuLTEfire, and/or NR/5G (e.g., as provided by Radio Access Network (RAN) node 130), WLAN (e.g., WiFi®) technologies (e.g., as provided by an access point (AP) 130), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The remote/cloud servers 160 may represent one or more application servers, a cloud computing architecture/platform that provides cloud computing services, and/or some other remote infrastructure. The remote/cloud servers 160 may include any one of a number of services and capabilities 180 such as, for example, ITS-related applications and services, driving assistance (e.g., mapping/navigation), content provision (e.g., multi-media infotainment streaming), and/or the like.

Additionally, the NAN 130 is co-located with an edge compute node 140 (or a collection of edge compute nodes 140), which may provide any number of services/capabilities 180 to vehicles 110 such as ITS services/applications, driving assistance, and/or content provision services 180. The edge compute node 140 may include or be part of an edge network or "edge cloud." The edge compute node 140 may also be referred to as an "edge host 140," "edge server 140," or "compute platforms 140." The edge compute nodes 140 may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Servlets, servers, and/or other like computation abstractions. The edge compute node 140 may be implemented in a data center or cloud installation; a designated edge node server, an enterprise server, a roadside server, a telecom central office; or a local or peer at-the-edge device being served consuming edge services. The edge compute node 140 may provide any number of driving assistance and/or content provision services 180 to vehicles 110. The edge compute node 140 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 140 and/or edge computing network/cloud include Multi-Access Edge Computing (MEC), Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

1. Dynamic Contextual Road Occupancy Map for Perception Embodiments

For the VRU-related functions in the ITS station (ITS-S) architecture depicted in [TS103300-2], the functions such as VRU 116/117 sensor system, local sensor data fusion and actuation, local perception, motion dynamic prediction, among others, provide the data needed for overall contextual awareness of the environment at an ego VRU 116/117 with respect to the location, speed, velocity, heading, intention, and other features of other ITS-Ss on or in the vicinity of a road segment. The other ITS-Ss on the road include R-ITS-Ss 130, V-ITS-S 110, and VRUs 116/117 other than the ego VRU 116/117, which are in the neighborhood operational environment of the ego VRU 116/117. Such contextual awareness data generation and exchange among the involved ITS-Ss is thus the key to enable robust collision risk analysis and subsequently take measures for collision risk avoidance at the ITS-S application layer. Apart from the above, the ITS-S application layer is also responsible for functionalities involving cooperative perception, event detection, maneuver coordination, and others. On the other hand, the VRU Basic service located in the facilities layer is responsible to enable the functionalities specific to VRU along with the interfaces mapping to the ITS-S architecture.

The interfaces are responsible for data exchange among various other services located in the facilities layer such as Position and Time (PoTi) local dynamic map (LDM), Data Provider, and others. In addition, the VRU basic service also relies on other application support facilities such as Cooperative Awareness Service (CAS), Decentralized Environmental Notification (DEN) service, Collective Perception Service (CPS), Maneuver Coordination Service (MCS), Infrastructure service, etc.

Furthermore, the VRU basic service (VBS) located in the facilities layer is linked with other application support facilities, one of which is the Maneuver Coordination Service (MCS) as depicted in VRU-related functions in the ITS station architecture definition by [TS103300-2]. Like MCS in vehicular sub-system of ITS, MCS in VRU sub-systems should also be responsible for sharing, negotiating, and coordinating maneuvers including trajectory planning in a coordinated manner triggered by collision risk analysis such that any potential collision can be avoided. The VRU basic service is also responsible to transmit the VRU awareness message (VAM) to enable the assessment of the potential risk of collision of the VRU 116/117 with the other users of the road which could be other VRUs, non-VRUs, obstacles appearing suddenly on the road, and others.

MCS enables proximate ITS-S' (including between V-ITS-Ss 110) and infrastructure) to exchange information that facilitates and supports driving automation functions of automated and connected V-ITS-Ss 110. In particular, MCS enables proximate V-ITS-Ss 110 to share their maneuver intentions (e.g., lane change, lane passes, overtakes, cut-ins, drift into Ego Lane, and the like), planned trajectory, detected traffic situations, ITS-S state, and/or other like information. MCS provides a way of maneuver negotiation and interaction among proximate V-ITS-Ss 110 for safe, reliable, efficient, and comfortable driving. MCS may utilize a message type referred to as a Maneuver Coordination Message (MCM). MCMs include a set of DEs and/or DFs to transmit V-ITS-S 110 status, trajectory, and maneuver intention. Examples of MCMs are discussed in more detail in U.S. Provisional App. No. 62/930,354, "Maneuver Coordination Service For Vehicular Networks", filed on Nov. 4, 2019 ("[a1]") and U.S. Provisional App. No. 62/962,760, "Maneuver Coordination Service For Intelligent Transportation System", filed on Jan. 17, 2020 ("[a2]"). MCS assists in Traffic Congestion Avoidance coordination (e.g., in case a V-ITS-S 110 is in virtual deadlock due to parallel slow vehicles in front of it in all lanes), traffic efficiency enhancement (e.g., merging into a highway, Exiting a Highway, roundabout entering/exiting, confirming vehicle's intension such as false right turn indication of an approaching vehicle, etc.), safety enhancement in maneuver (e.g., safe and efficient lane changes, overtake, etc.), smart intersection management, emergency trajectory coordination (e.g., in case when an obstacle, animal, kid suddenly comes in a lane and more than one vehicles are required to agree on a collective maneuver plan), etc. MCS can also help in enhancing user experience by avoiding frequent hard breaks as front and other proximity (proximate) V-ITS-Ss 110 indicate their intention in advance whenever possible.

For realizing collision risk analysis and subsequent collision avoidance, the present disclosure provides facilities layer solutions to address the problem via contextual awareness of VRU 116/117 environment that may include static obstacles, dynamic/moving object, static obstacles, other VRUs, buffer zone around lethal obstacles essentially to improve awareness of the surrounding static/dynamic environment/people at the ego VRU. On the other hand, awareness of the ego VRU 116/117 across the surrounding ITS-S is equally important as well.

Thus, in various embodiments one or more ITS-S in the vicinity of the ego-VRU 116/117 (including the ego-VRU 116/117 itself) that have the required computation capability of generating, updating and maintaining such information, which is defined herein as a dynamic contextual road occupancy map (DCROM) for perception. On the other hand, depending on VRU 116/117 device capabilities, the VRU 116/117 may or may not have the capability to generate such DCROM which may be a map obtained by aggregating the perception data obtained from diverse classes of sensors (e.g., resulting from a layered occupancy map as explained infra). As such, two possibilities exist depending on VRU device capabilities, including high complexity VRUs (HC VRUs) 116/117 and low complexity VRU (LC-VRUs) 116/117.

HC VRUs 116/117 are VRUs 116/117 having advanced sensor or perception capabilities. HC VRUs 116/117 may include VRU types VRU types such as motorbikes and the like (e.g., Profile 3). However, the capability should not be limited exclusively to any profile types since even VRUs 116/117 other than those in Profile 3 (e.g., mopeds) may be able to carry some sophisticated additional devices such as GPU enabled cameras. Such possibilities are not precluded by the embodiments discussed herein. The VRU may have computation capability with higher sophistication sensors (e.g., Lidar, cameras, radar, etc.) and/or actuators for environment perception capability and such VRUs 116/117 can generate DCROM on their own. Furthermore, such DCROM at an ego-VRU 116/117 could be augmented by collaboratively exchanging VAMs with DCROM related fields.

LC VRUs 116/117 are VRUs 116/117 without advanced sensors or perception capabilities. LC VRUs 116/117 may include VRU types, such as pedestrians, bicycles, and the like (e.g., Profile 1, Profile 2, etc.), that may not have the computation capability to generate DCROM on their own. Therefore, LC VRUs 116/117 may have to obtain DCROM from the nearby computation capable ITS-S via VAM exchange.

To this end, the questions addressed by the present disclosure, which have not been addressed on VRU 116/117 Safety in ITS are as follows: How to represent the contextual road occupancy awareness of the VRU 116/117 environment? What are the mechanisms for acquiring, maintaining and updating such contextual road occupancy awareness of the surrounding road environment at VRUs 116/117 (both HC VRUs 116/117 and LC VRUs 116/117) and non-VRUSs (e.g., R-ITS-Ss 130, V-ITS-S 110)? What kind of message exchange protocol or mechanisms between VRU ITS-Ss 117 and the neighboring ITS-Ss are needed to incorporate such contextual road occupancy awareness in the VRU functional architecture? What are the corresponding data fields and bitmaps necessary to be introduced in the VAM container [TS103300-2] to support DCROM-based environmental awareness exchange among ITS-Ss? What are the impacts of such contextual awareness on collision risk analysis and collision risk avoidance including trajectory interception awareness and maneuvering action recommendations U.S. Provisional App. No. 62/967,874 filed Jan. 30, 2020, and U.S. application Ser. No. 17/761,141 filed Mar. 16, 2022, in the VRU ITS-S 117?

The embodiments herein are related to increasing the dynamic contextual awareness in VRU ITS-S 117. The DCROM enables, in general, the following services/functionalities within the functional architecture of the VRU system related to collision risk analysis and collision avoidance: Enhanced perception at HC VRUs 116/117, LC VRUs 116/117 as well as neighboring R-ITS-Ss 130 and V-ITS-Ss 110 via cooperative message exchange among the ITS-S. Robust motion dynamic prediction of the VRU 116/117 possible via enhanced awareness of the VRU 116/117 in the ITS due to additional perception input provided by DCROM. Event Detection such as: risk of collision among VRUs 116/117 or VRUs 116/117 colliding with non-VRU ITS-Ss; change of VRU 116/117 motion dynamics (trajectory, velocity, intention); and sudden appearance of obstacles, objects, people, static obstacles, road infrastructure piece of equipment and the like in the vicinity of the VRU 116/117. Trajectory Interception likelihood computation and corresponding Maneuvering action as well as maneuver Coordination among VRUs 116/117 (see e.g., U.S. application Ser. No. 17/761,141).

Embodiments discussed herein provide contextual road occupancy awareness based VRU 116/117 safety enabling concepts and mechanisms including but not limited to message exchange protocol and data fields extensions of the VAMs. Embodiments discussed herein include: (1) Dynamic Contextual Road Occupancy Map (DCROM) for Perception (DCROMP) of a VRU 116/117 environment derived based on the principle of layered costmaps (see e.g., Lu et al., "Layered Costmaps for Context-Sensitive Navigation," IEEE/RSJ International Conference on Intelligent Robots and Systems (IROS), Chicago, IL, IEEE, pp. 709-715 (September 2014) ("[LU]"); (2) format for representing the DCROM of VRU 116/117 environment in terms of single layer occupancy grid map; (3) VAM message exchange protocol and mechanisms for collaborative DCROM sharing among VRUs 116/117 as well as among VRUs 116/117 and neighboring ITS-Ss; and (4) details of VAM data fields and bitmaps to support exchange of DCROM related data in terms of two new data fields (i) probabilistic occupancy status indicator (OSI), and (ii) grid location indicator (GLI). The embodiments herein enable VRU 116/117 safety at in ITS, which enhances the V-ITS-S's 110 robustness in timely collision risk analysis and collision avoidance. The embodiments herein fit well for enabling road user's safety in autonomous V-ITS-Ss 110 as well.

1.1. Dynamic Contextual Road Occupancy Map Generation Embodiments

In VRUs, having a contextual awareness of the road occupancy environment may be used to address the issues outlined previously for VRU 116/117 collision avoidance sub-system of ITS and for enabling cooperative collision risk analysis in the vicinity of the VRU 116/117 environment and to trigger maneuver related actions for the ego VRU 116/117 as well as for the neighboring VRUs 116/117 (and non-VRUs) at risk. In various embodiments, a layered costmap approach based on [LU] is used to build the DCROM. The DCROM creates the awareness of the VRU 116/117 spatial environment occupancy.

Figure 2:
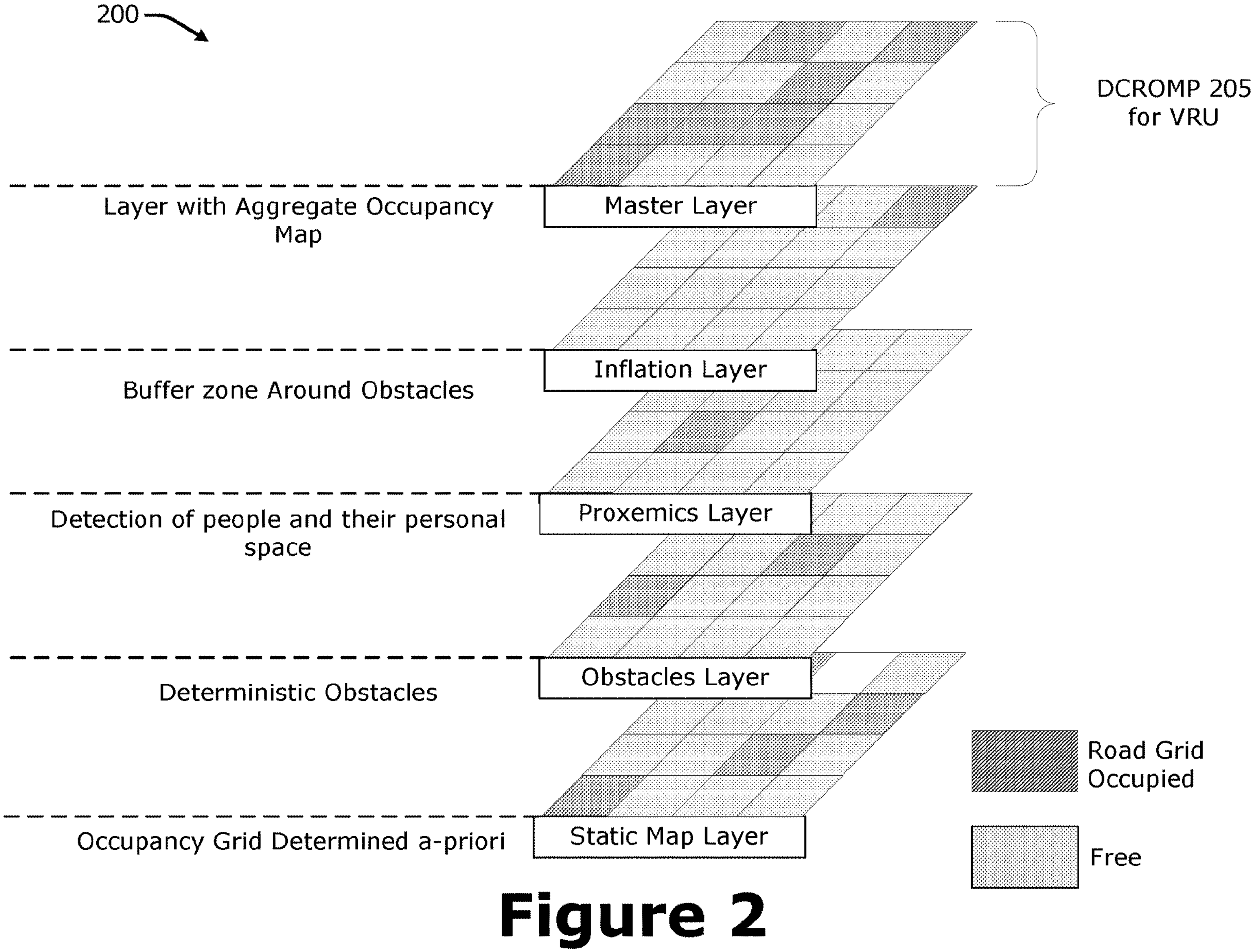
FIG. 2 illustrates an example layered occupancy map approach for building a Dynamic Contextual Road Occupancy Map (DCROM) for perception according to various embodiments.

FIG. 2 shows an example layered occupancy map approach 200 for building a Dynamic Contextual Road Occupancy Map (DCROM) 205 of the VRU 116/117 environment applicable for HC VRUs 116/117, R-ITS-Ss 130, and/or V-ITS-Ss 110, in accordance with various embodiments. The DCROM 205 corresponds to the aggregate occupancy represented by the master layer (or "master grid" in FIG. 2).

An occupancy map (or "costmap") is a data structure that contains a 2D grid of occupancy values that is/are used for path planning. In other words, an occupancy map represents the planning search space around a V-ITS-S 110, VRU 116/117, robot, or other movable object. The occupancy map is grid-based representation of an area or region comprising a set of cells or blocks. One or more of the cells carry values indicating a probability that a specific type of obstacle, object, and/or VRU 116/117 is present in an area represented by that cell. The grid or cell values in the occupancy map are referred to as "occupancy values" or "cost values", which represent the probability associated with entering or traveling through respective grid cells. Occupancy maps are used for navigating or otherwise traveling through dynamic environments populated with objects. For many use cases, such as CA/AD vehicles and/or (semi-)autonomous robotics, the travel path not only takes into account the starting and ending destinations, but also depends on having additional information about the larger contexts. Information about the environment that the path planners use is stored in the occupancy map.

ITS-Ss (e.g., V-ITS-Ss 110 and/or VRU ITS-Ss 117) may follow a global grid with same size of cell representation. Individual ITS-Ss prepare their own occupancy maps with a predefined shape and size. In some implementations, the occupancy map is a rectangular shape with a size of specified dimensions (e.g., n cells by m cells where n and m are numbers) in the FoV of one or more sensors or antenna elements. When occupancy map sharing is enabled, an ITS-S may prepare a bigger size occupancy map or a same size occupancy map as for the ITS-S's own use. Sharing the occupancy map may require changes in the dimensions of the occupancy map prepared for its own use, as neighbor ITS-Ss have different capabilities and/or are at different locations/lanes and heading in different direction.

The occupancy value (or "cost value") in each cell of the occupancy map represents a probability (or "cost") of navigating through a that grid cell. In other words, the occupancy value refers to a probability or likelihood that a given cell is free (unoccupied), occupied by an object, or unknown. In some implementations, the state of each grid cell can be one of free (unoccupied), occupied, or unknown, where calculated probabilities are converted or translated into one of the aforementioned categories. In other implementations, the calculated probabilities themselves may be inserted or added to respective cells.

The occupancy values of the occupancy map can be a cost as perceived by the ITS-S at a current time and/or a cost predicted at a specific future time (e.g., at a future time when the station intends to move to a new lane under a lane change maneuver). In case the original occupancy map contains the cost perceived at the current time, it is either included in either the MCM or a CPM, but not both to reduce overhead. However, a differential cost map can be contained in either a MCM, CPM, or both concurrently to enable fast updates to the cost map. For example, if a cost map update is triggered by an event and the station is scheduled for MCM transmission, the updated cost map can be included in the MCM.

A layered occupancy map maintains an ordered list of layers, each of which tracks the data related to a specific functionality and/or sensor type. The data for each layer is then accumulated into a master occupancy map, which takes two passes through the ordered list of layers. In the illustrated example, the layered occupancy map initially has four layers and the master occupancy map ("master layer" in FIG. 2). The static ("static map") layer, obstacles layer, proxemics layer, and inflation layer maintain their own copies of the grid. In other implementations, the static, obstacles, and proxemics layers maintain their own copies of the grid while the inflation layer does not. To update the occupancy map, an updateBounds method is called and performed on each layer, starting with the first layer in the ordered list. The updateBounds method polls each layer to determine how much of the occupancy map it needs to update. To determine the new bounds, the obstacles, proxemics, and inflation layers update their own occupancy maps with new sensor data. In this example, each layer uses a respective sensor data type, while in other embodiments, each layer may utilize multiple types of sensor data. The result is a bounding box that contains all the areas that each layer needs to update. The layers are iterated over, in order, providing each layer with the bounding box that the previous layers need to update (initially an empty box). Each layer can expand the bounding box as necessary. This first pass results in a bounding box that determines how much of the master occupancy map needs to be updated. Next, each layer in turn updates the master occupancy map in the bounding box using an update Values method, starting with the static layer, followed by the obstacles layer, the proxemics layer, and then the inflation layer. During this second pass, the update Values method is called, during which each successive layer will update the values within the bounding box's area of the master occupancy map. In some implementations, the update Values method operates directly on the master occupancy map without storing a local copy. Other methods for updating the occupancy map may be used in other embodiments.

In FIG. 2, the layered occupancy map includes a static map layer, an obstacles layer, a proxemics layer, an inflation layer, and the master occupancy map layer. The static map layer includes a static map of various static objects/obstacles, which is used for global planning. The static map can be generated with a simultaneous localization and mapping (SLAM) algorithm a priori or can be created from an architectural diagram. When the static map layer receives the static map, the updateBounds returns a bounding box covering the entire map. On subsequent iterations, the bounding box will not increase in size. Since the static map is the bottom layer of the global layered occupancy map, the values in the static map may be copied into the master occupancy map directly. If the robot (e.g., V-ITS-S 110, VRU 116/117, drone, UAV, etc.) is running SLAM while using the generated map for navigation, the layered occupancy map approach allows the static map layer to update without losing information in the other layers. In monolithic occupancy maps, the entire occupancy map would be overwritten.

The obstacles layer collects data from high accuracy sensors such as lasers (e.g., LiDAR), Red Blue Green and Depth (RGB-D) cameras, and/or the like, and places the collected high accuracy sensor data in its own 2D grid. The space between the sensor and the sensor reading is marked as "free," and the sensor reading's location is marked as "occupied." During the updateBounds portion of each cycle, new sensor data is placed into the obstacles layer's occupancy map, and the bounding box expands to fit it. The precise method that combines the obstacles layer's values with those already in the occupancy map can vary depending on the desired level of trust for the sensor data. In some implementations, the static map data may be over-written with the collected sensor data, which may be beneficial for scenarios where the static map may be inaccurate. In other implementations, the obstacles layer can be configured to only add lethal or VRU-related obstacles to the master occupancy map.

The proxemics layer is used to detect VRUs 116/117 and/or spaces surrounding individual VRUs 116/117. The proxemics layer may also collect data from high accuracy sensors such as lasers (e.g., LiDAR), RGB-D cameras, etc. In some implementations, the proxemics layer may use lower accuracy cameras or other like sensors. The proxemics layer may use the same or different sensor data or sensor types as the obstacles layer. The proxemics layer uses the location/position and velocity of detected VRUs 116/117 (e.g., extracted from the sensor data representative of individual VRUs 116/117) to write values into the proxemics layer's occupancy map, which are then added into the master occupancy map along with the other layer's occupancy map values. In some implementations, the proxemics layer uses a mixture of Gaussians models (see e.g., Kirby et al., "COMPANION: A Constraint-Optimizing Method for Person-Acceptable Navigation", Proceedings of the 18th IEEE Symposium on Robot and Human Interactive Communication (Ro-Man), Toyama, Japan, pp. 607-612 (2009) and/or Gonçalves et al., "Human-Aware Navigation for Autonomous Mobile Robots for Intra-Factory Logistics", International Workshop on Symbiotic Interaction, Lecture Notes in Computer Science, vol. 10727, pp 79-85, Springer (23 May 2018)) and writes the Gaussian values for each VRU 116/117 into the proxemics layer's private occupancy map. In some implementations, the generated values may be scaled according to the amplitude, the variance, and/or some other suitable parameter(s).

The inflation layer implements an inflation process, which inserts a buffer zone around lethal obstacles. Locations where the V-ITS-S 110 would definitely be in collision are marked with a lethal probability/occupancy value, and the immediately surrounding areas have a small non-lethal cost. These values ensure that that V-ITS-S 110 does not collide with lethal obstacles, and attempts to avoid such objects. The updateBounds method increases the previous bounding box to ensure that new lethal obstacles will be inflated, and that old lethal obstacles outside the previous bounding box that could inflate into the bounding box are inflated as well.

From FIG. 2, VRU ITS-Ss 117 (such as HC ITS-Ss 117), R-ITS-Ss 130, and/or V-ITS-Ss 110 can utilize their various sensors (e.g., lasers/LiDAR, cameras, radar, etc.) along with a static map determined a priori to come up with an aggregated master occupancy map of the road grid. Furthermore, such master occupancy map may also be periodically augmented via collaboration among HC ITS-Ss 117, LC ITS-Ss 117, R-ITS-Ss 130, and V-ITS-Ss 110, which allows for periodic updating and maintenance of such robust up-to-date aggregated map (e.g., DCROM 205). Once such an accurate master layer map has been obtained, it can comprehensively represent the joint effect of context-awareness acquired from various layers, leading to an accurate road occupancy map (e.g., the DCROM 205). The role of DCROM 205 in facilitating VRU 116/117 safety robustness, including the DCROM's 205 role within the VRU 116/117 safety mechanisms process provided in [TS103300-2], is discussed infra.

1.2. Dynamic Contextual Road Occupancy Map in VRU Safety Mechanisms

Figure 3:
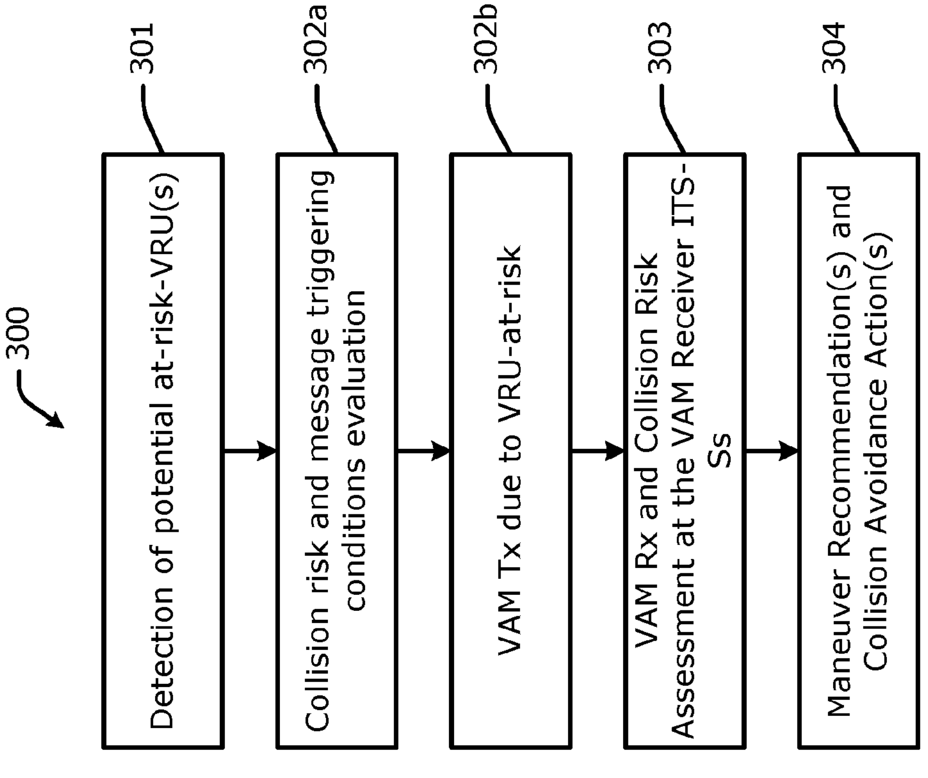
FIG. 3 shows an example VRU Safety Mechanisms process according to various embodiments.

FIG. 3 shows an example VRU Safety Mechanisms process 300 as per [TS103300-2] including detection of VRUs 116/117, Collison Risk Analysis (CRA), and collision risk avoidance, according to various embodiments. Process 300, including where the DCROM approach can be applied to facilitate the VRU 116/117 safety, begins at step 301 where detection of potential at-risk VRU(s) 116/117 takes place. The detection of potential at-risk VRU(s) 116/117 may take place via the ego VRU-ITS-S 117, other road users (e.g., non-VRUs such as V-ITS-S 110, other VRUs 116/117, etc.), and/or R-ITS-S 130. In embodiments, the DCROM 205 facilitates detection of potential at-risk-VRU(s) 116/117. The potential at-risk-VRU 116/117 detection can readily be augmented via availability of DCROM 205 at the HC VRUs 116/117, R-ITS-Ss 130, and/or V-ITS-Ss 110 to analyze the scene and find where the ego VRU 116/117 is currently detected in the occupancy grid map along with the surrounding environment which may comprise of the potential hazardous (to ego VRU 116/117) V-ITS-Ss 110, obstacles and other entities. Note that, in addition to the HC VRUs 116/117, R-ITS-Ss 130, or V-ITS-Ss 110 that have the computation capability, even LC VRUs 116/117 may also have a-prior DCROM 205 available at its disposal (due to collaborative sharing of DCROM 205 related information by HC VRUs 116/117, RSEs or V-ITS-Ss 110 in previously events) which, it may use to detect if it is at potential risk.

Step 302*a* involves VAM pre-transmission triggering condition evaluations. In embodiments, VAM pre-transmission triggering condition evaluations include collision risk and message triggering conditions evaluation based VAM (or the like) transmission preparation with information on, for example, ego VRU position; dynamic state of ego VRU 116/117 and other VRUs 116/117 or non-VRUs; presence of other road users; road layout and environment, and/or the like. In embodiments, the DCROM 205 facilitates VAM pre-transmission condition evaluations. After the potential at-risk-VRU 116/117 are detected, the available DCROM 205 may be used to decide the triggering conditions. For instance, DRCOMP analysis can be used to identify whether an approaching V-ITS-S 110 or other fast-moving object is too close to the ego-VRU 116/117 or not. In case it is, this serves as a VAM transmission triggering (e.g., at R-ITS-Ss 130, V-ITS-Ss 110, and/or VRUs 116/117 which have access to such DRCOMP) notify the ego-VRU 116/117 of the oncoming threat. Step 302*b* involves VAM transmission (Tx) due to VRU-at-risk by ego VRU 116/117, non-ego VRUs 116/117, V-ITS-Ss 110, R-ITS-Ss 130, and/or other like elements.

Step 303 involves Local Dynamic Map (LDM) building/updating and trajectory interception likelihood computation. VAM Rx and Collision Risk Assessment at the VAM Receiver ITS-Ss by using, for example, sensor data fusion at the ego VRU 116/117; received data from other road users: V-ITS-Ss 110, R-ITS-Ss 130, at-risk-VRU(s) 116/117 or other VRU ITS-S 117; building or updating LDM to reflect other road users' location, velocity, intention, trajectory; collision risk computation (e.g., via trajectory interception likelihood). Trajectory interception is discussed in U.S. application Ser. No. 17/761,141. The DCROM 205 facilitates the LDM building/updating and trajectory interception likelihood computation. DCROM 205 is able to aid in the evaluation of the collision risk triggering conditions resulting from ego VRU 116/117 position or its dynamic state relative to other VRUs 116/117, status of road users in the surrounding, as well as the updates in the road layout environment. After the triggering conditions assessment, the VAM transmission takes place if the VRU 116/117 is at-risk. The ego VRU 116/117 and the other ITS-S users in the vicinity are involved in the message transmission at their respective ends.

Step 304 involves maneuvering action recommendations and collision avoidance action. The maneuvering action recommendations are based on the augmented data available from DCROM 205 sharing, the collision risk analysis module (e.g., at ego VRU 116/117, other VRUs 116/117, V-ITS-Ss 110, R-ITS-Ss 130, and/or other non-VRUs 116/117 in the vicinity) gets triggered to decide on any potential high collision risk. If a high collision risk is detected, then the collision avoidance module undertakes one or more maneuver related actions (e.g., collision avoidance actions) such as, for example, emergency stopping, deceleration, acceleration, trajectory change as well as VRU 116/117 dynamic motion/momentum related actions. Such actions need to be executed in time to avoid potential collisions. Additionally or alternatively, the collision Avoidance Action may include warning messages to the VRU-at-risk; Warning messages to other neighboring ITS-Ss; Maneuvering action recommendation for the at-risk VRU; Maneuvering action recommendation for the approaching road user; Audio-Visual warning (e.g. sirens, flashing lights at the R-ITS-S 130 or V-ITS-S 110). The DCROM 205 facilitates the maneuvering action recommendations.

1.3. VRU Safety Mechanism Including VAM Exchange-Based Enablement of DCROM-Based Facilitation To enable VRUs 116/117 to be aware of the DCROM 205 for enhancing collision risk analysis and triggering timely collision avoidance measures, embodiments include DCROM-based facilitation of VRU 116/117 safety including VAM exchange mechanisms.

Figure 4:
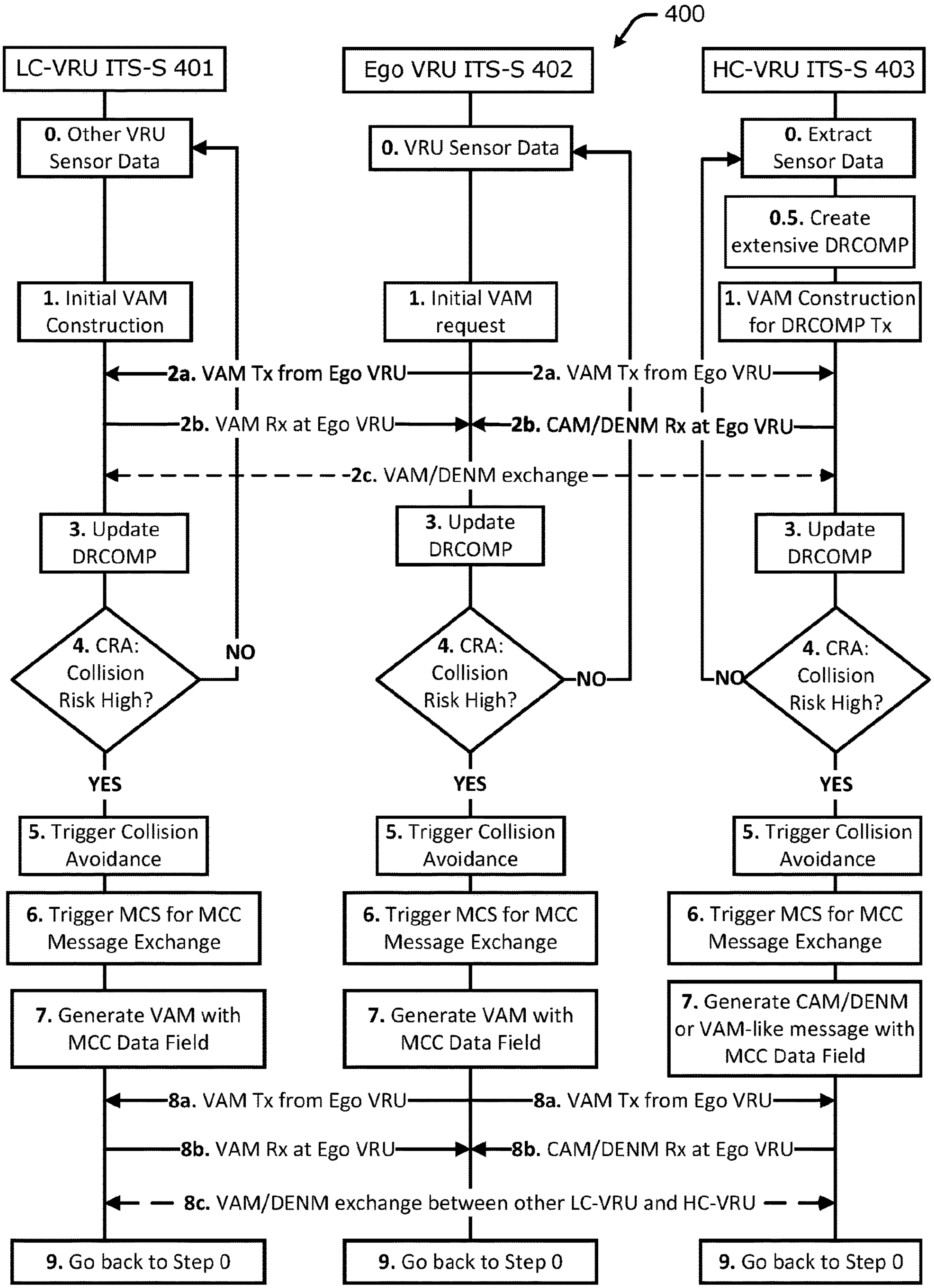
FIG. 4 illustrates an example VRU Safety procedure according to various embodiments.

FIG. 4 illustrates an example procedure 400 for VRU Safety Mechanisms including generation of DCROM 205 at nearby HC VRUs ITS-Ss 117, R-ITS-Ss 130, and/or V-ITS-Ss 110, and VAM exchange mechanisms including occupancy status indicator (OSI) and grid location indicator (GLI) for augmenting collision risk assessment and triggering collision risk avoidance.

The procedure 400 of FIG. 4 shows the operations performed by an LC VRU ITS-S 401, ego VRU ITS-S 402, and an HC VRU ITS-S 403, each of which may correspond to LC or HC VRU ITS-Ss 117 discussed herein. In FIG. 4, the HC VRU ITS-S 403 may represent any combination of one or more HC VRU ITS-S 117, one or more V-ITS-Ss 110, and/or one or more R-ITS-Ss 130, each of which have advanced sensor capabilities and are in the vicinity of the ego VRU ITS-S 402. The ego VRU ITS-S 402 in this example is an LC VRU ITS-S 117, which does not have advanced sensor capabilities. Additionally, the LC VRU ITS-S 401 in FIG. 4 represents one or more other LC VRUs 116/117 different than the ego VRU ITS-S 402, and that may be in in the vicinity of the ego VRU ITS-S 402. Procedure 400 of FIG. 4 may operate as follows.

Referring to the LC VRU ITS-S 401, at step 0, the LC VRU ITS-S 401 collects and processes its own LC VRU ITS-S 401 sensor data, which are collected from its embedded, attached, peripheral, or otherwise accessible sensors. The sensor data may include, for example, ID, Position, Profile, Speed, Direction, Orientation, Trajectory, Velocity, etc. At step 1, the LC VRU ITS-S 401 performs initial VAM construction for aiding OMP awareness at neighboring computation capable ITS-S(s). At step 2*a*, the LC VRU ITS-S 401 receives a VAM from ego VRU ITS-S 402. At step 2*b*, the LC VRU ITS-S 401 transmits the constructed VAM to ego VRU ITS-S 402, and at step 2*c*, a VAM/CAM/DENM exchange takes place between the LC VRU ITS-S 401 and the HC VRU ITS-S 403. At step 3, the LC VRU ITS-S 401 updates one or more DCROM 205 features based on OSI and GLI data coming in (e.g., obtained) from other ITS-Ss (e.g., ego VRU ITS-S 402, HC VRU ITS-S 403, and/or other ITS-Ss). At step 4, the LC VRU ITS-S 401 performs Collision Risk Analysis (CRA) to determine if a collision risk is high (e.g., highly likely or more probable than not; or at or above a threshold collision risk probability or within a range of probabilities). If the collision risk is not high (e.g., below a threshold collision risk probability), then the LC VRU ITS-S 401 loops back to collect other sensor data at step 0. If the collision risk is high (e.g., at or above a threshold collision risk probability), then the LC VRU ITS-S 401 proceeds to step 5. At step 5, the LC VRU ITS-S 401 triggers Collision Avoidance Action module/function (or Maneuver Coordination Service (MCS) module/function) to decide/determine on a collision avoidance action and/or maneuvering type (or action type). At step 6, the LC VRU ITS-S 401 triggers MCS for Maneuver Coordination Context (MCC) Message Exchange. In embodiments, MCC is part of the collision risk avoidance functionality, which is used to indicate the possible maneuvering options at the at-risk ego VRU ITS-S 402 or neighboring VRUs 116/117 as explained in U.S. application Ser. No. 17/761,141. At step 7, the LC VRU ITS-S 401 constructs or otherwise generates a VAM with an MCC Data Field. At step 8*a*, the LC VRU ITS-S 401 receives a VAM from the ego VRU ITS-S 402. At step 8*b*, the LC VRU ITS-S 401 transmits the generated VAM to the ego VRU ITS-S 402. At step 8*c*, a VAM/DENM exchange takes place between the LC VRU ITS-S 401 and the HC VRU ITS-S 403. At step 9, the LC VRU ITS-S 401 loops back to step 0.

Referring to the ego VRU ITS-S 402, at step 0, the ego VRU ITS-S 402 collects ego VRU sensor data from its embedded, attached, peripheral, or otherwise accessible sensors. The sensor data may include, for example, ID, Position, Profile, Speed, Direction, Orientation, Trajectory, Velocity, etc. At step 1, the ego VRU ITS-S 402 performs an initial VAM request for aiding in DRCOMP 205 awareness at neighbor/proximate computationally capable (or DCROM-capable) ITS-Ss. At step 2*a*, the ego VRU ITS-S 402 transmits the VAM to request DCROM 205 assistance to LC VRU ITS-S 401 and to the HC VRU ITS-S 403 (or broadcasts the VAM to neighboring/proximate ITS-Ss). At step 2*b*, the ego VRU ITS-S 402 receives a VAM from the LC VRU ITS-S 401 and receives a VAM, CAM, and/or DENM from the HC VRU ITS-S 403. At step 3, the ego VRU ITS-S 402 updates DRCOMP 205 features based on OSI and GLI data incoming (obtained) from other ITS-Ss (e.g., from the LC VRU ITS-S 401 and/or the HC VRU ITS-S 403). At step 3, the ego VRU ITS-S 402 performs Collision Risk Analysis (CRA) to determine if a collision risk is high (e.g., highly likely or more probable than not; or at or above a threshold collision risk probability or within a range of probabilities). If the collision risk is not high (e.g., below a threshold collision risk probability), then the ego VRU ITS-S 402 loops back to collect other sensor data at step 0. If the collision risk is high (e.g., at or above a threshold collision risk probability), then ego VRU ITS-S 402 proceeds to step 5. At step 5, the ego VRU ITS-S 402 triggers Collision Avoidance Action module/function (or MCS module/function) to decide/determine on a collision avoidance action and/or maneuvering type (or action type). At step 6, the ego VRU ITS-S 402 triggers MCS for Maneuver Coordination Context (MCC) Message Exchange. In embodiments, MCC is part of the collision risk avoidance functionality, which is used to indicate the possible maneuvering options at the at-risk ego VRU ITS-S 402 or neighboring VRU(s) 116/117 as explained in U.S. application Ser. No. 17,761,141. At step 7, the ego VRU ITS-S 402 constructs or otherwise generates a VAM with an MCC DF. At step 8*a*, the ego VRU ITS-S 402 transmits the VAM with the MCC DF 402 to the LC VRU ITS-S 401 and to the HC VRU ITS-S 403. At step 8*b*, the ego VRU ITS-S 402 receives a VAM including an MCC DF from the LC VRU ITS-S 401, and receives a CAM/DENM including an MCC DF from the HC VRU ITS-S 403. At step 9, the ego VRU ITS-S 402 loops back to step 0.

Referring to the HC VRU ITS-S 403, at step 0, the HC VRU ITS-S 403 extracts and/or collects HC VRU ITS-S 403 sensor data from its embedded, attached, peripheral, or otherwise accessible sensors. In some embodiments, the HC VRU ITS-S 403 may collect sensor data from other ITS-Ss via a suitable communication/interface means. The sensor data may include, for example, image data (e.g., from camera(s)), LIDAR data, radar data, and/or other like sensor data. At step 0.5, the HC VRU ITS-S 403 generates or creates a DRCOMP 205 based on the extracted/collected sensor data: OSI and GLI computation. At step 1, the HC VRU ITS-S 403 constructs a VAM, CAM, and/or DENM for transmitting DRCOMP 205 features including computed OSI and GLI. At step 2*a*, the HC VRU ITS-S 403 receives a VAM from the ego VRU ITS-S 402. At step 2*b*, the HC VRU ITS-S 403 transmits a VAM/CAM/DENM to the ego VRU ITS-S 402. At step 2*c*, a VAM/CAM/DENM exchange takes place between the LC VRU ITS-S 401 and the HC VRU ITS-S 403. At step 3, the HC VRU ITS-S 403 updates DRCOMP 205 features based on data incoming (e.g., obtained) from its own sensors and/or accessible sensors (e.g., "self sensors") and sensors implemented by other ITS-Ss. At step 4, the HC VRU ITS-S 403 performs CRA to determine if a collision risk is high (e.g., highly likely or more probable than not; or at or above a threshold collision risk probability or within a range of probabilities). If the collision risk is not high (e.g., below a threshold collision risk probability), then the HC VRU ITS-S 403 loops back to collect other sensor data at step 0. If the collision risk is high (e.g., at or above a threshold collision risk probability), then HC VRU ITS-S 403 proceeds to step 5. At step 5, the HC VRU ITS-S 403 triggers Collision Avoidance Action module/function (or MCS module/function) to decide/determine on a collision avoidance action and/or maneuvering type (or action type). At step 6, the HC VRU ITS-S 403 triggers MCS for Maneuver Coordination Context (MCC) message exchange. In embodiments, MCC is part of the collision risk avoidance functionality, which is used to indicate the possible maneuvering options at the at-risk ego VRU ITS-S 402 and/or neighboring VRU(s) 116/117 as explained in U.S. application Ser. No. 17/761,141. 8 AC7386]. In some implementations, the MCC may include a Trajectory Interception Indicator (TII) and a Maneuver Identifier (MI), where the TII reflects how likely the ego-VRU ITS-S 402 trajectory is going to be intercepted by the neighboring ITSs (e.g., other VRUs and/or non-VRUs) and the MI indicates the type of VRU maneuvering needed to avoid the predicted collision. At step 7, the HC VRU ITS-S 403 constructs or otherwise generates a CAM, DENM, and/or VAM-like message with an MCC DF. In embodiments, MCC (e.g., step 6 in FIG. 4) is part of the CRA functionality, which is used to indicate the possible maneuvering options at the at-risk ego VRU ITS-S 402 and/or neighboring VRUs 116/117 as explained in U.S. application Ser. No. 17/761141. At step 8*a*, the HC VRU ITS-S 403 receives a VAM with the MCC DF 402 from the ego VRU ITS-S 402. At step 8*b*, the HC VRU ITS-S 403 transmits the CAM/DENM/VAM including an MCC DF to the ego VRU ITS-S 402. At step 8*c*, a VAM/DENM/CAM exchange takes place between the LC-VRU ITS-S 117 and the HC VRU ITS-S 403. At step 9, the ego VRU ITS-S 402 loops back to step 0.

As shown by FIG. 4, the procedure 400 for DCROM-based facilitation of VRU safety includes VAM exchange as indicated via step 1 through 7. Embodiments also include message exchange protocol, along with two new DFs including the OSI and GLI. The DCROM influences functional, system, and operational architecture and requirements updates needed for the VRU system/ITS-S 117. Additionally, in various embodiments, the Collision Avoidance Action (or MCS) module/function may determine or identify a Maneuver Identifier (MI), which is an identifier of a maneuver used in MCS. The choice of maneuver may be generated locally based on the available sensor data at the VRU ITS-S 117 and may be shared with neighboring ITS-S (e.g., VRUs 116/117 or non-VRUs) in the vicinity of the ego VRU ITS-S 117 to initiate a joint maneuver coordination among VRUs 116/117 (see e.g., clause 6.5.10.9 of [TS103300-2]).

1.4. Example DCROM Generation Use Case

In addition to generating the DCROM 205, embodiments include generating a corresponding VAM with new DFs to enable DCROM 205 exchange. The new DFs include an OSI field and GLI field to collaboratively share the DCROM 205 features from a compute intensive ITS-S to LC-VRUs ITS-Ss 117 such as computation-limited an ego VRU 116/117 and/or other VRU nodes 116/117. The concepts are illustrated by FIG. 5*a*, FIG. 5*b*, and FIG. 5*c* based on example use cases discussed in [TS103300-2].

Figure 5A:
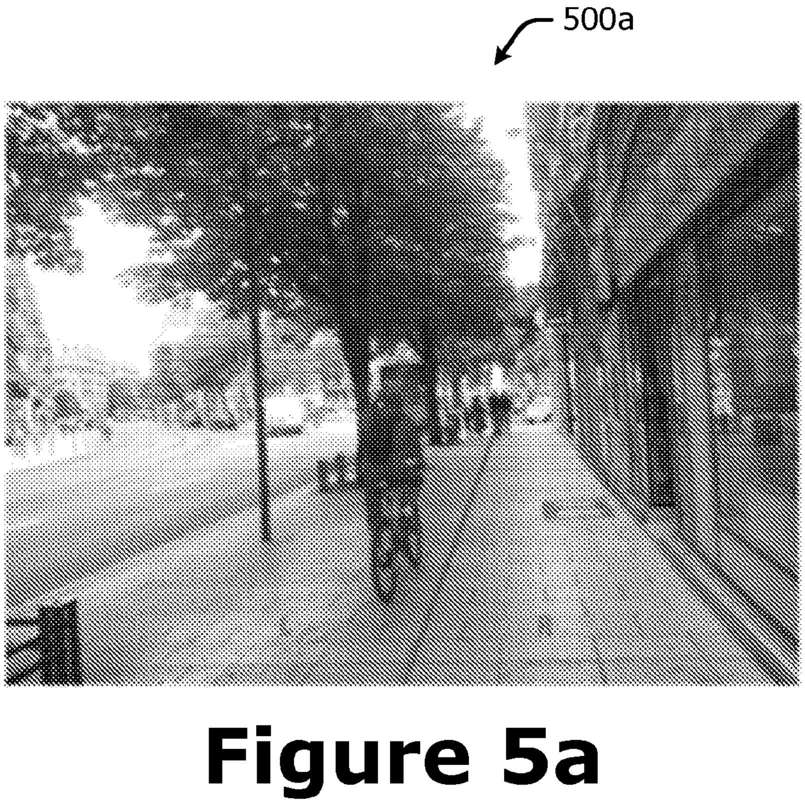
FIGS. 5*a*, 5*b*, 5*c*, 5*d*, and 5*e* and illustrate a DCROP use case according to various embodiments.

FIG. 5*a* illustrates a VRU-to-VRU related use case 500*a* from [TR103300-1] for which the concept of DCROM is illustrated. In FIG. 5*a*, a bicyclist is riding on the pedway (sidewalk) where several pedestrians can be seen to lie along the trajectory of the bicyclist. Additionally, there are other objects such as light pole, trees, benches, building(s), and approaching cars in the scene. The computation capable ITS-S needs to be able to accurately perceive such scene. For the purpose, the DCROM 205 reflecting the occupancy map of the area should be represented to accurately capture the scene by, say, diving the area into grids specified by (X, Y) coordinates and with a label to say if the grid is "occupied" or "free" of objects, people, cars, among others (e.g., dynamic or static).

Figure 5B:
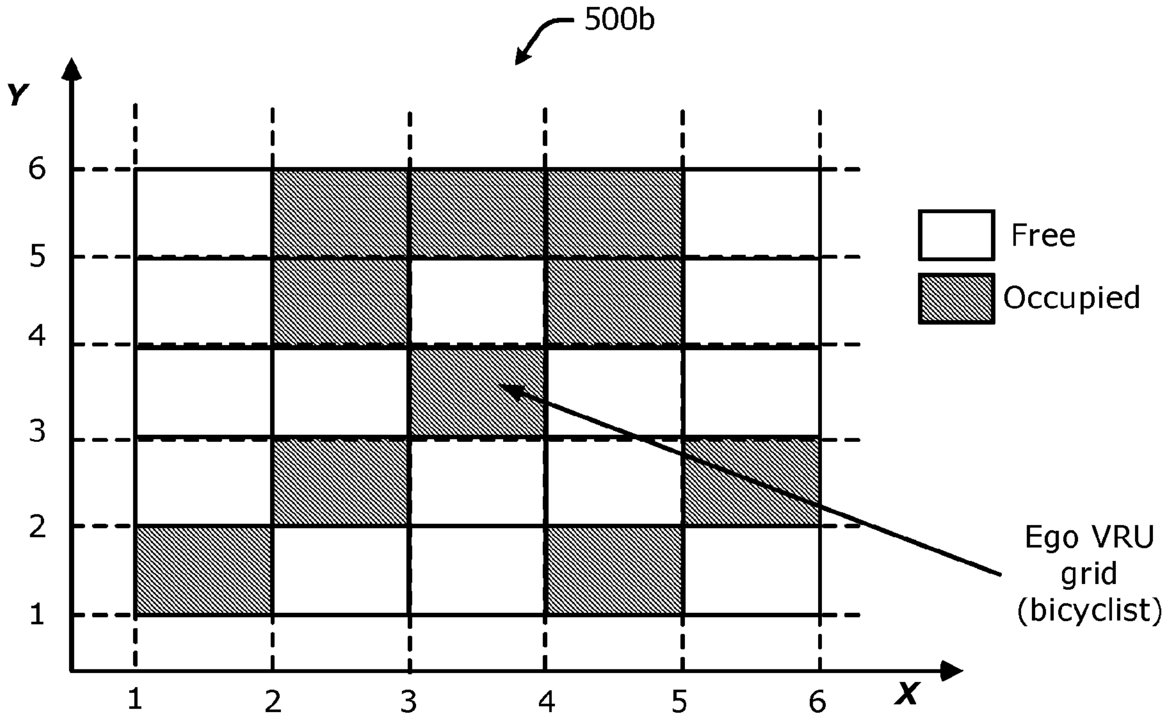
Figure 5C:
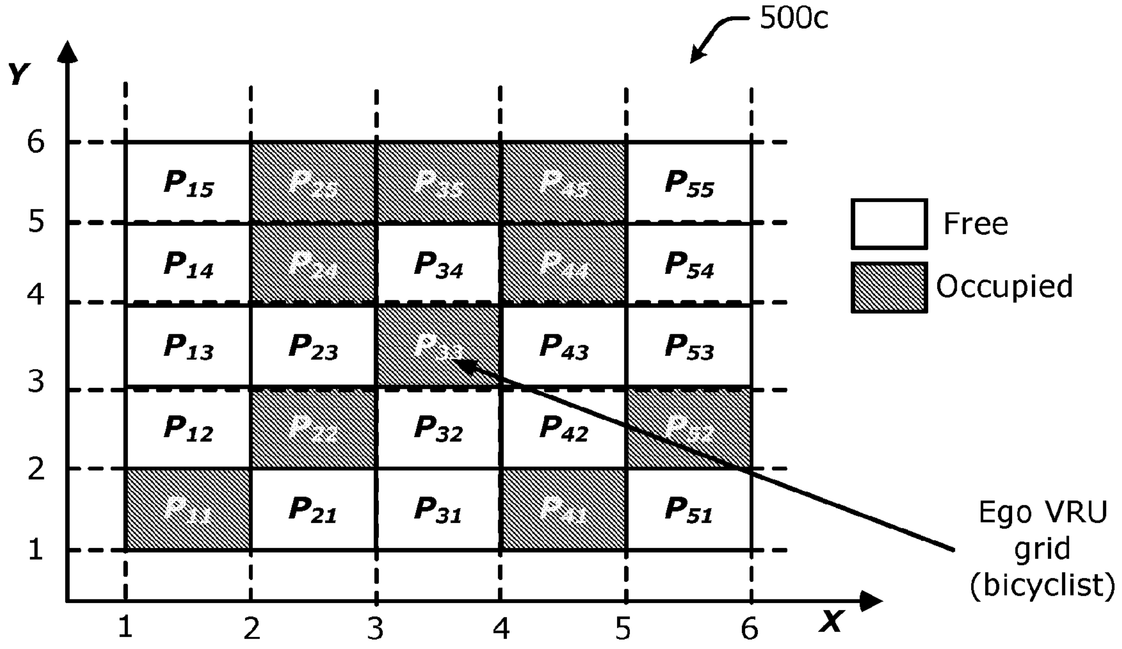

FIG. 5*b* illustrates an example 6×6 grid-based representation of a ground-truth occupancy map 500*b* for the use case environment shown in FIG. 5*a*. Here, "ground-truth" refers to information/data provided by direct observation (e.g., empirical evidence) as opposed to information provided by inference. The ground-truth DCROM 500*b* comprises "Free" and "Occupied" grid cells (sometimes referred to herein as "grids") in the (X, Y) plane spatial area represented as a grid-matrix in the field of view (FoV) of a computation capable ITS-S such as an HC VRU 116/117 or R-ITS-S 130. In FIG. 5*b*, the bicyclist is represented as the ego VRU 116/117 along with other objects on the road (e.g., pole, buildings, etc.) and other VRUs 116/117 (e.g., people/pedestrians) if presented represented as "Occupied" while representing the empty spatial grids as "Free."

To represent the scenario in FIG. 5*a* where the bicyclist is the ego VRU 116/117 as a reference point in the grid who may be looking to obtain the DRCOMP 500*b* from nearby computation capable ITS-S(s) so that it can perceive the environment for collision risk analysis and prepare to take appropriate maneuvering actions for collision avoidance. In some embodiments, the computation capable ITS-S(s) should be able to estimate the true DCROM 500*b* as shown in FIG. 5*b*. However, because the actual situation with the sensors would not be ideal, in various embodiments, the computation capable ITS-S(s) associate a confidence level with each grid-occupancy estimation decision (free or occupied) as shown by FIG. 5*c*.

FIG. 5*c* shows an Estimated Occupancy Map 500*c* at the R-ITS-S 130 of the true occupancy map 500*b* from FIG. 5*b* along with the computed occupancy probability shown for each grid element (cell). To estimate such ground truth occupancy map 500*b* shown in FIG. 5*b*, the DCROM-based estimation of the occupancy map 500*b*, along with the associated probability of occupancy for each grid element (cell), is illustrated in FIG. 5*c*. The grid representation is an aggregated master layer (e.g., master layer shown by FIG. 2) resulting from fusion of the layered occupancy map.

Each grid cell in the grid 500*c* of FIG. 5*c* includes a probability label $P_{XY}$, which indicates the probability of occupancy of the grid element position in terms of an X-position and a Y-position relative to the left-bottom most corner of the grid. FIG. 4*c* shows a two-tier grid where the first tier around the ego VRU 116/117 grid includes 8 neighboring grids while the second tier includes 16 neighboring grids. The definition of a tier is discussed in more detail with respect to FIG. 5*d*. Additionally, each grid (or grid cell) has a unique location in terms of the (X, Y) differential coordinates implicitly assigned to it, and thus, such a label is used to define the grid location indicator (GLI) DF in the VAM as discussed infra. The computed probability values and their role in definition and assignment of the occupancy status indicator (OSI) is also discussed infra.

1.5. VAM Data Fields and VAM Construction for DCROM Sharing in VBS

1.5.1. Occupancy Status Indicator Data Field Construction and Bitmap

In various embodiments, the VAM format structure is adjusted to include an Occupancy Status Indicator (OSI) DF as a probabilistic indicator of the estimation uncertainty of the neighboring grid map elements around the ego VRU 116/117. The OSI helps to determine if the ego VRU's 116/117 trajectory is going to intercept with any static objects, moving objects, other VRUs 116/117, non-VRUs as well as suddenly appearing objects (e.g., fallen from a nearby car, building or flown by wind, etc.). Depending upon the analysis of the scene in terms of the sensory as well as shared inputs at, for example, a heavy computation capable ITS-S, the OSI is defined as a representation of the likelihood of whether a nearby grid may be occupied or not.

Figure 6A:
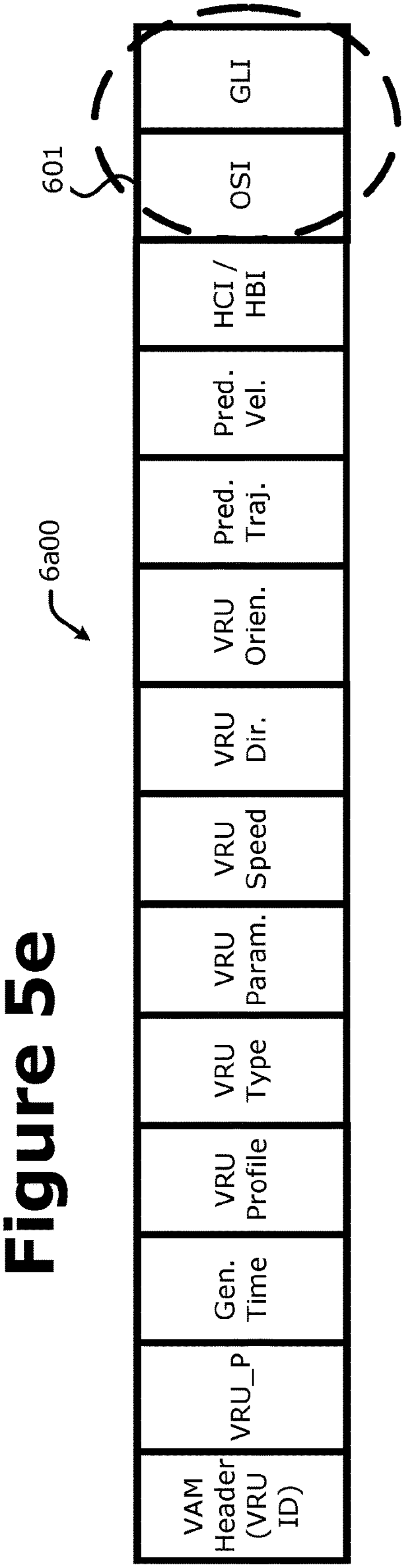
FIGS. 6*a* and 6*b* illustrate example VRU Awareness Messages (VAMs) according to various embodiments.
Figure 6B:
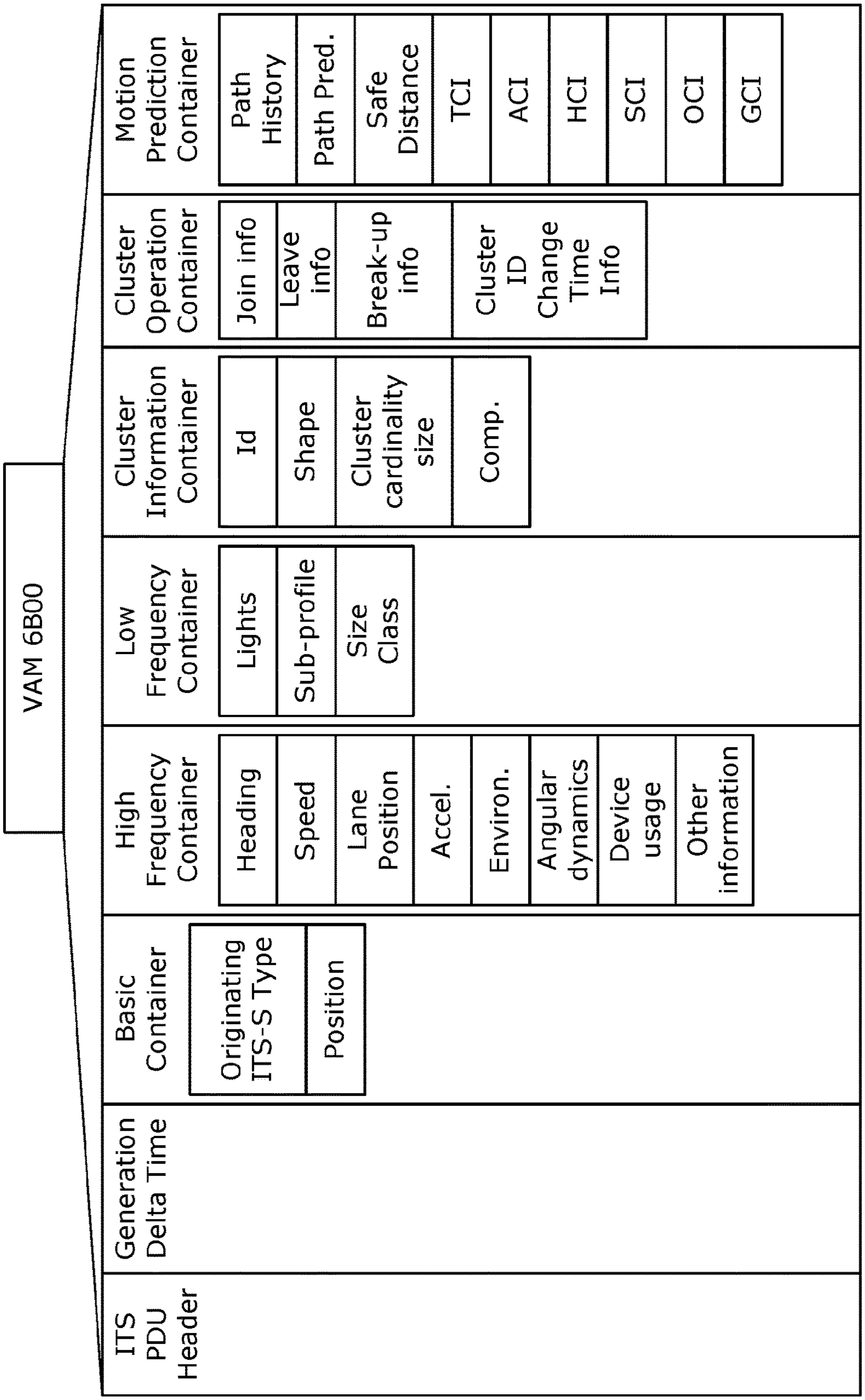

In some embodiments, the OSI index has a 2-bit construction with a value range and classification levels indices as shown by Table 1.5.1-1. The corresponding inclusion of the OSI as one of the new data fields in a VAM container is shown by FIG. 6*a*. Although the generation of the DCROM requires a computation capable ITS-S, the OSI represents the occupancy likelihood of the road grid in the vicinity of the VRU 116/117. The OSI is a lightweight 2-bit representation only, which can be readily exchanged via VAM with the ego VRU 116/117 as well as its neighboring ITS-S. In some embodiments, the OSI does not come alone as a DF in the VAM and is an indicator associated to the location in the grid in question, given by GLI as explained infra.

TABLE 1.5.1-1

Example OSI Construction

| Occupancy Status Indicator (OSI) | OSI bit designation for VAM container (2-bits) | OSI Range | OSI Level | Grid Occupancy Decision (conservative) |
|---|---|---|---|---|
| 1 | 00 | 0 to 0.25 | 1: LOW | Free |
| 2 | 01 | 0.25 to 0.5 | 2: MEDIUM | Occupied |
| 3 | 10 | 0.5 to 0.75 | 3: HIGH | Occupied |
| 4 | 11 | 0.75 to 1 | 4: VERY HIGH | Occupied |

Table 1.5.1-1 serves to map the probability values $P_{XY}$ shown in FIG. 5*c* based on the defined example OSI range into one of the OSI levels. For instance, if the probability of occupancy of a grid is 0.37, then the corresponding OSI level is "MEDIUM", which can be captured with OSI=2. However, even though the grid occupancy level is MEDIUM, a conservative approach can be taken to declare the grid as "Occupied" because the penalty of failing to detect the occupancy of the grid when it is occupied in reality is more than declaring the grid as empty which may result in a potential collision among road users. An example of this conservative decision making is shown by the example above, which may be updated based on the increased robustness of the grid occupancy detection measures that may be available.

1.5.2. Grid Location Indicator Data Field Construction and Bitmap

Figure 5D:
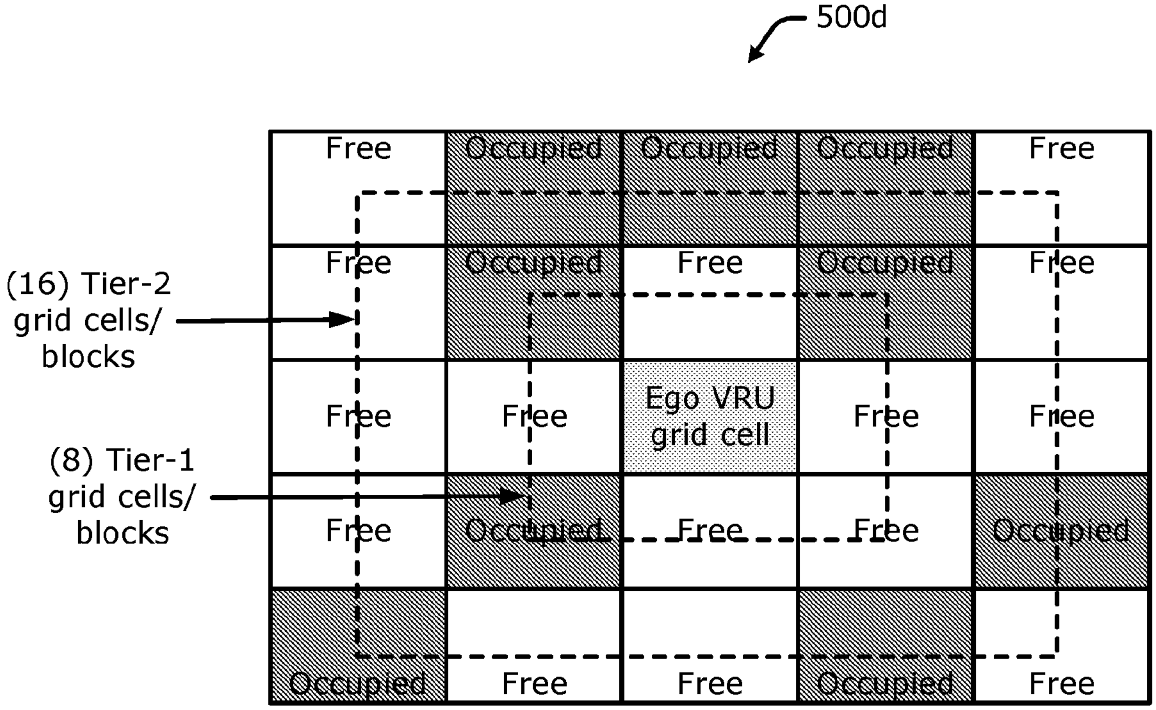

FIG. 5*d* shows an example grid occupancy map 500*d* of the environment perceived at the ego-VRU 116/117 in terms of OSI values for a 2-tier DCROM model. FIG. 5*d* shows a 2-tier representation of the DCROM in terms of grid map around reference grid in which the ego VRU 116/117 is located. This provides a representation of the relative grid locations around a reference ego-VRU 116/117 grid in terms of logical representation as well as bitmap representation to be included in the VAM container. The example is useful in understanding the construction and representation for GLI shown in Table 1.5.2-1.

TABLE 1.5.2-1

Example GLI construction considering first tier occupancy map only

| Grid Location Indicator | GLI Bit Designation for VAM Container (3-bits) | Grid location direction relative to ego VRU grid |
|---|---|---|
| 1 | 000 | North (N) |
| 2 | 001 | South (S) |
| 3 | 010 | East (E) |
| 4 | 011 | West (W) |
| 5 | 100 | Northwest (NW) |
| 6 | 101 | Northeast (NE) |
| 7 | 110 | Southeast (SE) |
| 8 | 111 | Southwest (SW) |

In the example of FIG. 5*d*, the nearest 8 grid layer around the ego VRU 116/117 grid 500*d* is defined as Tier-1 grids (or tier-1 cells or grid blocks) and the next outer layer of 16 grid layer as Tier-2 grids (or tier-2 cells or grid blocks). For the Tier-1 grid, GLI designates indices to reflect the 8 possible locations of the occupancy grids relative to the ego VRU's 116/117, which can be classified using a 3-bit representation. The construction of GLI for inclusion in the VAM container is shown in Table 1.5.2-1 by using 3-bits to label the 8-grids' relative locations around the ego VRU 116/117 grid.

For the Tier-2 grid, GLI designates indices to reflect the 16 possible locations of the occupancy grids relative to the ego VRU's 116/117, which can be classified using a 4-bit representation, for example. In some implementations, the 4-bit representation can incorporate the 3-bit representations of table 2 as, for example, the least significant bits of the 4-bit representations. Other implementations are possible in other embodiments.

As shown in FIG. 5*d*, the grid includes "free" grid cells and "occupied" grid cells. The "free" grid cells include a LOW Probability of Occupancy such as OSI=1. The "occupied" grid cells include MEDIUM, HIGH, or VERY HIGH Probability of Occupancy such as OSI={2, 3, 4}. The "free" and "occupied" decision result from the example given in table 1, for the sake of clarity and is not limited by the example cases. Also, although the generation of the DCROM requires an R-ITS-S 130, HC VRU 116/117, or similar computation capable ITS-S, the GLI is a lightweight 3-bits and thus can be readily exchanged via VAM with the ego VRU 116/117 as well as its neighboring ITS-S.

1.5.3. Examples OSI and GLI Fields in VAM Container

FIG. 6*a* shows an example VAM container format 6*a*00 according to various embodiments. The VAMs contain data depending on the VRU profile and the actual environmental conditions. The VAM container format of FIG. 6*a* includes additional data fields (DFs) to support DRCOMP sharing between VRU ITS-Ss 117 and/or neighboring ITS-Ss such as V-ITS-S 110 and/or R-ITS-S 130. These additional data fields include a Grid Location Indicator (GLI) DF and an Occupancy Status Indicator (OSI) DF in addition to the existing VAM fields as discussed infra and/or as defined in [TS103300-2].

The example VAM container format 6*a*00 includes the following DFs/containers: VAM header including VRU identifier (ID); VRU position (VRU P); VAM Generation (Gen.) time; VRU profile such as one of the VRU profiles discussed herein. VRU type, which is a type of entity or system associated with the VRU profile (e.g., if VRU profile is pedestrian, VRU type is infant, animal, adult, child, etc. (mandatory)). VRU parameters (param.) such as, for example, VRU cluster parameters are optional. Example VRU cluster parameters/data elements may include: VRU cluster ID, VRU cluster position, VRU cluster dimension (e.g., geographical or bounding box size/shape), VRU cluster size (e.g., number of members in the cluster), VRU size class (e.g., mandatory if outside a VRU cluster, optional if inside a VRU cluster), VRU weight class (e.g., mandatory if outside a VRU cluster, optional if inside a VRU cluster), and/or other VRU-related and/or VRU cluster parameters;

VRU speed (e.g., speed of the VRU in kilometers per hour (km/h) or miles per hour (m/h); in some embodiments, the speed to have four variations: LOW, MEDIUM and HIGH as defined by the ranges indicated in Table 1.5.3-2); VRU direction (e.g., a direction or angle of heading of the VRU measured relative to one of the global reference coordinate planes, for instance, the Y-plane); VRU orientation; Predicted trajectory (e.g., succession of way points); Predicted velocity (e.g., including 3D heading and average speed); Heading change indicator(s) (HCI) (e.g., turning left or turning right indicators); Hard braking indicator (HBI); the OSI DF including one or more OSIs as discussed herein; and the GLI DF including one or more GLIs as discussed herein. Aside from the OSI and GLI DFs, these DFs/DEs are discussed in more detail supra with respect to Table 0-2.

The VRU profile DF may include an initial Profile ID or updated Profile ID [2-bits]: When a VRU ITS-S device is ready to be used for the first time for a VRU, it is first configured to a default Profile Category. For example, a person getting a VRU ITS-S device would have its VRU ITS-S 117 by default configured to a Profile 1; while a bicycle and motorcycle may themselves be equipped with a VRU ITS-S device as well and designated to be Profile 2 and Profile 3, respectively. In case the bicycle or motorcycle is not equipped with any ITS-S device, the person riding those would have their initial ITS-S device configured as Profile 1 subject to update later. Similarly, any domestic pet equipped with ITS-S device would have the initial Profile configured by default to Profile 4, again, subject update based on transition later. The designation of a VRU profile category mapping to bits is illustrated in Table 1.5.3-1.

TABLE 1.5.3-1

Initial Profile ID or Profile ID Bits to VRU Profile Mapping

| VRU Profile Category | Bits Designation |
|---|---|
| Profile-1 (Pedestrian) | 00 |
| Profile-2 (Bicyclist) | 01 |
| Profile-3 (Motorcyclist) | 10 |
| Profile-4 (Animal) | 11 |

Speed Range [2-bits]: Depending on possible speed values, we propose classifying the VRU speed into one of the various speed ranges within a profile defined as: (i) LOW; (II) MEDIUM; and (iii) HIGH. In embodiments, speed is used for defining the sub-profile since speed is a key characteristic distinguishing parameter among all. The mapping details for various VRU Profile Categories are illustrated in Table 1.5.3-2 along with example range of values.

Environment [2-bits]: The environment for the VRUs 116 are typically defined only to one among Urban/Suburban, Rural and Highway [TS103300-2]. However, such environment definition may be too broad and may not provide a localized environment information for the VRU. Accordingly, sub-categories of the environment may be defined as follows: Sidewalk (on or near), Zebra Crossing (on or near), and Road Pavement (on or near). Table 1.5.3-2 shows the bit mappings for various VRU Profile categories along with example range of values.

Weight Class [2-bits]: Depending upon the weight of the VRU, 2-bits are used to indicate 3 levels ranging from LOW, MEDIUM to HIGH weights as shown in Table 1.5.3-2.

TABLE 1.5.3-2

VRU Profile and Sub-Profile Parameter Definitions and Bit Mapping Construction

| VRU Profile Category | Sub-Profile | Bits | Sub-Profile Designation | Example Range of Values |
|---|---|---|---|---|
| Profile-1 (Pedestrian) | Speed Range | 00 | LOW | Less than 3 km/h |
| | | 01 | MEDIUM | 3 km/h to 5 km/h |
| | | 10 | HIGH | 5 km/h to 10 km/h |
| | | 11 | N/A (Reserved for Future) | — |
| | Environment | 00 | On or near Sidewalk | — |
| | | 01 | On or near Zebra Crossing | — |
| | | 10 | On or near Road Pavement | — |
| | | 11 | N/A (Reserved for Future) | — |
| | Weight Category | 00 | LOW | Less than 10 kg |
| | | 01 | MEDIUM | 10 kg to 30 kg |
| | | 10 | HIGH | Above 30 kg |
| | | 11 | N/A (Reserved for Future) | — |
| Profile-2 (Bicyclist) | Speed Range | 00 | LOW | Less than 15 km/h |
| | | 01 | MEDIUM | 15 km/h to 25 km/h |
| | | 10 | HIGH | 25 km/h to 30 km/h |
| | | 11 | N/A (Reserved for Future) | — |
| | Environment | 00 | On or near Sidewalk | — |
| | | 01 | On or near Zebra Crossing | — |
| | | 10 | On or near Road Pavement | — |
| | | 11 | N/A (Reserved for Future) | — |
| | Weight Category | 00 | Low | Less than 15 kg |
| | | 01 | MEDIUM | 15 kg to 40 kg |
| | | 10 | HIGH | Above 40 kg |
| | | 11 | N/A (Reserved for Future) | — |
| Profile-3 (Motorcyclist) | Speed Range | 00 | LOW | Less than 30 km/h |
| | | 01 | MEDIUM | 30 km/h to 45 km/h |
| | | 10 | HIGH | 45 km/h to 55 km/h |
| | | 11 | N/A (Reserved for Future) | — |
| | Environment | 00 | On or near Sidewalk | — |
| | | 01 | On or near Zebra Crossing | — |
| | | 10 | On or near Road Pavement | — |
| | | 11 | N/A (Reserved for Future) | — |

TABLE 1.5.3-2-continued

VRU Profile and Sub-Profile Parameter Definitions and Bit Mapping Construction

| VRU Profile Category | Sub-Profile | Bits | Sub-Profile Designation | Example Range of Values |
|---|---|---|---|---|
| | Weight Category | 00 | LOW | Less than 25 kg |
| | | 01 | MEDIUM | 25 kg to 140 kg |
| | | 10 | HIGH | 140 kg to 300 kg |
| | | 11 | N/A (Reserved for Future) | — |
| Profile-4 (Animals) | Speed Range | 00 | LOW | Less than 5 km/h |
| | | 01 | MEDIUM | 5 km/h to 20 km/h |
| | | 10 | HIGH | 20 km/h to 40 km/h |
| | | 11 | N/A (Reserved for Future) | — |
| | Environment | 00 | On or near Sidewalk | — |
| | | 01 | On or near Zebra Crossing | — |
| | | 10 | On or near Road Pavement | — |
| | | 11 | N/A (Reserved for Future) | — |
| | Weight Category | 00 | LOW | Less than 15 kg |
| | | 01 | MEDIUM | 15 kg to 40 kg |
| | | 10 | HIGH | Above 40 kg |
| | | 11 | N/A (Reserved for Future) | — |

To enable the message exchange mechanism for DCROM, two additional DFs **6*a*01, the OSI and GLI, are provided in the VAM container 6*a*00. Generation and construction of the OSI and GLI are discussed supra. These DFs 6*a*01 allow the DCROM to be shared by the computation capable ITS-S to the ego VRU 116/117** and other neighboring road users.

In various embodiments, the VAM container **6*a*00 may include multiple OSI and GLI DFs, or OSI-GLI pairs. For each OSI-GLI pair, the GLI indicates a grid cell in the DCROM and the OSI indicates a probability of occupancy of the grid element position in terms of X-position and Y-position relative to the left-bottom most corner of the grid. In this way, the LC-VRU 116/117** may construct its own DCROM or otherwise utilize the occupancy probabilities for collision avoidance purposes.

In some embodiments, VAMs with the OSI and GLI fields may be exchanged in a periodic manner to broadcast an awareness of the VRU 116/117 environment and context to the neighboring ITS-Ss. For example, the VAM transmission frequency may be $$\frac{1}{T_{VAM}} \geq 1\text{ Hz},$$

where $T_{VAM}$ is the periodicity in seconds (or some other unit of time). The periodicity may be configurable depending upon a-priori conditions.

In other embodiments, the VAM with the OSI and GLI fields may be exchanged in an event-driven manner. For example, VAM transmission may be triggered due to appearance (or detection) of a potential emergency situation.

1.5.4. VAM Format Embodiments

FIG. **6*b*** shows an example VRU Awareness Messages (VAM) 6b00 according to various embodiments. The VAM parameters include multiple data containers, data fields (DFs), and/or data elements (DEs). Current ETSI standards (e.g., [TR103300-1], [TS103300-2], [TS103300-3]) may define various containers as comprising a sequence of optional or mandatory data elements (DEs) and/or data frames (DFs). However, it should be understood that the requirements of any particular standard should not limit the embodiments discussed herein, and as such, any combination of containers, DFs, DEs, values, actions, and/or features are possible in various embodiments, including any combination of containers, DFs, DEs, values, actions, and/or features that are strictly required to be followed in order to conform to such standards or any combination of containers, DFs, DEs, values, actions, and/or features strongly recommended and/or used with or in the presence/absence of optional elements. The DEs and DFs included in the CPM format are based on the ETSI Common Data Dictionary (CDD), ETSI TS 102 894-2 ("[TS102894-2]"), and/or makes use of certain elements defined in CEN ISO/TS 19091.

FIG. **6*b* shows example VAM 6b00 including data containers, DEs, and/or DFs according to various embodiments. The VAM 6b00 includes a common ITS PDU header, a generation time container/DF, a basic container, a VRU high frequency container with dynamic properties of the VRU 116/117 (e.g., motion, acceleration, etc.), a VRU low frequency container with physical properties of the VRU 116/117** (e.g., conditional mandatory with higher periodicity, see clause 7.3.2 of [TS103300-3]), a cluster information container, a cluster operation container, and a motion prediction container.

The ITS PDU Header is a header DF of the VAM 6b00. The ITS PDU Header includes DEs for the VAM protocol Version, the VAM message type identifier messageID and the station identifier stationID of the originating ITS-S. The DE protocol Version is used to select the appropriate protocol decoder at the receiving ITS-S. This DE messageID should be harmonized with other C-ITS message identifier definitions. In some implementations, the value of the DE protocol Version is set to 1. For VAM, the DE messageID is set to vam(14). The StationID is locally unique. This DF is presented as specified in clause E.3 of [TS103300-3].

The ITS PDU header is as specified in [TS102894-2]. Detailed data presentation rules of the ITS PDU header in the context of VAM is as specified in annex B of [TS103300-3]. The StationId field in the ITS PDU Header changes when the signing pseudonym certificate changes, or when the VRU starts to transmit individual VAMs after being a member of a cluster (e.g., either when, as leader, it breaks up the cluster, or when, as any cluster member, it leaves the cluster). Exception if the VRU device experiences a "failed join" of a cluster as defined in clause 5.4.2.2 of [TS103300-3], it should continue to use the StationId and other identifiers that it used before the failed join. The generation time in the VAM is a GenerationDeltaTime as used in CAM. This is a measure of the number of milliseconds elapsed since the ITS epoch, modulo $2^{16}$ (e.g., 65 536).

The VAM payload vam includes of indicates the time stamp of the VAM and the containers basicContainer and vruHighFrequency Container. The VAM payload may include the additional containers vruLowFrequencyContainer, vruClusterinformationContainer, vruClusterOperationContainer, and vruMellotionPredictionContainer. The selection of the additional containers depends on the dissemination criteria, e.g., vruCluster or MotionDynamicPrediction availability. This DF is presented as specified in annex A of [TS103300-3].

The generationDeltaTime DF is or includes a time corresponding to the time of the reference position in the VAM, considered as time of the VAM generation. The value of the DE is wrapped to 65 536. This value is set as the remainder of to the corresponding value of TimestampIts divided by 65 536 as below. generationDeltaTime=TimestampIts mod 65 536. TimestampIts represents an integer value in milliseconds since 2004-01-01T00:00:00:000Z as defined in X. The DE is presented as specified in annex A of [TS103300-3].

The vamParameters DF includes of indicates the sequence of VAM mandatory and optional containers. Other containers may be added in the future. This DF is presented as specified in annex A of [TS103300-3].

The basicContainer is the (mandatory) basic container of a VAM. The basic container provides (includes of indicates) basic information of the originating ITS-S. Type of the originating ITS-S; this DE somehow overlaps with the VRU profile, even though they do not fully match (e.g., moped(3) and motorcycle(4) both correspond to a VRU profile 3). To enable a future possibility to have the VAM transmitted by non VRU ITS-S (see clause 4.1 and annex I), both data elements are kept independent. The latest geographic position of the originating ITS-S as obtained by the VBS at the VAM generation. This DF is defined in [TS102894-2] and includes a positionConfidenceEllipse which provides the accuracy of the measured position with the 95% confidence level. The basic container is present for VAM generated by all ITS-Ss implementing the VBS. Although the basic container has the same structure as the BasicContainer in other ETSI ITS messages, the type DE contains VRU-specific type values that are not used by the BasicContainer for vehicular messages. It is intended that at some point in the future the type field in the ITS Common Data Dictionary (CDD) in [TS102894-2] will be extended to include the VRU types. At this point the VRU BasicContainer and the vehicular BasicContainer will be identical.

The stationType DF includes of indicates the station type of the VAM originating device. This DE takes the value pedestrian(1), bicyclist(2), moped(3), motorcycle(4), lightVRUvehicle(12), or animal(13). Other values of stationType is not used in the basicContainer transmitted in the VAM. This DF is presented as specified in clause E.2 of [TS103300-3].

The referencePosition DF includes of indicates the position and position accuracy measured at the reference point of the originating ITS-S. The measurement time corresponds to generationDeltaTime. If the station type of the originating ITS-S is set to one out of the values listed in clause B.2.2 of [TS103300-3], the reference point is the ground position of the centre of the front side of the bounding box of the VRU (see e.g., ETSI EN 302 890-2 ("[EN302890-2]")). The positionConfidenceEllipse provides the accuracy of the measured position with the 95% confidence level. Otherwise, the positionConfidenceEllipse is set to unavailable. If semiMajorOrientation is set to 0° North, then the semiMajorConfidence corresponds to the position accuracy in the North/South direction, while the semiMinorConfidence corresponds to the position accuracy in the East/West direction. This definition implies that the semiMajorConfidence might be smaller than the semiMinorConfidence. This DF is presented as specified in [TS102894-2] A.124 ReferencePosition.

VAM-specific containers include VRU high frequency (VRU HF) container and VRU low frequency (VRU LF) container. All VAMs generated by a VRU ITS-S include at least a VRU HF container. The VRU HF container contains potentially fast-changing status information of the VRU ITS-S such as heading or speed. As the VAM is not used by VRUs from profile 3 (motorcyclist), none of these containers apply to VRUs profile 3. Instead, VRUs profile 3 only transmit the motorcycle special container with the CAM (see clauses 4.1, 4.4, and 7.4 in [TS103300-3]). In addition, VAMs generated by a VRU ITS-S may include one or more of the containers, as specified in Table 1.5.4-1, if relevant conditions are met.

TABLE 1.5.4-1

VAM conditional mandatory and optional containers

| Container name | Description | Condition for presence in the VAM |
|---|---|---|
| VRU low frequency (VRU LF) container | The VRU LF container contains static or slow-changing vehicle data like the profile or the status of the exterior lights. | Mandatory with higher periodicity (see clause 6.2 of [TS103300-3]) or when VRU cluster operation container is present |
| VRU cluster information container | This container provides the information/parameters relevant to a VRU cluster. | Conditional mandatory (see clause 5.4.1 of [TS103300-3]) |
| VRU cluster operation container | This container provides information relevant to change of cluster state in the VBS. It may be included by a cluster VAM transmitter or by a cluster member (respectively leader or ordinary member). | Conditional mandatory (see clause 5.4.1 of [TS103300-3]) |
| VRU motion prediction container | When the information is available in the VRU ITS-S, this container provides dynamic VRU motion prediction information as well as explicit path prediction. | Optional |

The VRU HF container of a VAM (vruHighFrequency-Container) is presented as specified in annex A of [TS103300-3]. The VRU HF container of the VAM contains potentially fast-changing status information of the VRU ITS-S. It includes the parameters listed in clause B.3.1 of [TS103300-3]. The VRU HF container includes the following parameters: heading; speed; longitudinalAcceleration; curvature OPTIONAL (Recommended for VRU Profile 2); curvatureCalculationMode OPTIONAL (Recommended for VRU Profile 2); yawRate OPTIONAL (Recommended for VRU Profile 2); lateralAcceleration OPTIONAL (Recommended for VRU Profile 2); verticalAcceleration OPTIONAL; vruLanePosition OPTIONAL (extended to include sidewalks and bicycle lanes); environment OPTIONAL; vruMovementControl OPTIONAL (Recommended for VRU Profile 2); orientation OPTIONAL (Recommended for VRU Profile 2); rollAngle OPTIONAL (Recommended for VRU Profile 2); and/or vruDeviceUsage OPTIONAL (Recommended for VRU Profile 1). Part of the information in this container do not make sense for some VRU profiles, and therefore, they are indicated as optional, but recommended to specific VRU profiles.

The VRU profile may be included in the VRU LF container and so is not transmitted as often as the VRU HF container (see clause 6.2 of [TS103300-3]). However, the receiver may deduce the VRU profile from the vruStationType field: pedestrian indicates profile 1, bicyclist or lightVRUvehicle indicates profile 2, moped or motorcycle indicates profile 3, and animals indicates profile 4.

The VRU HF DF may be used to describe the lane position in CAM is not sufficient when considering VRUs 116/117, as it does not include bicycle paths and sidewalks. Accordingly, it has been extended to cover all positions where a VRU could be located. When present, the vruLanePosition DF either describes a lane on the road (same as for a vehicle), a lane off the road or an island between two lanes of the previous types. Further details are provided in the DF definition, in clause B.3.10 of [TS103300-3].

The VruOrientation DF complements the dimensions of the VRU vehicle by defining the angle between the VRU vehicle longitudinal axis with regards to the WGS84 north. It is restricted to VRUs from profile 2 (bicyclist) and profile 3 (motorcyclist). When present, it is as defined in clause B.3.17. The VruOrientationAngle is different from the vehicle heading, which is related to the VRU movement while the orientation is related to the VRU position.

The RollAngle DF provides an indication of a cornering two-wheeler. It is defined as the angle between the ground plane and the current orientation of a vehicle's y-axis with respect to the ground plane about the x-axis as specified in ISO 8855. The DF also includes the angle accuracy. Both values are coded in the same manner as DF_Heading, see A.101 in [TS102894-2], with the following conventions: positive values mean rolling to the right side (0 . . . "500"), where 500 corresponds to a roll angle value to the right of 50 degrees; negative values mean rolling to the left side (3 600 . . . "3 100"), where 3 100 corresponds to a roll angle value to the left of 50 degrees; values between 500 and 3 100 is not used; the DE vruDeviceUsage provides indications to the VAM receiver about a parallel activity of the VRU. This DE is similar to the DE PersonalDeviceUsageState specified in SAE J2945/9. It is restricted to VRUs from profile 1, e.g., pedestrians. When present, it is as defined in clause B.3.19 of [TS103300-3] and will provide the possible values given in Table 1.5.4-2. To respect the user's choice for privacy, the device configuration application should include a consent form for transmitting this information. How this consent form is implemented is out of scope of the present document. In the case the option is opted-out (default), the device systematically sends the value "unavailable(0)".

TABLE 1.5.4-2

| vruDeviceUsage possible values | | |
|---|---|---|
| Activity definition | Value | Description |
| unavailable | 0 | Not determined or VRU did not consent to transmission of this personal data in this DE |
| other | 1 | Used for states other than defined below |
| idle | 2 | Human is not interacting with device |
| listeningToAudio | 3 | Any audio source other than calling |
| typing | 4 | Including texting, entering addresses and other manual input activity |
| calling | 5 | |
| playingGames | 6 | |
| reading | 7 | |
| viewing | 8 | Watching dynamic content, including following navigation prompts, viewing videos or other visual contents that are not static |

The DE VruMovementControl indicates the mechanism used by the VRU to control the longitudinal movement of the VRU vehicle. It is mostly aimed at VRUs from profile 2, e.g., bicyclists. When present, it is presented as defined in clause B.3.16 of [TS103300-3] and provides the possible values given in Table 1.5.4-3. The usage of the different values provided in the table may depend on the country where they apply. For example, a pedal movement could be necessary for braking, depending on the bicycle in some countries. This DE could also serve as information for the surrounding vehicles' on-board systems to identify the bicyclist (among others) and hence improve/speed up the "matching" process of the messages already received from the VRU vehicle (before it entered the car's field of view) and the object which is detected by the other vehicle's camera (once the VRU vehicle enters the field of view).

TABLE 1.5.4-3

| VruMovementControl possible values | | |
|---|---|---|
| Movement control applied | Value | Description |
| unavailable | 0 | Not determined or VRU did not consent to transmission of this personal data in this DE |
| braking | 1 | Action applied on VRU vehicle brakes |

TABLE 1.5.4-3-continued

| VruMovementControl possible values | | |
|---|---|---|
| Movement control applied | Value | Description |
| hardBraking | 2 | Action applied on VRU vehicle brakes |
| stopPedaling | 3 | Action applied on VRU vehicle pedals |
| brakingAndStopPedaling | 4 | Action applied on both VRU vehicle pedals and brakes |
| hardBrakingAndStopPedaling | 5 | Action applied on both VRU vehicle pedals and brakes |
| noReaction | 6 | No action applied on VRU vehicle |

The heading DF includes or indicates a heading and heading accuracy of the originating ITS-S with regards to the true north. The heading accuracy provided in the DE headingConfidence value provides the accuracy of the measured vehicle heading with a confidence level of 95%. Otherwise, the value of the headingConfidence is set to unavailable. The DE is presented as specified in [TS102894-2] A.112 heading.

The speed DF includes or indicates a speed in moving direction and speed accuracy of the originating ITS-S. The speed accuracy provided in the DE speedConfidence provides the accuracy of the speed value with a confidence level of 95%. Otherwise, the speedConfidence is set to unavailable. The DE is presented as specified in [TS102894-2] A.126 Speed.

The longitudinalAcceleration DF includes or indicates a longitudinal acceleration of the originating ITS-S. It includes the measured longitudinal acceleration and its accuracy value with the confidence level of 95%. Otherwise, the longitudinalAccelerationConfidence is set to unavailable. The data element is presented as specified in [TS102894-2], A.116 LongitudinalAcceleration.

The curvature DF is related to the actual trajectory of the VRU vehicle. It includes: curvatureValue denoted as inverse of the VRU current curve radius and the turning direction of the curve with regards to the moving direction of the VRU as defined in [TS102894-2]. curvatureConfidence denoted as the accuracy of the provided curvatureValue for a confidence level of 95%. Optional. Recommended to VRUs Profile 2. The DF is presented as specified in [TS102894-2], A.107 Curvature.

The curvatureCalculationMode is a flag DE indicates whether vehicle yaw-rate is used in the calculation of the curvature of the VRU vehicle ITS-S that originates the VAM. Optional. Recommended to VRUs Profile 2. The DE is presented as specified [TS102894-2], A.13 CurvatureCalculationMode.

The yawRate DF is similar to the one used in CAM and includes: yawRateValue denotes the VRU rotation around the centre of mass of the empty vehicle or VRU living being. The leading sign denotes the direction of rotation. The value is negative if the motion is clockwise when viewing from the top (in street coordinates). yawRateConfidence denotes the accuracy for the 95% confidence level for the measured yawRateValue. Otherwise, the value of yawRateConfidence is set to unavailable. Optional. Recommended to VRUs Profile 2. The DF is presented as specified in [TS102894-2], A.132 YawRate.

The lateralAcceleration DF includes or indicates a VRU vehicle lateral acceleration in the street plane, perpendicular to the heading direction of the originating ITS-S in the centre of the mass of the empty VRU vehicle (for profile 2) or of the human or animal VRU (for profile 1 or 4). It includes the measured VRU lateral acceleration and its accuracy value with the confidence level of 95%. This DE is present if the data is available at the originating ITS-S. Optional but recommended to VRUs Profile 2. The DF is presented as specified in [TS102894-2], A.115 DF_LateralAcceleration.

The verticalAcceleration DF includes or indicates a Vertical Acceleration of the originating ITS-S. This DE is present if the data is available at the originating ITS-S. The DF is presented as specified in [TS102894-2], A.129 VerticalAcceleration.

The vruLanePosition DF includes or indicates a lane position of the referencePosition of a VRU, which is either a VRU-specific non-traffic lane or a standard traffic lane. This DF is present if the data is available at the originating ITS-S (Additional information is needed to unambiguously identify the lane position and to allow the correlation to a map. This is linked to an adequate geolocation precision). This DF includes one or more of the following fields: onRoadLanePosition; offRoadLanePosition; trafficIslandPosition; and/or mapPosition. The DF is presented as specified in annex A and clause F.3.1 of [TS103300-3].

The offRoadLanePosition DE includes or indicates a lane position of the VRU when it is in a VRU-specific non-traffic lane. The DE is presented as specified in clause F.3.2 of [TS103300-3].

The onRoadLanePosition DE includes or indicates a onRoadLanePosition of the referencePosition of a VRU, counted from the outside border of the road, in the direction of the traffic flow. This DE is present if the data is available at the originating ITS-S (see note: Additional information is needed to unambiguously identify the lane position and to allow the correlation to a map. This is linked to an adequate geolocation precision). The DE is presented as specified in [TS102894-2], A.40 LanePosition.

The trafficIslandPosition DE includes or indicates a lane position of the VRU when it is on a VRU-specific traffic island. The TrafficIslandPosition type consists of two lane-identifiers for the two lanes on either side of the traffic island. Each identifier may be an offRoadLanePosition, a onRoadLanePosition, or a mapPosition. The extensibility marker allows for future extensions of this type for traffic islands with more than two sides. The DF is presented as specified in clause F.3.3 of [TS103300-3].

The mapPosition DE includes or indicates a lane position of the VRU as indicated by a MAPEM message, as specified in ETSI TS 103 301 v1.1.1 (2016-11). The DF is presented as specified in clause F.3.5 of [TS103300-3].

The environment DE provides contextual awareness of the VRU among other road users. This DE is present only if the data is available at the originating ITS-S. The DE is presented as specified in clause F.3.6 of [TS103300-3].

The vruMovementControl DE indicates the mechanism used by the VRU to control the longitudinal movement of the VRU vehicle (see e.g., accelerationControl in [TS102894-2], A.2). The impact of this mechanism may be indicated by other DEs in the vruMotionPredictionContainer (e.g., headingChangeIndication, accelerationChangeIndication). This DE is present only if the data is available at the originating ITS-S. The DE is presented as specified in clause F.3.7 of [TS103300-3].

The vruOrientation DF complements the dimensions of the VRU vehicle by defining the angle of the VRU vehicle longitudinal axis with regards to the WGS84 north. The orientation of the VRU is an important factor, especially in the case where the VRU has fallen on the ground after an accident and constitutes a non-moving obstacle to other road users. This DE is present only if the data is available at the originating ITS-S. Optional. Recommended to VRUs profile 2 and VRUs profile 3. The DE is presented as specified in clause F.3.8 of [TS103300-3].

The rollAngle DF rollAngle provides the angle and angle accuracy between the ground plane and the current orientation of a vehicle's y-axis with respect to the ground plane about the x-axis according to the ISO 8855. The DF includes the following information: rollAngle Value; rollAngleConfidence. This DF is present only if the data is available at the originating ITS-S. Optional. Recommended to VRUs profile 2 and VRUs profile 3. The DF is presented as specified in [TS102894-2] for the heading DF, which is also expressed as an angle with its confidence (see A.101 DF_Heading). The rollAngleValue is set as specified in clause 7.3.3 of [TS103300-3].

The vruDeviceUsage DE provides indications from the personal device about the potential activity of the VRU. It is harmonized with the SAE PSM. This DE is present only if the data is available at the originating ITS-S. Optional but recommended for VRUs profile 1. The DE is presented as specified in clause F.3.9 of [TS103300-3].

The VRU low frequency (LF) container (vruLowFrequencyContainer) of a VAM may be mandatory with higher periodicity. This DF is presented as specified in annex A of [TS103300-3].

The VRU LF container includes the following parameters: vruProfileAndSubProfile; vruSizeClass; vruExteriorLights (optional or mandatory for VRUs profile 2 and VRUs profile 3).

The VRU LF container of the VAM contains potential slow-changing information of the VRU ITS-S. It includes the parameters listed in clause B.4.1 of [TS103300-3]. Some elements are mandatory, others are optional or conditional mandatory. The VRU LF container is included into the VAM with a parametrizable frequency as specified in clause 6.2 of [TS103300-3]. The VAM VRU LF container has the following content. The DE VruProfileAndSubProfile contains the identification of the profile and the sub-profile of the originating VRU ITS-S if defined. Table 1.5.4-4 shows the list of profiles and sub-profiles specified in the present document.

TABLE 1.5.4-4

VruProfileAndSubProfile description based on profiles

| Profile | Profile Index | SubProfile Index | VruSubProfile description |
|---|---|---|---|
| Pedestrian | 1 | 0 | Unavailable |
| | | 1 | Ordinary Pedestrian |
| | | 2 | Road workers |
| | | 3 | First responder |
| Bicyclist | 2 | 0 | Unavailable |
| | | 1 | Bicyclist |
| | | 2 | Wheelchair User |
| | | 3 | Horse and rider |
| | | 4 | Rollerskater |
| | | 5 | Standing E-Scooter |
| | | 6 | Personal Transporter |
| | | 7 | E-Bicyclist (Pedelec), up to 25 km/h in Europe |
| | | 8 | E-Bicyclist (Speed-Pedelec), up to 45 km/h but with a motion dynamic similar to a bicycle |
| Motorcyclist | 3 | 0 | Unavailable |
| | | 1 | Moped |
| | | 2 | Motorcycle |
| | | 3 | Motorcycle + Sidecar right |
| | | 4 | Motorcycle + Sidecar left |
| | | 5 | Seated E-scooter |
| Animals (see note) | 4 | 0 | Unavailable |
| | | 1 | Wild animal |
| | | 2 | Farm animal |
| | | 3 | Service animal |

NOTE:

In the context of safety related traffic communication animals are regarded having a higher priority than non-living objects. Thus, a specific profile has been defined in order to treat them correctly in any kind of decision-making process.

The DE VruProfileAndSubProfile is OPTIONAL if the VRU LF container is present. If it is absent, this means that the profile is unavailable. The sub-profiles for VRU profile 3 are used only in the CAM special container. The DE VRUSizeClass contains information of the size of the VRU. The DE VruSizeClass depends on the VRU profile. This dependency is depicted in Table 1.5.4-5. An example of the DE VruProfileAndSubProfile is shown by Table 1.5.4-6.

TABLE 1.5.4-5

VruSizeClass description based on profiles

| Profile | Profile Value | VruSizeClass Value | VruSizeClass description |
|---|---|---|---|
| Unavailable | 0 | 0 | N/A |
| Pedestrian | 1 | 0 | Unavailable |
| | | 1 | Low → 1 m or less in height |
| | | 2 | medium → larger than 1 m and 1.5 m or less in height |
| | | 3 | high → larger than 1.5 m |
| Bicyclist | 2 | 0 | Unavailable |
| | | 1 | Low → 1.5 m or less height |
| | | 2 | medium → more than 1.5 m in height, 1 m or less front-to-back |
| | | 3 | high → more than 1.5 m in height, more than 1 m front-to-back |
| Motorcyclist | 3 | 0 | Unavailable |
| | | 1 | Low → 1.5 m or less height |
| | | 2 | medium → more than 1.5 m in height, 1 m or less front-to-back |
| | | 3 | high → more than 1.5 m in height, more than 1 m front-to-back |
| Animals | 4 | 0 | Unavailable |
| | | 1 | Low → 60 Kg or less and 1.5 m or less height |
| | | 2 | medium →more than 60 kg and 100 kg or less and 1.5 m or less in height |
| | | 3 | high → more than 100 kg or more than 1.5 m in height |

NOTE:
1.5 m height of a VRU as a limit makes the difference between being obscured by a parked car and not being obscured by a parked car.

TABLE 1.5.4-6

DE_VruProfileAndSubProfile

| | |
|---|---|
| Description Name | VruProfileAndSubProfile |
| Identifier | DataType XX |
| ASN.1 representation | VruProfileAndSubProfile ::= CHOICE {<br>pedestrian VruSubProfilePedestrian,<br>bicyclist VruSubProfileBicyclist,<br>motorcyclist VruSubProfileMotorcyclist,<br>animal VruSubProfileAnimal,<br>...<br>} |
| Definition | Profile of a VRU including sub-profile information.<br>This DE is used in VRU low frequency container DF as defined in clause B.4.1 of [TS103300-3]. |
| Unit | N/A |
| Category | VRU information |

The DE VruExteriorLight gives the status of the most important exterior lights switches of the VRU ITS-S that originates the VAM. The DE VruExteriorLight is mandatory for the profile 2 and profile 3 if the low VRU LF container is present. For all other profiles it is optional.

The vruProfileAndSubProfile DE/DF includes or indicates a profile of the ITS-S that originates the VAM, including sub-profile information. The setting rules for this value are out of may be defined or discussed elsewhere (see e.g., [TS103300-2] and/or [TS103300-3]). The profile ID identifies the four types of VRU profiles specified in [TS103300-2] and/or [TS103300-3]: pedestrian, bicyclist, motorcyclist, and animal. The profile type names are descriptive: for example, a human-powered tricycle would conform to the bicyclist profile. The subProfile ID identifies different types of VRUs 116/117 within a profile. Conditional mandatory if vruLowFrequencyContainer is included. The DE is presented as specified in clause F.4.1 of [TS103300-3].

The vruSubProfilePedestrian DE/DF includes or indicates the sub-profile of the ITS-S that originates the VAM. The setting rules for this value are out of may be defined or discussed elsewhere (see e.g., [TS103300-2] and/or [TS103300-3]). The DE is presented as specified in clause F.4.2 of [TS103300-3] and/or as shown by Table 1.5.4-7.

TABLE 1.5.4-7

| DE_VruSubProfilePedestrian | |
|---|---|
| Description Name | VruSubProfilePedestrian |
| Identifier | DataType XX |
| ASN.1 representation | VruSubProfilePedestrian ::= ENUMERATED {<br>unavailable(0), ordinary-pedestrian(1),<br>road-worker(2), first-responder(3),<br>max(15)<br>} |
| Definition | Sub-profile of a VRU from Profile 1.<br>The corresponding value shall be set as in Table 1.5.4-4 and/or clause 7.3.4 of [TS103300-3]. The value 15 is set to "max" in order to bound the size of the encoded field.<br>This DE is used in VRU low frequency container DF as defined in clause B.4.1 of [TS103300-3]. |
| Unit | N/A |
| Category | VRU information |

The vruSubProfileBicyclist DE/DF includes or indicates the sub-profile of the ITS-S that originates the VAM. The setting rules for this value are out of the scope of the present document (see e.g., [TS103300-2]). The DE is presented as specified in clause F.4.3 of [TS103300-3] and/or as shown by Table 1.5.4-8.

TABLE 1.5.4-8

| DE_VruSubProfileBicyclist | |
|---|---|
| Description Name | VruSubProfileBicyclist |
| Identifier | DataType XX |
| ASN.1 representation | VruSubProfileBicyclist ::= ENUMERATED {<br>unavailable(0), bicyclist(1), wheelchair-user(2),<br>horse-and-rider(3), rollerskater(4), e-scooter(5),<br>personal-transporter(6), pedelec (7), speed-pedelec(8),<br>max(15)<br>} |
| Definition | Sub-profile of a VRU from Profile 2.<br>The corresponding value shall be set as in Table 1.5.4-4 and/or clause 7.3.4 of [TS103300-3]. The value 15 is set to "max" in order to bound the size of the encoded field.<br>This DE is used in VRU low frequency container DF as defined in clause B.4.1 of [TS103300-3]. |
| Unit | N/A |
| Category | VRU information |

The vruSubProfileMotorcyclist DE/DF includes or indicates the sub-profile of the ITS-S that originates the VAM. The setting rules for this value are out of the scope of the present document (see e.g., [TS103300-2]). The DE is presented as specified in clause F.4.4 of [TS103300-3] and/or as shown by Table 1.5.4-9.

TABLE 1.5.4-9

| DE_VruSubProfileMotorcyclist | |
|---|---|
| Description Name | VruSubProfileMotorcyclist |
| Identifier | DataType XX |
| ASN.1 representation | VruSubProfileMotorcyclist ::= ENUMERATED {<br>unavailable(0), moped(1), motorcycle(2),<br>motorcycle-and-sidecar-right(3),<br>motorcycle-and-sidecar-left(4), max(15)<br>} |
| Definition | Sub-profile of a VRU from Profile 3.<br>The corresponding value shall be set as in Table 1.5.4-4 and/or clause 7.3.4 of [TS103300-3]. The value 15 is set to "max" in order to bound the size of the encoded field.<br>This DE is used in VRU low frequency container DF as defined in clause B.4.1 of [TS103300-3]. |
| Unit | N/A |
| Category | VRU information |

The vruSubProfileAnimal DE/DF includes or indicates the sub-profile of the ITS-S that originates the VAM. The setting rules for this value are out of the scope of the present document (see e.g., [TS103300-2]). The DE is presented as specified in clause F.4.5 of [TS103300-3] and/or as shown by Table 1.5.4-10.

TABLE 1.5.4-10

| DE_VruSubProfileAnimal | |
|---|---|
| Description Name | VruSubProfileAnimal |
| Identifier | DataType XX |
| ASN.1 representation | VruSubProfileAnimal ::= ENUMERATED {<br>unavailable(0), wild-animal(1), farm-animal(2), service-animal(3), max(15)<br>} |
| Definition | Subprofile of a VRU from Profile 4.<br>The corresponding value shall be set as in Table 1.5.4-4 and/or clause 7.3.4 of [TS103300-3]. The value 15 is set to "max" in order to bound the size of the encoded field.<br>This DE is used in VRU low frequency container DF as defined in clause B.4.1 of [TS103300-3]. |
| Unit | N/A |
| Category | VRU information |

The vruSizeClass DE/DF includes or indicates the SizeClass of the ITS-S that originates the VAM. The setting rules for this field are given in Table 1.5.4-5. The size class is interpreted in combination with the profile type to get the range of dimensions of the VRU. Mandatory if vruLowFrequencyContainer is included. The DE is presented as specified in clause F.4.6 of [TS103300-3] and/or as shown by Table 1.5.4-11.

TABLE 1.5.4-11

| DE_VruSizeClass | |
|---|---|
| Description Name | VRUSizeClass |
| Identifier | DataType XX |
| ASN.1 representation | VruSizeClass ::= ENUMERATED {<br>unavailable (0)<br>low (1),<br>medium (2),<br>high (3),<br>max(15)<br>} |
| Definition | Size of a VRU including the use VRU vehicle.<br>The corresponding value shall be set as follows:<br>low (1): the VRU size class is low depending on the VRU profile<br>medium (2): the VRU size class is medium depending on the VRU profile<br>high (3): the VRU size class is high depending on the VRU profile<br>unavailable(0): There is no matched size class or due to privacy reasons in profile 1.<br>The value 15 is set to "max" in order to bound the size of the encoded field.<br>This DE is used in VRU low frequency container DF as defined in clause B.4.1. The mapping of the size values is given in clause 7.3.4 of [TS103300-3], Table 1.5.4-5. |
| Unit | N/A |
| Category | VRU information |

The vruExteriorLights DE/DF includes or indicates the status of the most important exterior lights switches of the VRU ITS-S that originates the VAM. Conditional Mandatory (for VRUs profile 2 and VRUs profile 3). The DE is presented as specified in clause F.4.7 of [TS103300-3] and/or as shown by Table 1.5.4-11.

TABLE 1.5.4-11

| DE_VruExteriorLights | |
|---|---|
| Descriptive Name | VruExteriorLights |
| Identifier | DataType XX |
| ASN.1 representation | VruExteriorLights ::= SEQUENCE {<br>vruSpecific VruSpecificExteriorLights,<br>vehicular ExteriorLights<br>}<br>VruSpecificExteriorLights ::= BIT STRING {<br>unavailable (0)<br>backFlashLight (1),<br>helmetLight (2),<br>armLight (3),<br>legLight (4),<br>wheelLight (5),<br>} (SIZE(8)) |
| Definition | This DE describes the status of the exterior light switches of a vehicle or a VRU.<br>The DE is an extension of the existing vehicular DE ExteriorLight.<br>The value of each bit indicates the state of the switch, which commands the corresponding light. The bit corresponding to a specific light is set to 1, when the corresponding switch is turned on, either manually by the driver or VRU or automatically by a vehicle or VRU system.<br>The bit values do not indicate if the corresponding lamps are alight or not.<br>If a vehicle or VRU is not equipped with a certain light or if the light switch status information is not available, the corresponding bit shall be set to 0. |
| Unit | N/A |
| Category | Vehicle information, VRU information |

A VAM, such as VAM 6b00, that includes information about a cluster of VRUs 116/117 may be referred to as a "cluster VAM" (e.g., VAM 6b00 may be referred to as "cluster VAM 6b00"). The VRU cluster containers of a VAM 6b00 contain the cluster information and/or operations related to the VRU clusters of the VRU ITS-S 117. The VRU cluster containers are made of two types of cluster containers according to the characteristics of the included data/parameters: cluster information containers and cluster operation containers.

A VRU cluster information container is added to a VAM 6b00 originated from the VRU cluster leader. This container provides the information/parameters relevant to the VRU cluster. The VRU cluster information container is of type VruClusterinformationContainer. A VRU cluster information container comprises information about the cluster identifier (ID), shape of the cluster bounding box, cardinality size of the cluster, and profiles of VRUs 116/117 in the cluster. The cluster ID is of type ClusterID. ClusterID is selected by the cluster leader to be non-zero and locally unique as specified in clause 5.4.2.2 of [TS103300-3] and/or as shown by Table 1.5.4-1. The shape of the VRU cluster bounding box is specified by DF ClusterBoundingBoxShape. The shape of the cluster bounding box can be rectangular, circular or polygon. An example of the DF ClusterBoundingBoxShape is shown by Table 1.3-2.

TABLE 1.5.4-1

| DE_ClusterID | |
|---|---|
| Descriptive Name | ClusterID |
| Identifier | DataType XX |
| ASN.1 representation | ClusterID ::= INTEGER (0..255) |
| Definition | ID of a VRU cluster.<br>This DE is used in VRU cluster information container DF as defined in clause B.5.1. |
| Unit | N/A |
| Category | VRU cluster information |

TABLE 1.3-2

| DF_ClusterBoundingBoxShape | |
|---|---|
| Descriptive Name | ClusterBoundingBoxShape |
| Identifier | DataType XX |
| ASN.1 representation | ClusterBoundingBoxShape::= CHOICE {<br>clusterRectangle AreaRectangle,<br>clusterCircle AreaCircular,<br>clusterPolygon AreaPolygon,<br>...<br>} |
| Definition | Bounding box of a VRU cluster. See annex E for definitions of these types |
| Unit | N/A |
| Category | VRU cluster information |

The AreaRectangle, AreaCircular, and AreaPolygon, are shown by Table 1.5.4-3, Table 1.5.4-4, and Table 1.5.4-5, respectively, and additional aspects of these DEs/DFs are shown by Table 1.5.4-6, Table 1.5.4-7, Table 1.5.4-8, Table 1.5.4-9, Table 1.5.4-10, Table 1.5.4-11, Table 1.5.4-12, Table 1.5.4-13, Table 1.5.4-14, and Table 1.5.4-15.

TABLE 1.5.4-3

| DF_AreaRectangle | |
|---|---|
| Descriptive Name | AreaRectangle |
| Identifier | DataType_ XX |
| ASN.1 representation | AreaRectangle ::= SEQUENCE {<br>nodeCenterPoint OffsetPoint OPTIONAL,<br>semiMajorRangeLength SemiRangeLength,<br>semiMinorRangeLength SemiRangeLength,<br>semiMajorRangeOrientation WGS84AngleValue,<br>semiHeight SemiRangeLength OPTIONAL<br>} |
| Definition | Describes a rectangular area. The rectangle is centred about the nodeCenterPoint, which is always provided when this is used for VAM. In this structure:<br>nodeCenterPoint is the offset point about which the rectangle is centred with respect to the position that appears in the BasicContainer.<br>semiMajorRangeLength is the half-length of the rectangle in units of 0.1 metres.<br>semiMinorRangleLength is the half-width of the rectangle in units of 0.1 metres.<br>semiMajorRangeOrientation is the orientation of the semiMajorRangeLength of the rectangle in the WGS84 coordinate system, given in units of 0.1<br>degrees<br>semiHeight is omitted when this type is used to indicate a VRU cluster boundary. |

TABLE 1.5.4-4

| DF_AreaCircular | |
|---|---|
| Descriptive Name | AreaCircular |
| Identifier | DataType_ XX |
| ASN.1 representation | AreaCircular ::= SEQUENCE {<br>nodeCenterPoint OffsetPoint OPTIONAL,<br>radius Radius<br>} |
| Definition | Describes a circular area. The rectangle is centred about the nodeCenterPoint, which is always provided when this is used for VAM. In this structure:<br>nodeCenterPoint is the offset point about which the rectangle is centred with respect to the position that appears in the BasicContainer.<br>radius is the radius of the circle in units of 0.1 metres. |

TABLE 1.5.4-5

| DF_AreaPolygon | |
|---|---|
| Descriptive Name | AreaPolygon |
| Identifier | DataType_ XX |
| ASN.1 representation | AreaPolygon ::= SEQUENCE {<br>polyPointList PolyPointList<br>} |
| Definition | Describes a polygonal area constructed by connecting the offset points in the sequence provided. The last point shall be connected with the first point to close the polygon. The first point is offset relative to the ReferencePosition in the BasicContainer. Each subsequent point is offset relative to the point before it in the list. |

TABLE 1.5.4-6

| DF_OffsetPoint | |
|---|---|
| Descriptive Name | OffsetPoint |
| Identifier | DataType_ XX |
| ASN.1 representation | OffsetPoint ::= SEQUENCE{<br>nodeOffsetPointXY NodeOffsetPointXY (WITH COMPONENTS<br>{..., node-LatLon ABSENT, regional ABSENT}),<br>nodeOffsetPointZ NodeOffsetPointZ OPTIONAL<br>} |

TABLE 1.5.4-6-continued

| DF_OffsetPoint | |
|---|---|
| Definition | Describes a point offset in two, and optionally three, dimensions, from a reference point. See the definition of the enclosing structure of a specification of how the reference point is obtained.<br>nodeOffsetPointXY is the offset in 1 cm units relative to the reference point along the surface of the WGS84 ellipsoid. The type NodeOffsetPOintXY is defined in ISO/TS 19091.<br>nodeOffsetPointZ is the offset in 1 cm units relative to the reference point perpendicular to the surface of the WGS84 ellipsoid. |

TABLE 1.5.4-7

| DF_NodeOffsetPointZ | |
|---|---|
| Descriptive Name | NodeOffsetPointZ |
| Identifier | DataType_ XX |
| ASN.1 representation | NodeOffsetPointZ ::= CHOICE {<br>node-Z1 Offset-B10, -- node is within 5.11m of last node<br>node-Z2 Offset-B11, -- node is within 10.23m of last node<br>node-Z3 Offset-B12, -- node is within 20.47m of last node<br>node-Z4 Offset-B13, -- node is within 40.96m of last node<br>node-Z5 Offset-B14, -- node is within 81.91m of last node<br>node-Z6 Offset-B16 -- node is within 327.67m of last node<br>} |
| Definition | Specifies the offset in 1 cm units relative to a reference point perpendicular to the surface of the WGS84 ellipsoid. The types Offset-Bxx are defined in ISO/TS 19091. |

TABLE 1.5.4-8

| DE_Radius | |
|---|---|
| Descriptive Name | Radius |
| Identifier | DataType_ XX |
| ASN.1 representation | Radius ::= INTEGER {<br>zeroPointOneMeter (1),<br>oneMeter (10)<br>} (0..10000) |
| Definition | Specifies the radius of a circle in 10 cm units. |

TABLE 1.5.4-9

| DF_PolyPointList | |
|---|---|
| Descriptive Name | PolyPointList |
| Identifier | DataType_ XX |
| ASN.1 representation | PolyPointList ::= SEQUENCE (SIZE(3..16, ...)) OF OffsetPoint |
| Definition | Specifies a list of points. Used to define a polygon in DF_AreaPolygon. |

TABLE 1.5.4-10

| DE_SemiRangeLength | |
|---|---|
| Descriptive Name | PolyPointList |
| Identifier | DataType_ XX |
| ASN.1 representation | SemiRangeLength ::= INTEGER {<br>zeroPointOneMeter (1),<br>oneMeter (10)<br>} (0..10000) |
| Definition | Specifies a length in units of 0.1 meter. |

TABLE 1.5.4-11

| DF_WGS84Angle | |
|---|---|
| Descriptive Name | WGS84Angle |
| Identifier | DataType_ XX |
| ASN.1 representation | WGS84Angle ::= SEQUENCE {<br>value WGS84AngleValue,<br>confidence AngleConfidence<br>} |
| Definition | Specifies an angle and confidence relative to north on the WGS84 ellipsoid. |

TABLE 1.5.4-12

| DE_WGS84AngleValue | |
|---|---|
| Descriptive Name | WGS84AngleValue |
| Identifier | DataType_ XX |
| ASN.1 representation | WGS84AngleValue ::= INTEGER {<br>wgs84North (0),<br>wgs84East (900),<br>wgs84South (1800),<br>wgs84West (2700),<br>unavailable (3601)<br>} (0..3601) |
| Definition | Specifies an angle relative to north on the WGS84 ellipsoid in units of 0.1 degrees. |

TABLE 1.5.4-13

| DE_AngleConfidence | |
|---|---|
| Descriptive Name | AngleConfidence |
| Identifier | DataType_ XX |
| ASN.1 representation | AngleConfidence ::= INTEGER {<br>zeroPointOneDegree (1),<br>oneDegree (10),<br>outOfRange (126),<br>unavailable (127) } (0..127) |
| Definition | Specifies the 95% confidence range of a stated angle relative to north on the WGS84 ellipsoid. The range is stated in units of 0.1 degrees. The value given is the 95% confidence range on one side of the indicated angle, i.e. the full 95% confidence range covers an angle of twice the value given in AngleConfidence. outOfRange indicates the 95% confidence range covers an angle |

TABLE 1.5.4-14

| DE_ClusterCardinalilySize | |
|---|---|
| Descriptive Name | ClusterCardinalitySize |
| Identifier | DataType XX |
| ASN.1 representation | ClusterCardinalitySize ::= INTEGER {unavailable(0),<br>onlyLeader(1)} (0..255) |
| Definition | Cardinality size of a VRU cluster.<br>The maximum value is set as specified in clause 8.<br>This DE is used in VRU cluster information container DF as defined in clause B.5.1 of [TS103300-3]. |
| Unit | N/A |
| Category | VRU cluster information |

TABLE 1.5.4-15

| DE_ClusterProfiles | |
|---|---|
| Descriptive Name | ClusterProfiles |
| Identifier | DataType XX |

TABLE 1.5.4-15-continued

| DE_ClusterProfiles | |
|---|---|
| ASN.1 representation | ClusterProfiles ::= BIT STRING {<br>pedestrian (0),<br>bicycle (1),<br>motorcycle (2),<br>animal (3)<br>} (SIZE(4)) |
| Definition | Bitmap encoding VRU profiles, to allow multiple profiles to be indicated in a single cluster (heterogeneous cluster if more than one profile).<br>The corresponding bit shall be set to 1 under the following conditions:<br>pedestrian (0): The VRU cluster contains at least one pedestrian VRU,<br>bicycle(1): The VRU cluster contains at least one bicycle VRU member,<br>motorcycle(2): The VRU cluster contains at least one motorcycle VRU member,<br>animal(3): The VRU cluster contains at least one animal VRU member,<br>Otherwise, the corresponding bit shall be set to 0.<br>This DE is used in VRU cluster information container DF as defined in clause B.5.1 of [TS103300-3]. |
| Unit | N/A |
| Category | VRU cluster information |

A VRU cluster operation container contains information relevant to change of cluster state and composition (comp.). This container may be included by a cluster VAM transmitter or by a cluster member (e.g., cluster leader/CH or ordinary member). A cluster leader/CH includes VRU cluster operation container for performing cluster operations of disbanding (breaking up) cluster. A cluster member includes VRU cluster operation container in its individual VAM 6b00 to perform cluster operations of joining a VRU cluster and leaving a VRU cluster. VRU cluster operation containers are of type VruClusterOperationContainer.

VruClusterOperationContainer provides: DF clusterJoinInfo for cluster operation of joining a VRU cluster by a new member; DF clusterLeaveInfo for an existing cluster member to leave a VRU cluster; DF clusterBreakupInfo to perform cluster operations of disbanding (breaking up) cluster respectively by the cluster leader; and DE clusterIdChangeTimeInfo to indicate that the cluster leader is planning to change the cluster ID at the time indicated in the DE. The new Id is not provided with the indication for privacy reasons (see E.G., clause 5.4.2.3 and clause 6.5.4 of [TS103300-3]).

A VRU device 117 joining or leaving a cluster announced in a message other than a VAM indicates this using the ClusterId value 0. A VRU device 117 leaving a cluster indicates the reason why it leaves the cluster using the DE ClusterLeaveReason. The available reasons are depicted in Table 1.5.4-16. A VRU leader device breaking up a cluster indicates the reason why it breaks up the cluster using the ClusterBreakupReason. The available reasons are depicted in Table 1.5.4-17. In the case the reason for leaving the cluster or breaking up the cluster is not exactly matched to one of the available reasons, the device systematically sends the value "notProvided(0)".

TABLE 1.5.4-16

ClusterLeaveReason description

| Name | Value | Description |
|---|---|---|
| ClusterLeaveReason | 0 | notProvided |
| | 1 | clusterLeaderLost |
| | 2 | clusterDisbandedByLeader |
| | 3 | outOfClusterBoundingBox |
| | 4 | outOfClusterSpeedRange |
| | 5 | joiningAnotherCluster |
| | 6 | CancelledJoin |

TABLE 1.5.4-16-continued

ClusterLeaveReason description

| Name | Value | Description |
|---|---|---|
| | 7 | FailedJoin |
| | 8 | SafetyCondition |

TABLE 1.5.4-17

ClusterBreakupReason description

| Name | Value | Description |
|---|---|---|
| ClusterBreakupReason | 0 | notProvided |
| | 1 | clusteringPurposeCompleted |
| | 2 | leaderMovedOutOfClusterBoundingBox |
| | 3 | joiningAnotherCluster |
| | 4 | enteringLowriskareaBasedonMAPs |
| | 5 | receptionOfCPMcontainingCluster |

In particular, a VRU 116/117 in a cluster, may determine that one or more new vehicles or other VRUs 116/117 (e.g., VRU Profile 3—Motorcyclist) have come closer than minimum safe lateral distance (MSLaD) laterally, and closer than minimum safe longitudinal distance (MSLoD) longitudinally and closer than minimum safe vertical distance (MSVD) vertically (the minimum safe distance condition is satisfied as in clause 6.5.10.5 of [TS103300-3]); it leaves the cluster and enter VRU-ACTIVE-STANDALONE VBS state in order to transmit immediate VAM with ClusterLeaveReason "SafetyCondition(8)". The same applies if any other safety issue is detected by the VRU device 117. Device suppliers and/or manufacturers may declare the conditions on which the VRU device 117 will join/leave a cluster.

The VruClusterOperationContainer does not include the creation of VRU cluster by the cluster leader. When the cluster leader starts to send a cluster VAM 6b00, it indicates that it has created a VRU cluster. While the cluster leader is sending a cluster VAM 6b00, any individual VRUs 116/117 can join the cluster if the joining conditions are met.

The VRU cluster operation container of VAM 6b00 is vruClusterOperationContainer. The VRU cluster operation container includes the following parameters: clusterJoinInfo; clusterLeaveInfo; clusterBreakupInfo; and clusterIdChangeTimeInfo. The clusterJoinInfo DF indicates the intent of an individual VAM transmitter to join a cluster. The clusterJoinInfo DF includes clusterId and joinTime. The clusterId is the cluster identifier for the cluster to be joined (e.g., identical to the clusterId field in the vruInformation-ClusterContainer in the VAM 6b00 describing the cluster that the sender of the clusterJoinInfo intends to join). The joinTime is the time after which the sender will no longer send individual VAMs 6b00 and/or a time after which the VAM transmitter will stop transmitting individual VAMs 6b00. It is presented and interpreted as specified in clause F.6.6 of [TS103300-3], VruClusterOpTimestamp, and/or as shown by Table 1.5.4-18.

TABLE 1.5.4-18

| DF_ClusterJoinInfo | |
|---|---|
| Descriptive Name | ClusterJoinInfo |
| Identifier | DataType XX |
| ASN.1 representation | ClusterJoinInfo ::= SEQUENCE {<br>clusterId ClusterID,<br>joinTime VruClusterOpTimestamp<br>} |
| Definition | This DF is used in VRU cluster operation container DF as defined in clause B.6.1 of [TS103300-3]. In this DF, clusterId is the cluster identifier for the cluster to be joined, and joinTime is the time after which the sender will no longer send individual VAMs. |
| Unit | N/A |
| Category | VRU cluster information |

The clusterLeaveInfo DF indicates that an individual VAM transmitter has recently left the VRU cluster. This DF is presented as specified in clause F.6.2 of [TS103300-3], at clusterLeaveInfo, clusterId, and clusterLeaveReason; and/or as shown by Table 1.5.4-19. The clusterId is identical to the clusterId field in the VruClusterinformationContainer in the VAM 6b00 describing the cluster that the sender of the clusterLeaveInfo has recently left. The clusterLeaveReason indicates the reason why the sender of ClusterLeaveInfo has recently left the cluster. It is presented and interpreted as specified in clause F.6.4 of [TS103300-3], ClusterLeaveReason and/or as shown by Table 1.5.4-19. This DF is used in VRU cluster operation container DF as defined in clause B.6.1 of [TS103300-3]. In this DF, clusterId is the cluster identifier for the cluster that the VAM sender has just left, and ClusterLeaveReason is the reason why it left.

TABLE 1.5.4-19

| DF_ClusterLeaveInfo | |
|---|---|
| Descriptive Name | ClusterLeaveInfo |
| Identifier | DataType XX |
| ASN.1 representation | ClusterLeaveInfo ::= SEQUENCE {<br>clusterId ClusterID,<br>clusterLeaveReason ClusterLeaveReason,<br>} |
| Definition | This DF is used in VRU cluster operation container DF as defined in clause B.6.1 of [TS103300-3]. In this DF, clusterId is the cluster identifier for the cluster that the VAM sender has just left, and ClusterLeaveReason is the reason why it left. |
| Unit | N/A |
| Category | VRU cluster information |

The clusterBreakupInfo DF indicates the intent of a cluster VAM transmitter to stop sending cluster VAMs. This DF is presented as specified in clause B.6.1 and/or clause F.6.3 of [TS103300-3], clusterBreakupInfo, clusterBreakupReason; breakupTime; and/or as shown by Table 1.5.4-20. The clusterBreakupReason indicates the reason why the sender of ClusterBreakupInfo intends to break up the cluster. It is presented and interpreted as specified in clause F.6.5 of [TS103300-3], ClusterBreakupReason. The breakupTime indicates a time after which the VAM transmitter will stop transmitting cluster VAMs. It is presented and interpreted as specified in clause F.6.6 of [TS103300-3], VruClusterOp-Timestamp.

TABLE 1.5.4-20

| DF_ClusterBreakupInfo | |
|---|---|
| Descriptive Name | ClusterBreakupInfo |
| Identifier | DataType XX |
| ASN.1 representation | ClusterBreakupInfo ::= SEQUENCE {<br>ClusterBreakupReason ClusterBreakupReason,<br>breakupTime VruClusterOpTimestamp,<br>...<br>} |
| Definition | This DF is used in VRU cluster operation container DF as defined in clause B.6.1 of [TS103300-3]. In this DF, ClusterBreakupReason is the reason for the breakup, and breakupTime is the time after which the sender will no longer send cluster VAMs.<br>NOTE: This DF does not contain a clusterId, as it will be indicated the VruClusterInformationContainer. |
| Unit | N/A |
| Category | VRU cluster information |

The clusterIdChangeTimeInfo DF indicates the intent of a cluster VAM transmitter to change cluster ID. This DE is presented as in clause B.6.1 and/or clause F.6.6 of [TS103300-3], VruClusterOpTimestamp. VruClusterOp-Timestamp is a unit of time. In one implementation, the unit of time is 256 milliseconds, and the VruClusterOpTime-stamp is represented as an INTEGER (1 . . . 255). It can be interpreted as the first 8 bytes of a GenerationDeltaTime. To convert a VruClusterOpTimestamp to a GenerationDelta-Time, multiply by 256 (e.g., append a “00” byte).

The clusterLeaveReason DF indicates the reason for leaving the VRU cluster by an individual VAM transmitter. This DE indicates a reason why the VAM transmitter has left the cluster recently and/or and started to send individual VAMs. It is presented and interpreted as specified in clause B.6.1 and/or clause F.6.4 of [TS103300-3], ClusterLeav-eReason and/or as shown by Table 1.5.4-21. In one imple-mentation, the value 15 is set to “max” in order to bound the size of the encoded field.

TABLE 1.5.4-21

| DE_ClusterLeaveReason | |
|---|---|
| Descriptive Name | ClusterLeaveReason |
| Identifier | DataType XX |
| ASN.1 representation | ClusterLeaveReason ::= ENUMERATED {<br>notProvided (0),<br>clusterLeaderLost (1),<br>clusterDisbandedByLeader (2),<br>outOfClusterBoundingBox (3),<br>outOfClusterSpeedRange (4),<br>joiningAnotherCluster (5),<br>CancelledJoin (6),<br>FailedJoin (7),<br>SafetyCondition (8),<br>max(15)<br>} |
| Definition | This DE is used in VRU cluster operation container DF as defined in clause B.6.1 of [TS103300-3]. It provides the reason why a VRU device left a cluster and started to send individual VAMs. The value 15 is set to “max” in order to bound the size of the encoded field. |
| Unit | N/A |
| Category | VRU cluster information |

The clusterBreakupReason DF indicates the reason for disbanding VRU cluster by a cluster VAM transmitter. This DE indicates a reason why a cluster leader VRU broke up the cluster that it was leading and/or the reason why the VAM transmitter will stop transmitting cluster VAMs. It is pre-sented and interpreted as specified in clause B.6.1 and/or clause F.6.5 of [TS103300-3], ClusterBreakupReason and/or as shown by Table 1.5.4-22. In one implementation, the value 15 is set to “max” in order to bound the size of the encoded field.

TABLE 1.5.4-22

| DE_ClusterBreakupReason | |
|---|---|
| Descriptive Name | ClusterBreakupReason |
| Identifier | DataType XX |
| ASN.1 representation | ClusterBreakupReason ::= ENUMERATED {<br>notProvided (0),<br>clusteringPurposeCompleted (1),<br>leaderMovedOutOfClusterBoundingBox (2),<br>joiningAnotherCluster (3),<br>enteringLowRiskareaBasedOnMaps (4),<br>receptionOfCpmContainingCluster (5),<br>max(15)<br>} |
| Definition | This DE is used in VRU cluster operation container DF as defined in clause B.6.1 of [TS103300-3]. This DE indicates the reason why a cluster leader VRU broke up the cluster that it was leading. The value 15 is set to "max" in order to bound the size of<br>the encoded field. |
| Unit | N/A |
| Category | VRU cluster information |

The parameters in Table 1.5.4-23 govern the VRU decision to create, join or leave a cluster. The parameters may be set on individual devices or system wide and may depend on external conditions or be independent of them.

TABLE 1.5.4-23

Parameters for VRU clustering decisions

| Parameter | Type | Meaning | Recommended range |
|---|---|---|---|
| numCreateCluster | Integer | Number of VRU devices that a potential cluster leader anticipates will join a cluster, if one is created | [3 to 5] |
| maxClusterDistance | distance (in m) | maximum distance between the edge of the cluster and the VRU performing the evaluation. This value also restricts the size of a VRU cluster | [3 to 5] |
| maxClusterVelocityDifference | percentage | maximum speed velocity difference inside a cluster | 5% |
| maxCombinedClusterDistance | distance (in m) | maximum distance between the edge of the combined VRU cluster and the VRU performing the evaluation. This value also restricts the size of a combined VRU cluster | [1 to 2] |
| minClusterSize | Integer | minimal size of a VRU cluster. It is used to fill the ClusterCardinalitySize field, just after creation and before any VRU has joined (see note 1). | 1 |
| maxClusterSize | Integer | maximal size (or number of active ITS-S) of a VRU cluster. It is used by a VRU to check whether it can join the cluster. In practice, the cluster may be larger and include non-equipped VRUs, which cannot take part in the clustering operation and be identified as such by the cluster leader. | 20 (see note 2) |
| numClusterVAMRepeat | Integer | Number of VAM repetitions with former identifiers in case of a cluster cancelled-join or a failed-join | 3 |

NOTE 1:
The minimal size of 1 for the cluster cardinality size does not mean any VRU can be its own cluster as a VRU should comply with the criteria set in clause 5.4.2.4 before it creates a cluster. This value is set to 1 to reflect the cluster condition just after it was created and before any other VRU has had an opportunity to join.
NOTE 2:
The value given in the present document is an initial indicative value. It may be revised in a later revision after more evaluations of clustering have been performed.

The parameters in Table 1.5.4-24 govern the messaging behavior around joining and leaving clusters. The parameters may be set on individual devices or system wide and may depend on external conditions or be independent of them.

TABLE 1.5.4-24

| Cluster membership parameters | | | |
|---|---|---|---|
| Parameter | Type | Meaning | Recommended default value |
| timeClusterUniquenessThreshold | Time period | When a cluster leader selects a cluster ID, it has to be different from any cluster ID received by the cluster leader within this time | 30 seconds |
| timeClusterBreakupWarning | Time period | When a cluster leader has made the decision to end a cluster, it includes in its VAMs an indication of the forthcoming end of the cluster for this time. | 3 seconds |
| timeClusterJoinNotification | Time period | When a VRU device sending individual VAMs intends to join a cluster, it includes in its VAMs an indication of this intention for this time | 3 seconds |
| timeClusterJoinSuccess | Time period | After a VRU device joins a cluster, it waits this amount of time for the cluster VAM to reflect the fact that the VRU device has joined and leaves the cluster if not | 0.5 seconds |
| timeClusterIdChangeNotification | Time period | The time for which a cluster leader advertises that it is going to change its ID before changing it | 3 seconds |
| timeClusterIdPersist | Time period | If the cluster ID for a particular device changes, the time for which it can continue to use the old ID in a cluster leave indication | 3 seconds |
| timeClusterContinuity | Time period | If a VRU device that is a member of a cluster does not receive a cluster VAM for this period of time, it leaves the cluster | 2 seconds |
| timeClusterLeaveNotification | Time period | After a VRU device has left a cluster, it includes in its VAMs an indication of the cluster it has left for this time | 1 second |
| timeCombinedVruClusterOpportunity | Time period | The time for which an ITS-S advertises that it is offering to form a combined VRU cluster | 15 seconds |

The VAM VRU Motion Prediction container carries the past and future motion state information of the VRU. The VRU Motion Prediction Container of type VruMotionPredictionContainer contains information about the past locations of the VRU of type PathHistory, predicted future locations of the VRU (formatted as SequenceOfVruPathPoint), safe distance indication between VRU and other road users/objects of type SequenceOfVruSafeDistanceIndication, VRU's possible trajectory interception with another VRU/object is of type SequenceOfTrajectoryInterceptionIndication, the change in the acceleration of the VRU is of type AccelerationChangeIndication, the heading changes of the VRU is of HeadingChangeIndication, and changes in the stability of the VRU is of type StabdityChangandication. The VRU Motion Prediction Container includes the following parameters: pathHistory; pathPrediction; safeDistance; trajectoryInterceptionIndication; accelerationChangeIndication; headingChangeIndication; and stabdityChangeIndication.

The Path History DF (pathHistory) is of PathHistory type. The PathHistory DF comprises the VRU's recent movement over past time and/or distance. The PathHistory DF includes up to 40 past path points, each represented as DF PathPoint (see [TS102894-2], A117 pathHistory, A118; and/or clause 7.3.6 of [TS103300-3]). Each PathPoint includes pathPosition (A109) and an optional pathDeltaTime (A47) with granularity of 10 ms. When a VRU leaves a cluster and wants to transmit its past locations in the VAM, the VRU may use the PathHistory DF.

The Path Prediction DF (pathPrediction) provides the set of predicted locations of the ITS-S, confidence values and the corresponding future time instants. The pathPrediction DF is of SequenceOfVruPathPoint type and defines up to 40 future path points, confidence values and corresponding time instances of the VRU ITS-S. It contains future path information for up to 10 seconds or up to 40 path points, whichever is smaller. The DF is presented specified in clause F.7.1 of [TS103300-3] and/or Table 1.5.4-25. It is a sequence of VruPathPoint. The VruPathPoint DE provides the predicted location of the ITS-S, confidence value and the corresponding future time instant. The DE shall be presented specified in clause F.7.2 of [TS103300-3] and/or Table 1.5.4-26.

TABLE 1.5.4-25

| DF_ SequenceOfVruPathPoint | |
|---|---|
| Description Name | SequenceOfVruPathPoint |
| Identifier | DataType XX |
| ASN.1 representation | -- predicted set of path points<br>SequenceOfVruPathPoint ::= SEQUENCE(SIZE(0..40)) OF VruPathPoint |
| Definition | This DF provides up to 40 predicted path points of VRU ITS-S |
| Unit | N/A |
| Category | VRU information |

TABLE 1.5.4-26

| DF_VruPathPoint | |
|---|---|
| Description Name | VruPathPoint |
| Identifier | DataType XX |
| ASN.1 representation | -- predicted path point, confidence value and corresponding time instant<br>VRUPathPoint ::= SEQUENCE {<br>pathPosition ReferencePosition,<br>pathDeltaTime PathDeltaTime OPTIONAL,<br>} |
| Definition | This DF provides predicted path point and confidence level defined by ReferencePosition (see e.g., [TS102894-2]) and corresponding time instant defined by PathDeltaTime (see e.g., [TS102894-2]) of VRU ITS-S |
| Unit | N/A |
| Category | VRU information |

The Safe Distance Indication (e.g., vruSafeDistance) provides indication of safe distance between an ego-VRU and up to 8 other ITS-S or entity on the road to indicate whether the ego-VRU is at a safe distance (that is less likely to physically collide) from another ITS-S or entity on the road. The Safe Distance Indication is of type SequenceOfVruSafeDistanceIndication and provides an indication of whether the VRU is at a recommended safe distance laterally, longitudinally and vertically from up to 8 other stations in its vicinity. The simultaneous comparisons between Lateral Distance (LaD), Longitudinal Distance (LoD) and Vertical Distance (VD) and their respective thresholds, Minimum Safe Lateral Distance (MSLaD), Minimum Safe Longitudinal Distance (MSLoD), and Minimum Safe Vertical Distance (MSVD) as defined in clause 6.5.10.5 of [TS103300-2], is used for setting the VruSafeDistanceIndication DF. Other ITS-S involved are indicated as StationID DE within the VruSafeDistanceIndication DE. The timetocollision (TTC) DE within the container reflects the estimated time taken for collision based on the latest onboard sensor measurements and VAMs. The DF is presented as specified in clause F.7.3 of [TS103300-3] and is a sequence of VruSafeDistanceIndication.

The VruSafeDistanceIndication DF provides indication of safe distance between an ego-VRU and ITS-S or entity on the road to indicate whether the ego-VRU is at a safe distance (that is less likely to physically collide) from another ITS-S or entity on the road. It depends on subjectStation; stationSafeDistanceIndication; and timeToCollision. This DF is presented as specified in clause F.7.4 of [TS103300-3].

The stationSafeDistanceIndication DE includes or indicates an indication when the conditional relations LaD<MSLaD, LoD<MSLoD, and VD<MSVD are simultaneously satisfied. This DE is mandatory within the VruSafeDistanceIndication in some implementations. The DE shall be presented as specified in clause F.7.5 of [TS103300-3]. The timeToCollision DF includes or indicates the time to collision (TTC) DE shall reflect the estimated time taken for collision based on the latest onboard sensor measurements and VAMs. This DF is presented as specified in clause F.7.14 of [TS103300-3], by DE_ActionDeltaTime.

The trajectoryInterception DF provides the indication for possible trajectory interception with up to 8 VRUs 116/117 or other objects on the road. This DF is presented as specified in clause F.7.6 of [TS103300-3] and/or Table 1.5.4-27, and is a sequence of VruTrajectoryInterceptionIndication. The VrutrajectoryInterceptionIndication is defined as an indicator of the ego-VRU trajectory and its potential interception with another station or object on the road. It depends on subjectStation; trajectoryInterceptionProbability; and/or trajectoryInterceptionConfidence. This DF is presented as specified in clause F.7.7 of [TS103300-3] and/or Table 1.5.4-28.

TABLE 1.5.4-27

| DF_SequenceOfTrajectoryInterceptionIndication | |
|---|---|
| Description Name | TrajectoryInterceptionIndication |
| Identifier | DataType XX |
| ASN.1 representation | SequenceOfTrajectoryInterceptionIndication ::=<br>SEQUENCE(SIZE(1..8)) OF<br>VruTrajectoryInterceptionIndication |
| Definition | This DF provides the trajectory interception indication of ego-VRU ITS-S with 8 other ITS-Ss |
| Unit | N/A |
| Category | VRU information |

TABLE 1.5.4-28

| DF_ VruTrajectoryInterceptionIndication | |
|---|---|
| Description Name | TrajectoryInterceptionIndication |
| Identifier | DataType XX |
| ASN.1 representation | VruTrajectoryInterceptionIndication ::= SEQUENCE {<br>subjectStation StationID OPTIONAL,<br>trajectoryInterceptionProbability |

TABLE 1.5.4-28-continued

| DF__ VruTrajectoryInterceptionIndication | |
|---|---|
| | TrajectoryInterceptionProbability,<br>trajectoryInterceptionConfidence<br>TrajectoryInterceptionConfidence OPTIONAL,<br>...<br>} |
| Definition | This DF provides the trajectory interception indication of ego-VRU ITS-S with another ITS-Ss.<br>subjectStation is of type StationID and indicates the subject station.<br>trajectoryInterceptionProbability and<br>trajectoryInterceptionConfidence are of types<br>TrajectoryInterceptionProbability and<br>TrajectoryInterceptionConfidence, respectively. |
| Unit | N/A |
| Category | VRU information |

The trajectoryInterceptionProbability DE defines the probability for the ego-VRU's trajectory intercepts with any other object's trajectory on the road. In some implementations, this DE is mandatory within VruTrajectoryInterceptionIndication, and this DE is presented as specified in clause F.7.8 of [TS103300-3] and/or Table 1.5.4-29. The trajectoryInterceptionConfidence DE defines the confidence level of trajectoryInterceptionProbability calculations, and is presented as specified in clause F.7.9 of [TS103300-3] and/or Table 1.5.4-30.

TABLE 1.5.4-29

| DF__TrajectoryInterceptionProbability | |
|---|---|
| Description Name | trajectoryInterception |
| Identifier | DataType XX |
| ASN.1 representation | TrajectoryInterceptionProbability ::= INTEGER { zero(0), twoPercent(1), fourPercent(2), oneHundredPercent(50), unavailable (63) } (0..63) |
| Definition | The TrajectoryInterceptionProbability DE specifies the trajectory interception probability (TIP) metric computed with respective to an ITS-S in the path of potential trajectory interception. The TIP shall be computed as a probabilistic indicator of the estimation uncertainty of the ego VRU trajectory and its potential interception with any other object or people on the road ranging from other stations in the road. Depending upon the analysis of the scene in terms of the sensory as well as shared inputs, the level of likelihood of the ego VRU's path to be intercepted by another station j = 1, 2, . . . N can be computed. The TIP in percentage is rounded to the nearest even number. |
| Unit | 2% |
| Category | VRU information |

TABLE 1.5.4-30

| DE__TrajectoryInterceptionConfidence | |
|---|---|
| Description Name | TrajectoryInterceptionConfidence |
| Identifier | DataType XX |
| ASN.1 representation | TrajectoryInterceptionConfidence ::= INTEGER { lessthan50percent(0), between50and70Percent(1), between70and90Percent(2), above90Percent(3) } (0..3) |
| Definition | It denotes the estimated confidence levels of Trajectory Interception Probability calculation. The confidence levels (CL) are divided into four levels. They are CL < 50%, 50% <= CL < 70%, 70% <= CL < 90% and CL >= 90%. |
| Unit | N/A |
| Category | VRU information |

The SequenceOfTrajectoryInterceptionIndication DF contains ego-VRU's possible trajectory interception with up to 8 other stations in the vicinity of the ego-VRU. The trajectory interception of a VRU is indicated by VruTrajectoryInterceptionIndication DF. The other ITS-S involved are designated by StationID DE. The trajectory interception probability and its confidence level metrics are indicated by TrajectoryInterceptionProbability and TrajectoryInterceptionConfidence DEs. The Trajectory Interception Indication (TII) DF corresponds to the TII definition in [TS103300-2].

The HeadingChangeIndication DF contains ego-VRU's change of heading in the future (left or right) for a time period. This DF provides additional data elements associated to heading change indicators such as a change of travel direction (left or right). The DE LeftOrRight gives the choice between heading change in left and right directions. The direction change action is performed for a period of actionDeltaTime. The DE ActionDeltaTime indicates the time duration. When present the DF includes the following data elements: LeftOrRight; and actionDeltaTime. The DF is presented as specified in clause F.7.10 of [TS103300-3] and/or Table 1.5.4-31.

TABLE 1.5.4-31

| DF_HeadingChangeIndication | |
|---|---|
| Description Name | HeadingChangeIndicator |
| Identifier | DataType XX |
| ASN.1 representation | HeadingChangeIndication ::= SEQUENCE {<br>leftOrRight LeftOrRight,<br>actionDeltaTime ActionDeltaTime,<br>...<br>} |
| Definition | This DF provides additional data elements associated to heading change indicators such as a change of direction. The direction change action is performed for a period of actionDeltaTime |
| Unit | N/A |
| Category | VRU information |

The leftOrRight DE provides the actions turn left or turn right performed by the VRU when available. A turn left or turn right is performed for time period specified by actionDeltaTime. This DE is presented as specified in clause F.7.11 of [TS103300-3] and/or as shown by Table 1.5.4-35. The actionDeltaTime DE provides set of equally spaced time instances when available. The DE defines set of time instances 100 ms granularity starting from 0 (current instant) up to 12.6 seconds. The actionDeltaTime DE is presented as specified in clause F.7.14 of [TS103300-3].

TABLE 1.5.4-35

| DE_LeftOrRight | |
|---|---|
| Description Name | LeftOrRight |
| Identifier | DataType XX |
| ASN.1 representation | LeftOrRight ::= ENUMERATED { left, right } |
| Definition | This DE provides the VRU actions turning left or turning right |
| Unit | N/A |
| Category | VRU information |

-

The AccelerationChangeIndication DF provides an acceleration change indication of the VRU. This DF contains ego-VRU's change of acceleration in the future (acceleration or deceleration) for a time period. When present this DF indicates an anticipated change in the VRU speed. Speed changes can be: decelerating for period of actionDeltaTime, or accelerating for period of actionDeltaTime. The DE AccelOrDecel gives the choice between acceleration and deceleration. The DE ActionDeltaTime indicates the time duration. The DF shall be presented as specified in clause F.7.12 of [TS103300-3] and/or as shown by Table 1.5.4-36. The accelOrDecel DE provides the actions Acceleration or Deceleration performed by the VRU when available. Acceleration or Deceleration is performed for time period specified by actionDeltaTime. This DE is presented as specified in clause F.7.13 of [TS103300-3] and/or as shown by Table 1.5.4-37.

TABLE 1.5.4-36

| DF_AccelerationChangeIndication | |
|---|---|
| Description Name | AccelerationChangeIndication |
| Identifier | DataType XX |
| ASN.1 representation | AccelerationChangeIndication ::= SEQUENCE {<br>accelOrDecel AccelOrDecel,<br>actionDeltaTime ActionDeltaTime,<br>...<br>} |
| Definition | This DF provides additional data elements associated to change in VRU acceleration. The acceleration change action is performed for a period of actionDeltaTime |
| Unit | N/A |
| Category | VRU information |

TABLE 1.5.4-37

| DE_AccelOrDecel | |
|---|---|
| Description Name | AccelOrDecel |
| Identifier | DataType XX |
| ASN.1 representation | AccelOrDecel ::= ENUMERATED { accelerate, decelerate } |
| Definition | This DF provides the VRU actions accelerate or decelerate |
| Unit | N/A |
| Category | VRU information |

The StabilityChangeIndication DF provides an estimation of the VRU stability. This DF contains ego-VRU's change in stability for a time period. When present, this The StabilityChangeIndication DF provides information about the VRU stability. It is expressed in the estimated probability of a complete VRU stability loss which may lead to a VRU ejection of its VRU vehicle. The DE StabilityLossProbability or vruStabilityLossProbability gives the probability indication of the stability loss of the ego-VRU. The loss of stability is projected for a time period actionDeltaTime. The DE ActionDeltaTime indicates the time duration. The description of the container is provided in clause B.7 of [TS103300-3] and the corresponding DFs and DEs to be added to [TS102894-2] are provided in clause F.7.15 of [TS103300-3].

The vruStabilityLossProbability DE provides an estimation of the VRU stability probability. When present this DE provides the stability loss probability of the VRU in the steps of 2% with 0 for full stability and 100% loss of stability. This DE is presented as specified in clause F.7.16 of [TS103300-3].

Table 1.5.4-38 shows the parameters for a VAM generation. The parameters may be set on individual devices or system wide and may depend on external conditions or be independent of them.

TABLE 1.5.4-38

Parameters for VAM generation

| Parameter | Type | Meaning | Recommended value |
|---|---|---|---|
| T_GenVamMin | Time in ms | The minimum time elapsed between the start of consecutive VAM generation events.<br>For VRU LF container 2 000 ms shall be used | 100 |
| T_GenVamMax | Time in ms | The maximum time elapsed between the start of consecutive VAM generation events | 5 000 |
| T_AssembleVAM | Time in ms | The time allocated for assembling a VAM packet in the facilities layer | 50 |

-

The parameters in Table 1.5.4-39 govern the VAM generation triggering. The parameters may be set on individual devices or system wide and may depend on external conditions or be independent of them.

TABLE 1.5.4-39

Parameters for VAM generation triggering

| Parameter | Type | Meaning | Recommended range |
|---|---|---|---|
| minReferencePointPositionChangeThreshold | distance (in m) | Minimum Euclidian absolute distance between the current estimated position of the | 4 |

TABLE 1.5.4-39-continued

Parameters for VAM generation triggering

| Parameter | Type | Meaning | Recommended range |
|---|---|---|---|
| | | reference point of the VRU (or VRU cluster) and the estimated position of the reference point lastly included in a VAM in order to trigger VAM generation based on position change of VRU (or VRU cluster). This restricts triggering VAM generation. | |
| minGroundSpeedChangeThreshold | Speed (in m/s) | Minimum difference between the current estimated ground speed of the reference point of the VRU (or VRU cluster) and the estimated absolute speed of the reference point of the VRU (or VRU Cluster) lastly included in a VAM in order to trigger VAM generation based on speed change of VRU (or VRU cluster). This restricts triggering VAM generation. | ±0.5 |
| minGroundVelocityOrientationChangeThreshold | orientation (in degrees) | Minimum difference between the orientation of the vector of the current estimated ground velocity of the reference point of the VRU (or VRU cluster) and the estimated orientation of the vector of the ground velocity of the reference point of the VRU (or VRU cluster) lastly included in a VAM in order to trigger VAM generation based on change in orientation of the vector of the ground velocity of VRU (or VRU cluster). This restricts triggering VAM generation. | ±4 |
| minTrajectoryInterceptionProbChangeThreshold | Probability (in percentage) | Minimum difference between the current estimated Trajectory Interception probability of VRU (or VRU cluster) with vehicle(s) or other VRU(s) and the estimated collision probability of VRU (or VRU cluster) with vehicle(s) or other VRU(s) lastly reported in a VAM in order to trigger VAM generation based on Trajectory Interception probability change of VRU (or VRU cluster). This restricts triggering VAM generation. | 10 |
| numSkipVamsForRedundancyMitigation | Number of times | If conditions are satisfied for redundancy mitigation, an originating VRU ITS-S shall skip current individual VAM numSkipVamsForRedundancyMitigation times. | [2 to 10] |
| minClusterDistanceChangeThreshold | length (in m) | Minimum difference between the current estimated distance from the VRU cluster boundary and the estimated distance based on the last transmitted VAM in order to trigger VAM generation based on VRU cluster bounding box size change. This restricts triggering VAM generation. | 2 |
| minimumSafeLateralDistance (MSLaD) | length (in m) | Minimum safe lateral distance between ego-VRU and another traffic participant (equipped or not). It depends on the ego-VRU profiles, their speeds, and the other traffic participants' profiles and their speeds. The maximum value between 2 m and lateral distance ego-VRU could travel in T_GenVamMax seconds is set as MSLaD. | Max [2, A] |

TABLE 1.5.4-39-continued

| Parameters for VAM generation triggering | | | |
|---|---|---|---|
| Parameter | Type | Meaning | Recommended range |
| | | A = the lateral distance ego-VRU could travel in T_GenVamMax seconds | |
| minimumSafeLongitudinalDistance (MSLoD) | length (in m) | Minimum safe longitudinal distance between ego-VRU and another traffic participant (equipped or not). It depends on the ego-VRU profiles, their speeds, and the other traffic participants' profiles and their speeds. B = the longitudinal distance ego-VRU could travel in T_GenVamMax seconds. | B |
| minimumSafeVerticalDistance (MSVD) | length (in m) | Minimum safe vertical distance between ego-VRU and another traffic participant (equipped or not). The overpass normally has 5 m clearance. | 5 |

Some new DEs and DFs in vruHighFrequencyContainer include DE VruEnvironment and DE VruMovementControl, which are further detailed by Table 1.5.4-40 and Table 1.5.4-41.

TABLE 1.5.4-40

| DE_VruEnvironment | |
|---|---|
| Descriptive Name | VruEnvironment |
| Identifier | DataType XX |
| ASN.1 representation | VruEnvironment ::= ENUMERATED {<br>unavailable (0), intersectionCrossing(1), zebraCrossing(2),<br>sidewalk (3), onVehicleRoad(4), protectedGeographicArea(5),<br>max(255)<br>-- values 6-254 reserved for later use<br>} |
| Definition | Encoded value of the possible VRU environment conditions.<br>The VRU environment conditions are described as follows:<br>unavailable (0): in case information on the type of environment is unavailable,<br>intersectionCrossing (1),<br>zebraCrossing (2),<br>sidewalk (3),<br>onVehicleRoad (4),<br>value 6-255: reserved for future usage. Value 255 is set to "max" in order to bound the size of the encoded field. |
| Unit | N/A |
| Category | VRU information |

TABLE 1.5.4-41

| DE_VruMovementControl | |
|---|---|
| Descriptive Name | VruMovementControl |
| Identifier | DataType XX |
| ASN.1 representation | VruMovementControl ::= ENUMERATED {<br>unavailable (0), braking(1), hardBraking(2), stopPedaling<br>(3),<br>brakingAndStopPedaling (4), hardBrakingAndStopPedaling (5),<br>noReaction(6), max (255)<br>-- values 7-254 reserved for later use<br>} |
| Definition | Encoded value of the possible VruMovementControl<br>The VruMovementControl are described as follows:<br>unavailable (0): in case information on the VruMovementControl is unavailable,<br>braking (1),<br>hardBraking (2), |

TABLE 1.5.4-41-continued

| DE_VruMovementControl | |
|---|---|
| | stopPedaling (3),<br>brakingAndStopPedaling (4),<br>hardBrakingAndStopPedaling (5),<br>noReaction (6),<br>value 5-255: reserved for future usage. Value 255 is set to "max" in order to bound the size of the encoded field. |
| Unit | N/A |
| Category | VRU information |

1.6. Parameterization of Grid Representation

In some embodiments, a rectangular shape for the DCROM grid is assumed as the baseline and fixed shape for an individual grid. Moreover, embodiments include parameterization of the grid in terms of the following configuration parameters: reference point: specified by the location of the originating ITS-S for the overall area; grid size: individual grid size specified by length and width of the grid assuming rectangular grid (e.g., baseline is 30 cm×30 cm); Total Number of Tiers: Minimum 1 tier to Maximum of 2 tiers. 1st tier comprising 8 grids surrounding the ego ITS-S grid, 2nd tier comprising of 16 additional grids surrounding 8 tier-1 grids thus leading to a total of 25 grid including the ego ITS-S grid for the two-tier representation (see e.g., FIG. 5*d*); relative grid location: measured relative to reference point as specified in earlier; and/or Occupancy Status: Occupied or Free as specified in earlier.

1.7. Embodiments for Different Types of VAM Originating ITS-Ss

As defined in the VRU cluster specification in clause 5.4.1 of [TS103300-3], the VRU basic service (VBS) supports VRU cluster operations, where a number of VRU ITS-S 117 can be grouped together under the management of a cluster head (CH) or cluster leader (CL) in order to optimize resource usage (e.g., spectrum resources and processing resources) in the ITS-S.

Among the possible options for the VAM originating ITS-S with the OSI and GLI fields within the VAM, in various embodiments, the ego-VRU 116/117, which may be one of LC VRUs 116/117 or HC VRUs 116/117 can be operating in the following options/modes depending upon the type of the originating ITS-S:

Mode-1: The ITS-S originating VAM with GLI and OSI is a standalone-VRU 116/117 which is not a part of any cluster (as the default mode assumed in all the prior sections so far).

Mode-2: The ITS-S originating VAM with GLI and OSI is a nearby R-ITS-S 130 or V-ITS-S 110.

Mode-3: Clustered-VRU 116/117 as member(s) of clusters being managed by a CL. Furthermore, the CL may be one of the following ITS-S types:

Mode-2(a): The cluster leader ITS-S originating VAM with GLI and OSI is a VRU ITS-S 117 (either LC-VRU 116/117 or HC VRU 116/117) as shown by FIG. 7*a*.

Mode-2(b): The cluster leader ITS-S 117 originating VAM with GLI and OSI is an R-ITS-S 130 as shown by FIG. 7*b*.

Mode-2(c): The cluster leader ITS-S originating VAM with GLI and OSI is a V-ITS-S 110 (especially suitable when the VRU is of Profile 3 (high speed motorbikes) as shown by FIG. 7*c*.

Figure 7A:
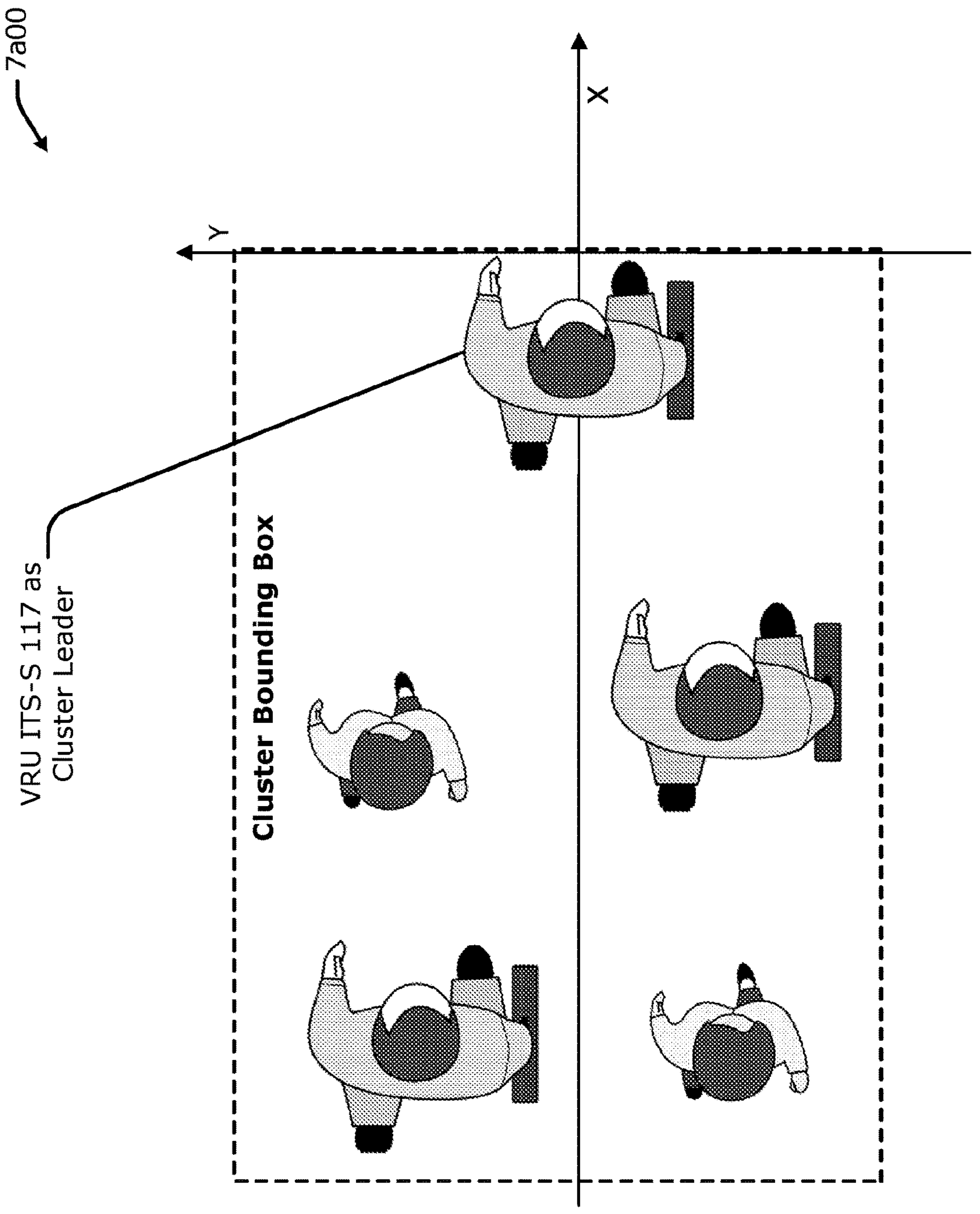
FIGS. 7*a*, 7*b*, and 7*c* illustrate examples of VRU cluster operations according to various embodiments.
Figure 7B:
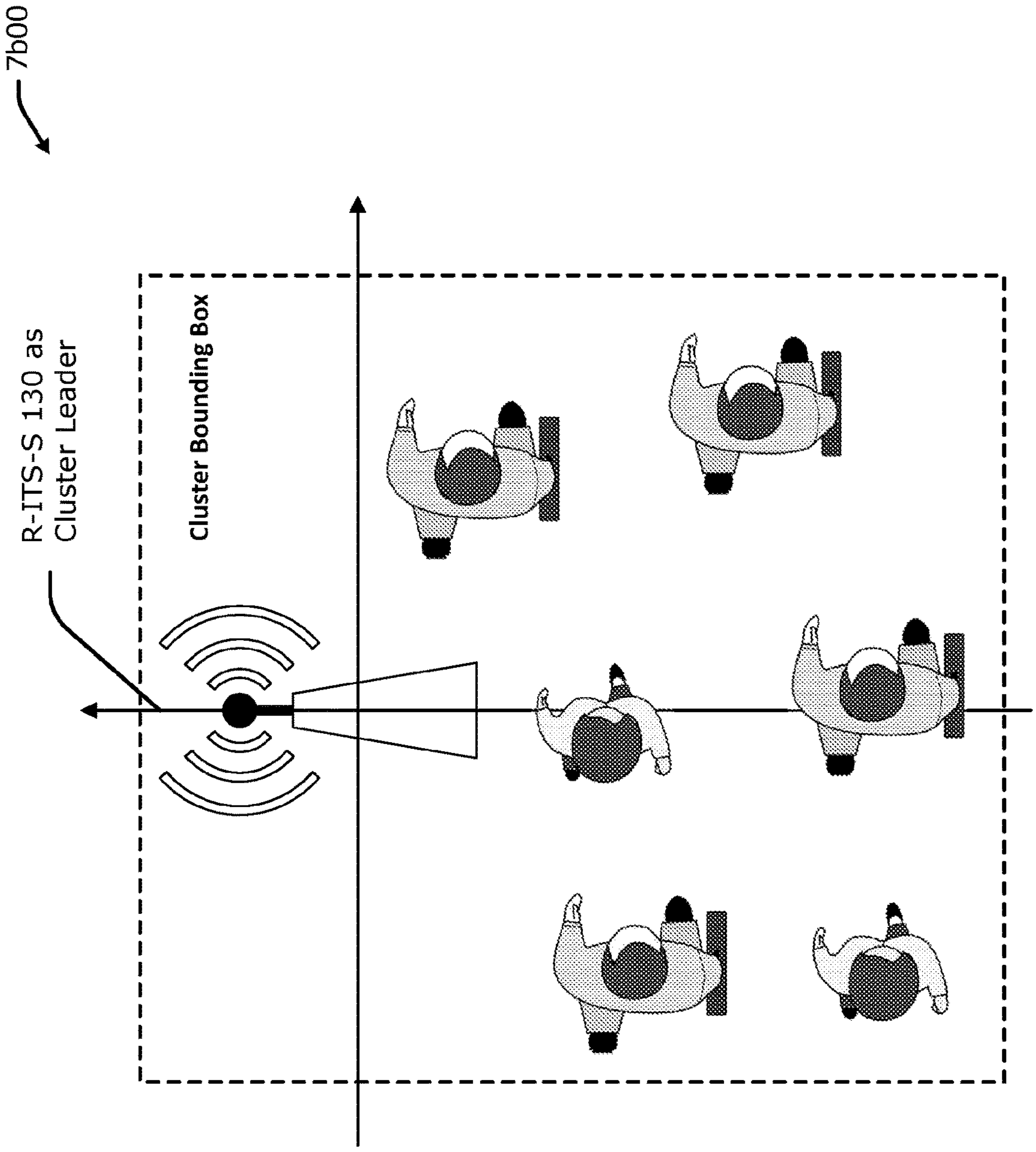
Figure 7C:
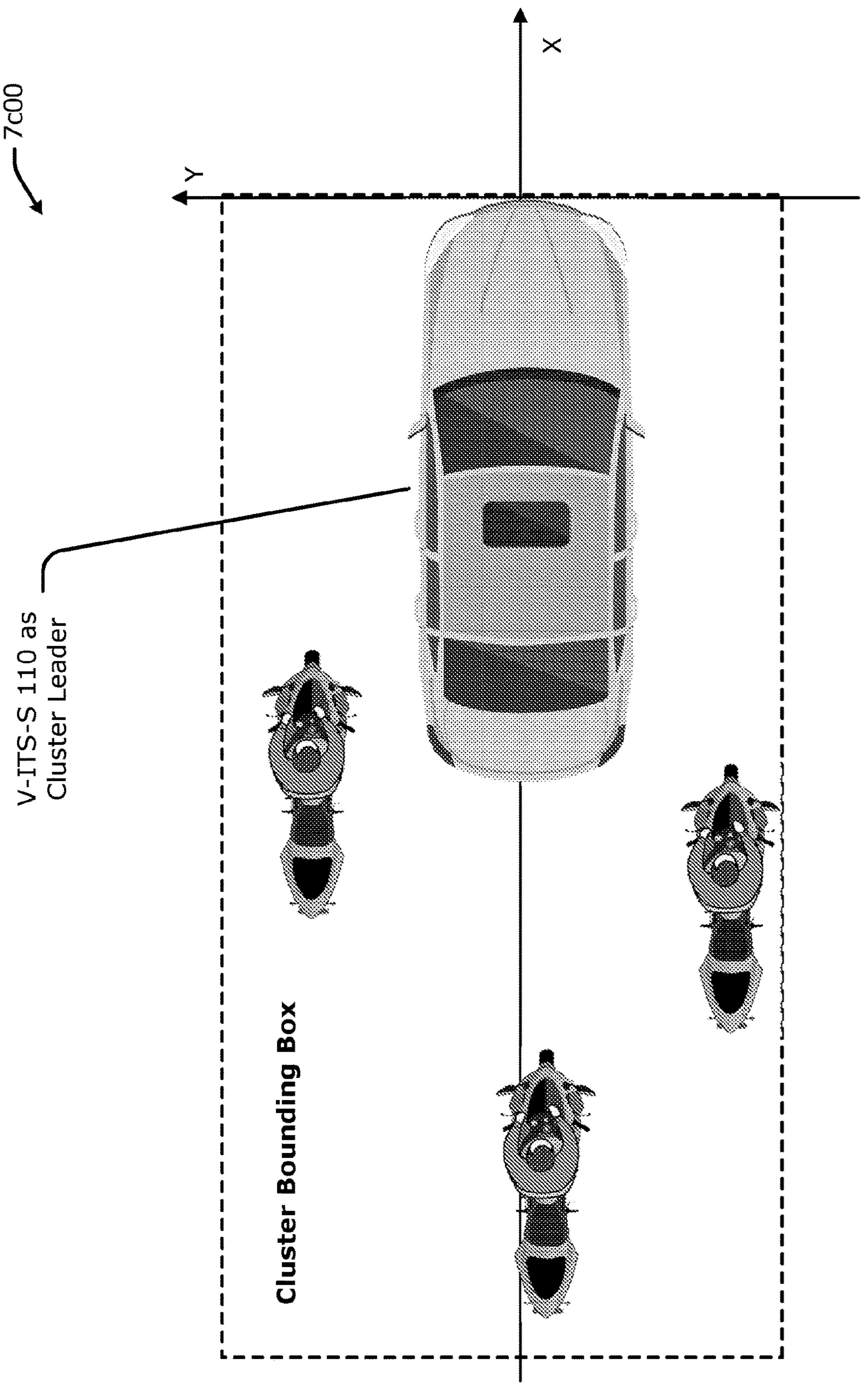

FIGS. 7*a*, 7*b*, and 7*c* show examples of clustered operation based example for different types of VAM-originating ITS-Ss. FIG. 7*a* shows an example 7a00 where a VRU-ITS-S 117 is the cluster leader originating ITS-S for VAM with GLI and OSI. In the example of FIG. 7*a*, the cluster leader is an LC VRU 116/117, however, this example also applies to an HC VRU 116/117 acting as cluster leader. FIG. 7*b* shows an example 7b00 where an R-ITS-S 130 acts as the cluster leader originating ITS-S for VAM with GLI and OSI. FIG. 7*c* shows an example 7c00 where V-ITS-S 110 is the cluster leader originating ITS-S for VAM with GLI and OSI.

In addition to the above, various types of originating ITS-Ss to create, update, and maintain DROM (e.g., DCROM) may depend on the ITS-S device capabilities, computational complexity, available classes of sensors, and/or other like parameters/conditions.

Figure 8:
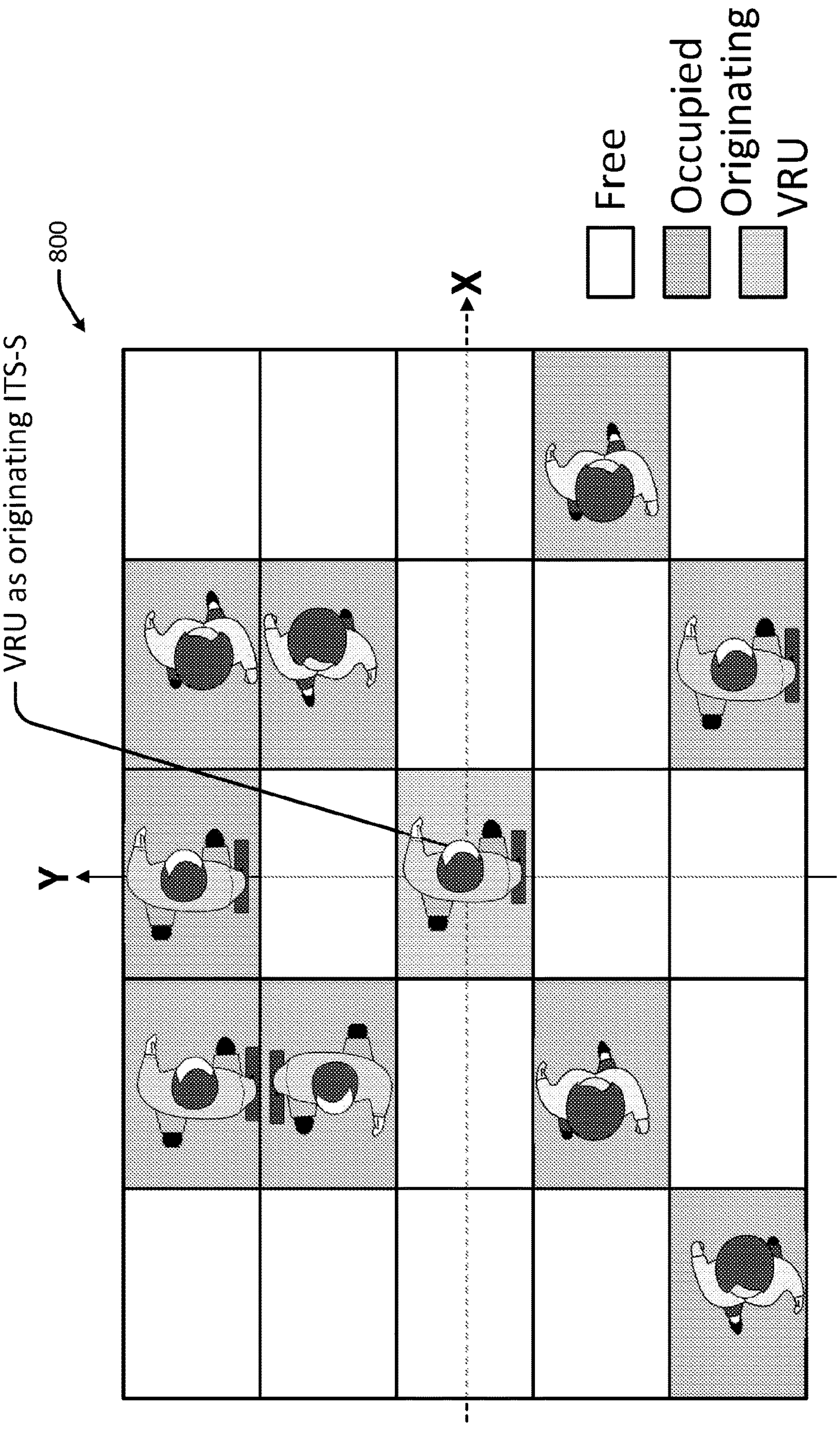
FIG. 8 illustrates an example of Grid Occupancy Map where an ego-VRU ITS-S is an originating ITS-S, according to various embodiments.

A first embodiment involves a standalone VRU 116/117 as VAM originating ITS-S. VRU 116/117 types such as Profile 3 may be able to generate DROM based on GPU, gyroscopes, cameras and other sensor data available at their disposal. However, even in absence of sophisticated sensors, a VRU ITS-S 117 can still share baseline information such as the VAM basic container including the type of the originating ITS-S and the latest geographic position of the originating ITS-S as obtained by the VBS at VAM generation. On receiving such information at another standalone ego-VRU 116/117, it may be able to create, maintain and share (with other ITS-Ss) a low-complexity DROM periodically. The initial quality of DROM depends on the quality and availability of the sensors and computation capability at the standalone VRU 116/117 and can be improved over time via VAM exchange with DROM DF and related DEs with the neighboring ITS-Ss. An example representation for this case is shown in FIG. 8, which shows an example Grid Occupancy Map embodiment for ego-VRU 116/117 as the originating ITS-S.

A second embodiment involves a cluster-leader VRU 116/117 as VAM originating ITS-S: This case arises when a standalone-VRU 116/117 may be operating as a part of a cluster managed by a cluster-leader. In this case, compared to the standalone VRUs 116/117, the cluster-leader VRUs 116/117 may possess a more complete first-hand information and perception of the member VRUs 116/117 within its local-cluster and thus may be able to create and share DROM with other road users via its originating VAM.

Figure 9:
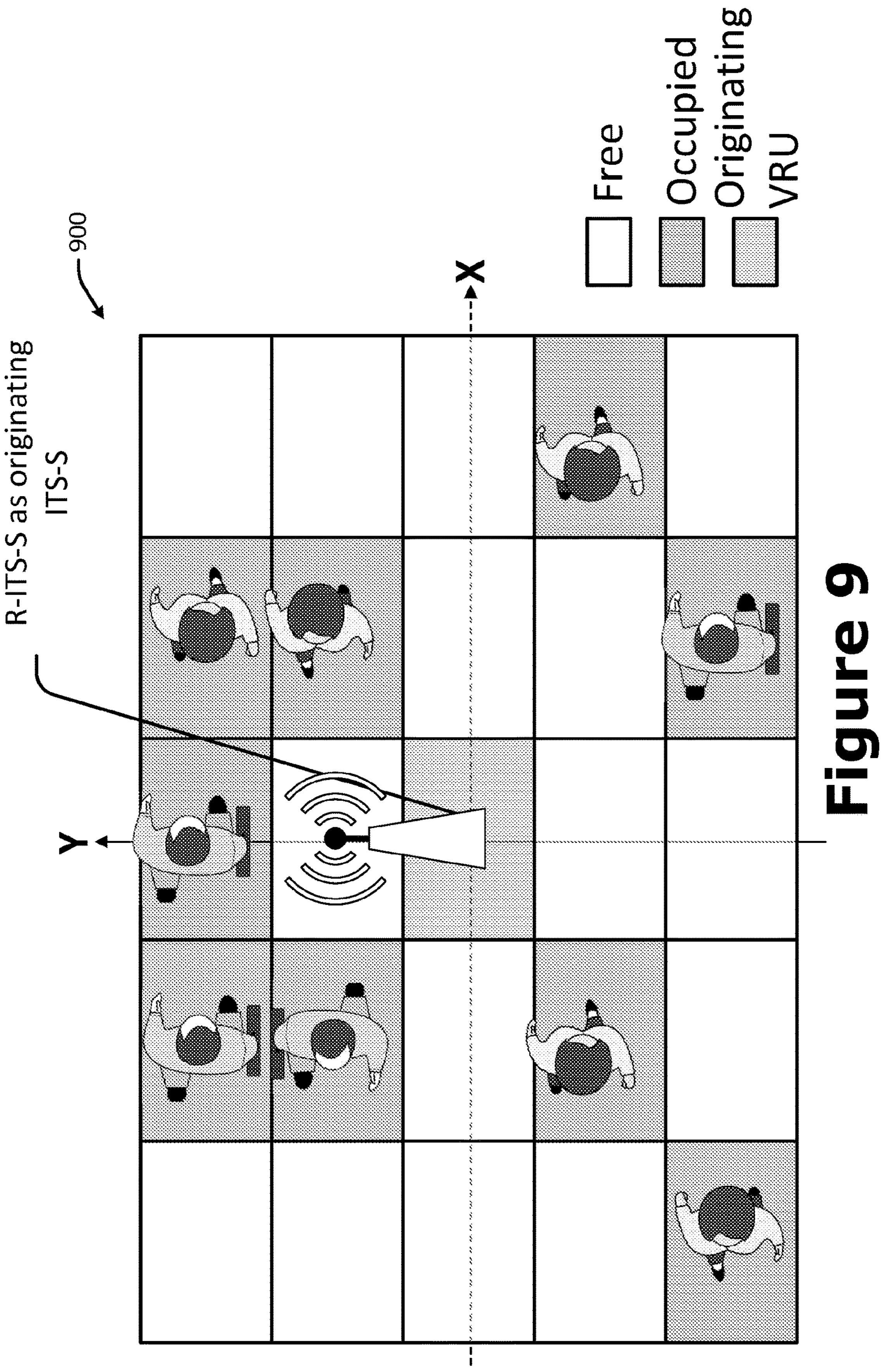
FIG. 9 illustrates an example of Grid Occupancy Map where a roadside ITS-S (R-ITS-S) is an originating ITS-S, according to various embodiments.

A third embodiment involves an RSE as VAM originating ITS-S: Non-VRU ITS-Ss such as nearby R-ITS-S 130 with advanced sensors or perception capabilities may also be able to create, maintain and share DROM with ego VRU 116/117 and the nearby VRUs 116/117 as shown in FIG. 9. FIG. 9 shows an example Grid Occupancy Map embodiment for RSE as the originating ITS-S. However, since the VRU ITS-S 117 may not need to receive a generalized and computation heavy DROM from the R-ITS-S 130 (due to unrelated region/environment, due to device computation resource limitations as well as communication resource limitations), a clipped or partial DROM (from the larger DROM data that may be available at the R-ITS-S 130) relevant only to the specific standalone VRU ITS-S 117 or cluster-leader VRU ITS-S 117 under consideration is shared.

A fourth embodiment involves a Vehicle as VAM originating ITS-S: Non-VRU ITS-Ss such as nearby V-ITS-S 110 with advanced sensors or perception capabilities may also be able to create, maintain and share DROM with ego-VRU 116/117 and the nearby VRUs 116/117. Similar to the case of R-ITS-S 130 as the VAM-originating ITS-S, a clipped or partial DROM (from the larger DROM data that may be available at the V-ITS-S 110) relevant only to the specific standalone VRU ITS-S 117 or cluster-leader VRU ITS-S 117 under consideration is shared 1.8. Non-VRU ITS-S VAM Dissemination The VAM originated from a VRU ITS-S 117 does not address awareness of non-equipped VRUs 116 effectively. Here, non-equipped VRUs 116 are VRUs 116 without any ITS-S for Tx, Rx or both Tx/Rx (e.g., VRUs 116 that are not VRU-Tx, VRU-Rx, or VRU-St; see e.g., Table 0-1). In many crowded situations such as busy intersection, zebra crossing, school drop off and pick up area, public bus stops, school bus stops, busy crossing near shopping mall, construction work area, and others, both equipped and non-equipped VRUs 116 will be present. Cluster formation and management by an individual VRU ITS-S 117 (as the cluster leader or cluster head) is limited by the available resources (e.g., computational, communication, sensing) VRU cluster formed by an individual VRU 116/117 cannot include non-equipped VRUs 116 in the cluster. In such cases, the VRUs 116/117 should be able to decode and interpret the collective perception message (CPM) to obtain the full environment awareness for safety. To this end, infrastructure (e.g., R-ITS-Ss 130) can play a role in detecting (e.g., via sensors) potential VRUs 116/117 and grouping them together into clusters in such scenarios including both equipped VRUs 117 and non-equipped VRUs 116. For example, a static R-ITS-S 130 may be installed at busy intersection, zebra crossing, school drop off and pick up area, busy crossing near shopping mall, and the like while a mobile R-ITS-S 130 can be installed on designated vehicles (e.g., school bus, city bus, service vehicle, drones/robots, etc.) to serve as infrastructure/R-ITS-S 130 on public bus stops, school bus stops, construction work area, etc., for this purpose.

Existing VAMs allow information sharing of either one ego-VRU 116/117 or one VRU cluster. However, in case of non-VRU ITS-Ss (e.g., R-ITS-Ss 130 or designated V-ITS-Ss 110) VAM, non-VRU ITS-S may be able to detect one or more individual VRUs 116/117, and/or one or more VRU clusters in the field of view (FOV), which need to be reported in the VAM.

In some embodiments, existing VAM format may be modified to enable non-VRU ITS-S VAMs. In a non-VRU ITS-S VAM, the VRU awareness contents of one or more VRUs 116/117 and/or one or more VRU clusters are carried. In addition, detailed mechanisms for non-VRU ITS-S assisted VRU clustering including both equipped VRUs 116/117 and non-equipped VRUs 116 are considered where a non-VRU ITS-S (e.g., R-ITS-S 130) acts as a cluster leader and transmits non-VRU ITS-S VAMs.

Reporting all detected VRUs 116/117 and/or VRU clusters individually by non-VRU ITS-Ss can be inefficient in certain scenarios such as presence of large number of VRUs 116/117 or overlapping view of VRUs or occlusion of VRUs 116/117 in the FOV of sensors at the originating non-VRU ITS-S. Such reporting via existing DFs/DEs in the VAM in case of large number of perceived VRUs 116/117 and/or VRU clusters may require large communication overhead and increased delay in reporting all VRUs 116/117 and/or VRU clusters. The non-VRU ITS-S may need to use self-admission control, redundancy mitigation or self-contained segmentation to manage the congestion in the access layers. The self-contained segments are independent VAM messages and can be transmitted in each successive VAM generation events.

Therefore, an occupancy grid-based bandwidth efficient lightweight VRU awareness message could be supported to assist with large number of detected VRUs 116/117 and/or VRU clusters or overlapping view of VRUs 116/117 or occlusion of VRUs 116/117 in the FOV. Value of each cell can indicate information such as presence/absence of a VRU, presence/absence of a VRU cluster, and even presence/absence of non-VRUs or other objects in the environment. Moreover, non-VRU ITS-Ss such as RSE have better perception of the environment (via sophisticated sensors) through collective perception service (CPS) by exchange of collective perception message (CPM) (see e.g., [EN302890-2]). Since VRUs are not expected to be able to listen to CPMs and perceive the environment, non-VRU ITS-S can share light weight perceived environment information acquired from CPS to VRUs 116/117 via VAMs instead by adding corresponding DF and DEs.

Non-VRU ITS-Ss such as nearby R-ITS-S 130 with advanced sensors or perception capabilities may also be able to create, maintain and share a dynamic road occupancy map with ego-VRU and the nearby VRUs 116/117 as shown in FIGS. 8 and/or 9. The dynamic road occupancy map is a predefined grid area of a road segment represented by Boolean values for the occupancy accompanied by corresponding confidence values. Since non-VRUs such as a nearby R-ITS-S 130 may have better global view of the road segment it can be used for the management of VRU clustering and dissemination of multiple-VRU VAMs and multiple-VRU-cluster VAMs. Furthermore, the accurate environment perception, power availability, and computation capability of the non-VRU ITS-S could be leveraged for accurate environmental awareness and positioning of the VRUs and vehicles.

FIGS. 8 and 9 ITS-S show grids 800 and 900, respectively, each with a rectangular shape, which is assumed as the baseline with a fixed shape for an individual grid 800, 900. In embodiments, a parameterization of the grid in terms of the following configuration parameters may be used Reference point of the grid map: The reference point of the grid map is specified by the location of the originating ITS-S for the overall area. For example, the center cell including the VRU 116/117 as originating ITS-S in FIG. 8 and the center cell including the R-ITS-S 130 as originating ITS-S in FIG. 9.

Grid/cell size: The grid/cell size is the size (dimensions) and/or shape of the individual cells of the grid map. The grid/cell size may be predefined global grid/cell sizes specified by the length and width of the grid assuming rectangular grid reflecting the granularity of the cells. In some implementations, the cells may be equally divided based on overall dimensions of the grid map, or individual cell dimensions may be indicated/configured.

Figure 5E:
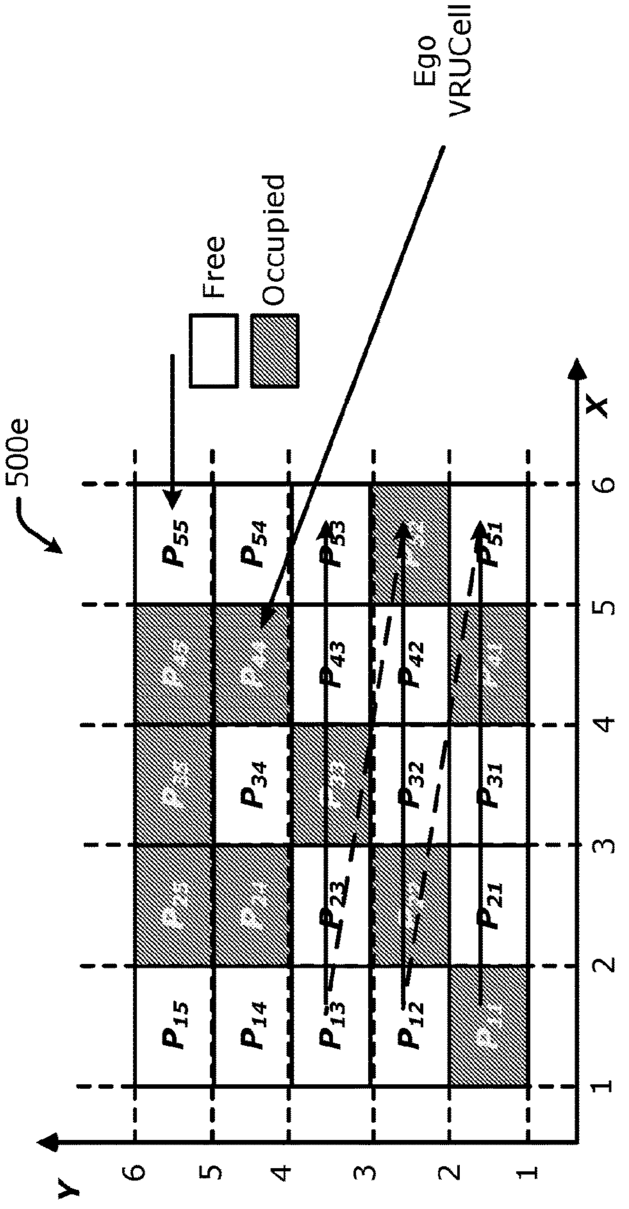

Starting position of the cell: The starting position of the cell is a starting cell of the occupancy grid as a reference grid (e.g., Pu as shown by FIG. 5*e*). The other grid/cell locations can be labelled based on offset from the reference grid/cell.

Bitmap of the occupancy values: FIG. 5*e* shows an example bitmap 500*e* where the occupancy values may be Boolean values representing the occupancy of each cell in the grid. Other values, character(s), strings, etc., may be used to represent different levels of occupancy or probabilities of occupancy of individual cells.

Confidence values: The confidence values are confidence values corresponding to each cell in the grid (associated to the bitmap). In addition to the aforementioned parameters, the mapping pattern of the occupancy grid into a bitmap is shown by FIG. 5*e*.

In some cases, non-VRU ITS-S (e.g., Static R-ITS-S 130 or Mobile R-ITS-S 130 on designated vehicles like school bus, construction work vehicle, police cars) may need to transmit a VAM (e.g., infrastructure VAM) specifically when non-equipped VRUs 116 are detected. Such infrastructure VAM may be transmitted for reporting either individual detected VRUs or cluster(s) of VRUs. Non-VRU ITS-S may select to transmit infrastructure VAM reporting individual detected VRUs 116/117 and cluster(s) of VRUs 116/117 in the same infrastructure VAM by including zero or more individual detected VRUs 116/117 and zero or more clusters of VRUs 116/117 in the same infrastructure VAM.

For VAM Transmission Management by VBS at Non-VRU ITS-S, if a non-VRU ITS-S is not already transmitting consecutive (such as periodic) infrastructure VAM and the infrastructure VAM transmission does not subject to redundancy mitigation techniques, first time infrastructure VAM should be generated immediately or at earliest time for transmission when any of the following conditions is satisfied:

(1) At least one VRU 116/117 is detected by originating non-VRU ITS-S where the detected VRU has not transmitted VAM for at least T_GenVamMax duration; the perceived location of the detected VRU does not fall in a bounding box of Cluster specified in any VRU Cluster VAMs received by originating Non-VRU ITS-S during last T_GenVamMax duration; and the detected VRU is not included in any infrastructure VAMs received by originating Non-VRU ITS-S during last T_GenVamMax duration.

(2) At least one VRU Cluster is detected by originating Non-VRU ITS-S where the Cluster head of the detected VRU Cluster has not transmitted VRU Cluster VAM for at least T_GenVamMax duration; the perceived bounding box of the detected VRU cluster does not overlap more than a pre-defined threshold maxInterVRUClusterOverlapInfrastructureVAM with the bounding box of any VRU Clusters specified in VRU Cluster VAMs or infrastructure VAMs received by originating Non-VRU ITS-S during last T_GenVamMax duration.

Consecutive infrastructure VAM transmission is contingent to conditions as described here. Consecutive infrastructure VAM generation events should occur at an interval equal to or larger than T_GenVam. An infrastructure VAM should be generated for transmission as part of a generation event if the originating non-VRU ITS-S has at least one selected perceived VRU or VRU Cluster to be included in current infrastructure VAM.

For perceived VRU inclusion Management in Current Non-VRU ITS-S VAM, the perceived VRUs 116/117 considered for inclusion in current infrastructure VAM should fulfil all these conditions: (1) originating Non-VRU ITS-S has not received any VAM from the detected VRU for at least T_GenVamMax duration; (2) the perceived location of the detected VRU does not fall in a bounding box of VRU Clusters specified in any VRU Cluster VAMs received by originating Non-VRU ITS-S during last T_GenVamMax duration; (3) the detected VRU is not included in any infrastructure VAMs received by originating Non-VRU ITS-S during last T_GenVamMax duration; and (4) the detected VRU does not fall in bounding box of any VRU clusters to be included in the current infrastructure VAM by originating Non-VRU ITS-S.

A VRU perceived with sufficient confidence level fulfilling above conditions and not subject to redundancy mitigation techniques should be selected for inclusion in the current VAM generation event if the perceived VRU additionally satisfy one of the following conditions:

(1) The VRU has first been detected by originating Non-VRU ITS-S after the last infrastructure VAM generation event.

(2) The time elapsed since the last time the perceived VRU was included in an infrastructure VAM exceeds T_GenVamMax.

(3) the Euclidian absolute distance between the current estimated position of the reference point for the perceived VRU and the estimated position of the reference point for the perceived VRU lastly included in the infrastructure VAM exceeds minReferencePointPositionChangeThreshold.

(4) The difference between the current estimated ground speed of the reference point for the perceived VRU and the estimated absolute speed of the reference point for the perceived VRU lastly included in the infrastructure VAM exceeds minGroundSpeedChangeThreshold.

(5) The difference between the orientation of the vector of the current estimated ground velocity of the reference point for the perceived VRU and the estimated orientation of the vector of the ground velocity of the reference point for the perceived VRU lastly included in the infrastructure VAM exceeds minGroundVelocityOrientationChangeThreshold.

(6) The infrastructure or vehicles has determined that there is difference between the current estimated trajectory interception indication with vehicle(s) or other VRU(s) and the trajectory interception indication with vehicle(s) or other VRU(s) lastly reported in an infrastructure VAM.

(7) One or more new vehicles or other VRUs 116/117 (e.g. VRU Profile 3—Motorcyclist) have satisfied the following conditions simultaneously after the lastly transmitted VAM. The conditions are: coming closer than minimum safe lateral distance (MSLaD) laterally, coming closer than minimum safe longitudinal distance (MSLoD) longitudinally and coming closer than minimum safe vertical distance (MSVD) vertically to the VRU after the lastly transmitted infrastructure VAM.

For perceived VRU Cluster inclusion Management in Current Non-VRU ITS-S VAM, the perceived VRU Clusters considered for inclusion in current infrastructure VAM should fulfil all of the following conditions: The perceived bounding box of the detected VRU cluster does not overlap more than maxInterVRUClusterOverlapInfrastructureVAM with the bounding box of VRU Cluster specified in any of the VRU Cluster VAMs or infrastructure VAMs received by originating Non-VRU ITS-S during last T_GenVamMax duration.

A VRU Cluster perceived with sufficient confidence level fulfilling above conditions and not subject to redundancy mitigation techniques should be selected for inclusion in the current VAM generation if the perceived VRU Cluster additionally satisfy one of the following conditions:

(1) The VRU Cluster has first been detected by originating Non-VRU ITS-S after the last infrastructure VAM generation event.
(2) The time elapsed since the last time the perceived VRU Cluster was included in an infrastructure VAM exceeds T_GenVamMax.
(3) The Euclidian absolute distance between the current estimated position of the reference point of the perceived VRU Cluster and the estimated position of the reference point of the perceived VRU Cluster lastly included in an infrastructure VAM exceeds minReferencePointPositionChangeThreshold.
(4) The difference between the current estimated Width of the perceived VRU Cluster and the estimated Width of the perceived VRU Cluster included in the lastly transmitted VAM exceeds minClusterWidthChangeThreshold.
(5) The difference between the current estimated Length of the perceived VRU Cluster and the estimated Length of the perceived VRU Cluster included in the lastly transmitted VAM exceeds minClusterLengthChangeThreshold.
(6) The difference between the current estimated ground speed of the reference point of the perceived VRU Cluster and the estimated absolute speed of the reference point included in the lastly transmitted VAM exceeds minGroundSpeedChangeThreshold.
(7) The difference between the orientation of the vector of the current estimated ground velocity of the reference point of the perceived VRU Cluster and the estimated orientation of the vector of the ground velocity of the reference point included in the lastly transmitted infrastructure VAM exceeds minGroundVelocityOrientationChangeThreshold.
(8) The infrastructure or vehicles determined that there is difference between the current estimated trajectory interception indication with vehicle(s) or other VRU(s) and the trajectory interception indication with vehicle (s) or other VRU(s) lastly reported in an infrastructure VAM.
(9) Originating Non-VRU ITS-S has determined to merge the perceived cluster with other cluster(s) after previous infrastructure VAM generation event.
(10) Originating Non-VRU ITS-S has determined to split the current cluster after previous infrastructure VAM generation event.
(11) Originating Non-VRU ITS-S has determined change in type of perceived VRU cluster (e.g. from Homogeneous to Heterogeneous Cluster or vice versa) after previous infrastructure VAM generation event.
(12) Originating Non-VRU ITS-S has determined that one or more new vehicles or non-member VRUs 116/117 (e.g. VRU Profile 3—Motorcyclist) have satisfied the following conditions simultaneously after the lastly transmitted VAM. The conditions are: coming closer than minimum safe lateral distance (MSLaD) laterally, coming closer than minimum safe longitudinal distance (MSLoD) longitudinally and coming closer than minimum safe vertical distance (MSVD) vertically to the Cluster bounding box after the lastly transmitted infrastructure VAM.

1.9. Example VAMs DCROP Data Fields

Table 1.9-1 and Table 1.9-2 show DCROM related extension of VAM data fields (DFs) according to various embodiments. In Table 1.9-1, the OSI and GLI DFs are defined for enabling DCROM via the received VAM at the ego VRU 116/117 from a computation capable ITS-S (e.g., R-ITS-Ss 130, V-ITS-Ss 110, and/or HC VRUs 116/117). Additionally, all the relevant ITS-Ss could broadcast VAM in the vicinity of the ego VRU 116/117 for creating a collaborative DCROM among the ego VRU ITS-S, other VRU ITS-Ss and non-VRU ITS-Ss such as V-ITS-Ss 110 and R-ITS-Ss 130 for a joint collaborative perception of the VRU environmental occupancy map. Another example VAM is shown by Table 1.9-2 for the message exchange among ego-VRU and other ITS-Ss with DCROM related information are expressed in terms of the new DEs/DFs by following the message formats following that given in Annex A of [TS103300-2].

Table 1.9-3 shows an example VAM with VRU Extension container(s) of type VamExtension that carries VRU low frequency, VRU high frequency, cluster information container, cluster operation container, motion prediction container for each of the VRU 116/117 and VRU Clusters reported in a non-VRU ITS-S originated VAM. VRU Extension container additionally carries totalIndividualVruReported, totalVruClusterReported, and VruRoadGridOccupancy containers for in a non-VRU ITS-S originated VAM. The Road Grid Occupancy DF is of type VruRoadGridOccupancy and should provide an indication of whether the cells are occupied (by another VRU ITS-station or object) or free. The indication should be represented by the VruGridOccupancyStatusIndication DE and the corresponding confidence value of should be given by ConfidenceLevelPerCell DE. Additional DF/DE s are included for carrying the grid and cell sizes, road segment reference ID and reference point of the grid.

The example VAMs of Table 1.9-1, Table 1.9-2, and Table 1.9-3 are structured in the message formats according to SAE International, "Dedicated Short Range Communications (DSRC) Message Set Dictionary", J2735_201603 (2016 Mar. 30) (hereinafter "[SAEJ2735]").

TABLE 1.9-1

```
-- Facilities layer message formats
MessageTypes MESSAGE-ID-AND-TYPE ::= {
{ BasicSafetyMessage IDENTIFIED BY basicSafetyMessage } |
{ MapData IDENTIFIED BY mapData } |
{ SPAT IDENTIFIED BY signalPhaseAndTimingMessage } |
{ CommonSafetyRequest IDENTIFIED BY commonSafetyRequest } |
{ EmergencyVehicleAlert IDENTIFED BY emergencyVehicleAlert } |
{ IntersectionCollision IDENTIFIED BY intersectionCollision } |
{ NMEAcorrections IDENTIFIED BY nmeaCorrections } |
{ ProbeDataManagement IDENTIFIED BY probeDataManagement } |
{ ProbeVehicleData IDENTIFIED BY probeVehicleData } |
{ RoadSideAlert IDENTIFIED BY roadSideAlert } |
{ RTCMcorrections IDENTIFIED BY rtcmCorrections } |
```

TABLE 1.9-1-continued

```
{ SignalRequestMessage IDENTIFIED BY signalRequestMessage } |
{ SignalStatusMessage IDENTIFIED BY signalStatusMessage } |
{ TravelInformation IDENTIFIED BY travelerInformation } |
{ PersonalSafetyMessage IDENTIFIED BY personalSafetyMessage } |
{ vruAwarenessMessage IDENTIFIED BY vruawarenessmessage } |
{ TestMessage02 IDENTIFIED BY testMessage02 } |
{ TestMessage03 IDENTIFIED BY testMessage03 } |
{ TestMessage04 IDENTIFIED BY testMessage04 } |
{ TestMessage05 IDENTIFIED BY testMessage05 } |
{ TestMessage06 IDENTIFIED BY testMessage06 } |
{ TestMessage07 IDENTIFIED BY testMessage07 } |
{ TestMessage08 IDENTIFIED BY testMessage08 } |
{ TestMessage09 IDENTIFIED BY testMessage09 } |
{ TestMessage10 IDENTIFIED BY testMessage10 } |
{ TestMessage11 IDENTIFIED BY testMessage11 } |
{ TestMessage12 IDENTIFIED BY testMessage12 } |
{ TestMessage13 IDENTIFIED BY testMessage13 } |
{ TestMessage14 IDENTIFIED BY testMessage14 } |
{ TestMessage15 IDENTIFIED BY testMessage15 } |
...
}
vruAwarenessMessage ::= SEQUENCE {
...
   id                    TemporaryID,
   vrugridosi                 VRUGridOccupancyStatusIndicator OPTIONAL,
   VRUGLI                     vruGridLocationIndicator OPTIONAL,
   ...
}
VRUGridOccupancyStatusIndicator ::= SEQUENCE(SIZE(1..50)) OF
VRUGridOccupancyStatusIndicator
VRUGGridOccupancyStatusIndicator ::= ENUMERATED {
   low                   (0),
   medium                (1),
   high                  (2),
   veryhigh              {3}
}
VRUGridLocationIndicator ::= SEQUENCE(SIZE(1..50))
OF VRUGridLocationIndicator
VRUGridLocationIndicator ::= ENUMERATED {
   north                 (0),
   south                 (1),
   east                  {2},
   west                  {3},
   northwest             {4},
   northeast             {5},
   southeast             {6},
   southwest             {7}
}
-- Facilities layer message formats
MessageTypes MESSAGE-ID-AND-TYPE ::= {
{ BasicSafetyMessage IDENTIFIED VY basicSafetyMessage } |
{ MapData IDENTIFIED BY mapData } |
{ SPAT IDENTIFIED BY signalPhaseAndTimingMessage } |
{ CommonSafetyRequest IDENTIFIED BY commonSafetyRequest } |
{ EmergencyVehicleAlert IDENTIFIED BY emergencyVehicleAlert } |
{ IntersectionCollision IDENTIFIED BY intersectionCollision } |
{ NMEAcorrections IDENTIFIED BY nmeaCorrections } |
{ ProbeDataManagement IDENTIFIED BY probeDataManagement } |
{ ProbeVehicleData IDENTIFIED BY probeVehicleData } |
{ RoadSideAlert IDENTIFIED BY roadSideAlert } |
{ RTCMcorrections IDENTIFIED BY rtcmCorrections } |
{ SignalRequestMessage IDENTIFIED BY signalRequestMessage } |
{ SignalStatusMessage IDENTIFIED BY signalStatusMessage } |
{ TravelerInformation IDENTIFIED BY travelerInformation } |
{ PersonalSafetyMessage IDENTIFIED BY personalSafetyMessage } |
{ vruAwarenessMessage IDENTIFIED BY vruAwarenessMessage } |
{ TestMessage02 IDENTIFIED BY testMessage02 } |
{ TestMessage03 IDENTIFIED BY testMessage03 } |
{ TestMessage04 IDENTIFIED BY testMessage04 } |
{ TestMessage05 IDENTIFIED BY testMessage05 } |
{ TestMessage06 IDENTIFIED BY testMessage06 } |
{ TestMessage07 IDENTIFIED BY testMessage07 } |
{ TestMessage08 IDENTIFIED BY testMessage08 } |
{ TestMessage09 IDENTIFIED BY testMessage09 } |
{ TestMessage10 IDENTIFIED BY testMessage10 } |
{ TestMessage11 IDENTIFIED BY testMessage11 } |
{ TestMessage12 IDENTIFIED BY testMessage12 } |
{ TestMessage13 IDENTIFIED BY testMessage13 } |
{ TestMessage14 IDENTIFIED BY testMessage14 } |
{ TestMessage15 IDENTIFIED BY testMessage15 } |
```

TABLE 1.9-1-continued

```
...
}
vruAwarenessMessage ::= SEQUENCE {
   ...
   generationDeltaTime GenerationDeltaTime,
   vamParameters VamParameters,
   vamExtensions SEQUENCE (SIZE(0..MAX)) OF VamExtension
   }
   ...
}
VRUGridOccupancyStatusIndicator ::= SEQUENCE(SIZE(1..50)) OF
VRUGridOccupancyStausIndicator
VRUGridOccupancyStatusIndicator ::= ENUMERATED {
   low                    (0),
   medium                 (1),
   high                   (2),
   veryhigh               {3}
}
VRUGridLocationIndicator ::= SEQUENCE(SIZE(1..50))
OF VRUGridLocationIndicator
VRUGridLocationIndicator ::=ENUMERATED {
   egoVruGrid                 (0),
   northOfEgoVruGrid          (1),
   SouthOfEgoVruGrid          (2),
   eastOfEgoVruGrid           {3},
   westOfEgoVruGrid           {4},
   northwestOfEgoVruGrid          {5},
   northeastOfEgoVruGrid          {6},
   southeastOfEgoVruGrid          {7},
   southwestOfEgoVruGrid          {8}
}
```

TABLE 1.9-2

```
-- ETSI EN 302 637-2 V1.3.2 (2014-11)
VAM-PDU-Descriptions {itu-t(0) identified-organization(4) etsi(0) itsDomain(5)
wg1(1) ts(103300) vam(3) version(1)}
DEFINITIONS AUTOMATIC TAGS ::=
BEGIN
   IMPORTS
      ItsPduHeader, CauseCode, ReferencePosition, AccelerationControl,
            Curvature, CurvatureCalculationMode, Heading, HeadingValue, LanePosition,
         EmergencyPriority, EmbarkationStatus, Speed, DriveDirection,
         LongitudinalAcceleration, LateralAcceleration, StationID,
         VerticalAcceleration, StationType, ExteriorLights,
         DangerousGoodsBasic, SpecialTransportType, LightBarSirenInUse,
         VehicleRole, VehicleLength, VehicleWidth,
         PathHistory,
         RoadworksSubCauseCode, ClosedLanes, TrafficRule, SpeedLimit,
         SteeringWheelAngle, PerformanceClass, YawRate,
         ProtectedCommunicationZone, PtActivation,
         Latitude, Longitude,
         ProtectedCommunicationZonesRSU, CenDsrcTollingZone
      FROM ITS-Container {itu-t(0) identified-organization(4) etsi(0)
         itsDomain(5) wg1(1) ts(102894) cdd(2) version(2)}
   GenerationDeltaTime
   FROM CAM-PDU-Descriptions {itu-t(0) identified-organization(4) etsi(0)
   itsDomain(S) wg1(1) en(302637) cam(2) version(2)}
   ;
   VAM ::= SEQUENCE {
   header ItsPduHeaderVam,
   vam VruAwareness
   }
   -- contains StationID
   -- StationID should change when certificate changes, or when VRU
   -- enters or leaves a cluster (as leader or otherwise)
   ItsPduHeaderVam ::= ItsPduHeader(WITH COMPONENTS {
   ...,
   messageID(vam)
   })
   VruAwareness ::= SEQUENCE {
   generationDeltaTime GenerationDeltaTime,
   vamParameters VamParameters,
   vamExtensions SEQUENCE (SIZE(0..MAX)) OF VamExtension
   }
   VamExtension ::= SEQUENCE {
   roadGridOccupancy VruRoadGridOccupancy OPTIONAL, -- defined below
```

TABLE 1.9-2-continued

```
   ...
   }
        -- road grid occupancy related parameters and confidence
     VruRoadGridOccupancyVruGridOccupancyStatusIndication OPTIONAL,
     confidenceLevelPerGrid Objectconfidence OPTIONAL,
     VruGridOccupancyStatusIndication ::= SEQUENCE (Size(1..8,...)){
          occupancyGridParameter          OccupancyGridParameter--definedbelow
          egoVruGridOccupancy                  BOOLEAN,
          northOfEgoVruGridOccupancy           BOOLEAN,
          southOfEgoVruGridOccupancy           BOOLEAN,
          eastOfEgoVruGridOccupancy            BOOLEAN,
          westOfEgoVruGridOccupancy            BOOLEAN,
          northwestOfEgoVruGridOccupancy       BOOLEAN,
          northeastOfEgoVruGridOccupancy       BOOLEAN,
          southeastOfEgoVruGridOccupancy       BOOLEAN,
          southwestOfEgoVruGridOccupancy       BOOLEAN
     }
     OccupancyGridParameter ::= SEQUENCE {
          referencePoint ReferencePosition -- imported from ITS-Container
gridsize GridSize -- defined below
          numberOfTier                    NumberOfTiers -- define below
   }
     GridSize                                ::= SEQUENCE {
          length                          GridLength -- defined below
          width                           Gridwidth -- defined below
}
          GridLength ::= ThirtyCmLength -- defined below
          Gridwidth ::=ThirtyCmLength -- defined below
          ThirtyCmLength ::= INTEGER {zero(0), thirtyCentimeters(1), outOfRange(254),
          unavailable(255)} (0..255)
          NumberOf Tiers ::= INTEGER{zero(0), One(1), outOfRange(7), unavaialble(8)}
```

TABLE 1.9-3

```
VamParameters ::= SEQUENCE {
basicContainer                      BasicContainer,
   vruHighFrequencyContainer         VruHighFrequencyContainer OPTIONAL,
   vruLowFrequencyContainer          VruLowFrequencyContainer OPTIONAL,
   vruClusterInformationContainer    VruClusterInformationContainer OPTIONAL,
   VruClusterOperationContainer      VruClusterOperationContainer OPTIONAL,
   vruMotionPredictionContainer      VruMotionPredictionContainer OPTIONAL,
   vamExtensionsNonVruItsStation     VamExtensionNonVruItsStation OPTIONAL,
...
}
--Only present for Non-VRU ITS-S Originated VAM
VamExtensionNonVruItsStation ::= SEQUENCE {
   totalIndividualVruReportedTotalIndividualVruReported OPTIONAL,
   totalVruClusterReported           TotalVruClusterReported OPTIONAL,
vamParametersNonVruItsStation SEQUENCE
(SIZE(1..Max))VamParametersNonVruItsStation OPTIONAL,
   -- Max is an integer value such as 64 or 128
roadGridOccupancy                 VruRoadGridOccupancy OPTIONAL, -- defined below
...
}
-- Total individual VRUs reported in this VAM
totalIndividualVRUReported ::= INTEGER( 1..Max) - Max is maximum VRUs included in
single VAM such as
32 or 64
-- Total VRU Clusters reported in this VAM
   totalVRUClusterReported ::= INTEGER( 1..Max) -- Max is maximum VRU Clusters
included in single VAM such as 32 or 64
VamParametersNonVruItsStation ::= SEQUENCE {
vruHighFrequencyContainer           VruHighFrequencyContainer,
vruLowFrequencyContainer            VruLowFrequencyContainer OPTIONAL,
vruClusterInformationContainer      VruClusterInformationContainer OPTIONAL,
VruClusterOperationContainer        VruClusterOperationContainer OPTIONAL,
vruMotionPredictionContainer        VruMotionPredictionContainer OPTIONAL,
...
}
-- road grid occupancy related parameters and confidence
VruRoadGridOccupancy ::= SEQUENCE{
roadsegmentID                       RoadSegmentReferenceID, OPTIONAL, -- imported
from ITS
gridReferencePoint                  ReferencePosition, -- imported from ITS
gridSize                            GridSize OPTIONAL,
cellSize                            GridSize OPTIONAL,
vruGridOccupancyStatusIndication    VruGridOccupancyStatusIndication,
```

TABLE 1.9-3-continued

```
confidenceLevelPerCell                 ConfidenceLevelPerCell OPTIONAL,
}
GridSize ::= SEQUENCE {
gridLength                            SemiRangeLength -- imported from ITS
gridwidth                             SemiRangeLength -- imported from ITS
}
VruGridOccupancyStatusIndication ::= SEQUENCE (Size(1..256,...)) OF BOOLEAN,
ConfidenceLevelPerCell                  ::= SEQUENCE (Size(1..256,...))
                                        OF ObjectConfidence,
-- imported from ITS
...
```

Figure 10:
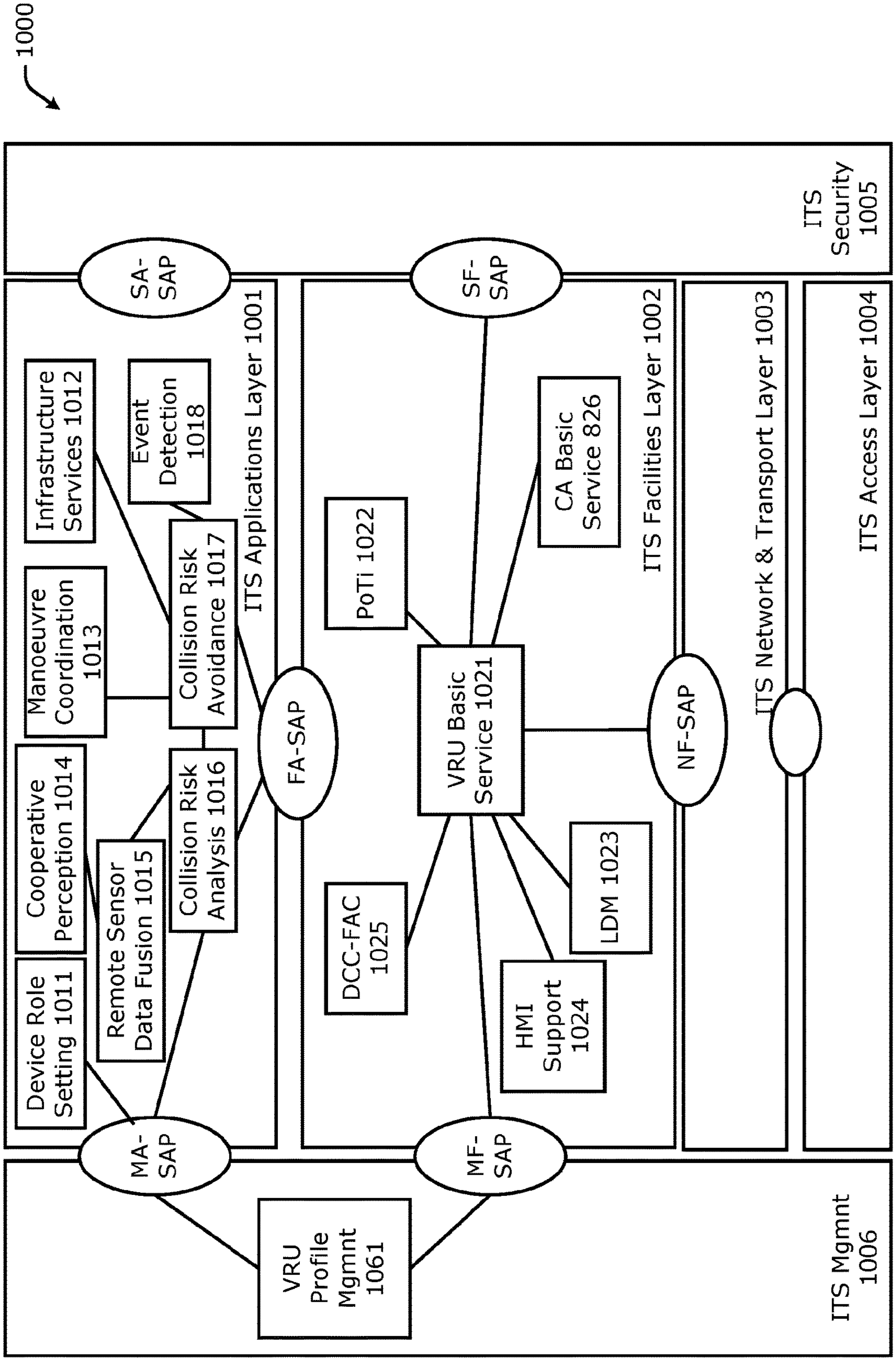
FIG. 10 shows an example ITS-S reference architecture according to various embodiments.

In these embodiments, the new V2X message or existing V2X/ITS messages may be generated by a suitable service or facility in the facilities layer (see e.g., FIG. 10 infra). For example, in some embodiments where the 'Potential-Dangerous-Situation-VRU-Perception-Info' may be a DE included in a cooperative awareness message (CAM) ((generated by a Cooperative Awareness Service (CAS) facility), collective perception message (CPM) (generated by a Collective Perception Service (CPS) facility), Maneuver Coordination Message (MCM) (generated by a Maneuver Coordination Service (MCS) facility), VRU awareness message (VAM) (generated by a VRU basic service (see e.g., FIG. 11), Decentralized Environmental Notification Message (DENM) (generated by a DENM facility), and/or other like facilities layer message, such as those discussed herein.

2. ITS-Station Configurations and Arrangements

FIG. 10 depicts an example ITS-S reference architecture 1000 according to various embodiments. In ITS-based implementations, some or all of the components depicted by FIG. 10 may follow the ITSC protocol, which is based on the principles of the OSI model for layered communication protocols extended for ITS applications. The ITSC includes, inter alia, an access layer which corresponds with the OSI layers 1 and 2, a networking & transport (N&T) layer which corresponds with OSI layers 3 and 4, the facilities layer which corresponds with OSI layers 5, 6, and at least some functionality of OSI layer 7, and an applications layer which corresponds with some or all of OSI layer 7. Each of these layers are interconnected via respective interfaces, SAPs, APIs, and/or other like connectors or interfaces.

The applications layer 1001 provides ITS services, and ITS applications are defined within the application layer 1001. An ITS application is an application layer entity that implements logic for fulfilling one or more ITS use cases. An ITS application makes use of the underlying facilities and communication capacities provided by the ITS-S. Each application can be assigned to one of the three identified application classes: road safety, traffic efficiency, and other applications (see e.g., [EN302663]), ETSI TR 102 638 V1.1.1 (2009-06) (hereinafter "[TR102638]")). Examples of ITS applications may include driving assistance applications (e.g., for cooperative awareness and road hazard warnings) including AEB, EMA, and FCW applications, speed management applications, mapping and/or navigation applications (e.g., turn-by-turn navigation and cooperative navigation), applications providing location based services, and applications providing networking services (e.g., global Internet services and ITS-S lifecycle management services). A V-ITS-S 110 provides ITS applications to vehicle drivers and/or passengers, and may require an interface for accessing in-vehicle data from the in-vehicle network or in-vehicle system. For deployment and performances needs, specific instances of a V-ITS-S 110 may contain groupings of Applications and/or Facilities.

The facilities layer 1002 comprises middleware, software connectors, software glue, or the like, comprising multiple facility layer functions (or simply a "facilities"). In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the application layer and exchanges data with lower layers for communicating that data with other ITS-Ss. Example facilities include Cooperative Awareness Services, Collective Perception Services, Device Data Provider (DDP), Position and Time management (POTI), Local Dynamic Map (LDM), collaborative awareness basic service (CABS) and/or cooperative awareness basic service (CABS), signal phase and timing service (SPATS), vulnerable road user basic service (VBS), Decentralized Environmental Notification (DEN) basic service, maneuver coordination services (MCS), and/or the like. For a vehicle ITS-S, the DDP is connected with the in-vehicle network and provides the vehicle state information. The POTI entity provides the position of the ITS-S and time information. A list of the common facilities is given by ETSI TS 102 894-1 V1.1.1 (2013-08) (hereinafter "[TS102894-1]").

Each of the aforementioned interfaces/Service Access Points (SAPs) may provide the full duplex exchange of data with the facilities layer, and may implement suitable APIs to enable communication between the various entities/elements.

For a vehicle ITS-S, the facilities layer 1002 is connected to an in-vehicle network via an in-vehicle data gateway as shown and described in [TS102894-1]. The facilities and applications of a vehicle ITS-S receive required in-vehicle data from the data gateway in order to construct messages (e.g., CSMs, VAMs, CAMs, DENMs, MCMs, and/or CPMs) and for application usage. For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity 1006. The encode CAM/DENM entity constructs (encodes) CAMs/DENMs to include various, the object list may include a list of DEs and/or DFs included in an ITS data dictionary.

The ITS station type/capabilities facility provides information to describe a profile of an ITS-S to be used in the applications and facilities layers. This profile indicates the ITS-S type (e.g., vehicle ITS-S, road side ITS-S, personal ITS-S, or central ITS-S), a role of the ITS-S, and detection capabilities and status (e.g., the ITS-S's positioning capabilities, sensing capabilities, etc.). The station type/capabilities facility may store sensor capabilities of various connected/coupled sensors and sensor data obtained from such sensors. FIG. 10 shows the VRU-specific functionality, including interfaces mapped to the ITS-S architecture. The VRU-specific functionality is centered around the VRU Basic Service (VBS) 1021 located in the facilities layer, which consumes data from other facility layer services such as the Position and Time management (PoTi) 1022, Local Dynamic Map (LDM) 1023, HMI Support 1024, DCC-FAC 1025, CA basic service (CBS) 1026, etc. The PoTi entity 1022 provides the position of the ITS-S and time information. The LDM 1023 is a database in the ITS-S, which in addition to on-board sensor data may be updated with received CAM and CPM data (see e.g., ETSI TR 102 863 v1.1.1 (2011-06)). Message dissemination-specific information related to the current channel utilization are received by interfacing with the DCC-FAC entity 1025. The DCC-FAC 1025 provides access network congestion information to the VBS 1021.

The Position and Time management entity (PoTi) 1022 manages the position and time information for use by ITS applications, facility, network, management, and security layers. For this purpose, the PoTi 1022 gets information from sub-system entities such as GNSS, sensors and other subsystem of the ITS-S. The PoTi 1022 ensures ITS time synchronicity between ITS-Ss in an ITS constellation, maintains the data quality (e.g., by monitoring time deviation), and manages updates of the position (e.g., kinematic and attitude state) and time. An ITS constellation is a group of ITS-S's that are exchanging ITS data among themselves. The PoTi entity 1022 may include augmentation services to improve the position and time accuracy, integrity, and reliability. Among these methods, communication technologies may be used to provide positioning assistance from mobile to mobile ITS-Ss and infrastructure to mobile ITS-Ss. Given the ITS application requirements in terms of position and time accuracy, PoTi 1022 may use augmentation services to improve the position and time accuracy. Various augmentation methods may be applied. PoTi 1022 may support these augmentation services by providing messages services broadcasting augmentation data. For instance, a roadside ITS-S may broadcast correction information for GNSS to oncoming vehicle ITS-S; ITS-Ss may exchange raw GPS data or may exchange terrestrial radio position and time relevant information. PoTi 1022 maintains and provides the position and time reference information according to the application and facility and other layer service requirements in the ITS-S. In the context of ITS, the "position" includes attitude and movement parameters including velocity, heading, horizontal speed and optionally others. The kinematic and attitude state of a rigid body contained in the ITS-S included position, velocity, acceleration, orientation, angular velocity, and possible other motion related information. The position information at a specific moment in time is referred to as the kinematic and attitude state including time, of the rigid body. In addition to the kinematic and attitude state, PoTi 1022 should also maintain information on the confidence of the kinematic and attitude state variables.

The VBS 1021 is also linked with other entities such as application support facilities including, for example, the collaborative/cooperative awareness basic service (CABS), signal phase and timing service (SPATS), Decentralized Environmental Notification (DEN) service, Collective Perception Service (CPS), Maneuver Coordination Service (MCS), Infrastructure service 1012, etc. The VBS 1021 is responsible for transmitting the VAMs, identifying whether the VRU is part of a cluster, and enabling the assessment of a potential risk of collision. The VBS 1021 may also interact with a VRU profile management entity in the management layer to VRU-related purposes.

The VBS 1021 interfaces through the Network—Transport/Facilities (NF)-Service Access Point (SAP) with the N&T for exchanging of CPMs with other ITS-Ss. The VBS 1021 interfaces through the Security—Facilities (SF)-SAP with the Security entity to access security services for VAM transmission and VAM reception 1103. The VBS 1021 interfaces through the Management-Facilities (MF)-SAP with the Management entity and through the Facilities—Application (FA)-SAP with the application layer if received VAM data is provided directly to the applications. Each of the aforementioned interfaces/SAPs may provide the full duplex exchange of data with the facilities layer, and may implement suitable APIs to enable communication between the various entities/elements.

In some embodiments, the embodiments discussed herein may be implemented in or by the VBS 1021. In particular, the VBS module/entity 1021 may reside or operate in the facilities layer, generates VAMs, checks related services/messages to coordinate transmission of VAMs in conjunction with other ITS service messages generated by other facilities and/or other entities within the ITS-S, which are then passed to the N&T and access layers for transmission to other proximate ITS-Ss. In embodiments, the VAMs are included in ITS packets, which are facilities layer PDUs that may be passed to the access layer via the N&T layer or passed to the application layer for consumption by one or more ITS applications. In this way, VAM format is agnostic to the underlying access layer and is designed to allow VAMs to be shared regardless of the underlying access technology/RAT.

The application layer recommends a possible distribution of functional entities that would be involved in the protection of VRUs 116, based on the analysis of VRU use cases. The application layer also includes device role setting function/application (app) 1011, infrastructure services function/app 1012, maneuver coordination function/app 1013, cooperative perception function/app 1014, remote sensor data fusion function/app 1015, collision risk analysis (CRA) function/app 1016, collision risk avoidance function/app 1017, and event detection function/app 1018.

The device role setting module 1011 takes the configuration parameter settings and user preference settings and enables/disables different VRU profiles depending on the parameter settings, user preference settings, and/or other data (e.g., sensor data and the like). A VRU can be equipped with a portable device which needs to be initially configured and may evolve during its operation following context changes which need to be specified. This is particularly true for the setting-up of the VRU profile and type which can be achieved automatically at power on or via an HMI. The change of the road user vulnerability state needs to be also provided either to activate the VBS 1021 when the road user becomes vulnerable or to de-activate it when entering a protected area. The initial configuration can be set-up automatically when the device is powered up. This can be the case for the VRU equipment type which may be: VRU-Tx (a VRU only with the communication capability to broadcast messages complying with the channel congestion control rules); VRU-Rx (a VRU only communication capability to receive messages); and VRU-St (a VRU with full duplex (Tx and Rx) communication capabilities). During operation the VRU profile may also change due to some clustering or de-assembly. Consequently, the VRU device role will be able to evolve according to the VRU profile changes The infrastructure services module 1012 is responsible for launching new VRU instantiations, collecting usage data, and/or consuming services from infrastructure stations. Existing infrastructure services 1012 such as those described below can be used in the context of the VBS 1021:

The broadcast of the SPAT (Signal Phase And Timing) & MAP (SPAT relevance delimited area) is already standardized and used by vehicles at intersection level. In principle they protect VRUs 116 crossing. However, signal violation warnings may exist and can be detected and signaled using DENM. This signal violation indication using DENMs is very relevant to VRU devices as indicating an increase of the collision risk with the vehicle which violates the signal. If it uses local captors or detects and analyses VAMs, the traffic light controller may delay the red phase change to green and allow the VRU to safely terminate its road crossing.

The contextual speed limit using IVI (In Vehicle Information) can be adapted when a large cluster of VRUs 116 is detected (ex: limiting the vehicles' speed to 30 km/hour). At such reduced speed a vehicle may act efficiently when perceiving the VRUs 116 by means of its own local perception system Remote sensor data fusion and actuator applications/functions 1015 (including ML/AI) is also included in some implementations. The local perception data obtained by the computation of data collected by local sensors may be augmented by remote data collected by elements of the VRU system (e.g., V-ITS-Ss 110, R-ITS-Ss 130) via the ITS-S. These remote data are transferred using standard services such as the CPS and/or the like. In such case it may be necessary to fuse these data. In some implementations, the data fusion may provide at least three possible results: (i) After a data consistency check, the received remote data are not coherent with the local data, wherein the system element has to decide which source of data can be trusted and ignore the other; (ii) only one input is available (e.g., the remote data) which means that the other source does not have the possibility to provide information, wherein the system element may trust the only available source; and (iii) after a data consistency check, the two sources are providing coherent data which augment the individual inputs provided. The use of ML/AI may be necessary to recognize and classify the detected objects (e.g., VRU, motorcycle, type of vehicle, etc.) but also their associated dynamics. The AI can be located in any element of the VRU system. The same approach is applicable to actuators, but in this case, the actuators are the destination of the data fusion.

Collective perception (CP) involves ITS-Ss sharing information about their current environments with one another. An ITS-S participating in CP broadcasts information about its current (e.g., driving) environment rather than about itself. For this purpose, CP involves different ITS-Ss actively exchanging locally perceived objects (e.g., other road participants and VRUs 116, obstacles, and the like) detected by local perception sensors by means of one or more V2X RATs. In some implementations, CP includes a perception chain that can be the fusion of results of several perception functions at predefined times. These perception functions may include local perception and remote perception functions The local perception is provided by the collection of information from the environment of the considered ITS element (e.g., VRU device, vehicle, infrastructure, etc.). This information collection is achieved using relevant sensors (optical camera, thermal camera, radar, LIDAR, etc.). The remote perception is provided by the provision of perception data via C-ITS (mainly V2X communication). Existing basic services like the Cooperative Awareness (CA) or more recent services such as the Collective Perception Service (CPS) can be used to transfer a remote perception.

Several perception sources may then be used to achieve the cooperative perception function 1014. The consistency of these sources may be verified at predefined instants, and if not consistent, the CP function may select the best one according to the confidence level associated with each perception variable. The result of the CP should comply with the required level of accuracy as specified by PoTi. The associated confidence level may be necessary to build the CP resulting from the fusion in case of differences between the local perception and the remote perception. It may also be necessary for the exploitation by other functions (e.g., risk analysis) of the CP result.

The perception functions from the device local sensors processing to the end result at the cooperative perception 1014 level may present a significant latency time of several hundred milliseconds. For the characterization of a VRU trajectory and its velocity evolution, there is a need for a certain number of the vehicle position measurements and velocity measurements thus increasing the overall latency time of the perception. Consequently, it is necessary to estimate the overall latency time of this function to take it into account when selecting a collision avoidance strategy.

The CRA function 1016 analyses the motion dynamic prediction of the considered moving objects associated to their respective levels of confidence (reliability). An objective is to estimate the likelihood of a collision and then to identify as precisely as possible the Time To Collision (TTC) if the resulting likelihood is high. Other variables may be used to compute this estimation.

In embodiments, the VRU CRA function 1016, and dynamic state prediction are able to reliably predict the relevant road users maneuvers with an acceptable level of confidence for the purpose of triggering the appropriate collision avoidance action, assuming that the input data is of sufficient quality. The CRA function 1016 analyses the level of collision risk based on a reliable prediction of the respective dynamic state evolution. Consequently, the reliability level aspect may be characterized in terms of confidence level for the chosen collision risk metrics as discussed in clauses 6.5.10.5 and 6.5.10.9 of [TS103300-2]. The confidence of a VRU dynamic state prediction is computed for the purpose of risk analysis. The prediction of the dynamic state of the VRU is complicated especially for some specific VRU profiles (e.g., animal, child, disabled person, etc.). Therefore, a confidence level may be associated to this prediction as explained in clauses 6.5.10.5, 6.5.10.6 and 6.5.10.9 of [TS103300-2]. The VRU movement reliable prediction is used to trigger the broadcasting of relevant VAMs when a risk of collision involving a VRU is detected with sufficient confidence to avoid false positive alerts (see e.g., clauses 6.5.10.5, 6.5.10.6 and 6.5.10.9 of [TS103300-2]).

The following two conditions are used to calculate the TTC. First, two or more considered moving objects follow trajectories which intersect somewhere at a position which can be called "potential conflict point". Second, if the moving objects maintain their motion dynamics (e.g., approaches, trajectories, speeds, etc.) it is possible to predict that they will collide at a given time which can be estimated through the computation of the time (referred to as Time To Collision (TTC)) necessary for them to arrive simultaneously at the level of the identified potential conflict point. The TTC is a calculated data element enabling the selection of the nature and urgency of a collision avoidance action to be undertaken.

A TTC prediction may only be reliably established when the VRU 116 enters a collision risk area. This is due to the uncertainty nature of the VRU pedestrian motion dynamic (mainly its trajectory) before deciding to cross the road.

At the potential conflict point level, another measurement, the 'time difference for pedestrian and vehicle travelling to the potential conflict point' (TDTC) can be used to estimate the collision risk level. For example, if it is not acted on the motion dynamic of the pedestrian or/and on the motion dynamic of the vehicle, TDTC is equal to 0 and the collision is certain. Increasing the TDTC reduces the risk of collision between the VRU and the vehicle. The potential conflict point is in the middle of the collision risk area which can be defined according to the lane width (e.g., 3.5 m) and vehicle width (maximum 2 m for passenger cars).

The TTC is one of the variables that can be used to define a collision avoidance strategy and the operational collision avoidance actions to be undertaken. Other variables may be considered such as the road state, the weather conditions, the triple of {Longitudinal Distance (LoD), Lateral Distance (LaD), Vertical Distance (VD)} along with the corresponding threshold triple of {MSLaD, MSLoD, MSVD}, Trajectory Interception Indicator (TII), and the mobile objects capabilities to react to a collision risk and avoid a collision (see e.g., clause 6.5.10.9 in [TS103300-2]). The TII is an indicator of the likelihood that the VRU 116 and one or more other VRUs 116, non-VRUs, or even objects on the road are going to collide.

The CRA function 1016 compares LaD, LoD and VD, with their respective predefined thresholds, MSLaD, MSLoD, MSVD, respectively, if all the three metrics are simultaneously less than their respective thresholds, that is LaD<MSLaD, LoD<MSLoD, VD<MSVD, then the collision avoidance actions would be initiated. Those thresholds could be set and updated periodically or dynamically depending on the speed, acceleration, type, and loading of the vehicles and VRUs 116, and environment and weather conditions. On the other hand, the TII reflects how likely is the ego-VRU ITS-S 117 trajectory going to be intercepted by the neighboring ITSs (other VRUs 116 and/or non-VRU ITSs such as vehicles 110).

The likelihood of a collision associated with the TTC may also be used as a triggering condition for the broadcast of messages (e.g., an infrastructure element getting a complete perception of the situation may broadcast DENM, IVI (contextual speed limit), CPM or MCM).

The collision risk avoidance function/application 1017 includes the collision avoidance strategy to be selected according to the TTC value. In the case of autonomous vehicles 110, the collision risk avoidance function 1017 may involve the identification of maneuver coordination 1013/vehicle motion control 1308 to achieve the collision avoidance as per the likelihood of VRU trajectory interception with other road users captured by TII and Maneuver Identifier (MI) as discussed infra.

The collision avoidance strategy may consider several environmental conditions such as visibility conditions related to the local weather, vehicle stability conditions related to the road state (e.g., slippery), and vehicle braking capabilities. The vehicle collision avoidance strategy then needs to consider the action capabilities of the VRU according to its profile, the remaining TTC, the road and weather conditions as well as the vehicle autonomous action capabilities. The collision avoidance actions may be implemented using maneuver coordination 1013 (and related maneuver coordination message (MCM) exchange) as done in the French PAC V2X project or other like systems.

In one example, when in good conditions, it is possible to trigger a collision avoidance action when the TTC is greater than two seconds (one second for the driver reaction time and one second to achieve the collision avoidance action). Below two seconds, the vehicle can be considered to be in a "pre-crash" situation and so it needs to trigger a mitigation action to reduce the severity of the collision impact for the VRU 116/117. The possible collision avoidance actions and impact mitigation actions have been listed in requirement FSYS08 in clause 5 of [TS103300-2].

Road infrastructure elements (e.g., R-ITS-Ss 130) may also include a CRA function 1016 as well as a collision risk avoidance function 1017. In these embodiments, these functions may indicate collision avoidance actions to the neighboring VRUs 116/117 and vehicles 110.

The collision avoidance actions (e.g., using MCM as done in the French PAC V2X project) for VRUs, V-ITS-Ss, and/or R-ITS-Ss may depend on the vehicle level of automation. The collision avoidance action or impact mitigation action are triggered as a warning/alert to the driver or as a direct action on the vehicle 110 itself. Examples of collision avoidance include any combination of: extending or changing the phase of a traffic light; acting on the trajectory and/or velocity of the vehicles 110 (e.g., slow down, change lane, etc.) if the vehicle 110 has a sufficient level of automation; alert the ITS device user through the HMI; disseminate a C-ITS message to other road users, including the VRU 116/117 if relevant. Examples of impact mitigation actions may include any combination of triggering a protective mean at the vehicle level (e.g., extended external airbag); triggering a portable VRU protection airbag.

The road infrastructure may offer services to support the road crossing by VRU such as traffic lights. When a VRU starts crossing a road at a traffic light level authorizing him, the traffic light should not change of phase as long as the VRU has not completed its crossing. Accordingly, the VAM should contain data elements enabling the traffic light to determine the end of the road crossing by the VRU 116/117.

The maneuver coordination function 1013 executes the collision avoidance actions which are associated with the collision avoidance strategy that has been decided (and selected). The collision avoidance actions are triggered at the level of the VRU 116/117, the vehicle 110, or both, depending on the VRU capabilities to act (e.g., VRU profile and type), the vehicle type and capabilities and the actual risk of collision. VRUs 116/117 do not always have the capability to act to avoid a collision (e.g., animal, children, aging person, disabled, etc.), especially if the TTC is short (a few seconds) (see e.g., clauses 6.5.10.5 and 6.5.10.6 of [TS103300-2]. This function should be present at the vehicle 110 level, depending also on the vehicle 110 level of automation (e.g., not present in non-automated vehicles), and may be present at the VRU device 117 level according to the VRU profile. At the vehicle 110 level, this function interfaces the vehicle electronics controlling the vehicle dynamic state in terms of heading and velocity. At the VRU device 117 level, this function may interface the HMI support function, according to the VRU profile, to be able to issue a warning or alert to the VRU 116/117 according to the TTC.

Maneuver coordination 1013 can be proposed to vehicles from an infrastructure element, which may be able to obtain a better perception of the motion dynamics of the involved moving objects, by means of its own sensors or by the fusion of their data with the remote perception obtained from standard messages such as CAMs.

The maneuver coordination 1013 at the VRU 116 may be enabled by sharing among the ego-VRU and the neighboring ITSs, first the TII reflecting how likely is the ego VRU ITS-Ss 117 trajectory going to be intercepted by the neighboring ITSs (other VRU or non-VRU ITSs such as vehicles), and second a Maneuver Identifier (MI) to indicate the type of VRU maneuvering needed. An MI is an identifier of a maneuver (to be) used in a maneuver coordination service (MCS) 1013. The choice of maneuver may be generated locally based on the available sensor data at the VRU ITS-S 117 and may be shared with neighboring ITS-S (e.g., other VRUs 116 and/or non-VRUs) in the vicinity of the ego VRU ITS-S 117 to initiate a joint maneuver coordination among VRUs 116 (see e.g., clause 6.5.10.9 of [TS103300-3]).

Depending upon the analysis of the scene in terms of the sensory as well as shared inputs, simple TII ranges can be defined to indicate the likelihood of the ego-VRU's 116 path to be intercepted by another entity. Such indication helps to trigger timely maneuvering. For instance, TII could be defined in terms of TII index that may simply indicate the chances of potential trajectory interception (low, medium, high or very high) for CRA 1016. If there are multiple other entities, the TII may be indicated for the specific entity differentiable via a simple ID which depends upon the simultaneous number of entities in the vicinity at that time. The vicinity could even be just one cluster that the current VRU is located in. For example, the minimum number of entities or users in a cluster is 50 per cluster (worst case). However, the set of users that may have the potential to collide with the VRU could be much less than 50 thus possible to indicate via few bits in say, VAM.

On the other hand, the MI parameter can be helpful in collision risk avoidance 1017 by triggering/suggesting the type of maneuver action needed at the VRUs 116/117. The number of such possible maneuver actions may be only a few. For simplicity, it could also define as the possible actions to choose from as {longitudinal trajectory change maneuvering, lateral trajectory change maneuvering, heading change maneuvering or emergency braking/deceleration} in order to avoid potential collision indicated by the TII. In various embodiments, the TII and MI parameters can also be exchanged via inclusion in part of a VAM DF structure.

The event detection function 1018 assists the VBS 1021 during its operation when transitioning from one state to another. Examples of the events to be considered include: change of a VRU role when a road user becomes vulnerable (activation) or when a road user is not any more vulnerable (de-activation); change of a VRU profile when a VRU enters a cluster with other VRU(s) or with a new mechanical element (e.g., bicycle, scooter, moto, etc.), or when a VRU cluster is disassembling; risk of collision between one or several VRU(s) and at least one other VRU (using a VRU vehicle) or a vehicle (such event is detected via the perception capabilities of the VRU system); change of the VRU motion dynamic (trajectory or velocity) which will impact the TTC and the reliability of the previous prediction; and change of the status of a road infrastructure piece of equipment (e.g., a traffic light phase) impacting the VRU movements.

Additionally or alternatively, existing infrastructure services 1012 such as those described herein can be used in the context of the VBS 1021. For example, the broadcast of the Signal Phase And Timing (SPAT) and SPAT relevance delimited area (MAP) is already standardized and used by vehicles at intersection level. In principle they protect VRUs 116/117 crossing. However, signal violation warnings may exist and can be detected and signaled using DENM. This signal violation indication using DENMs is very relevant to VRU devices 117 as indicating an increase of the collision risk with the vehicle which violates the signal. If it uses local captors or detects and analyses VAMs, the traffic light controller may delay the red phase change to green and allow the VRU 116/117 to safely terminate its road crossing. The contextual speed limit using In-Vehicle Information (IVI) can be adapted when a large cluster of VRUs 116/117 is detected (e.g., limiting the vehicles' speed to 30 km/hour). At such reduced speed a vehicle 110 may act efficiently when perceiving the VRUs by means of its own local perception system.

The ITS management (mgmnt) layer includes a VRU profile mgmnt entity. The VRU profile management function is an important support element for the VBS 1021 as managing the VRU profile during a VRU active session. The profile management is part of the ITS-S configuration management and is then initialized with necessary typical parameters' values to be able to fulfil its operation. The ITS-S configuration management is also responsible for updates (for example: new standard versions) which are necessary during the whole life cycle of the system.

When the VBS 1021 is activated (vulnerability configured), the VRU profile management needs to characterize a VRU personalized profile based on its experience and on provided initial configuration (generic VRU type). The VRU profile management may then continue to learn about the VRU habits and behaviors with the objective to increase the level of confidence (reliability) being associated to its motion dynamic (trajectories and velocities) and to its evolution predictions.

The VRU profile management 1061 is able to adapt the VRU profile according to detected events which can be signaled by the VBS management and the VRU cluster management 1102 (cluster building/formation or cluster disassembly/disbandenment).

According to its profile, a VRU may or may not be impacted by some road infrastructure event (e.g., evolution of a traffic light phase), so enabling a better estimation of the confidence level to be associated to its movements. For example, an adult pedestrian will likely wait at a green traffic light and then cross the road when the traffic light turns to red. An animal will not take care of the traffic light color and a child can wait or not according to its age and level of education.

Figure 11:
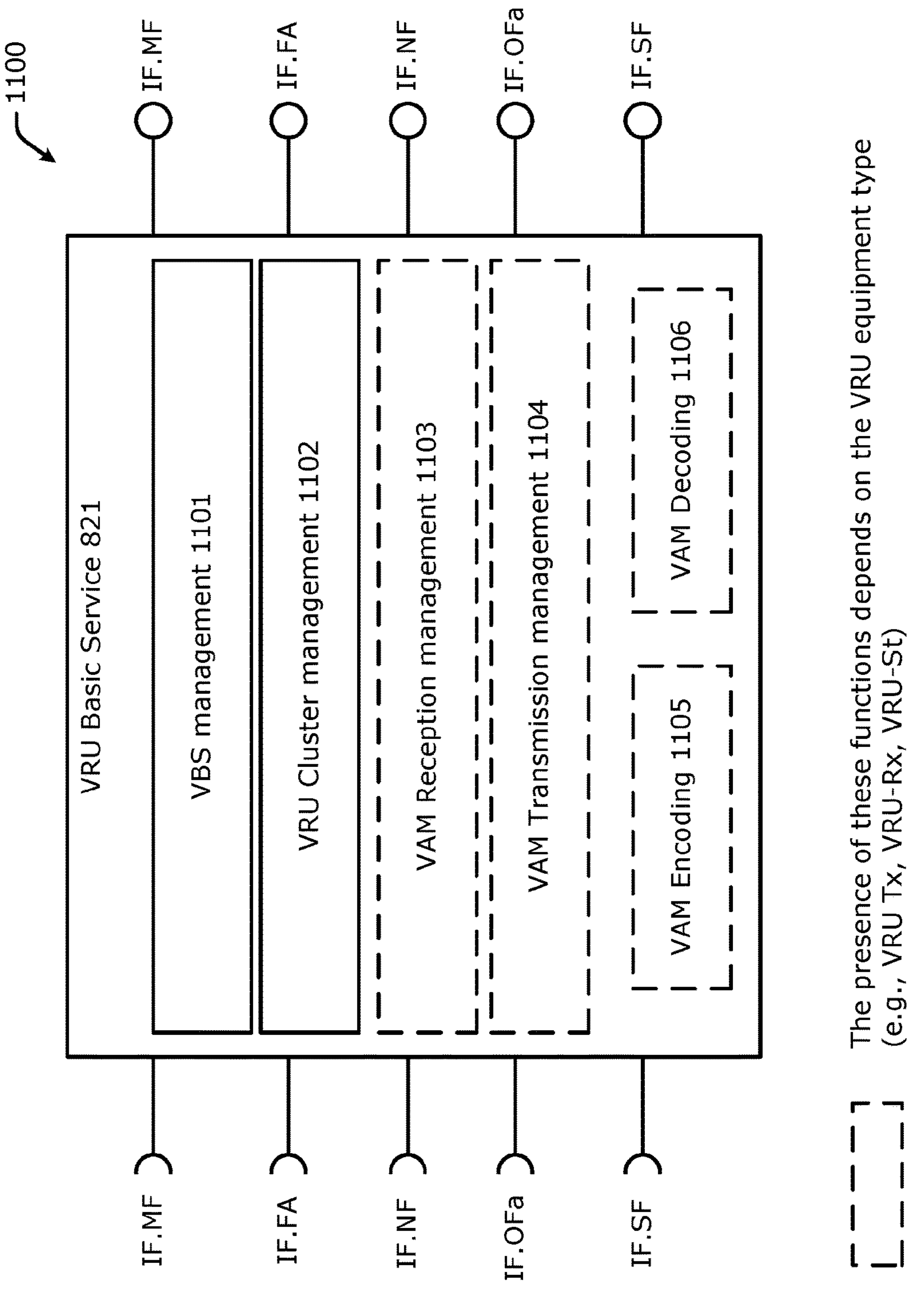
FIG. 11 depicts an example VRU basic service (VBS) functional model according to various embodiments.

FIG. 11 shows an example VBS functional model 1100 according to various embodiments. The VBS 1021 is a facilities layer entity that operates the VAM protocol. It provides three main services: handling the VRU role, sending and receiving of VAMs. The VBS uses the services provided by the protocol entities of the ITS networking & transport layer to disseminate the VAM.

Handling VRU role: The VBS 1021 receives unsolicited indications from the VRU profile management entity (see e.g., clause 6.4 in [TS103300-2]) on whether the device user is in a context where it is considered as a VRU (e.g., pedestrian crossing a road) or not (e.g., passenger in a bus). The VBS 1021 remains operational in both states, as defined by Table 4-1.

The VBS 1021 includes a VBS management function 1101, a VRU cluster management function 1102, a VAM reception management function 1103, a VAM transmission management function 1104, VAM encoding function 1105, and VAM decoding function 1106. The presence of some or all of these functions depends on the VRU equipment type (e.g., VRU-Tx, VRU-Rx, or VRU-St), and may vary from embodiment to embodiment.

The VBS management function 1101 executes the following operations: store the assigned ITS AID and the assigned Network Port to use for the VBS 1021; store the VRU configuration received at initialization time or updated later for the coding of VAM data elements; receive information from and transmit information to the HMI; activate/deactivate the VAM transmission service 1104 according to the device role parameter (for example, the service is deactivated when a pedestrian enters a bus); and manage the triggering conditions of VAM transmission 1104 in relation to the network congestion control. For example, after activation of a new cluster, it may be decided to stop the transmission of element(s) of the cluster.

TABLE 4-1

Possible roles of the VRU during VRU basic service operation

| VRU role | Specification | Valid VRU profiles | Valid VRU types | Additional explanation |
|---|---|---|---|---|
| VRU_ROLE_ON | The device user is considered as a VRU. Based on information received from VRU profile management entity, the VBS shall check the type of VRU and the profile of VRU. It shall also handle the VBS clustering state and provide services to other entities, as defined in clause 5. | ALL | ALL | The VBS state should be changed according to the condition of VRU device user as notified by the VRU profile Management entity. The VRU device can send VAMs, receive VAMs, or both while checking the position of VRU device user through the PoTi entity. Except for VRUs of profile 3, it may execute the VRU clustering functions (see clause 5). |
| VRU_ROLE_OFF | The device user is not considered as a VRU. The VRU device shall neither send nor receive VAMs | ALL | ALL | The VRU is located in a “zero-risk” geographical area, for example in a bus, in a passenger car, etc. The VBS remains operational in this state to monitor any notification that the role has changed to VRU_ROLE_ON. |

There may be cases where the VRU profile management entity provides invalid information, e.g., the VRU device user is considered as a VRU, while its role should be VRU_ROLE_OFF. This is implementation dependent, as the receiving ITS-S should have very strong plausibility check and take into account the VRU context during their risk analysis. The precision of the positioning system (both at transmitting and receiving side) would also have a strong impact on the detection of such cases Sending VAMs includes two activities: generation of VAMs and transmission of VAMs. In VAM generation, the originating ITS-S 117 composes the VAM, which is then delivered to the ITS networking and transport layer for dissemination. In VAM transmission, the VAM is transmitted over one or more communications media using one or more transport and networking protocols. A natural model is for VAMs to be sent by the originating ITS-S to all ITS-Ss within the direct communication range. VAMs are generated at a frequency determined by the controlling VBS 1021 in the originating ITS-S. If a VRU ITS-S is not in a cluster, or is the leader of a cluster, it transmits the VAM periodically. VRU ITS-S 117 that are in a cluster, but not the leader of a cluster, do not transmit the VAM. The generation frequency is determined based on the change of kinematic state, location of the VRU ITS-S 117, and congestion in the radio channel. Security measures such as authentication are applied to the VAM during the transmission process in coordination with the security entity.

Upon receiving a VAM, the VBS 1021 makes the content of the VAM available to the ITS applications and/or to other facilities within the receiving ITS-S 117/130/110, such as a Local Dynamic Map (LDM). It applies all necessary security measures such as relevance or message integrity check in coordination with the security entity.

The VRU cluster management function 1102 performs the following operations: detect if the associated VRU can be the leader of a cluster; compute and store the cluster parameters at activation time for the coding of VAM data elements specific to the cluster; manage the state machine associated to the VRU according to detected cluster events (see e.g., state machines examples provided in section 6.2.4 of [TS103300-2]); and activate or de-activate the broadcasting of the VAMs or other standard messages (e.g., DENMs) according to the state and types of associated VRU.

The clustering operation as part of the VBS 1021 is intended to optimize the resource usage in the ITS system. These resources are mainly spectrum resources and processing resources.

A huge number of VRUs in a certain area (pedestrian crossing in urban environment, large squares in urban environment, special events like large pedestrian gatherings) would lead to a significant number of individual messages sent out by the VRU ITS-S and thus a significant need for spectrum resources. Additionally, all these messages would need to be processed by the receiving ITS-S, potentially including overhead for security operations.

In order to reduce this resource usage, the present document specifies clustering functionality. A VRU cluster is a group of VRUs with a homogeneous behavior (see ETSI TS 103 300-2 [1]), where VAMs related to the VRU cluster provide information about the entire cluster. Within a VRU cluster, VRU devices take the role of either leader (one per cluster) or member. A leader device sends VAMs containing cluster information and/or cluster operations. Member devices send VAMs containing cluster operation container to join/leave the VRU cluster. Member devices do not send VAMs containing cluster information container at any time.

A cluster may contain VRU devices of multiple profiles. A cluster is referred to as "homogeneous" if it contains devices of only one profile, and "heterogeneous" if it contains VRU devices of more than one profile (e.g., a mixed group of pedestrians and bicyclists). The VAM ClusterInformationContainer contains a field allowing the cluster container to indicate which VRU profiles are present in the cluster. Indicating heterogeneous clusters is important since it provides useful information about trajectory and behaviors prediction when the cluster is broken up.

The support of the clustering function is optional in the VBS 1021 for all VRU profiles. The decision to support the clustering or not is implementation dependent for all the VRU profiles. When the conditions are satisfied (see clause 5.4.2.4 of [TS103300-3]), the support of clustering is recommended for VRU profile 1. An implementation that supports clustering may also allow the device owner to activate it or not by configuration. This configuration is also implementation dependent. If the clustering function is supported and activated in the VRU device, and only in this case, the VRU ITS-S shall comply with the requirements specified in clause 5.4.2 and clause 7 of [TS103300-3], and define the parameters specified in clause 5.4.3 of [TS103300-3]. As a consequence, cluster parameters are grouped in two specific and conditional mandatory containers in the present document.

The basic operations to be performed as part of the VRU cluster management 1102 in the VBS 1021 are: Cluster identification: intra-cluster identification by cluster participants in Ad-Hoc mode; Cluster creation: creation of a cluster of VRUs including VRU devices located nearby and with similar intended directions and speeds. The details of the cluster creation operation are given in clause 5.4.2.2 of [TS103300-3]; Cluster breaking up: disbanding of the cluster when it no longer participates in the safety related traffic or the cardinality drops below a given threshold; Cluster joining and leaving: intro-cluster operation, adding or deleting an individual member to an existing cluster; Cluster extension or shrinking: operation to increase or decrease the size (area or cardinality).

Any VRU device shall lead a maximum of one cluster. Accordingly, a cluster leader shall break up its cluster before starting to join another cluster. This requirement also applies to combined VRUs as defined in [TS103300-2] joining a different cluster (e.g., while passing a pedestrian crossing). The combined VRU may then be re-created after leaving the heterogeneous cluster as needed. For example, if a bicyclist with a VRU device, currently in a combined cluster with his bicycle which also has a VRU device, detects it could join a larger cluster, then the leader of the combined VRU breaks up the cluster and both devices each join the larger cluster separately. The possibility to include or merge VRU clusters or combined VRUs inside a VRU cluster is left for further study. In some implementations, a simple in-band VAM signaling may be used for the operation of VRU clustering. Further methods may be defined to establish, maintain and tear up the association between devices (e.g., Bluetooth®, UWB, etc.).

VRU Cluster operation. Depending on its context, the VBS 1021 is in one of the cluster states specified in Table 4-5.

TABLE 4-5

Possible states of the VRU basic service related to cluster operation

| VBS State | Specification | Valid VRU profiles | Valid VRU types | Additional explanation |
|---|---|---|---|---|
| VRU-IDLE | The device user is not considered as a VRU | ALL | ALL | The VRU role as defined in clause 4.2 OF [TS103300-3] is VRU_ROLE_OFF. |
| VRU-ACTIVE-STANDALONE | VAMs or CAMs (in case of VRU Profile 2) are transmitted with information related to only that VRU. | ALL | VRU-St, VRU-Tx | In this state a VRU ITS-S may indicate an intention to join a cluster, or indicate that it has just left a cluster. |
| VRU-ACTIVE-CLUSTER-LEADER | VAMs are transmitted and include a container with specific data elements related to the cluster | VRU profile 1, VRU profile 2 | VRU-St | |
| VRU-PASSIVE | The VRU device does not transmit VAMs | ALL except VRU profile 3 | VRU-St, VRU-Tx | The VRU is member of a cluster or located in a low-risk geographical area defined in clause 3.1 of [TS103300-3] (see e.g., FCOM03 in [TS103300-2]). In the case the area rules authorize the traffic of motor vehicles, the VBS can also remain in VRU-ACTIVESTANDALONE VBS state and increase the periodicity of the VAMs. |

In addition to the normal VAM triggering conditions defined in clause 6 of [TS103300-3], the following events trigger a VBS state transition related to cluster operation. Parameters that control these events are summarized in clause 8 of [TS103300-3], Table 1.5.4-23, and Table 1.5.4-24.

Entering VRU role: VRU-IDLE. When the VBS 1021 in VRU-IDLE determines that the VRU device user has changed its role to VRU_ROLE_ON (e.g., by exiting a bus), it shall start the transmission of VAMs, as defined in clause 4.2. A VBS 1021 executing this transition shall not belong to any cluster. Next state: VRU-ACTIVE-STANDALONE Leaving VRU role: VRU-ACTIVE-STANDALONE. When the VBS 1021 in VRU-ACTIVE-STANDALONE determines that the VRU device user has changed its role to VRU_ROLE_OFF (e.g., by entering a bus or a passenger car), it shall stop the transmission of VAMs, as defined in clause 4.2 of [TS103300-3]. A VBS 1021 executing this transition shall not belong to any cluster. Next state: VRU-IDLE.

Creating a VRU cluster Initial state: VRU-ACTIVE STANDALONE. When the VBS 1021 in VRU-ACTIVE-STANDALONE determines that it can form a cluster based on the received VAMs from other VRUs (see conditions in clause 5.4.2.4 of [TS103300-3]), it takes the following actions: 1) Generate a random cluster identifier. The identifier shall be locally unique, i.e. it shall be different from any cluster identifier in a VAM received by the VBS 1021 in the last timeClusterUniquenessThreshold time, and it shall be non-zero. The identifier does not need to be globally unique, as a cluster is a local entity and can be expected to live for a short time frame. 2) Determine an initial cluster dimension to delimit the cluster bounding box. To avoid false positives, the initial bounding box shall be set to include only the cluster leader VRU. 3) Set the size of the cluster to minClusterSize and the VRU cluster profiles field to its own VRU profile. 4) Transition to the next state, i.e. start transmitting cluster VAMs. The random selection of the cluster ID protects against the case where two cluster leaders, which select an ID simultaneously, select the same identifier. Cluster creation is different from cluster joining as defined in clause 5.4.2.4 of [TS103300-3] in that a VRU device joining a cluster gives an indication that it will join the cluster beforehand, while a VRU device creating a cluster simply switches from sending individual VAMs to sending cluster VAMs. Next state: VRU-ACTIVE-CLUSTER-LEADER Breaking up a VRU cluster: Initial state: VRU-ACTIVE-CLUSTER-LEADER. When the VBS 1021 in VRU-ACTIVE-CLUSTER-LEADER determines that it should break up the cluster, it shall include in the cluster VAMs a VRU cluster operation field indicating that it will disband the cluster with the VRU cluster's identifier and a reason to break up the VRU cluster (see clause 7.3.5 for the list of possible reasons). It shall then shortly stop sending cluster VAMs. This indication is transmitted for timeClusterBreakupWarning in consecutive VAMs. All VRU devices in the cluster shall resume sending individual VAMs (e.g., they transition to state VRU-ACTIVE-STANDALONE). Other VRUs may then attempt to form new clusters with themselves as leaders as specified above. Next state: VRU-ACTIVE-STANDALONE.

Joining a VRU cluster: Initial state: VRU-ACTIVE-STANDALONE. When a VRU device receives cluster VAMs from a cluster leader, the VBS 1021 in VRU-ACTIVE-STANDALONE shall analyse the received cluster VAMs and decide whether it should join the cluster or not (see conditions in clause 5.4.2.4 of [TS103300-3]). Joining a cluster is an optional operation. Before joining the cluster, the VRU shall include in its individual VAMs an indication that it is joining the identified cluster along with an indication of the time at which it intends to stop sending individual VAMs. It shall send these indications for a time timeClusterJoinNotification. Once the VRU has sent the appropriate number of notifications, it joins the cluster, i.e. it stops transmission and starts monitoring the cluster VAMs from the cluster leader.

Cancelled-join handling: If the VBS 1021 determines that it will not join the cluster after having started the joining operation (for example because it receives a VAM with the maximal cluster size (cardinality) maxClusterSize exceeded), it stops including the cluster join notification in its individual VAMs and includes the cluster leave notification for a time timeClusterLeaveNotification. This allows the cluster leader to track the size of its cluster.

Failed-join handling: If after ceasing to send individual VAMs the VBS 1021 determines that the cluster leader has not updated the cluster state to contain that new member (e.g., the device is not inside the bounding box information provided in the received cluster VAM from the cluster leader, or the size is not consistent with observed cluster join and leave notifications), or the cluster it intended to join does not exist anymore, the VBS 1021 leaves the cluster (e.g., it starts transmitting individual VAMs again and remain in VRU-ACTIVE-STANDALONE state). The VBS 1021 takes this action if the first cluster VAM received after timeClusterJoinSuccess passes does not account for the ego VBS 1021. When the ego VBS 1021 transmits individual VAMs after a cancelled-join or a failed-join, it: a) uses the same station ID it used before the cancelled-join or failed-join; and b) includes the cluster leave notification for a time timeClusterLeaveNotification. A VRU ITS-S that experiences a “failed join” of this type may make further attempts to join the cluster. Each attempt shall follow the process defined in this transition case. A VRU device may determine that it is within a cluster bounding box indicated by a message other than a VAM (for example a CPM). In that case, it shall follow the cluster join process described here, but shall provide the special value “0” as identifier of the cluster it joins. Next state: VRU-PASSIVE.

Leaving a VRU cluster: Initial state: VRU-PASSIVE. When a VRU in a cluster receives VAMs from the VRU cluster leader, the VBS 1021 analyzes the received VAMs and decide whether it should leave the cluster or not (see clause 5.4.2.4 of [TS103300-3]). Leaving the cluster consists of resuming to send individual VAMs. When the VRU ITS-S leaves the cluster, the VAMs that it sends after state VRU-PASSIVE ends, shall indicate that it is leaving the identified cluster with a reason why it leaves the identified cluster (see clause 7.3.5 of [TS103300-3] for the list of reasons). It shall include this indication for time timeClusterLeaveNotification. A VRU is always allowed to leave a cluster for any reason, including its own decision or any safety risk identified. After a VRU leaves a cluster and starts sending individual VAMs, it should use different identifiers (including Station ID in the VAM and pseudonym certificate) from the ones it used in individual VAMs sent before it joined the cluster. Exception, if the VRU experiences a cancelled-join or a failed-join as specified above (in “Joining a VRU cluster” transition), it should use the Station ID and other identifiers that it was using before the failed join to allow better tracking by the cluster leader of the state of the cluster for a numClusterVAMRepeat number of VAMs, and resume the pseudonymization of its Station ID afterwards. A VRU device that is in VRU-PASSIVE state and within a cluster indicated by a message other than a VAM (e.g., a CPM) may decide to resume sending the VAM because it has determined it was within the cluster indicated by the other message, but is now going to leave or has left that cluster bounding box. In that case, it shall follow the cluster leave process described here, indicating the special cluster identifier value "0". Next state: VRU-ACTIVE-STANDALONE Determining VRU cluster leader lost: In some cases, the VRU cluster leader may lose communication connection or fail as anode. In this case, the VBS 1021 of the cluster leader cannot send VAMs any more on behalf of the cluster. When a VBS 1021 in VRU-PASSIVE state because of clustering determines that it did not receive VAMs from the VRU cluster leader for a time timeClusterContinuity, it shall assume that the VRU cluster leader is lost and shall leave the cluster as specified previously. Next state: VRU-ACTIVE-STANDALONE The following actions do not trigger a state transition but shall cause an update of information.

Extending or shrinking a VRU cluster: State: VRU-ACTIVE-CLUSTER-LEADER. A VAM indicating that a VRU is joining the cluster allows the VRU cluster leader to determine whether the cluster is homogeneous or heterogeneous, its profile, bounding box, velocity and reference position, etc. The cluster data elements in the cluster VAM shall be updated by the VRU cluster leader to include the new VRU. The same applies when a VRU leaves the cluster.

Changing a VRU cluster ID: State: VRU-ACTIVE-CLUSTER-LEADER, VRU-PASSIVE. A cluster leader may change the cluster ID at any time and for any reason. The cluster leader shall include in its VAMs an indication that the cluster ID is going to change for time timeClusterIdChangeNotification before implementing the change. The notification indicates the time at which the change will happen. The cluster leader shall transmit a cluster VAM with the new cluster ID as soon as possible after the ID change. VRU devices in the cluster shall observe at that time whether there is a cluster with a new ID that has similar bounding boxes and dynamic properties to the previous cluster. If there is such a cluster, the VRU devices shall update their internal record of the cluster ID to the newly observed cluster ID. If there is no such cluster, the VRU devices shall execute the leave process with respect to the old cluster. VRU devices that leave a cluster that has recently changed ID may use either the old or the new cluster ID in their leave indication for time timeClusterIdPersist. After that time, they shall only use the new cluster ID. If the VBS 1021 of a cluster leader receives a VAM from another VRU with the same identifier as its own, it shall immediately trigger a change of the cluster ID complying with the process described in the previous paragraph.

The transmission of intent to change cluster ID does not significantly impact privacy. This is because an eavesdropper who is attempting to track a cluster and is listening to the cluster VAMs at the time of an ID change will be able to determine continuity of the cluster anyway, by "joining the dots" of its trajectory through the ID change using the dynamic information. ID change is intended mainly to protect against an eavesdropper who is not continually listening, but instead has the capability to listen only in discrete, isolated locations. For this eavesdropper model, including a "change prepare" notification for a short time does not significantly increase the likelihood that the eavesdropper will be able to track the cluster through the ID change. The new cluster ID is not provided in the notification, only the time when the ID is intended to change.

Conditions to determine whether to create a cluster: a VRU device with a VBS 1021 in VRU-ACTIVE-STANDALONE can create a cluster if all these conditions are met: It has sufficient processing power (indicated in the VRU configuration received from the VRU profile management function). It has been configured with VRU equipment type VRU-St (as defined in clause 4.4 of [TR103300-1]). It is receiving VAMs from numCreateCluster different VRUs not further away than maxClusterDistance. It has failed to identify a cluster it could join. Another possible condition is that the VRU-ITS-S has received an indication from a neighbouring V-ITS-S or R-ITS-S that a cluster should be created.

Conditions to determine whether to join or leave a cluster in normal conditions: a VRU device whose VBS 1021 is in VRU-ACTIVE-STANDALONE state shall determine whether it can join or should leave a cluster by comparing its measured position and kinematic state with the position and kinematic state indicated in the VAM of the VRU cluster leader. Joining a cluster is an optional operation.

If the compared information fulfils certain conditions, i.e. the cluster has not reached its maximal size (cardinality) maxClusterSize, the VRU is within the VRU cluster bounding box or at a certain distance maxClusterDistance away from the VRU cluster leader and velocity difference less than maxClusterVelocityDifference of own velocity, the VRU device may join the cluster.

After joining the cluster, when the compared information does not fulfil the previous conditions any longer, the VRU device shall leave the cluster. If changing its role to non-VRU (e.g., by entering a bus or a passenger car), the VRU device shall also follow the leaving process described in clause 5.4.2.2 of [TS103300-3]. If the VRU device receives VAMs from two different clusters that have the same cluster ID (e.g., due to hidden node situation), it shall not join any of the two clusters. In the case the VBS 1021, after leaving a VRU cluster, determines that it has entered a low-risk geographical area as defined in clause 3.1 of [TS103300-3] (e.g., through the reception of a MAPEM), according to requirement FCOM03 in [TS103300-2], it shall transition to the VRU-PASSIVE state (see clause 6 of [TS103300-3]). The VBS 1021 indicates in the VAM the reason why it leaves a cluster, as defined in clause 7.3.5 of [TS103300-3].

In some cases, merging VRU clusters can further reduce VRU messaging in the network. For example, moving VRU clusters on a sidewalk with similar coherent cluster velocity profiles may have fully or partially overlapped bounding boxes (see clause 5.4.3 of [TS103300-3]) and so may merge to form one larger cluster. This shall be done as specified in clause 5.4.1 of [TS103300-3], i.e. the second cluster leader shall break up its cluster, enter VRU-ACTIVE-STANDALONE state and join the new cluster as an individual VRU. All devices that were part of the cluster led by the second cluster leader become individual VRUs (i.e. enter VRU-ACTIVE-STANDALONE state) and may choose individually to join the cluster led by the first cluster leader.

The VAM reception management function 1103 performs the following operations after VAM messages decoding: check the relevance of the received message according to its current mobility characteristics and state; check the consistency, plausibility and integrity (see the liaison with security protocols) of the received message semantic; and destroy or store the received message data elements in the LDM according to previous operations results.

The VAM Transmission management function 1104 is only available at the VRU device level, not at the level of other ITS elements such as V-ITS-Ss 110 or R-ITS-Ss 130. Even at the VRU device level, this function may not be present depending on its initial configuration (see device role setting function 1011). The VAM transmission management function 1104 performs the following operations upon request of the VBS management function 1101: assemble the message data elements in conformity to the message standard specification; and send the constructed VAM to the VAM encoding function 1105. The VAM encoding function 1105 encodes the Data Elements provided by the VAM transmission management function 1104 in conformity with the VAM specification. The VAM encoding function 1105 is available only if the VAM transmission management function 1104 is available.

The VAM decoding function 1106 extracts the relevant Data Elements contained in the received message. These data elements are then communicated to the VAM reception management function 1103. The VAM decoding function 1106 is available only if the VAM reception management function 1103 is available.

A VRU may be configured with a VRU profile. VRU profiles are the basis for the further definition of the VRU functional architecture. The profiles are derived from the various use cases discussed herein. VRUs 116 usually refers to living beings. A living being is considered to be a VRU only when it is in the context of a safety related traffic environment. For example, a living being in a house is not a VRU until it is in the vicinity of a street (e.g., 2 m or 3 m), at which point, it is part of the safety related context. This allows the amount of communications to be limited, for example, a C-ITS communications device need only start to act as a VRU-ITS-S when the living being associated with it starts acting in the role of a VRU.

A VRU can be equipped with a portable device. The term "VRU" may be used to refer to both a VRU and its VRU device unless the context dictates otherwise. The VRU device may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VBS when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

The following profile classification parameters may be used to classify different VRUs 116:

- Maximum and average (e.g., typical) speed values (e.g., may be with its standard deviation).
- Minimum and average (e.g., typical) communication range, The communication range may be calculated based on the assumption that an awareness time of 5 seconds is needed to warn/act on the traffic participants.
- Environment or type of area (e.g., urban, sub-urban, rural, highway, etc.).
- Average Weight and standard deviation.
- directivity/trajectory ambiguity (give the level of confidence in the predictability of the behavior of the VRU in its movements).
- Cluster size: Number of VRUs 116 in the cluster. A VRU may be leading a cluster and then indicate its size. In such case, the leading VRU can be positioned as serving as the reference position of the cluster.

These profile parameters are not dynamic parameters maintained in internal tables, but indications of typical values to be used to classify the VRUs 116 and evaluate the behavior of a VRU 116 belonging to a specific profile. Example VRU profiles may be as follows:

- VRU Profile 1— Pedestrian. VRUs 116 in this profile may include any road users not using a mechanical device, and includes, for example, pedestrians on a pavement, children, prams, disabled persons, blind persons guided by a dog, elderly persons, riders off their bikes, and the like.
- VRU Profile 2— Bicyclist. VRUs 116 in this profile may include bicyclists and similar light vehicle riders, possibly with an electric engine. This VRU profile includes bicyclists, and also unicycles, wheelchair users, horses carrying a rider, skaters, e-scooters, Segway's, etc. It should be noted that the light vehicle itself does not represent a VRU, but only in combination with a person creates the VRU.
- VRU Profile 3— Motorcyclist. VRUs 116 in this profile may include motorcyclists, which are equipped with engines that allow them to move on the road. This profile includes users (e.g., driver and passengers, e.g., children and animals) of Powered Two Wheelers (PTW) such as mopeds (motorized scooters), motorcycles or side-cars, and may also include four-wheeled all-terrain vehicles (ATVs), snowmobiles (or snow machines), jet skis for marine environments, and/or other like powered vehicles.
- VRU Profile 4—Animals presenting a safety risk to other road users. VRUs 116 in this profile may include dogs, wild animals, horses, cows, sheep, etc. Some of these VRUs 116 might have their own ITS-S (e.g., dog in a city or a horse) or some other type of device (e.g., GPS module in dog collar, implanted RFID tags, etc.), but most of the VRUs 116 in this profile will only be indirectly detected (e.g., wild animals in rural areas and highway situations). Clusters of animal VRUs 116 might be herds of animals, like a herd of sheep, cows, or wild boars. This profile has a lower priority when decisions have to be taken to protect a VRU.

Point-to-multipoint communication as discussed in ETSI EN 302 636-4-1 v 1.3.1 (2017-08) (hereinafter "[EN302634-4-1]"), ETSI EN 302 636-3 v1.1.2 (2014-03) (hereinafter "[EN302636-3]") may be used for transmitting VAMs, as specified in ETSI TS 103 300-3 V0.1.11 (2020-05) (hereinafter "PS103300-31").

Frequency/Periodicity range of VAMs. A VAM generation event results in the generation of one VAM. The minimum time elapsed between the start of consecutive VAM generation events are equal to or larger than T_GenVam. T_GenVam is limited to T_GenVamMin≤T_GenVam≤T_GenVamMax, where T_GenVamMin and T_GenVamMax are specified in Table 11 (Section 8). When a cluster VAM is transmitted, the T_GenVam could be smaller than that of individual VAM.

In case of ITS-G5, T_GenVam is managed according to the channel usage requirements of Decentralized Congestion Control (DCC) as specified in ETSI TS 103 175. The parameter T_GenVam is provided by the VBS management entity in the unit of milliseconds. If the management entity provides this parameter with a value above T_GenVamMax, T_GenVam is set to T_GenVamMax and if the value is below T_GenVamMin or if this parameter is not provided, the T_GenVam is set to T_GenVamMin. The parameter T_GenVam represents the currently valid lower limit for the time elapsed between consecutive VAM generation events.

In case of C-V2X PC5, T_GenVam is managed in accordance to the congestion control mechanism defined by the access layer in ETSI TS 103 574.

Triggering conditions. Individual VAM Transmission Management by VBS at VRU-ITS-S. First time individual VAM is generated immediately or at earliest time for transmission if any of the following conditions is satisfied and the individual VAM transmission does not subject to redundancy mitigation techniques:

1. A VRU 116 is in VRU-IDLE VBS State and has entered VRU-ACTIVE-STANDALONE
2. A VRU 116/117 is in VRU-PASSIVE VBS State; has decided to leave the cluster and enter VRU-ACTIVE-STANDALONE VBS State.
3. A VRU 116/117 is in VRU-PASSIVE VBS State; VRU has determined that one or more new vehicles or other VRUs 116/117 (e.g., VRU Profile 3—Motorcyclist) have come closer than minimum safe lateral distance (MSLaD) laterally, closer than minimum safe longitudinal distance (MSLoD) longitudinally and closer than minimum safe vertical distance (MSVD) vertically; and has determined to leave cluster and enter VRU-ACTIVE-STANDALONE VBS State in order to transmit immediate VAM.
4. A VRU 116/117 is in VRU-PASSIVE VBS State; has determined that VRU Cluster leader is lost and has decided to enter VRU-ACTIVE-STANDALONE VBS State.
5. A VRU 116/117 is in VRU-ACTIVE-CLUSTER-LEADER VBS State; has determined breaking up the cluster and has transmitted VRU Cluster VAM with disband indication; and has decided to enter VRU-ACTIVE-STANDALONE VBS State.

Consecutive VAM Transmission is contingent to conditions as described here. Consecutive individual VAM generation events occurs at an interval equal to or larger than T_GenVam. An individual VAM is generated for transmission as part of a generation event if the originating VRU-ITS-S 117 is still in VBS VRU-ACTIVE-STANDALONE VBS State, any of the following conditions is satisfied and individual VAM transmission does not subject to redundancy mitigation techniques:

1. The time elapsed since the last time the individual VAM was transmitted exceeds T_GenVamMax.
2. The Euclidian absolute distance between the current estimated position of the reference point of the VRU and the estimated position of the reference point lastly included in an individual VAM exceeds a pre-defined Threshold minReferencePointPositionChangeThreshold.
3. The difference between the current estimated ground speed of the reference point of the VRU 116 and the estimated absolute speed of the reference point of the VRU lastly included in an individual VAM exceeds a pre-defined Threshold minGroundSpeedChangeThreshold.
4. The difference between the orientation of the vector of the current estimated ground velocity of the reference point of the VRU 116 and the estimated orientation of the vector of the ground velocity of the reference point of the VRU 116 lastly included in an individual VAM exceeds a pre-defined Threshold minGroundVelocilyOrientationChangeThreshold
5. The difference between the current estimated collision probability with vehicle(s) or other VRU(s) 116 (e.g., as measured by Trajectory Interception Probability) and the estimated collision probability with vehicle(s) or other VRU(s) 116 lastly reported in an individual VAM exceeds a pre-defined Threshold minCollisionProbabilityChangeThreshold.
6. The originating ITS-S is a VRU in VRU-ACTIVE-STANDALONE VBS State and has decided to join a Cluster after its previous individual VAM transmission.
7. A VRU 116/117 has determined that one or more new vehicles or other VRUs 116/117 have satisfied the following conditions simultaneously after the lastly transmitted VAM. The conditions are: coming closer than minimum safe lateral distance (MSLaD) laterally, coming closer than minimum safe longitudinal distance (MSLoD) longitudinally and coming closer than minimum safe vertical distance (MSVD) vertically.

VRU cluster VAM transmission management by VBS at VRU-ITS-S. First time VRU cluster VAM is generated immediately or at earliest time for transmission if any of the following conditions is satisfied and the VRU cluster VAM transmission does not subject to redundancy mitigation techniques: A VRU 116 in VRU-ACTIVE-STANDALONE VBS State determines to form a VRU cluster.

Consecutive VRU cluster VAM Transmission is contingent to conditions as described here. Consecutive VRU cluster VAM generation events occurs at cluster leader at an interval equal to or larger than T_GenVam. A VRU cluster VAM is generated for transmission by the cluster leader as part of a generation event if any of the following conditions is satisfied and VRU cluster VAM transmission does not subject to redundancy mitigation techniques:

1. The time elapsed since the last time the VRU cluster VAM was transmitted exceeds T_GenVamMax.
2. The Euclidian absolute distance between the current estimated position of the reference point of the VRU cluster and the estimated position of the reference point lastly included in a VRU cluster VAM exceeds a pre-defined Threshold minReferencePointPositionChangeThreshold.
3. The difference between the current estimated Width of the cluster and the estimated Width included in the lastly transmitted VAM exceeds a pre-defined Threshold minClusterWidthChangeThreshold.
4. The difference between the current estimated Length of the cluster and the estimated Length included in the lastly transmitted VAM exceeds a pre-defined Threshold minClusterLengthChangeThreshold.
5. The difference between the current estimated ground speed of the reference point of the VRU cluster and the estimated absolute speed of the reference point lastly included a VRU cluster VAM exceeds a pre-defined Threshold minGroundSpeedChangeThreshold.
6. The difference between the orientation of the vector of the current estimated ground velocity of the reference point of the VRU cluster and the estimated orientation of the vector of the ground velocity of the reference point lastly included in a VRU cluster VAM exceeds a pre-defined Threshold minGroundVelocityOrientationChangeThreshold.
7. The difference between the current estimated probability of collision of the VRU cluster with vehicle(s) or other VRU(s) (e.g., as measured by Trajectory Interception Probability of other vehicles/VRUs 116/117 with cluster Bounding Area) and the estimated collision probability with vehicle(s) or other VRU(s) lastly reported in a VAM exceeds minCollisionProbabilityChangeThreshold.

8. VRU cluster type has been changed (e.g., from homogeneous to heterogeneous cluster or vice versa) after previous VAM generation event.
9. Cluster leader has determined to break up the cluster after transmission of previous VRU cluster VAM.
10. More than a pre-defined number of new VRUs 116/117 have joined the VRU cluster after transmission of previous VRU cluster VAM.
11. More than a pre-defined number of members has left the VRU cluster after transmission of previous VRU cluster VAM.
12. VRU in VRU-ACTIVE-CLUSTERLEADER VBS State has determined that one or more new vehicles or non-member VRUs 116/117 (e.g., VRU Profile 3—Motorcyclist) have satisfied the following conditions simultaneously after the lastly transmitted VAM. The conditions are: coming closer than minimum safe lateral distance (MSLaD) laterally, coming closer than minimum safe longitudinal distance (MSLoD) longitudinally and coming closer than minimum safe vertical distance (MSVD) vertically to the cluster bounding box.

VAM Redundancy Mitigation. A balance between Frequency of VAM generation at facilities layer and communication overhead at access layer is considered without impacting VRU safety and VRU awareness in the proximity. VAM transmission at a VAM generation event may subject to the following redundancy mitigation techniques:

An originating VRU-ITS-S 117 skips current individual VAM if all the following conditions are satisfied simultaneously. The time elapsed since the last time VAM was transmitted by originating VRU-ITS-S 117 does not exceed N (e.g., 4) times T_GenVamMax; The Euclidian absolute distance between the current estimated position of the reference point and the estimated position of the reference point in the received VAM is less than minReferencePointPositionChangeThreshold; The difference between the current estimated speed of the reference point and the estimated absolute speed of the reference point in received VAM is less than minGroundSpeedChangeThreshold; and The difference between the orientation of the vector of the current estimated ground velocity and the estimated orientation of the vector of the ground velocity of the reference point in the received VAM is less than minGroundVelocityOrientationChangeThreshold.

Or one of the following conditions are satisfied: VRU 116 consults appropriate maps to verify if the VRU 116 is in protected or non-drivable areas such as buildings, etc.; VRU is in a geographical area designated as a pedestrian only zone. Only VRU profiles 1 and 4 allowed in the area; VRU 116 considers itself as a member of a VRU cluster and cluster break up message has not been received from the cluster leader; the information about the ego-VRU 116 has been reported by another ITS-S within T_GenVam VAM generation time. Besides the VAM generation frequency, the time required for the VAM generation and the timeliness of the data taken for the message construction are decisive for the applicability of data in the receiving ITS-Ss. In order to ensure proper interpretation of received VAMs, each VAM is timestamped. An acceptable time synchronization between the different ITS-Ss is expected and it is out of scope for this specification. The time required for a VAM generation is less than T_AssembleVAM. The time required for a VAM generation refers to the time difference between time at which a VAM generation is triggered and the time at which the VAM is delivered to the N&T layer.

VAM times tamp. The reference timestamp provided in a VAM disseminated by an ITS-S corresponds to the time at which the reference position provided in BasicContainer DF is determined by the originating ITS-S. The format and range of the timestamp is defined in clause B.3 of ETSI EN 302 637-2 V1.4.1 (2019-04) (hereinafter "[EN302637-2]"). The difference between VAM generation time and reference timestamp is less than 32 767 ms as in [EN302637-2]. This may help avoid timestamp wrap-around complications.

Transmitting VAMs. VRU-ITS-S 117 in VRU-ACTIVE-STANDALONE state sends 'individual VAMs', while VRU-ITS-S in VRU-ACTIVE-CLUSTERLEADER VBS state transmits 'Cluster VAMs' on behalf of the VRU cluster. Cluster member VRU-ITS-S 117 in VRU-PASSIVE VBS State sends individual VAMs containing VruClusterOperationContainer while leaving the VRU cluster. VRU-ITS-S 117 in VRU-ACTIVE-STANDALONE sends VAM as 'individual VAM' containing VruClusterOperationContainer while joining the VRU cluster.

VRUs 116/117 present a diversity of profiles which lead to random behaviors when moving in shared areas. Moreover, their inertia is much lower than vehicles (for example a pedestrian can do a U turn in less than one second) and as such their motion dynamic is more difficult to predict.

The VBS 1021 enables the dissemination of VRU Awareness Messages (VAM), whose purpose is to create awareness at the level of other VRUs 116/117 or vehicles 110, with the objective to solve conflicting situations leading to collisions. The vehicle possible action to solve a conflict situation is directly related to the time left before the conflict, the vehicle velocity, vehicle deceleration or lane change capability, weather and vehicle condition (for example state of the road and of the vehicle tires). In the best case, a vehicle needs 1 to 2 seconds to be able to avoid a collision, but in worst cases, it can take more than 4 to 5 seconds to be able to avoid a collision. If a vehicle is very close to a VRU and with constant velocity (for example time-to-collision between 1 to 2 seconds), it is not possible any more to talk about awareness as this becomes really an alert for both the VRU and the vehicle.

VRUs 116/117 and vehicles which are in a conflict situation need to detect it at least 5 to 6 seconds before reaching the conflict point to be sure to have the capability to act on time to avoid a collision. Generally, collision risk indicators (for example TTC, TDTC, PET, etc., see e.g., [TS103300-2]) are used to predict the instant of the conflict. These indicators need a prediction of: the trajectory (path) followed by the subject VRU and the subject vehicle; and/or the time required by the subject VRU and the subject vehicle to reach together the conflict point.

These predictions should be derived from data elements which are exchanged between the subject VRU and the subject vehicle. For vehicles, the trajectory and time predictions can be better predicted than for VRUs, because vehicles' trajectories are constrained to the road topography, traffic, traffic rules, etc., while VRUs 116/117 have much more freedom to move. For vehicles, their dynamics is also constrained by their size, their mass and their heading variation capabilities, which is not the case for most of the VRUs.

Accordingly, it is not possible, in many situations, to predict the VRUs 116/117 exact trajectory or their velocity only based on their recent path history and on their current position. If this is performed, a lot of false positive and false negative results can be expected, leading to decisions of wrong collision avoidance action.

A possible way to avoid false positive and false negative results is to base respectively the vehicle and VRU path predictions on deterministic information provided by the vehicle and by the VRU (motion dynamic change indications) and by a better knowledge of the statistical VRU behavior in repetitive contextual situations. A prediction can always be verified a-posteriori when building the path history. Detected errors can then be used to correct future predictions.

VRU Motion Dynamic Change Indications (MDCI) are built from deterministic indicators which are directly provided by the VRU device itself or which result from a mobility modality state change (e.g., transiting from pedestrian to bicyclist, transiting from pedestrian riding his bicycle to pedestrian pushing his bicycle, transiting from motorcyclist riding his motorcycle to motorcyclist ejected from his motorcycle, transitioning from a dangerous area to a protected area, for example entering a tramway, a train, etc.).

In the present document, the VRUs 116/117 can be classified into four profiles which are defined in clause 4.1 of [TS103300-3]. The SAE J3194 also proposes a taxonomy and classification of powered micro-mobility vehicles: powered bicycle (e.g., electric bikes); powered standing scooter (e.g., Segway®); powered seated scooter; powered self-balancing board sometimes referred to as "self-balancing scooter" (e.g., Hoverboard® self-balancing board, and Onewheel® self-balancing single wheel electric board); powered skates; and/or the like. Their main characteristics are their kerb weight, vehicle width, top speed, power source (electrical or combustion). Human powered micro-mobility vehicles (bicycle, standing scooter) should be also considered. Transitions between engine powered vehicles and human powered vehicles may occur, changing the motion dynamic of the vehicle. Both, human powered and engine powered may also occur in parallel, also impacting the motion dynamic of the vehicle.

In [TS103300-2] and in clause 5.4.2.6 of [TS103300-3], a combined VRU 116/117 is defined as the assembly of a VRU profile 1, potentially with one or several additional VRU(s) 116/117, with one VRU vehicle or animal. Several VRU vehicle types are possible. Even if most of them can carry VRUs, their propulsion mode can be different, leading to specific threats and vulnerabilities: they can be propelled by a human (human riding on the vehicle or mounted on an animal); they can be propelled by a thermal engine. In this case, the thermal engine is only activated when the ignition system is operational; and/or they can be propelled by an electrical engine. In this case, the electrical engine is immediately activated when the power supply is on (no ignition).

A combined VRU 116/117 can be the assembly of one human and one animal (e.g., human with a horse or human with a camel). A human riding a horse may decide to get off the horse and then pull it. In this case, the VRU 116/117 performs a transition from profile 2 to profile 1 with an impact on its velocity.

This diversity of VRUs 116/117 and cluster association leads to several VBS state machines conditioning standard messages dissemination and their respective motion dynamics. These state machines and their transitions can be summarized as in FIG. 12.

Figure 12:
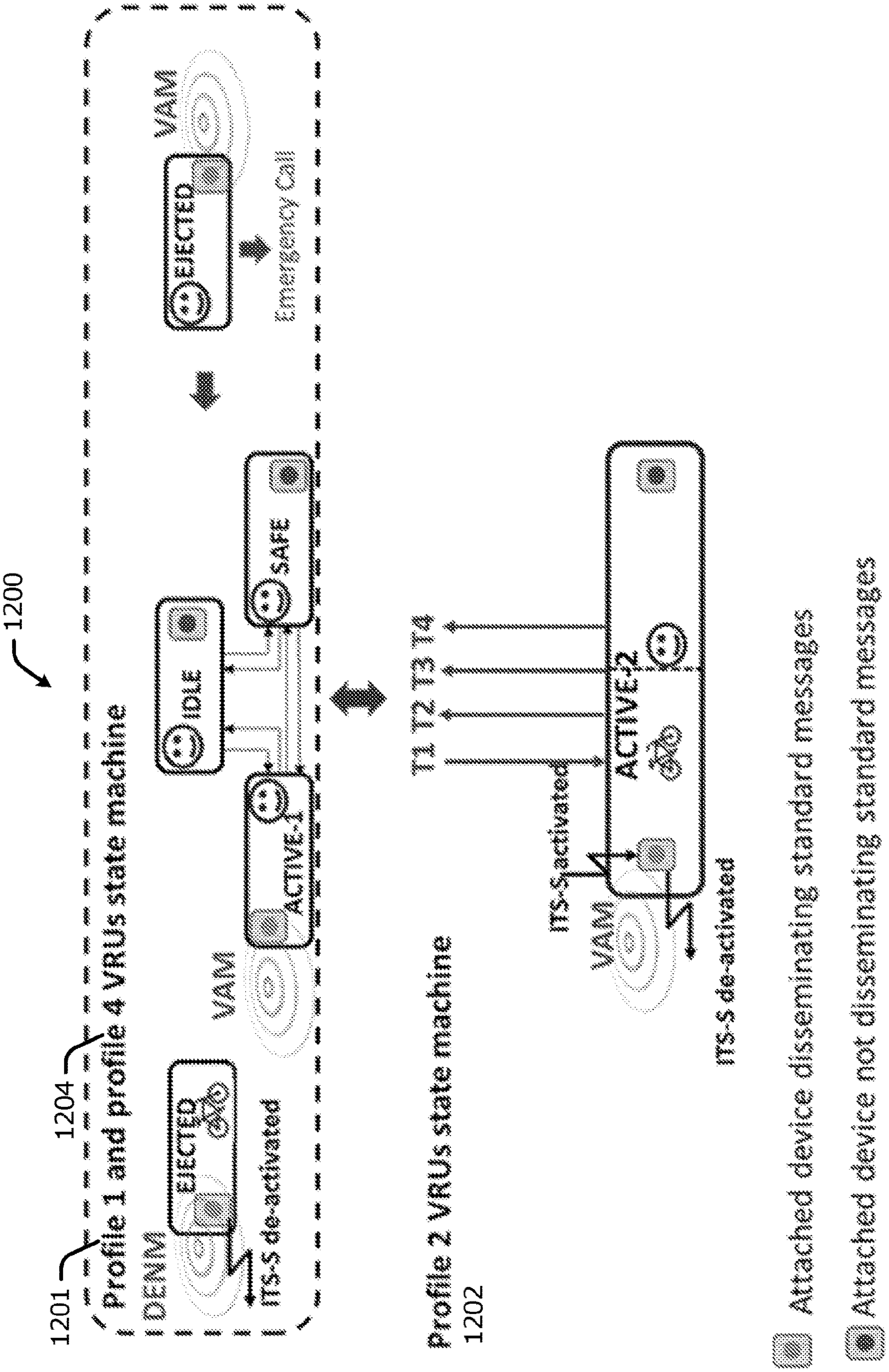
FIG. 12 shows an example of VBS state machines according to various embodiments.

FIG. 12 shows example state machines and transitions 1200 according to various embodiments. In FIG. 12, when a VRU is set as a profile 2 VRU 1202, with multiple attached devices, it is necessary to select an active one. This can be achieved for each attached device at the initialization time (configuration parameter) when the device is activated. In FIG. 12, the device attached to the bicycle has been configured to be active during its combination with the VRU. But when the VRU returns to a profile 1 state 1201, the device attached to the VRU vehicle needs to be deactivated, while the VBS 1021 in the device attached to the VRU transmits again VAMs if not in a protected location.

In the future, profile 2 1202, profile 1 1201, and profile 4 1204 VRUs may become members of a cluster, thus adding to their own state the state machine associated to clustering operation. This means that they need to respect the cluster management requirements while continuing to manage their own states. When transitioning from one state to another, the combined VRU may leave a cluster if it does not comply anymore with its requirements.

The machine states' transitions which are identified in FIG. 12 (e.g., T1 to T4) impact the motion dynamic of the VRU. These transitions are deterministically detected consecutively to VRU decisions or mechanical causes (for example VRU ejection from its VRU vehicle). The identified transitions have the following VRU motion dynamic impacts.

- T1 is a transition from a VRU profile 1 1201 to profile 2 1202. This transition is manually or automatically triggered when the VRU takes the decision to use actively a VRU vehicle (riding). The motion dynamic velocity parameter value of the VRU changes from a low speed (pushing/pulling his VRU vehicle) to a higher speed related to the class of the selected VRU vehicle.
- T2 is a transition from a VRU profile 2 1202 to profile 1 1201. This transition is manually or automatically triggered when the VRU gets off his VRU vehicle and leaves it to become a pedestrian. The motion dynamic velocity parameter value of the VRU changes from a given speed to a lower speed related to the class of the selected VRU vehicle.
- T3 is a transition from a VRU profile 2 1202 to profile 1 1201. This transition is manually or automatically triggered when the VRU gets off his VRU vehicle and pushes/pulls it for example to enter a protected environment (for example tramway, bus, train). The motion dynamic velocity parameter value of the VRU changes from a given speed to a lower speed related to the class of the selected VRU vehicle.
- T4 is a transition from a VRU profile 2 1202 to profile 1 1201. This transition is automatically triggered when a VRU is detected to be ejected from his VRU vehicle. The motion dynamic velocity parameter value of the VRU changes from a given speed to a lower speed related to the VRU state resulting from his ejection. In this case, the VRU vehicle is considered as an obstacle on the road and accordingly should disseminate DENMs until it is removed from the road (its ITS-S is deactivated).

The ejection case can be detected by stability indicators including inertia sensors and the rider competence level derived from its behavior. The stability can then be expressed in terms of the risk level of a complete stability lost. When the risk level is 100% this can be determined as a factual ejection of the VRU.

From the variation of the motion change dynamic velocity parameter value, a new path prediction can be provided from registered "contextual" past path histories (average VRU traces). The contextual aspects consider several parameters which are related to a context similar to the context in which the VRU is evolving.

Adding to the state transitions identified above, which may drastically impact the VRU velocity, the following VRU indications also impact the VRU velocity and/or the VRU trajectory (in addition to the parameters already defined in the VAM).

Stopping indicator. The VRU or an external source (a traffic light being red for the VRU) may indicate that the VRU is stopping for a moment. When this indicator is set, it could also be useful to know the duration of the VRU stop. This duration can be estimated either when provided by an external source (for example the SPATEM information received from a traffic light) or when learned through an analysis of the VRU behavior in similar circumstances.

Visibility indicators. Weather conditions may impact the VRU visibility and accordingly change its motion dynamic. Even if the local vehicles may detect these weather conditions, in some cases, the impact on the VRU could be difficult to estimate by vehicles. A typical example is the following: according to its orientation, a VRU can be disturbed by a severe glare of the sun (for example, in the morning when the sun rises, or in the evening when sun goes down), limiting its speed Referring back to FIG. 10, the N&T layer 1003 provides functionality of the OSI network layer and the OSI transport layer and includes one or more networking protocols, one or more transport protocols, and network and transport layer management. Additionally, aspects of sensor interfaces and communication interfaces may be part of the N&T layer 1003 and access layer 1004. The networking protocols may include, inter alia, IPv4, IPv6, IPv6 networking with mobility support, IPv6 over GeoNetworking, the CALM FAST protocol, and/or the like. The transport protocols may include, inter alia, BOSH, BTP, GRE, GeoNetworking protocol, MPTCP, MPUDP, QUIC, RSVP, SCTP, TCP, UDP, VPN, one or more dedicated ITSC transport protocols, or some other suitable transport protocol. Each of the networking protocols may be connected to a corresponding transport protocol.

The access layer includes a physical layer (PHY) 1004 connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY 1004 and DLL, and a security adaptation entity (SAE) to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (V2X RATs) may be used in various other embodiments.

Figure 15:
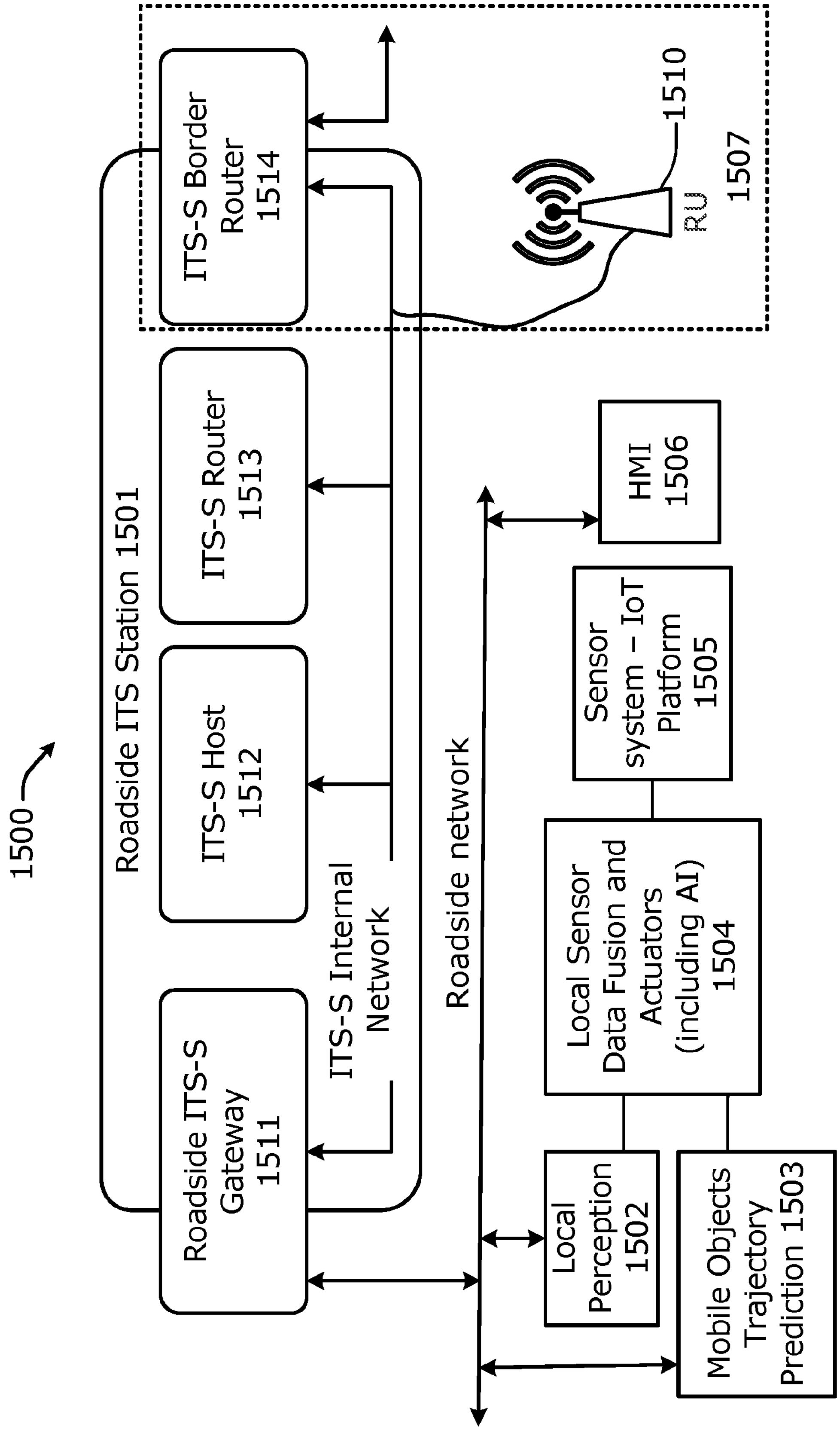
FIG. 15 depicts an example roadside ITS-S in a roadside infrastructure node according to various embodiments.

The ITS-S reference architecture 1000 may be applicable to the elements of FIGS. 13 and 15. The ITS-S gateway 1311, 1511 (see e.g., FIGS. 13 and 15) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 1311, 1511 (see e.g., FIGS. 13 and 15) is capable of converting protocols. This allows an ITS-S to communicate with external elements of the system in which it is implemented. The ITS-S router 1311, 1511 provides the functionality the ITS-S reference architecture 1000 excluding the Applications and Facilities layers. The ITS-S router 1311, 1511 interconnects two different ITS protocol stacks at layer 3. The ITS-S router 1311, 1511 may be capable to convert protocols. One of these protocol stacks typically is connected to the ITS station-internal network. The ITS-S border router 1514 (see e.g., FIG. 15) provides the same functionality as the ITS-S router 1311, 1511, but includes a protocol stack related to an external network that may not follow the management and security principles of ITS (e.g., the ITS Mgmnt and ITS Security layers in FIG. 10).

Additionally, other entities that operate at the same level but are not included in the ITS-S include the relevant users at that level, the relevant HMI (e.g., audio devices, display/touchscreen devices, etc.); when the ITS-S is a vehicle, vehicle motion control for computer-assisted and/or automated vehicles (both HMI and vehicle motion control entities may be triggered by the ITS-S applications); a local device sensor system and IoT Platform that collects and shares IoT data; local device sensor fusion and actuator application(s), which may contain ML/AI and aggregates the data flow issued by the sensor system; local perception and trajectory prediction applications that consume the output of the fusion application and feed the ITS-S applications; and the relevant ITS-S. The sensor system can include one or more cameras, radars, LIDARs, etc., in a V-ITS-S 110 or R-ITS-S 130. In the central station, the sensor system includes sensors that may be located on the side of the road, but directly report their data to the central station, without the involvement of a V-ITS-S 110 or R-ITS-S 130. In some cases, the sensor system may additionally include gyroscope(s), accelerometer(s), and the like (see e.g., sensor circuitry 1772 of FIG. 17). Aspects of these elements are discussed infra with respect to FIGS. 13, 14, and 15

FIG. 13 depicts an example vehicle computing system 1300 according to various embodiments. In this example, the vehicle computing system 1300 includes a V-ITS-S 1301 and Electronic Control Units (ECUs) 1305. The V-ITS-S 1301 includes a V-ITS-S gateway 1311, an ITS-S host 1312, and an ITS-S router 1313. The vehicle ITS-S gateway 1311 provides functionality to connect the components at the in-vehicle network (e.g., ECUs 1305) to the ITS station-internal network. The interface to the in-vehicle components (e.g., ECUs 1305) may be the same or similar as those discussed herein (see e.g., IX 1756 of FIG. 17) and/or may be a proprietary interface/interconnect. Access to components (e.g., ECUs 1305) may be implementation specific. The ECUs 1305 may be the same or similar to the driving control units (DCUs) 174 discussed previously with respect to FIG. 1. The ITS station connects to ITS ad hoc networks via the ITS-S router 1313.

Figure 14:
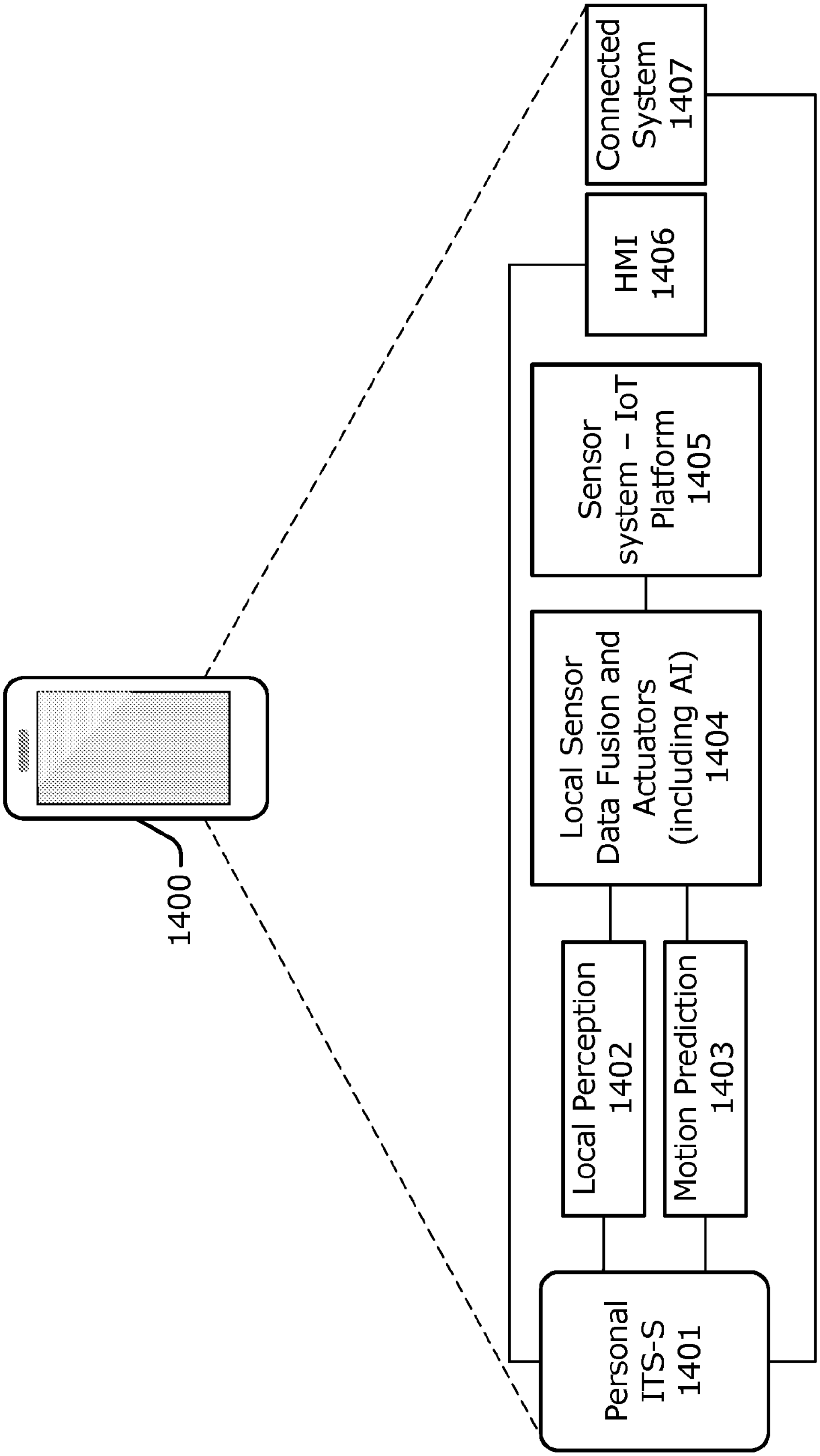
FIG. 14 depicts an example personal ITS station (P-ITS-S), which may be used as a VRU ITS-S according to various embodiments.

FIG. 14 depicts an example personal computing system 1400 according to various embodiments. The personal ITS sub-system 1400 provides the application and communication functionality of ITSC in mobile devices, such as smartphones, tablet computers, wearable devices, PDAs, portable media players, laptops, and/or other mobile devices. The personal ITS sub-system 1400 contains a personal ITS station (P-ITS-S) 1401 and various other entities not included in the P-ITS-S 1401, which are discussed in more detail infra. The device used as a personal ITS station may also perform HMI functionality as part of another ITS sub-system, connecting to the other ITS sub-system via the ITS station-internal network (not shown). For purposes of the present disclosure, the personal ITS sub-system 1400 may be used as a VRU ITS-S 117.

FIG. 15 depicts an example roadside infrastructure system 1500 according to various embodiments. In this example, the roadside infrastructure system 1500 includes an R-ITS-S 1501, output device(s) 1505, sensor(s) 1508, and one or more radio units (RUs) 1510. The R-ITS-S 1501 includes a R-ITS-S gateway 1511, an ITS-S host 1512, an ITS-S router 1513, and an ITS-S border router 1514. The ITS station connects to ITS ad hoc networks and/or ITS access networks via the ITS-S router 1513. The R-ITS-S gateway 1311 provides functionality to connect the components of the roadside system (e.g., output devices 1505 and sensors 1508) at the roadside network to the ITS station-internal network. The interface to the in-vehicle components (e.g., ECUs 1305) may be the same or similar as those discussed herein (see e.g., IX 1606 of FIG. 16, and IX 1756 of FIG. 17) and/or may be a proprietary interface/interconnect. Access to components (e.g., ECUs 1305) may be implementation specific. The sensor(s) 1508 may be inductive loops and/or sensors that are the same or similar to the sensors 172 discussed infra with respect to FIG. 1 and/or sensor circuitry 1772 discussed infra with respect to FIG. 17.

The actuators 1513 are devices that are responsible for moving and controlling a mechanism or system. In various embodiments, the actuators 1513 are used to change the operational state (e.g., on/off, zoom or focus, etc.), position, and/or orientation of the sensors 1508. In some embodiments, the actuators 1513 are used to change the operational state of some other roadside equipment, such as gates, traffic lights, digital signage or variable message signs (VMS), etc. The actuators 1513 are configured to receive control signals from the R-ITS-S 1501 via the roadside network, and convert the signal energy (or some other energy) into an electrical and/or mechanical motion. The control signals may be relatively low energy electric voltage or current. In embodiments, the actuators 1513 comprise electromechanical relays and/or solid state relays, which are configured to switch electronic devices on/off and/or control motors, and/or may be that same or similar or actuators 1774 discussed infra with respect to FIG. 17.

Each of FIGS. 13, 14, and 15 also show entities which operate at the same level but are not included in the ITS-S including the relevant HMI 1306, 1406, and 1506; vehicle motion control 1308 (only at the vehicle level); local device sensor system and IoT Platform 1305, 1405, and 1505; local device sensor fusion and actuator application 1304, 1404, and 1504; local perception and trajectory prediction applications 1302, 1402, and 1502; motion prediction 1303 and 1403, or mobile objects trajectory prediction 1503 (at the RSU level); and connected system 1307, 1407, and 1507.

The local device sensor system and IoT Platform 1305, 1405, and 1505 collects and shares IoT data. The VRU sensor system and IoT Platform 1405 is at least composed of the PoTi management function present in each ITS-S of the system (see e.g., [EN302890-2]). The PoTi entity provides the global time common to all system elements and the real time position of the mobile elements. Local sensors may also be embedded in other mobile elements as well as in the road infrastructure (e.g., camera in a smart traffic light, electronic signage, etc.). An IoT platform, which can be distributed over the system elements, may contribute to provide additional information related to the environment surrounding the VRU system 1400. The sensor system can include one or more cameras, radars, LiDARs, and/or other sensors (see e.g., 1722 of FIG. 17), in a V-ITS-S 110 or R-ITS-S 130. In the VRU device 117/1400, the sensor system may include gyroscope(s), accelerometer(s), and the like (see e.g., 1722 of FIG. 17). In a central station (not shown), the sensor system includes sensors that may be located on the side of the road, but directly report their data to the central station, without the involvement of a V-ITS-S 110 or an R-ITS-S 130.

The (local) sensor data fusion function and/or actuator applications 1304, 1404, and 1504 provides the fusion of local perception data obtained from the VRU sensor system and/or different local sensors. This may include aggregating data flows issued by the sensor system and/or different local sensors. The local sensor fusion and actuator application(s) may contain machine learning (ML)/Artificial Intelligence (AI) algorithms and/or models. Sensor data fusion usually relies on the consistency of its inputs and then to their timestamping, which correspond to a common given time. According to various embodiments, the sensor data fusion and/or ML/AL techniques may be used to determine occupancy values for the DCROM embodiments discussed herein.

Various ML/AI techniques can be used to carry out the sensor data fusion and/or may be used for other purposes, such as the DCROM embodiments discussed herein. In embodiments where the apps 1304, 1404, and 1504 are (or include) AI/ML functions, the apps 1304, 1404, and 1504 may include AI/ML models that have the ability to learn useful information from input data (e.g., context information, etc.) according to supervised learning, unsupervised learning, reinforcement learning (RL), and/or neural network(s) (NN). Separately trained AI/ML models can also be chained together in a AI/ML pipeline during inference or prediction generation.

The input data may include AI/ML training information and/or AI/ML model inference information. The training information includes the data of the ML model including the input (training) data plus labels for supervised training, hyperparameters, parameters, probability distribution data, and other information needed to train a particular AI/ML model. The model inference information is any information or data needed as input for the AI/ML model for inference generation (or making predictions). The data used by an AI/ML model for training and inference may largely overlap, however, these types of information refer to different concepts. The input data is called training data and has a known label or result.

Supervised learning is an ML task that aims to learn a mapping function from the input to the output, given a labeled data set. Examples of supervised learning include regression algorithms (e.g., Linear Regression, Logistic Regression), and the like), instance-based algorithms (e.g., k-nearest neighbor, and the like), Decision Tree Algorithms (e.g., Classification And Regression Tree (CART), Iterative Dichotomiser 3 (ID3), C4.5, chi-square automatic interaction detection (CHAID), etc.), Fuzzy Decision Tree (FDT), and the like), Support Vector Machines (SVM), Bayesian Algorithms (e.g., Bayesian network (BN), a dynamic BN (DBN), Naive Bayes, and the like), and Ensemble Algorithms (e.g., Extreme Gradient Boosting, voting ensemble, bootstrap aggregating ("bagging"), Random Forest and the like). Supervised learning can be further grouped into Regression and Classification problems. Classification is about predicting a label whereas Regression is about predicting a quantity. For unsupervised learning, Input data is not labeled and does not have a known result. Unsupervised learning is an ML task that aims to learn a function to describe a hidden structure from unlabeled data. Some examples of unsupervised learning are K-means clustering and principal component analysis (PCA). Neural networks (NNs) are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), etc.), deep stacking network (DSN), Reinforcement learning (RL) is a goal-oriented learning based on interaction with environment. In RL, an agent aims to optimize a long-term objective by interacting with the environment based on a trial and error process. Examples of RL algorithms include Markov decision process, Markov chain, Q-learning, multi-armed bandit learning, and deep RL.

In one example, the ML/AI techniques are used for object tracking. The object tracking and/or computer vision techniques may include, for example, edge detection, corner detection, blob detection, a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), etc.), a deep learning object detection technique (e.g., fully convolutional neural network (FCNN), region proposal convolution neural network (R-CNN), single shot multibox detector, 'you only look once' (YOLO) algorithm, etc.), and/or the like.

In another example, the ML/AI techniques are used for motion detection based on the y sensor data obtained from the one or more sensors. Additionally or alternatively, the ML/AI techniques are used for object detection and/or classification. The object detection or recognition models may include an enrollment phase and an evaluation phase. During the enrollment phase, one or more features are extracted from the sensor data (e.g., image or video data). A feature is an individual measurable property or characteristic. In the context of object detection, an object feature may include an object size, color, shape, relationship to other objects, and/or any region or portion of an image, such as edges, ridges, corners, blobs, and/or some defined regions of interest (ROI), and/or the like. The features used may be implementation specific, and may be based on, for example, the objects to be detected and the model(s) to be developed and/or used. The evaluation phase involves identifying or classifying objects by comparing obtained image data with existing object models created during the enrollment phase. During the evaluation phase, features extracted from the image data are compared to the object identification models using a suitable pattern recognition technique. The object models may be qualitative or functional descriptions, geometric surface information, and/or abstract feature vectors, and may be stored in a suitable database that is organized using some type of indexing scheme to facilitate elimination of unlikely object candidates from consideration.

For any of the embodiments discussed herein, any suitable data fusion or data integration technique(s) may be used to generate the composite information. For example, the data fusion technique may be a direct fusion technique or an indirect fusion technique. Direct fusion combines data acquired directly from multiple vUEs or sensors, which may be the same or similar (e.g., all vUEs or sensors perform the same type of measurement) or different (e.g., different vUE or sensor types, historical data, etc.). Indirect fusion utilizes historical data and/or known properties of the environment and/or human inputs to produce a refined data set. Additionally, the data fusion technique may include one or more fusion algorithms, such as a smoothing algorithm (e.g., estimating a value using multiple measurements in real-time or not in real-time), a filtering algorithm (e.g., estimating an entity's state with current and past measurements in real-time), and/or a prediction state estimation algorithm (e.g., analyzing historical data (e.g., geolocation, speed, direction, and signal measurements) in real-time to predict a state (e.g., a future signal strength/quality at a particular geolocation coordinate)). As examples, the data fusion algorithm may be or include a structured-based algorithm (e.g., tree-based (e.g., Minimum Spanning Tree (MST)), cluster-based, grid and/or centralized-based), a structure-free data fusion algorithm, a Kalman filter algorithm and/or Extended Kalman Filtering, a fuzzy-based data fusion algorithm, an Ant Colony Optimization (ACO) algorithm, a fault detection algorithm, a Dempster-Shafer (D-S) argumentation-based algorithm, a Gaussian Mixture Model algorithm, a triangulation based fusion algorithm, and/or any other like data fusion algorithm A local perception function (which may or may not include trajectory prediction application(s)) 1302, 1402, and 1502 is provided by the local processing of information collected by local sensor(s) associated to the system element. The local perception (and trajectory prediction) function 1302, 1402, and 1502 consumes the output of the sensor data fusion application/function 1304, 1404, and 1504 and feeds ITS-S applications with the perception data (and/or trajectory predictions). The local perception (and trajectory prediction) function 1302, 1402, and 1502 detects and characterize objects (static and mobile) which are likely to cross the trajectory of the considered moving objects. The infrastructure, and particularly the road infrastructure 1500, may offer services relevant to the VRU support service. The infrastructure may have its own sensors detecting VRUs 116/117 evolutions and then computing a risk of collision if also detecting local vehicles' evolutions, either directly via its own sensors or remotely via a cooperative perception supporting services such as the CPS (see e.g., ETSI TR 103 562). Additionally, road marking (e.g., zebra areas or crosswalks) and vertical signs may be considered to increase the confidence level associated with the VRU detection and mobility since VRUs 116/117 usually have to respect these marking/signs.

The motion dynamic prediction function 1303 and 1403, and the mobile objects trajectory prediction 1503 (at the RSU level), are related to the behavior prediction of the considered moving objects. In some embodiments, the motion dynamic prediction function 1303 and 1403 predict the trajectory of the vehicle 110 and the VRU 116, respectively. In some embodiments, the motion dynamic prediction function 1303 may be part of the VRU Trajectory and Behavioral Modeling module and trajectory interception module of the V-ITS-S 110. In some embodiments, the motion dynamic prediction function 1403 may be part of the dead reckoning module and/or the movement detection module of the VRU ITS-S 117. Alternatively, the motion dynamic prediction functions 1303 and 1403 may provide motion/movement predictions to the aforementioned modules. Additionally or alternatively, the mobile objects trajectory prediction 1503 predict respective trajectories of corresponding vehicles 110 and VRUs 116, which may be used to assist the VRU ITS-S 117 in performing dead reckoning and/or assist the V-ITS-S 110 with VRU Trajectory and Behavioral Modeling entity.

Motion dynamic prediction includes a moving object trajectory resulting from evolution of the successive mobile positions. A change of the moving object trajectory or of the moving object velocity (acceleration/deceleration) impacts the motion dynamic prediction. In most cases, when VRUs 116/117 are moving, they still have a large amount of possible motion dynamics in terms of possible trajectories and velocities. This means that motion dynamic prediction 1303, 1403, 1503 is used to identify which motion dynamic will be selected by the VRU 116 as quickly as possible, and if this selected motion dynamic is subject to a risk of collision with another VRU or a vehicle.

The motion dynamic prediction functions 1303, 1403, 1503 analyze the evolution of mobile objects and the potential trajectories that may meet at a given time to determine a risk of collision between them. The motion dynamic prediction works on the output of cooperative perception considering the current trajectories of considered device (e.g., VRU device 117) for the computation of the path prediction; the current velocities and their past evolutions for the considered mobiles for the computation of the velocity evolution prediction; and the reliability level which can be associated to these variables. The output of this function is provided to the risk analysis function (see e.g., FIG. 10).

In many cases, working only on the output of the cooperative perception is not sufficient to make a reliable prediction because of the uncertainty which exists in terms of VRU trajectory selection and its velocity. However, complementary functions may assist in increasing consistently the reliability of the prediction. For example, the use of the device (e.g., VRU device 117) navigation system, which provides assistance to the user (e.g., VRU 116) to select the best trajectory for reaching its planned destination. With the development of Mobility as a Service (MaaS), multimodal itinerary computation may also indicate to the VRU 116 dangerous areas and then assist to the motion dynamic prediction at the level of the multimodal itinerary provided by the system. In another example, the knowledge of the user (e.g., VRU 116) habits and behaviors may be additionally or alternatively used to improve the consistency and the reliability of the motion predictions. Some users (e.g., VRUs 116/117) follow the same itineraries, using similar motion dynamics, for example when going to the main Point of Interest (POI), which is related to their main activities (e.g., going to school, going to work, doing some shopping, going to the nearest public transport station from their home, going to sport center, etc.). The device (e.g., VRU device 117) or a remote service center may learn and memorize these habits. In another example, the indication by the user (e.g., VRU 116) itself of its selected trajectory in particular when changing it (e.g., using a right turn or left turn signal similar to vehicles when indicating a change of direction).

The vehicle motion control 1308 may be included for computer-assisted and/or automated vehicles 110. Both the HMI entity 1306 and vehicle motion control entity 1308 may be triggered by one or more ITS-S applications. The vehicle motion control entity 1308 may be a function under the responsibility of a human driver or of the vehicle if it is able to drive in automated mode.

The Human Machine Interface (HMI) 1306, 1406, and 1506, when present, enables the configuration of initial data (parameters) in the management entities (e.g., VRU profile management) and in other functions (e.g., VBS management). The HMI 1306, 1406, and 1506 enables communication of external events related to the VBS to the device owner (user), including the alerting about an immediate risk of collision (TTC<2 s) detected by at least one element of the system and signaling a risk of collision (e.g., TTC>2 seconds) being detected by at least one element of the system. For a VRU system 117 (e.g., personal computing system 1400), similar to a vehicle driver, the HMI provides the information to the VRU 116, considering its profile (e.g., for a blind person, the information is presented with a clear sound level using accessibility capabilities of the particular platform of the personal computing system 1400). In various implementations, the HMI 1306, 1406, and 1506 may be part of the alerting system.

The connected systems 1307, 1407, and 1507 refer to components/devices used to connect a system with one or more other systems. As examples, the connected systems 1307, 1407, and 1507 may include communication circuitry and/or radio units. The VRU system 1400 may be a connected system made of up to 4 different levels of equipment. The VRU system 1400 may also be an information system which collects, in real time, information resulting from events, processes the collected information and stores them together with processed results. At each level of the VRU system 1400, the information collection, processing and storage is related to the functional and data distribution scenario which is implemented.

3. Computing System and Hardware Configurations

Figure 16:
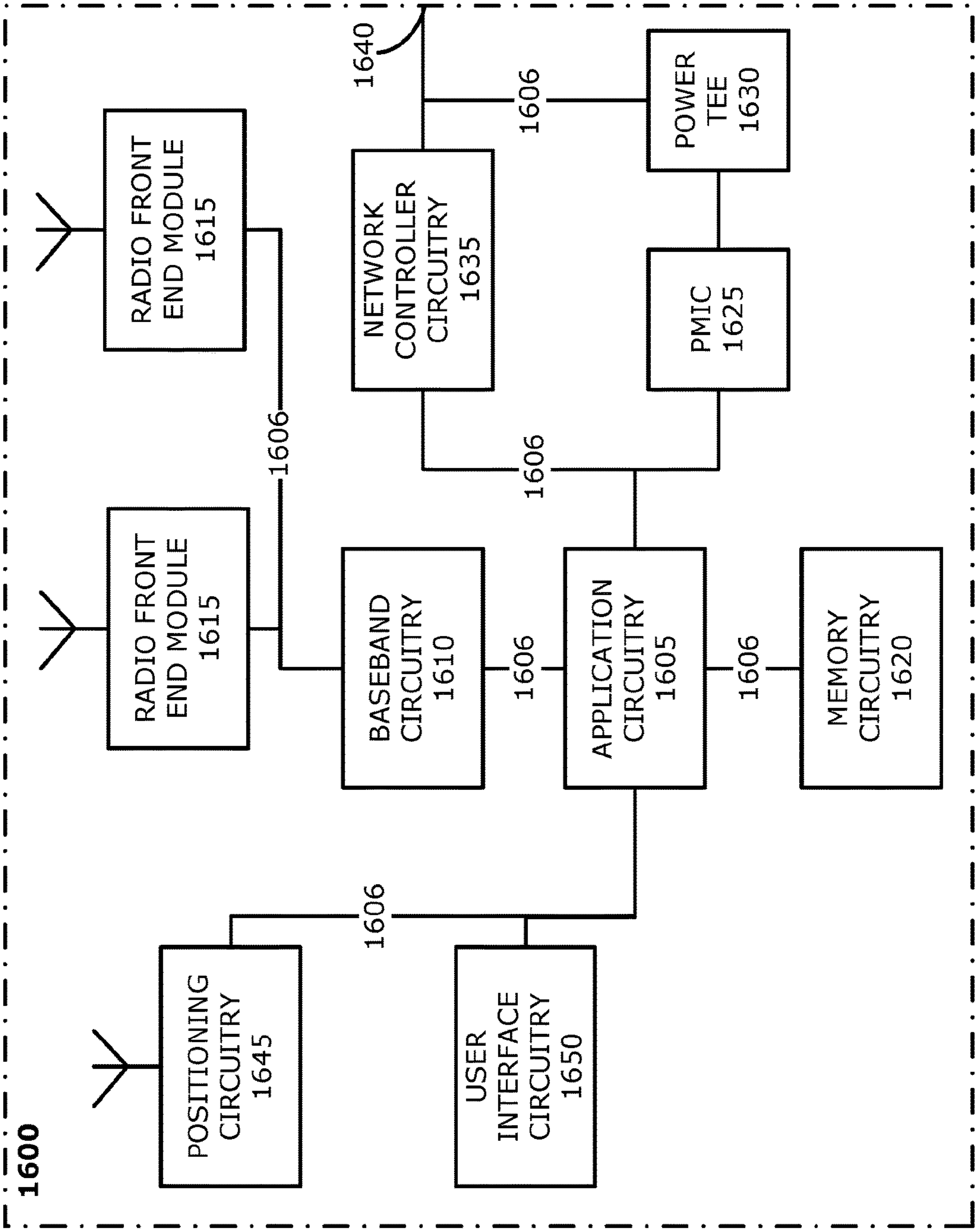
FIGS. 16 and 17 depict example components of various compute nodes in edge computing system(s).
Figure 17:
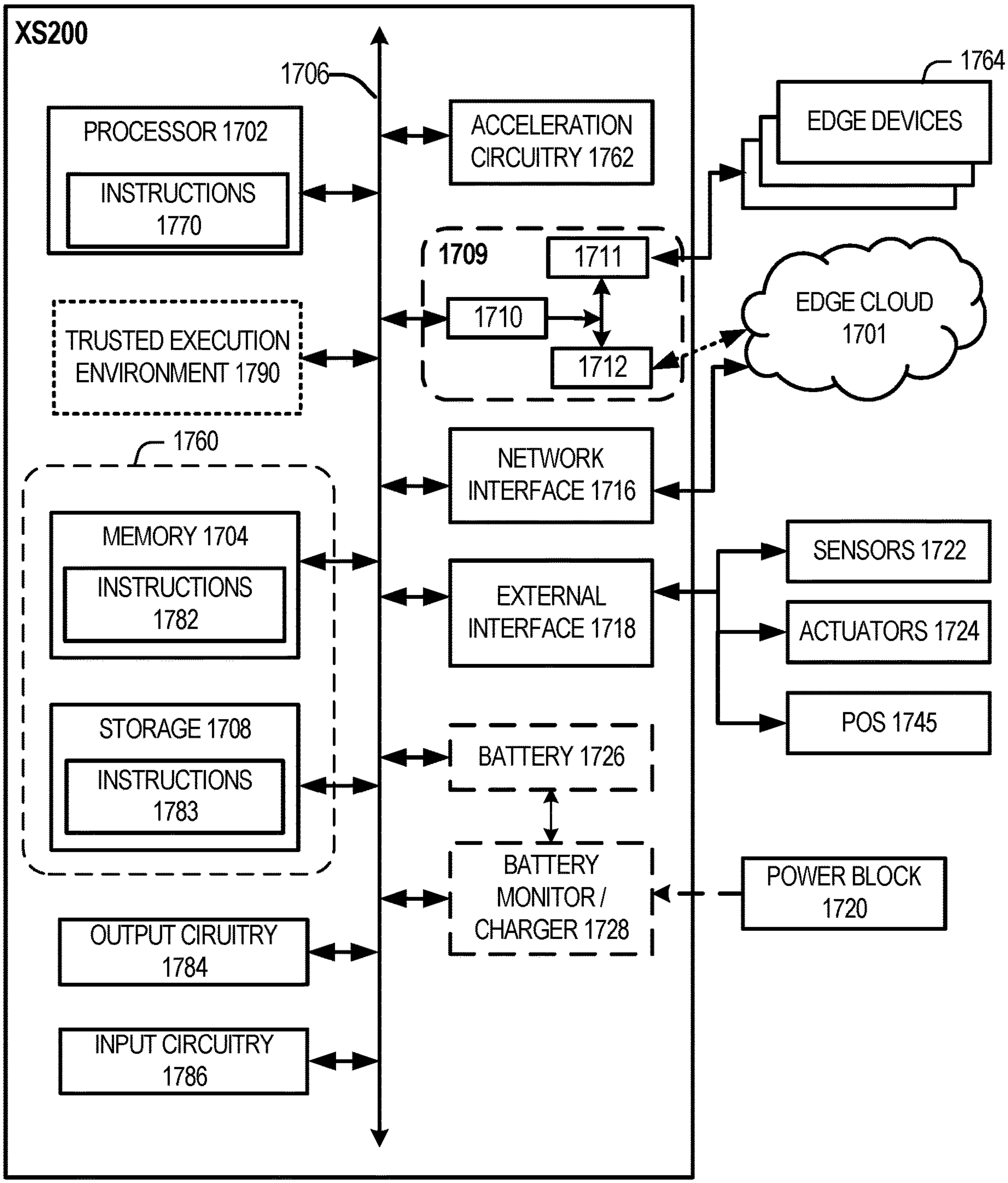

FIGS. 16 and 17 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

FIG. 16 illustrates an example of infrastructure equipment 1600 in accordance with various embodiments. The infrastructure equipment 1600 (or "system 1600") may be implemented as a base station, road side unit (RSU), roadside ITS-S (R-ITS-S 130), radio head, relay station, server, gateway, and/or any other element/device discussed herein.

The system 1600 includes application circuitry 1605, baseband circuitry 1610, one or more radio front end modules (RFEMs) 1615, memory circuitry 1620, power management integrated circuitry (PMIC) 1625, power tee circuitry 1630, network controller circuitry 1635, network interface connector 1640, positioning circuitry 1645, and user interface 1650. In some embodiments, the device 1600 may include additional elements such as, for example, memory/storage, display, camera, sensor, or IO interface. In other embodiments, the components described below may be included in more than one device. For example, said circuitries may be separately included in more than one device for CRAN, CR, vBBU, or other like implementations.

Application circuitry 1605 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1605 may be coupled with or may include memory/storage elements and may be configured to execute instructions stored in the memory/storage to enable various applications or operating systems to run on the system 1600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1605 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 1605 may comprise, or may be, a special-purpose processor/controller to operate according to the various embodiments herein. As examples, the processor(s) of application circuitry 1605 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1600 may not utilize application circuitry 1605, and instead may include a special-purpose processor/controller to process IP data received from an EPC or 5GC, for example.

In some implementations, the application circuitry 1605 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 1605 may comprise logic blocks or logic fabric, and other interconnected resources that may be programmed to perform various functions, such as the procedures, methods, functions, etc. of the various embodiments discussed herein. In such embodiments, the circuitry of application circuitry 1605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 130, intermediate nodes 120, and/or endpoints 110 of FIG. XS1 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1605 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating coprocessor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 1610 may be implemented, for example, as a solder-down substrate including one or more integrated circuits, a single packaged integrated circuit soldered to a main circuit board or a multi-chip module containing two or more integrated circuits. The baseband circuitry 1610 includes one or more processing devices (e.g., baseband processors) to carry out various protocol and radio control functions. Baseband circuitry 1610 may interface with application circuitry of system 1600 for generation and processing of baseband signals and for controlling operations of the RFEMs 1615. The baseband circuitry 1610 may handle various radio control functions that enable communication with one or more radio networks via the RFEMs 1615. The baseband circuitry 1610 may include circuitry such as, but not limited to, one or more single-core or multi-core processors (e.g., one or more baseband processors) or control logic to process baseband signals received from a receive signal path of the RFEMs 1615, and to generate baseband signals to be provided to the RFEMs 1615 via a transmit signal path. In various embodiments, the baseband circuitry 1610 may implement a real-time OS (RTOS) to manage resources of the baseband circuitry 1610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 16, in one embodiment, the baseband circuitry 1610 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1615 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1615 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1610 and/or RFEMs 1615. The baseband circuitry 1610 may also support radio communications for more than one wireless protocol.

Continuing with the aforementioned embodiment, the baseband circuitry 1610 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions, etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1650 may include one or more user interfaces designed to enable user interaction with the system 1600 or peripheral component interfaces designed to enable peripheral component interaction with the system 1600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1615, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1610 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1620 may be implemented as one or more of solder down packaged integrated circuits, socketed memory modules and plug-in memory cards.

The memory circuitry 1620 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1600, an operating system of infrastructure equipment 1600, one or more applications, and/or for carrying out the embodiments discussed herein. The computational logic may be stored or loaded into memory circuitry 1620 as instructions for execution by the processors of the application circuitry 1605 to provide or perform the functions described herein. The various elements may be implemented by assembler instructions supported by processors of the application circuitry 1605 or high-level languages that may be compiled into such instructions. The permanent copy of the programming instructions may be placed into persistent storage devices of memory circuitry 1620 in the factory during manufacture, or in the field through, for example, a distribution medium (not shown), through a communication interface (e.g., from a distribution server), and/or over-the-air (OTA).

As discussed in more detail infra, infrastructure equipment 1600 may be configured to support a particular V2X RAT based on the number of vUEs 121 that support (or are capable to communicate) the particular V2X RAT. In embodiments, the memory circuitry 1620 may store a RAT configuration control module to control the (re)configuration of the infrastructure equipment 1600 to support a particular RAT and/or V2X RAT. The configuration control module provides an interface for triggering (re)configuration actions. In some embodiments, the memory circuitry 1620 may also store a RAT software (SW) management module to implement SW loading or provisioning procedures, and (de)activation SW in the infrastructure equipment 1600. In either of these embodiments, the memory circuitry 1620 may store a plurality of V2X RAT software components, each of which include program code, instructions, modules, assemblies, packages, protocol stacks, software engine(s), etc., for operating the infrastructure equipment 1600 or components thereof (e.g., RFEMs 1615) according to a corresponding V2X RAT. When a V2X RAT component is configured or executed by the application circuitry 1605 and/or the baseband circuitry 1610, the infrastructure equipment 1600 operates according to the V2X RAT component.

In a first example, a first V2X RAT component may be an C-V2X component, which includes LTE and/or C-V2X protocol stacks that allow the infrastructure equipment 1600 to support C-V2X and/or provide radio time/frequency resources according to LTE and/or C-V2X standards. Such protocol stacks may include a control plane protocol stack including a Non-Access Stratum (NAS), Radio Resource Control (RRC), Packet Data Convergence Protocol (PDCP), Radio Link Control (RLC), Media Access Control (MAC), and Physical (PHY) layer entities; and a user plane protocol stack including General Packet Radio Service (GPRS) Tunneling Protocol for the user plane layer (GTP-U), User Datagram Protocol (UDP), Internet Protocol (IP), PDCP, RLC, MAC, and PHY layer entities. These control plane and user plane protocol entities are discussed in more detail in 3GPP TS 36.300 and/or 3GPP TS 38.300, as well as other 3GPP specifications. In some embodiments, the IP layer entity may be replaced with an Allocation and Retention Priority (ARP) layer entity or some other non-IP protocol layer entity. Some or all of the aforementioned protocol layer entities may be "relay" versions depending on whether the infrastructure equipment 1600 is acting as a relay. In some embodiments, the user plane protocol stack may be the PC5 user plane (PC5-U) protocol stack discussed in 3GPP TS 23.303 v15.1.0 (2018-06).

In a second example, a second V2X RAT component may be a ITS-G5 component, which includes ITS-G5 (IEEE 802.11p) and/or Wireless Access in Vehicular Environments (WAVE) (IEEE 1609.4) protocol stacks, among others, that allow the infrastructure equipment to support ITS-G5 communications and/or provide radio time-frequency resources according to ITS-G5 and/or other WiFi standards. The ITS-G5 and WAVE protocol stacks include, inter alia, a DSRC/WAVE PHY and MAC layer entities that are based on the IEEE 802.11p protocol. The DSRC/WAVE PHY layer is responsible for obtaining data for transmitting over ITS-G5 channels from higher layers, as well as receiving raw data over the ITS-G5 channels and providing data to upper layers. The MAC layer organizes the data packets into network frames. The MAC layer may be split into a lower DSRC/WAVE MAC layer based on IEEE 802.11p and an upper WAVE MAC layer (or a WAVE multi-channel layer) based on IEEE 1609.4. IEEE 1609 builds on IEEE 802.11p and defines one or more of the other higher layers. The ITS-G5 component may also include a logical link control (LLC) layer entity to perform layer 3 (L3) multiplexing and demultiplexing operations. The LLC layer (e.g., IEEE 802.2) allows multiple network L3 protocols to communicate over the same physical link by allowing the L3 protocols to be specified in LLC fields.

In addition to the V2X RAT components, the memory circuitry 1620 may also store a RAT translation component, which is a software engine, API, library, object(s), engine(s), or other functional unit for providing translation services to vUEs 121 that are equipped with different V2X capabilities. For example, the RAT translation component, when configured or executed, may cause the infrastructure equipment 1600 to convert or translate a first message obtained according to the first V2X RAT (e.g., C-V2X) into a second message for transmission using a second V2X RAT (e.g., ITS-G5). In one example, the RAT translation component may perform the translation or conversion by extracting data from one or more fields of the first message and inserting the extracted data into corresponding fields of the second message. Other translation/conversion methods may also be used in other embodiments. In some embodiments, the RAT translation component may employ a suitable translator for translating one or more source messages in a source format into one or more target messages in a target format, and may utilize any suitable compilation strategies for the translation. The translator may also have different implementations depending on the type of V2X RATs that are supported by the infrastructure equipment 1600 (e.g., memory map, instruction set, programming model, etc.).

The PMIC 1625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 1600 using a single cable.

The network controller circuitry 1635 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 1600 via network interface connector 1640 using a physical connection, which may be electrical (commonly referred to as a "copper interconnect"), optical, or wireless. The network controller circuitry 1635 may include one or more dedicated processors and/or FPGAs to communicate using one or more of the aforementioned protocols. In some implementations, the network controller circuitry 1635 may include multiple controllers to provide connectivity to other networks using the same or different protocols. In various embodiments, the network controller circuitry 1635 enables communication with associated equipment and/or with a backend system (e.g., server(s), core network, cloud service, etc.), which may take place via a suitable gateway device.

The positioning circuitry 1645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-Technology for Positioning, Navigation, and Timing (Micro-PNT) IC that uses a master timing clock to perform position tracking/estimation without GNSS assistance. The positioning circuitry 1645 may also be part of, or interact with, the baseband circuitry 1610 and/or RFEMs 1615 to communicate with the nodes and components of the positioning network. The positioning circuitry 1645 may also provide position data and/or time data to the application circuitry 1605, which may use the data to synchronize operations with various other infrastructure equipment, or the like.

The components shown by FIG. 3 may communicate with one another using interface circuitry 306 or interconnect (IX) 1606, which may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

FIG. 17 illustrates an example of components that may be present in an edge computing node 1750 for implementing the techniques (e.g., operations, processes, methods, and methodologies) described herein. This edge computing node 1750 provides a closer view of the respective components of node 1700 when implemented as or as part of a computing device (e.g., as a mobile device, a base station, server, gateway, etc.). The edge computing node 1750 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 1750, or as components otherwise incorporated within a chassis of a larger system.

The edge computing node 1750 includes processing circuitry in the form of one or more processors 1752. The processor circuitry 1752 includes circuitry such as, but not limited to one or more processor cores and one or more of cache memory, low drop-out voltage regulators (LDOs), interrupt controllers, serial interfaces such as SPI, $I^2C$ or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1752 may include one or more hardware accelerators (e.g., same or similar to acceleration circuitry 1764), which may be microprocessors, programmable processing devices (e.g., FPGA, ASIC, etc.), or the like. The one or more accelerators may include, for example, computer vision and/or deep learning accelerators. In some implementations, the processor circuitry 1752 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1752 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1752 may be coupled with or may include memory/storage and may be configured to execute instructions stored in the memory/storage to enable various applications or operating systems to run on the node 1750. The processors (or cores) 1752 is configured to operate application software to provide a specific service to a user of the node 1750. In some embodiments, the processor(s) 1752 may be a special-purpose processor(s)/controller(s) configured (or configurable) to operate according to the various embodiments herein.

As examples, the processor(s) 1752 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1752 may be a part of a system on a chip (SoC), System-in-Package (SiP), a multi-chip package (MCP), and/or the like, in which the processor(s) 1752 and other components are formed into a single integrated circuit, or a single package, such as the Edison™ or Galileo™ SoC boards from Intel® Corporation. Other examples of the processor(s) 1752 are mentioned elsewhere in the present disclosure.

The processor(s) 1752 may communicate with system memory 1754 over an interconnect (IX) 1756. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1758 may also couple to the processor 1752 via the IX 1756. In an example, the storage 1758 may be implemented via a solid-state disk drive (SSDD) and/or high-speed electrically erasable memory (commonly referred to as "flash memory"). Other devices that may be used for the storage 1758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1754 and/or storage circuitry 1758 may also incorporate three-dimensional (3D) cross-point (XPOINT) memories from Intel® and Micron®.

In low power implementations, the storage 1758 may be on-die memory or registers associated with the processor 1752. However, in some examples, the storage 1658 may be implemented using a micro hard disk drive (HDD). Further, any number of new technologies may be used for the storage 1758 in addition to, or instead of, the technologies described, such resistance change memories, phase change memories, holographic memories, or chemical memories, among others.

The storage circuitry 1758 store computational logic 1782 (or "modules 1782") in the form of software, firmware, or hardware commands to implement the techniques described herein. The computational logic 1782 may be employed to store working copies and/or permanent copies of computer programs, or data to create the computer programs, for the operation of various components of node 1750 (e.g., drivers, etc.), an OS of node 1750 and/or one or more applications for carrying out the embodiments discussed herein. The computational logic 1782 may be stored or loaded into memory circuitry 1754 as instructions 1782, or data to create the instructions 1788, for execution by the processor circuitry 1752 to provide the functions described herein. The various elements may be implemented by assembler instructions supported by processor circuitry 1752 or high-level languages that may be compiled into such instructions (e.g., instructions 1788, or data to create the instructions 1788). The permanent copy of the programming instructions may be placed into persistent storage devices of storage circuitry 1758 in the factory or in the field through, for example, a distribution medium (not shown), through a communication interface (e.g., from a distribution server (not shown)), or over-the-air (OTA).

In an example, the instructions 1788 provided via the memory circuitry 1754 and/or the storage circuitry 1758 of FIG. 17 are embodied as one or more non-transitory computer readable storage media (see e.g., NTCRSM 1760) including program code, a computer program product or data to create the computer program, with the computer program or data, to direct the processor circuitry 1758 of node 1750 to perform electronic operations in the node 1750, and/or to perform a specific sequence or flow of actions, for example, as described with respect to the flowchart(s) and block diagram(s) of operations and functionality depicted previously. The processor circuitry 1752 accesses the one or more non-transitory computer readable storage media over the interconnect 1756.

In alternate embodiments, programming instructions (or data to create the instructions) may be disposed on multiple NTCRSM 1760. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1760 may be embodied by devices described for the storage circuitry 1758 and/or memory circuitry 1754. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1782, instructions 1782, instructions 1788 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1750, partly on the system 1750, as a stand-alone software package, partly on the system 1750 and partly on a remote computer or entirely on the remote computer or server. In the latter scenario, the remote computer may be connected to the system 1750 through any type of network, including a LAN or WAN, or the connection may be made to an external computer (e.g., through the Internet using an Internet Service Provider).

In an example, the instructions 1788 on the processor circuitry 1752 (separately, or in combination with the instructions 1782 and/or logic/modules 1782 stored in computer-readable storage media) may configure execution or operation of a trusted execution environment (TEE) 1790. The TEE 1790 operates as a protected area accessible to the processor circuitry 1752 to enable secure access to data and secure execution of instructions. In some embodiments, the TEE 1790 may be a physical hardware device that is separate from other components of the system 1750 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 1790 may be implemented as secure enclaves, which are isolated regions of code and/or data within the processor and/or memory/storage circuitry of the system 1750. Only code executed within a secure enclave may access data within the same secure enclave, and the secure enclave may only be accessible using the secure application (which may be implemented by an application processor or a tamper-resistant microcontroller). Various implementations of the TEE 1750, and an accompanying secure area in the processor circuitry 1752 or the memory circuitry 1754 and/or storage circuitry 1758 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1750 through the TEE 1790 and the processor circuitry 1752.

In some embodiments, the memory circuitry 1754 and/or storage circuitry 1758 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1754 and/or storage circuitry 1758 may be divided into one or more trusted memory regions for storing applications or software modules of the TEE 1790.

Although the instructions 1782 are shown as code blocks included in the memory circuitry 1754 and the computational logic 1782 is shown as code blocks in the storage circuitry 1758, it should be understood that any of the code blocks may be replaced with hardwired circuits, for example, built into an FPGA, ASIC, or some other suitable circuitry. For example, where processor circuitry 1752 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1754 and/or storage circuitry 1758 may store program code of an operating system (OS), which may be a general purpose OS or an OS specifically written for and tailored to the computing node 1750. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOSR provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the node 1750, attached to the node 1750, or otherwise communicatively coupled with the node 1750. The drivers may include individual drivers allowing other components of the node 1750 to interact or control various I/O devices that may be present within, or connected to, the node 1750. For example, the drivers may include a display driver to control and allow access to a display device, a touchscreen driver to control and allow access to a touchscreen interface of the node 1750, sensor drivers to obtain sensor readings of sensor circuitry 1772 and control and allow access to sensor circuitry 1772, actuator drivers to obtain actuator positions of the actuators 1774 and/or control and allow access to the actuators 1774, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the node 1750 (not shown).

The components of edge computing device 1750 may communicate over the IX 1756. The IX 1756 may include any number of technologies, including ISA, extended ISA, VC, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 1756 may be a proprietary bus, for example, used in a SoC based system.

The IX 1756 couples the processor 1752 to communication circuitry 1766 for communications with other devices, such as a remote server (not shown) and/or the connected edge devices 1762. The communication circuitry 1766 is a hardware element, or collection of hardware elements, used to communicate over one or more networks (e.g., cloud 1763) and/or with other devices (e.g., edge devices 1762).

The transceiver 1766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1762. For example, a wireless local area network (WLAN) unit may be used to implement WiFi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1766 (or multiple transceivers) may communicate using multiple standards or radios for communications at a different range. For example, the edge computing node 1750 may communicate with close devices, e.g., within about 10 meters, using a local transceiver based on BLE, or another low power radio, to save power. More distant connected edge devices 1762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1766 (e.g., a radio transceiver) may be included to communicate with devices or services in the edge cloud 1763 via local or wide area network protocols. The wireless network transceiver 1766 may be an LPWA transceiver that follows the IEEE 802.15.4, or IEEE 802.15.4g standards, among others. The edge computing node 1763 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1766, as described herein. For example, the transceiver 1766 may include a cellular transceiver that uses spread spectrum (SPA/SAS) communications for implementing high-speed communications. Further, any number of other protocols may be used, such as WiFi® networks for medium speed communications and provision of network communications. The transceiver 1766 may include radios that are compatible with any number of 3GPP specifications, such as LTE and 5G/NR communication systems, discussed in further detail at the end of the present disclosure. A network interface controller (NIC) 1768 may be included to provide a wired communication to nodes of the edge cloud 1763 or to other devices, such as the connected edge devices 1762 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 1768 may be included to enable connecting to a second network, for example, a first NIC 1768 providing communications to the cloud over Ethernet, and a second NIC 1768 providing communications to other devices over another type of network.

Given the variety of types of applicable communications from the device to another component or network, applicable communications circuitry used by the device may include or be embodied by any one or more of components 1764, 1766, 171668, or 1770. Accordingly, in various examples, applicable means for communicating (e.g., receiving, transmitting, etc.) may be embodied by such communications circuitry.

The edge computing node 1750 may include or be coupled to acceleration circuitry 1764, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1764 may comprise logic blocks or logic fabric and other interconnected resources that may be programmed (configured) to perform various functions, such as the procedures, methods, functions, etc. of the various embodiments discussed herein. In such implementations, the acceleration circuitry 1764 may also include memory cells (e.g., EPROM, EEPROM, flash memory, static memory (e.g., SRAM, anti-fuses, etc.) used to store logic blocks, logic fabric, data, etc. in LUTs and the like.

The IX 1756 also couples the processor 1752 to a sensor hub or external interface 1770 that is used to connect additional devices or subsystems. The additional/external devices may include sensors 1772, actuators 1774, and positioning circuitry 1745.

The sensor circuitry 1772 includes devices, modules, or subsystems whose purpose is to detect events or changes in its environment and send the information (sensor data) about the detected events to some other a device, module, subsystem, etc. Examples of such sensors 1772 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

Additionally or alternatively, some of the sensors 172 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 172 may include other sensors such as an accelerator pedal position sensor (APP), accelerometers, magnetometers, level sensors, flow/fluid sensors, barometric pressure sensors, and the like. Sensor data from sensors 172 of the host vehicle may include engine sensor data collected by various engine sensors (e.g., engine temperature, oil pressure, and so forth).

The actuators 1774, allow node 1750 to change its state, position, and/or orientation, or move or control a mechanism or system. The actuators 1774 comprise electrical and/or mechanical devices for moving or controlling a mechanism or system, and converts energy (e.g., electric current or moving air and/or liquid) into some kind of motion. The actuators 1774 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1774 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The node 1750 may be configured to operate one or more actuators 1774 based on one or more captured events and/or instructions or control signals received from a service provider and/or various client systems In embodiments, the actuators 1774 may be driving control units (e.g., DCUs 174 of FIG. 1), Examples of DCUs 1774 include a Drivetrain Control Unit, an Engine Control Unit (ECU), an Engine Control Module (ECM), EEMS, a Powertrain Control Module (PCM), a Transmission Control Module (TCM), a Brake Control Module (BCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System, a Portable Emissions Measurement Systems (PEMS), an evasive maneuver assist (EMA) module/system, and/or any other entity or node in a vehicle system. Examples of the CSD that may be generated by the DCUs 174 may include, but are not limited to, real-time calculated engine load values from an engine control module (ECM), such as engine revolutions per minute (RPM) of an engine of the vehicle; fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the ECM by a transmission control unit (TCU)); and/or the like.

In vehicular embodiments, the actuators/DCUs 1774 may be provisioned with control system configurations (CSCs), which are collections of software modules, software components, logic blocks, parameters, calibrations, variants, etc. used to control and/or monitor various systems implemented by node 1750 (e.g., when node 1750 is a CA/AD vehicle 110). The CSCs define how the DCUs 1774 are to interpret sensor data of sensors 1772 and/or CSD of other DCUs 1774 using multidimensional performance maps or lookup tables, and define how actuators/components are to be adjust/modified based on the sensor data. The CSCs and/or the software components to be executed by individual DCUs 1774 may be developed using any suitable object-oriented programming language (e.g., C, C++, Java, etc.), schema language (e.g., XML schema, AUTomotive Open System Architecture (AUTOSAR) XML schema, etc.), scripting language (VBScript, JavaScript, etc.), or the like. the CSCs and software components may be defined using a hardware description language (HDL), such as register-transfer logic (RTL), very high speed integrated circuit (VHSIC) HDL (VHDL), Verilog, etc. for DCUs 1774 that are implemented as field-programmable devices (FPDs). The CSCs and software components may be generated using a modeling environment or model-based development tools. According to various embodiments, the CSCs may be generated or updated by one or more autonomous software agents and/or AI agents based on learnt experiences, ODDs, and/or other like parameters. In another example, in embodiments where one or more DCUs 1774.

The IVS 101 and/or the DCUs 1774 is configurable or operable to operate one or more actuators based on one or more captured events (as indicated by sensor data captured by sensors 1772) and/or instructions or control signals received from user inputs, signals received over-the-air from a service provider, or the like. Additionally, one or more DCUs 1774 may be configurable or operable to operate one or more actuators by transmitting/sending instructions or control signals to the actuators based on detected events (as indicated by sensor data captured by sensors 1772). One or more DCUs 1774 may be capable of reading or otherwise obtaining sensor data from one or more sensors 1772, processing the sensor data to generate control system data (or CSCs), and providing the control system data to one or more actuators to control various systems of the vehicle 110. An embedded device/system acting as a central controller or hub may also access the control system data for processing using a suitable driver, API, ABI, library, middleware, firmware, and/or the like; and/or the DCUs 1774 may be configurable or operable to provide the control system data to a central hub and/or other devices/components on a periodic or aperiodic basis, and/or when triggered.

The various subsystems, including sensors 1772 and/or DCUs 1774, may be operated and/or controlled by one or more AI agents. The AI agents is/are autonomous entities configurable or operable to observe environmental conditions and determine actions to be taken in furtherance of a particular goal. The particular environmental conditions to be observed and the actions to take may be based on an operational design domain (ODD). An ODD includes the operating conditions under which a given AI agent or feature thereof is specifically designed to function. An ODD may include operational restrictions, such as environmental, geographical, and time-of-day restrictions, and/or the requisite presence or absence of certain traffic or roadway characteristics.

In embodiments, individual AI agents are configurable or operable to control respective control systems of the host vehicle, some of which may involve the use of one or more DCUs 1774 and/or one or more sensors 1772. In these embodiments, the actions to be taken and the particular goals to be achieved may be specific or individualized based on the control system itself. Additionally, some of the actions or goals may be dynamic driving tasks (DDT), object and event detection and response (OEDR) tasks, or other non-vehicle operation related tasks depending on the particular context in which an AI agent is implemented. DDTs include all real-time operational and tactical functions required to operate a vehicle 110 in on-road traffic, excluding the strategic functions (e.g., trip scheduling and selection of destinations and waypoints. DDTs include tactical and operational tasks such as lateral vehicle motion control via steering (operational); longitudinal vehicle motion control via acceleration and deceleration (operational); monitoring the driving environment via object and event detection, recognition, classification, and response preparation (operational and tactical); object and event response execution (operational and tactical); maneuver planning (tactical); and enhancing conspicuity via lighting, signaling and gesturing, etc. (tactical). OEDR tasks may be subtasks of DDTs that include monitoring the driving environment (e.g., detecting, recognizing, and classifying objects and events and preparing to respond as needed) and executing an appropriate response to such objects and events, for example, as needed to complete the DDT or fallback task.

To observe environmental conditions, the AI agents is/are configurable or operable to receive, or monitor for, sensor data from one or more sensors 1772 and receive control system data (CSD) from one or more DCUs 1774 of the host vehicle 110. The act of monitoring may include capturing CSD and/or sensor data from individual sensors 172 and DCUs 1774. Monitoring may include polling (e.g., periodic polling, sequential (roll call) polling, etc.) one or more sensors 1772 for sensor data and/or one or more DCUs 1774 for CSD for a specified/selected period of time. In other embodiments, monitoring may include sending a request or command for sensor data/CSD in response to an external request for sensor data/CSD. In some embodiments, monitoring may include waiting for sensor data/CSD from various sensors/modules based on triggers or events, such as when the host vehicle reaches predetermined speeds and/or distances in a predetermined amount of time (with or without intermitted stops). The events/triggers may be AI agent specific, and may vary depending of a particular embodiment. In some embodiments, the monitoring may be triggered or activated by an application or subsystem of the IVS 101 or by a remote device, such as compute node 140 and/or server(s) 160.

In some embodiments, one or more of the AI agents may be configurable or operable to process the sensor data and CSD to identify internal and/or external environmental conditions upon which to act. Examples of the sensor data may include, but are not limited to, image data from one or more cameras of the vehicle providing frontal, rearward, and/or side views looking out of the vehicle; sensor data from accelerometers, inertia measurement units (IMU), and/or gyroscopes of the vehicle providing speed, acceleration, and tilt data of the host vehicle; audio data provided by microphones; and control system sensor data provided by one or more control system sensors. In an example, one or more of the AI agents may be configurable or operable to process images captured by sensors 1772 (image capture devices) and/or assess conditions identified by some other subsystem (e.g., an EMA subsystem, CAS and/or CPS entities, and/or the like) to determine a state or condition of the surrounding area (e.g., existence of potholes, fallen trees/utility poles, damages to road side barriers, vehicle debris, and so forth). In another example, one or more of the AI agents may be configurable or operable to process CSD provided by one or more DCUs 1774 to determine a current amount of emissions or fuel economy of the host vehicle. The AI agents may also be configurable or operable to compare the sensor data and/or CSDs with training set data to determine or contribute to determining environmental conditions for controlling corresponding control systems of the vehicle.

To determine actions to be taken in furtherance of a particular goal, each of the AI agents are configurable or operable to identify a current state of the IVS 101, the host vehicles 110, and/or the AI agent itself, identify or obtain one or more models (e.g., ML models), identify or obtain goal information, and predict a result of taking one or more actions based on the current state/context, the one or more models, and the goal information. The one or more models may be any algorithms or objects created after an AI agent is trained with one or more training datasets, and the one or more models may indicate the possible actions that may be taken based on the current state. The one or more models may be based on the ODD defined for a particular AI agent. The current state is a configuration or set of information in the IVS 101 and/or one or more other systems of the host vehicle 110, or a measure of various conditions in the IVS 101 and/or one or more other systems of the host vehicle 110. The current state is stored inside an AI agent and is maintained in a suitable data structure. The AI agents are configurable or operable to predict possible outcomes as a result of taking certain actions defined by the models. The goal information describes desired outcomes (or goal states) that are desirable given the current state. Each of the AI agents may select an outcome from among the predict possible outcomes that reaches a particular goal state, and provide signals or commands to various other subsystems of the vehicle 110 to perform one or more actions determined to lead to the selected outcome. The AI agents may also include a learning module configurable or operable to learn from an experience with respect to the selected outcome and some performance measure(s). The experience may include sensor data and/or new state data collected after performance of the one or more actions of the selected outcome. The learnt experience may be used to produce new or updated models for determining future actions to take.

The positioning circuitry 1745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1745 may include a Micro-Technology for Positioning, Navigation, and Timing (Micro-PNT) IC that uses a master timing clock to perform position tracking/estimation without GNSS assistance. The positioning circuitry 1745 may also be part of, or interact with, the communication circuitry 1766 to communicate with the nodes and components of the positioning network. The positioning circuitry 1745 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1745 is, or includes an INS, which is a system or device that uses sensor circuitry 1772 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the node 1750 without the need for external references.

In some optional examples, various input/output (I/O) devices may be present within or connected to, the edge computing node 1750, which are referred to as input circuitry 1786 and output circuitry 1784 in FIG. 17. The input circuitry 171686 and output circuitry 1784 include one or more user interfaces designed to enable user interaction with the node 1750 and/or peripheral component interfaces designed to enable peripheral component interaction with the node 1750. Input circuitry 1786 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1784 may be included to show information or otherwise convey information, such as sensor readings, actuator position(s), or other like information. Data and/or graphics may be displayed on one or more user interface components of the output circuitry 1784. Output circuitry 1784 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the node 1750. The output circuitry 1784 may also include speakers or other audio emitting devices, printer (s), and/or the like. In some embodiments, the sensor circuitry 1772 may be used as the input circuitry 1784 (e.g., an image capture device, motion capture device, or the like) and one or more actuators 1774 may be used as the output device circuitry 1784 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1776 may power the edge computing node 1750, although, in examples in which the edge computing node 1750 is mounted in a fixed location, it may have a power supply coupled to an electrical grid, or the battery may be used as a backup or for temporary capabilities. The battery 1776 may be a lithium ion battery, or a metal-air battery, such as a zinc-air battery, an aluminum-air battery, a lithium-air battery, and the like.

A battery monitor/charger 1778 may be included in the edge computing node 1750 to track the state of charge (SoCh) of the battery 1776, if included. The battery monitor/charger 1778 may be used to monitor other parameters of the battery 1776 to provide failure predictions, such as the state of health (SoH) and the state of function (SoF) of the battery 1776. The battery monitor/charger 1778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1778 may communicate the information on the battery 1776 to the processor 1752 over the IX 1756. The battery monitor/charger 1778 may also include an analog-to-digital (ADC) converter that enables the processor 1752 to directly monitor the voltage of the battery 1776 or the current flow from the battery 1776. The battery parameters may be used to determine actions that the edge computing node 1750 may perform, such as transmission frequency, mesh network operation, sensing frequency, and the like.

A power block 1780, or other power supply coupled to a grid, may be coupled with the battery monitor/charger 1778 to charge the battery 1776. In some examples, the power block 1780 may be replaced with a wireless power receiver to obtain the power wirelessly, for example, through a loop antenna in the edge computing node 1750. A wireless battery charging circuit, such as an LTC4020 chip from Linear Technologies of Milpitas, California, among others, may be included in the battery monitor/charger 1778. The specific charging circuits may be selected based on the size of the battery 1776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1758 may include instructions 1782 in the form of software, firmware, or hardware commands to implement the techniques described herein. Although such instructions 1782 are shown as code blocks included in the memory 1754 and the storage 1758, it may be understood that any of the code blocks may be replaced with hardwired circuits, for example, built into an application specific integrated circuit (ASIC).

In an example, the instructions 1682 provided via the memory 1754, the storage 1758, or the processor 1752 may be embodied as a non-transitory, machine-readable medium 1760 including code to direct the processor 1752 to perform electronic operations in the edge computing node 1750. The processor 1752 may access the non-transitory, machine-readable medium 1760 over the IX 1756. For instance, the non-transitory, machine-readable medium 1760 may be embodied by devices described for the storage 1758 or may include specific storage units such as optical disks, flash drives, or any number of other hardware devices. The non-transitory, machine-readable medium 1760 may include instructions to direct the processor 1752 to perform a specific sequence or flow of actions, for example, as described with respect to the flowchart(s) and block diagram (s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 16 and 17 are intended to depict a high-level view of components of a varying device, subsystem, or arrangement of an edge computing node. However, some of the components shown may be omitted, additional components may be present, and a different arrangement of the components may occur in other implementations. Further, these arrangements are usable in a variety of use cases and environments, including those discussed herein (e.g., a mobile UE in industrial compute for smart city or smart factory, among many other examples). The respective compute platforms of FIGS. 16 and 17 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

4. Example Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

Internet of Things (IoT) devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. The deployment of IoT devices and Multi-access Edge Computing (MEC) services have introduced a number of advanced use cases and scenarios occurring at or otherwise involving the edge of the network.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The present disclosure provides specific examples relevant to edge computing configurations provided within Multi-Access Edge Computing (MEC) and 5G network implementations. However, many other standards and network implementations are applicable to the edge and service management concepts discussed herein. For example, the embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

Figure 18:
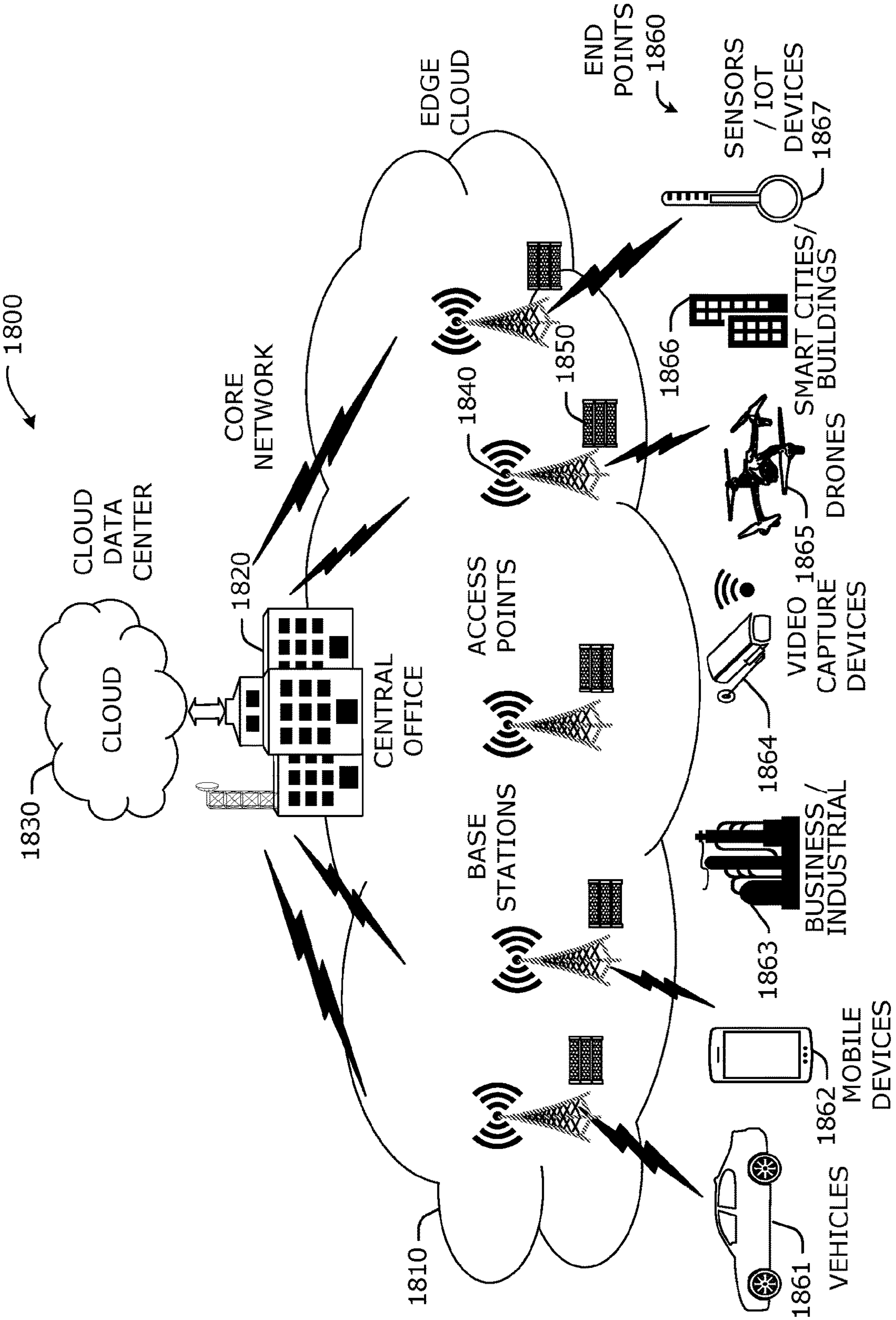
FIG. 18 illustrates an overview of an edge cloud configuration for edge computing.

FIG. 18 is a block diagram 1800 showing an overview of a configuration for edge computing, which includes a layer of processing referred to in many of the following examples as an "edge cloud". An "Edge Cloud" may refer to an interchangeable cloud ecosystem encompassing storage and compute assets located at a network's edge and interconnected by a scalable, application-aware network that can sense and adapt to changing needs, in real-time, and in a secure manner. An Edge Cloud architecture is used to decentralize computing resources and power to the edges of one or more networks (e.g., end point devices and/or intermediate nodes such as client devices/UEs). Traditionally, the computing power of servers is used to perform tasks and create distributed systems. Within the cloud model, such intelligent tasks are performed by servers (e.g., in a data center) so they can be transferred to other devices with less or almost no computing power. In the edge cloud 1810, some or all of these processing tasks are shifted to endpoint nodes and intermediate nodes such as client devices, IoT devices, network devices/appliances, and/or the like. It should be noted that an endpoint node may be the end of a communication path in some contexts, while in other contexts an endpoint node may be an intermediate node; similarly, an intermediate node may be the end of a communication path in some contexts, while in other contexts an intermediate node may be an endpoint node.

As shown, the edge cloud 1810 is co-located at an edge location, such as an access point or base station 1840, a local processing hub 1850, or a central office 1820, and thus may include multiple entities, devices, and equipment instances. The edge cloud 1810 is located much closer to the endpoint (consumer and producer) data sources 1860 (e.g., autonomous vehicles 1861, user equipment 1862, business and industrial equipment 1863, video capture devices 1864, drones 1865, smart cities and building devices 1866, sensors and IoT devices 1867, etc.) than the cloud data center 1830. Compute, memory, and storage resources which are offered at the edges in the edge cloud 1810 are critical to providing ultra-low latency response times for services and functions used by the endpoint data sources 1860 as well as reduce network backhaul traffic from the edge cloud 1810 toward cloud data center 1830 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 19:
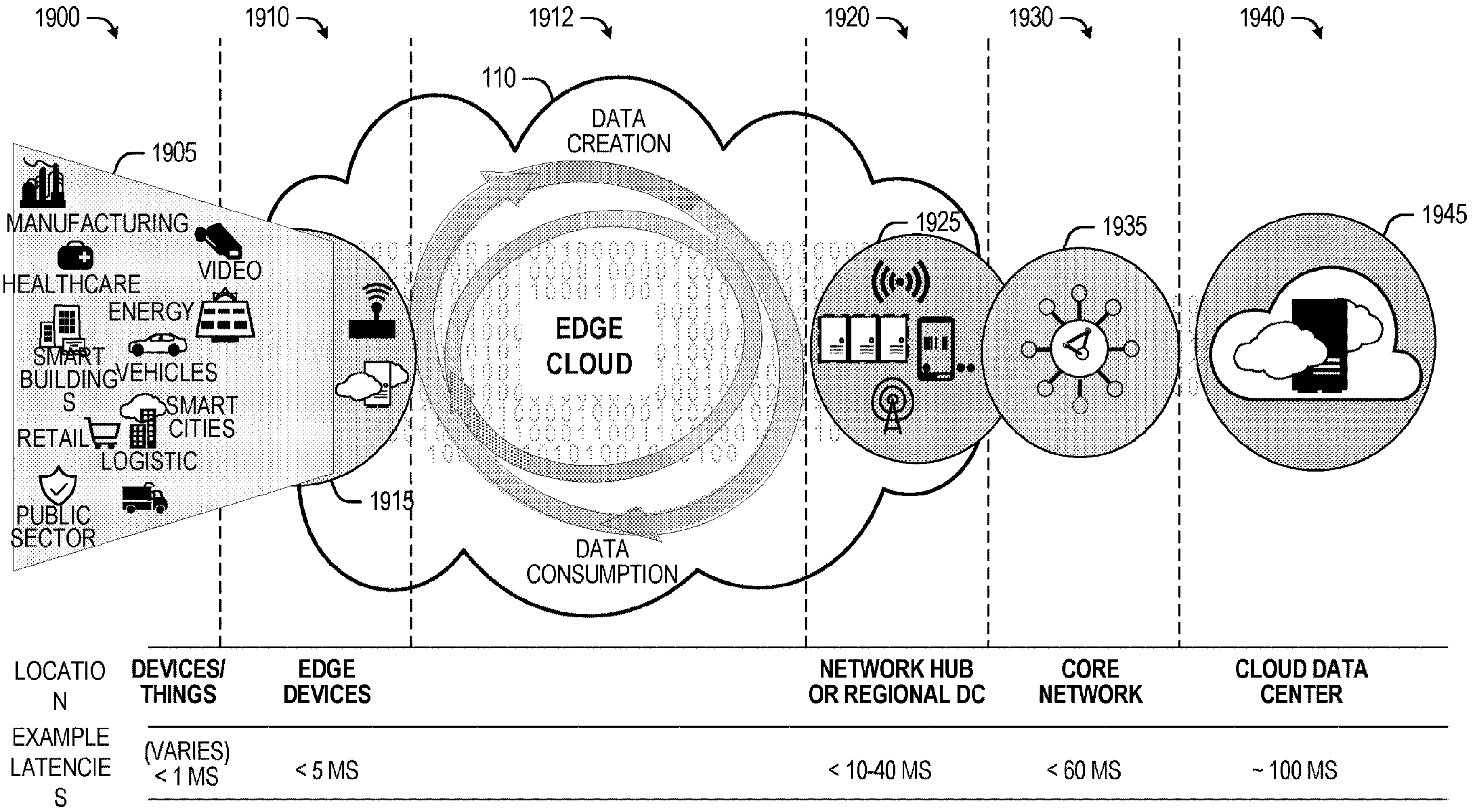
FIG. 19 illustrates operational layers among endpoints, an edge cloud, and cloud computing environments.

FIG. 19 illustrates operational layers among endpoints, an edge cloud, and cloud computing environments. Specifically, FIG. 19 depicts examples of computational use cases 1905, utilizing the edge cloud 1810 among multiple illustrative layers of network computing. The layers begin at an endpoint (devices and things) layer 1900, which accesses the edge cloud 1810 to conduct data creation, analysis, and data consumption activities. The edge cloud 1810 may span multiple network layers, such as an edge devices layer 1910 having gateways, on-premise servers, or network equipment (nodes 1915) located in physically proximate edge systems; a network access layer 1920, encompassing base stations, radio processing units, network hubs, regional data centers (DC), or local network equipment (equipment 1925); and any equipment, devices, or nodes located therebetween (in layer 1912, not illustrated in detail). The network communications within the edge cloud 1810 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1900, under 5 ms at the edge devices layer 1910, to even between 10 to 40 ms when communicating with nodes at the network access layer 1920. Beyond the edge cloud 1810 are core network 1930 and cloud data center 1940 layers, each with increasing latency (e.g., between 50-60 ms at the core network layer 1930, to 100 or more ms at the cloud data center layer). As a result, operations at a core network data center 1935 or a cloud data center 1945, with latencies of at least 50 to 100 ms or more, will not be able to accomplish many time-critical functions of the use cases 1905. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1935 or a cloud data center 1945, a central office or content data network may be considered as being located within a "near edge" layer ("near" to the cloud, having high latency values when communicating with the devices and endpoints of the use cases 1905), whereas an access point, base station, on-premise server, or network gateway may be considered as located within a "far edge" layer ("far" from the cloud, having low latency values when communicating with the devices and endpoints of the use cases 1905). It will be understood that other categorizations of a particular network layer as constituting a "close", "local", "near", "middle", or "far" edge may be based on latency, distance, number of network hops, or other measurable characteristics, as measured from a source in any of the network layers 1900-1940.

The various use cases 1905 may access resources under usage pressure from incoming streams, due to multiple services utilizing the edge cloud. To achieve results with low latency, the services executed within the edge cloud 1810 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1810 may provide the ability to serve and respond to multiple applications of the use cases 1905 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1810 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1810 (network layers 1900-1940), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1810.

As such, the edge cloud 1810 is formed from network components and functional features operated by and within edge gateway nodes, edge aggregation nodes, or other edge compute nodes among network layers 1910-1930. The edge cloud 1810 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1810 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., WiFi, long-range wireless, wired networks including optical networks) may also be utilized in place of or in combination with such 3GPP carrier networks.

The network components of the edge cloud 1810 may be servers, multi-tenant servers, appliance computing devices, and/or any other type of computing devices. For example, the edge cloud 1810 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 16-17. The edge cloud 1810 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

The storage and/or compute capabilities provided by the edge cloud 1810 may include specific acceleration types may be configured or identified in order to ensure service density is satisfied across the edge cloud. In some implementations, four primary acceleration types may be deployed in an edge cloud configuration: (1) general acceleration (e.g., FPGAs) to implement basic computational blocks such as a Fast Fourier transform (FFT), k-nearest neighbors algorithm (KNN), ML tasks/workloads; (2) image, video and transcoding accelerators; (3) inferencing accelerators; (4) crypto and compression related workloads (e.g., implemented by Intel® QuickAssist™ technology). In some implementations, the edge cloud 1810 may provide neural network (NN) acceleration to provide NN services for one or more types of NN topologies, such as Convolution NN (CNN), Recurrent NN (RNN), a Long Short Term Memory (LSTM) algorithm, a deep CNN (DCN), a Deconvolutional NN (DNN), a gated recurrent unit (GRU), a deep belief NN, a feed forward NN (FFN), a deep FNN (DFF), a deep stacking network, a Markov chain, a perception NN, a Bayesian Network (BN), a Dynamic BN (DBN), a Linear Dynamical Systems (LDS), a Switching LDS (SLDS), a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), etc.), a deep learning object detection technique (e.g., fully convolutional neural network (FCNN), region proposal convolution neural network (R-CNN), single shot multibox detector, 'you only look once' (YOLO) algorithm, etc.), and so forth. The particular design or configuration of the edge platform capabilities can consider which is the right type of acceleration and platform product models that needs to be selected in order to accommodate the service and throughput density as well as available power.

Figure 20:
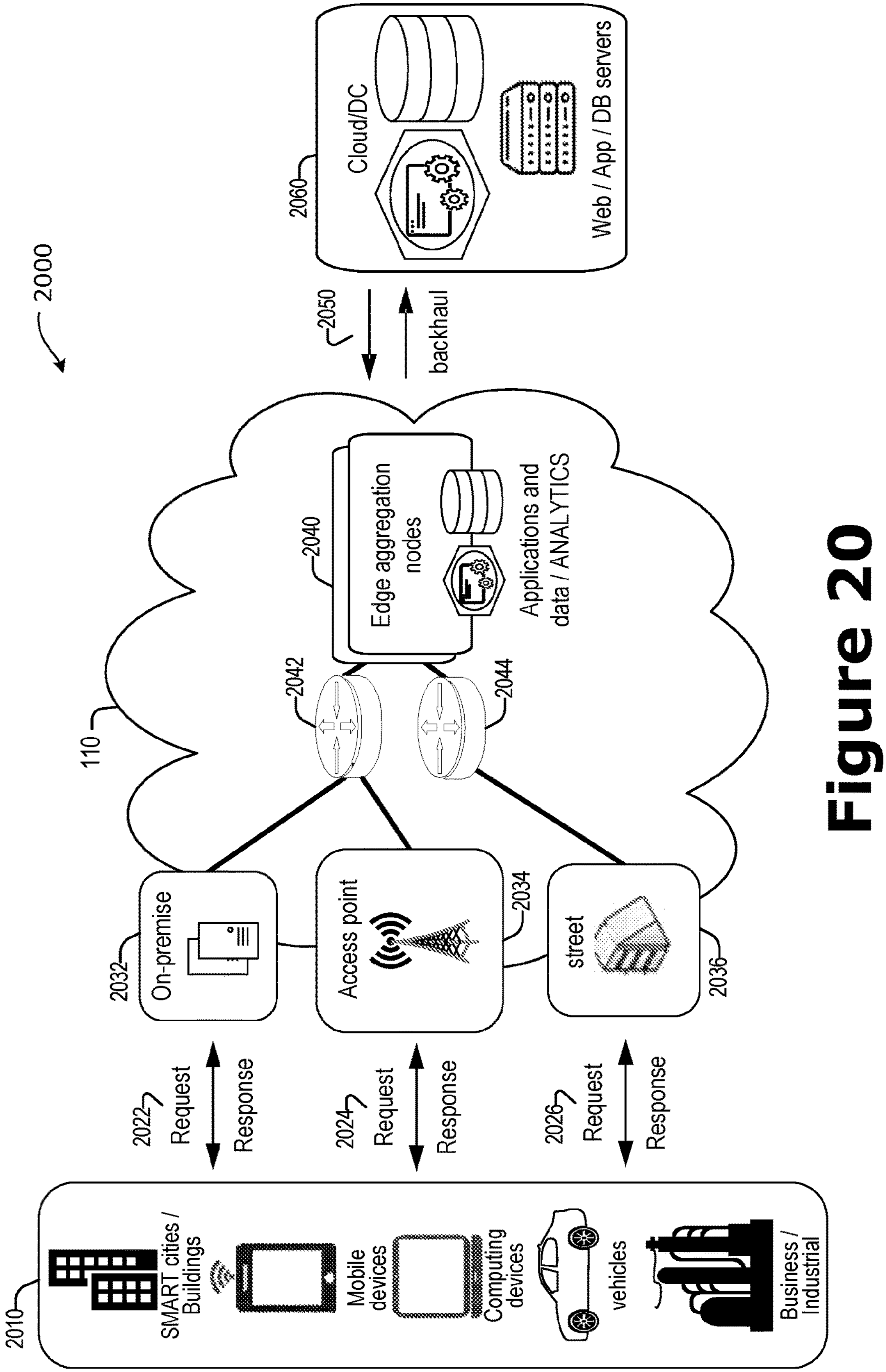
FIG. 20 illustrates an example approach for networking and services in an edge computing system.

In FIG. 20, various client endpoints 2010 (in the form of mobile devices, computers, autonomous vehicles, business computing equipment, industrial processing equipment) exchange requests and responses that are specific to the type of endpoint network aggregation. For instance, client endpoints 2010 may obtain network access via a wired broadband network, by exchanging requests and responses 2022 through an on-premise network system 2032. Some client endpoints 2010, such as mobile computing devices, may obtain network access via a wireless broadband network, by exchanging requests and responses 2024 through an access point (e.g., cellular network tower) 2034. Some client endpoints 2010, such as autonomous vehicles may obtain network access for requests and responses 2026 via a wireless vehicular network through a street-located network system 2036. However, regardless of the type of network access, the TSP may deploy aggregation points 2042, 2044 within the edge cloud 1810 to aggregate traffic and requests. Thus, within the edge cloud 1810, the TSP may deploy various compute and storage resources, such as at edge aggregation nodes 2040, to provide requested content. The edge aggregation nodes 2040 and other systems of the edge cloud 1810 are connected to a cloud or data center 2060, which uses a backhaul network 2050 to fulfill higher-latency requests from a cloud/data center for websites, applications, database servers, etc. Additional or consolidated instances of the edge aggregation nodes 2040 and the aggregation points 2042, 2044, including those deployed on a single server framework, may also be present within the edge cloud 1810 or other areas of the TSP infrastructure.

Figure 21:
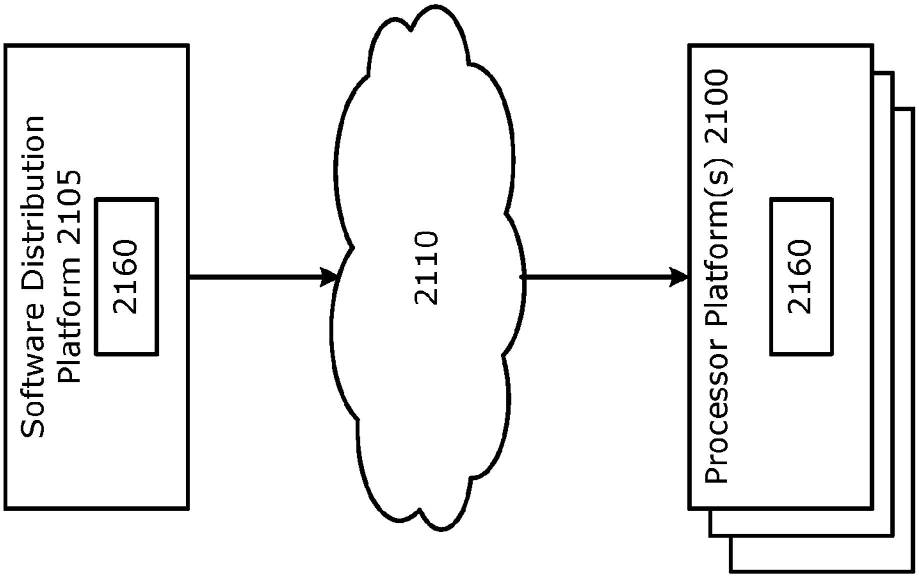
FIG. 21 illustrates an example software distribution platform according to various embodiments.

FIG. 21 illustrates an example software distribution platform 2105 to distribute software 2160, such as the example computer readable instructions 1760 of FIG. 17, to one or more devices, such as example processor platform(s) 2100 and/or example connected edge devices 1762 (see e.g., FIG. 17) and/or any of the other computing systems/devices discussed herein. The example software distribution platform 2105 may be implemented by any computer server, data facility, cloud service, etc., capable of storing and transmitting software to other computing devices (e.g., third parties, the example connected edge devices 1762 of FIG. 17). Example connected edge devices may be customers, clients, managing devices (e.g., servers), third parties (e.g., customers of an entity owning and/or operating the software distribution platform 2105). Example connected edge devices may operate in commercial and/or home automation environments. In some examples, a third party is a developer, a seller, and/or a licensor of software such as the example computer readable instructions 1760 of FIG. 17. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 21, the software distribution platform 2105 includes one or more servers and one or more storage devices. The storage devices store the computer readable instructions 2160, which may correspond to the example computer readable instructions 1760 of FIG. 17, as described above. The one or more servers of the example software distribution platform 2105 are in communication with a network 2110, which may correspond to any one or more of the Internet and/or any of the example networks 158, 1810, 1830, 1910, 2010, and/or the like as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 2160 from the software distribution platform 2105. For example, the software 2160, which may correspond to the example computer readable instructions 1760 of FIG. 17, may be downloaded to the example processor platform(s) 2100, which is/are to execute the computer readable instructions 2160 to implement Radio apps and/or the embodiments discussed herein.

In some examples, one or more servers of the software distribution platform 2105 are communicatively connected to one or more security domains and/or security devices through which requests and transmissions of the example computer readable instructions 2160 must pass. In some examples, one or more servers of the software distribution platform 2105 periodically offer, transmit, and/or force updates to the software (e.g., the example computer readable instructions 1760 of FIG. 17) to ensure improvements, patches, updates, etc. are distributed and applied to the software at the end user devices.

In the illustrated example of FIG. 21, the computer readable instructions 2160 are stored on storage devices of the software distribution platform 2105 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions D182 stored in the software distribution platform 2105 are in a first format when transmitted to the example processor platform(s) 2100. In some examples, the first format is an executable binary in which particular types of the processor platform(s) 2100 can execute. However, in some examples, the first format is uncompiled code that requires one or more preparation tasks to transform the first format to a second format to enable execution on the example processor platform(s) 2100. For instance, the receiving processor platform(s) 2100 may need to compile the computer readable instructions 2160 in the first format to generate executable code in a second format that is capable of being executed on the processor platform(s) 2100. In still other examples, the first format is interpreted code that, upon reaching the processor platform(s) 2100, is interpreted by an interpreter to facilitate execution of instructions.

5. EXAMPLE IMPLEMENTATIONS

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 includes a method to be performed by an originating Intelligent Transport System Station (ITS-S), the method comprising: collecting and processing sensor data; generating a Dynamic Contextual Road Occupancy Map (DCROM) based on the collected and processed sensor data; constructing a Vulnerable Road User Awareness Message (VAM) including one or more data fields (DFs) for sharing DCROM information; and transmitting or broadcasting the VAM to a set of ITS-Ss including one or more Vulnerable Road Users (VRUs).

Example 2 includes the method of example 1 and/or some other example(s) herein, wherein the DCROM is a occupancy map with a plurality of cells, each cell of the plurality of cells including an occupancy value, and the occupancy value of each cell is a probability that a corresponding cell is occupied by an object.

Example 3a includes the method of example 2 and/or some other example(s) herein, wherein the DCROM information includes one or more of: a reference point indicating a location of the originating ITS-S in an area covered by the DCROM; a grid size indicating dimensions of the grid; a cell size indicating dimensions of each cell of the plurality of cells; and a starting position indicating a starting cell of the occupancy grid, wherein other cells of the plurality of cells are to be labelled based on their relation to from the starting cell.

Example 3b includes the method of example 3a and/or some other example(s) herein, wherein the cell size and/or the grid size parameter indicate a total number of tiers.

Example 3c includes the method of example 3b and/or some other example(s) herein, wherein the total number of tiers includes a first tier comprising 8 cells surrounding the DCROM of the originating ITS-S, a second tier comprising 16 additional cells surrounding the 8 cells of the first tier.

Example 4 includes the method of examples 3a-3c and/or some other example(s) herein, wherein the DCROM information further includes: occupancy values representing the occupancy of each cell in the grid; and confidence values corresponding to each cell in the grid.

Example 5 includes the method of example 4 and/or some other example(s) herein, wherein the DCROM information further includes a bitmap of the occupancy values and the confidence values are associated to the bitmap.

Example 6 includes the method of examples 1-5 and/or some other example(s) herein, wherein the VAM is a first VAM, and the method further comprises: receiving a second VAM from at least a first ITS-S of the set of ITS-Ss, the first ITS-S being a VRU ITS-S.

Example 7 includes the method of example 6 and/or some other example(s) herein, further comprising: receiving a third VAM or a Decentralized Environmental Notification Message (DENM) from at least a second ITS-S of the set of ITS-Ss, the second ITS-S being a VRU ITS-S or a non-VRU ITS-S.

Example 8 includes the method of example 7 and/or some other example(s) herein, wherein: the first VAM includes an occupancy status indicator (OSI) data field (DF) including a first OSI value and a grid location indicator (GLI) field including a first GLI value, the second VAM includes an OSI field including a second OSI value and a GLI field including a second GLI value, and the third VAM or the DENM includes an OSI field including a third OSI value and a GLI field including a third GLI value.

Example 9 includes the method of example 8 and/or some other example(s) herein, further comprising: updating the DCROM based on the second OSI and GLI values or the third OSI and GLI values.

Example 10 includes the method of examples 8-9 and/or some other example(s) herein, wherein: the first GLI value indicates cells around a first reference cell of the plurality of cells, the first reference cell being a cell in the DCROM occupied by the originating ITS-S, the second GLI value indicates relative cells around a second reference cell, the second reference cell is a cell in the DCROM occupied by the first ITS-S, and the third GLI value indicates relative cells around a third reference cell, wherein the third reference cell is a cell in the DCROM occupied by the second ITS-S.

Example 11 includes the method of example 10 and/or some other example(s) herein, wherein: the first OSI value is a probabilistic indicator indicating an estimated uncertainty of neighboring cells around the originating ITS-S, the second OSI value is a probabilistic indicator indicating an estimated uncertainty of neighboring cells around the first ITS-S, and the third OSI value is a probabilistic indicator indicating an estimated uncertainty of neighboring cells around the second ITS-S.

Example 12 includes the method of examples 1-11 and/or some other example(s) herein, wherein the collected sensor data includes sensor data collected from sensors of the originating ITS-S.

Example 13 includes the method of examples 1-12 and/or some other example(s) herein, wherein the sensor data includes one or more of an ego VRU identifier (ID), position data, profile data, speed data, direction data, orientation data, trajectory data, velocity data, and/or other sensor data.

Example 14 includes the method of examples 1-13 and/or some other example(s) herein, further comprising: performing a Collision Risk Analysis (CRA) based on the occupancy values of respective cells in the DCROM, wherein the CRA includes: performing Trajectory Interception Probability (TIP) computations; or performing a Time To Collision (TTC) computation.

Example 15 includes the method of example 14 and/or some other example(s) herein, further comprising: determining a collision avoidance strategy based on the CRA; triggering collision risk avoidance based on the collision avoidance strategy; and triggering a maneuver coordination service (MCS) to execute collision avoidance actions of the collision avoidance strategy.

Example 16 includes the method of example 15 and/or some other example(s) herein, wherein the CRA includes performing the TIP computations, and the method further comprises: generating another VAM including Trajectory Interception Indicator (TII) and a Maneuver Identifier (MI), wherein the TII reflects how likely a trajectory of the originating ITS-S is going to be intercepted by one or more neighboring ITSs and the MI indicates a type of maneuvering needed of the collision avoidance actions; and transmitting or broadcasting the other VAM.

Example 17 includes the method of examples 3a-16 and/or some other example(s) herein, wherein the DCROM is a layered costmap including a master costmap and a plurality of layers.

Example 18 includes the method of example 17 and/or some other example(s) herein, wherein generating the DCROM comprises: tracking, at each layer of the plurality of layers, data related to a specific functionality or a specific sensor type; and accumulating the data from each layer into the master costmap, wherein the master costmap is the DCROM.

Example 19 includes the method of example 18 and/or some other example(s) herein, wherein the plurality of layers includes a static map layer including a static map of one or more static objects in the area covered by the DCROM.

Example 20 includes the method of example 19 and/or some other example(s) herein, wherein generating the DCROM comprises: generating the static map using a simultaneous localization and mapping (SLAM) algorithm; or generating the static map from an architectural diagram.

Example 21 includes the method of examples 18-20 and/or some other example(s) herein, wherein the plurality of layers further includes an obstacles layer including a obstacles layer occupancy map with sensor data in cells of the plurality of cells with detected objects according to the sensor data.

Example 22 includes the method of example 21 and/or some other example(s) herein, wherein generating the DCROM comprises: generating the obstacles layer occupancy map by over-writing the static map with the collected sensor data.

Example 23 includes the method of examples 18-22 and/or some other example(s) herein, wherein the plurality of layers further includes a proxemics layer including a proxemics layer occupancy map with detected VRUs and a space surrounding the detected VRUs in cells of the plurality of cells with detected objects according to the sensor data.

Example 24 includes the method of example 23 and/or some other example(s) herein, wherein the plurality of layers further includes an inflation layer including an inflation layer occupancy map with respective buffer zones surrounding ones of the detected objects determined to be lethal objects.

Example 25 includes the method of examples 7-24 and/or some other example(s) herein, wherein: the originating ITS-S is a low complexity (LC) VRU ITS-S or a high complexity (HC) VRU ITS-S, the first ITS-S is an LC VRU ITS-S or an HC VRU ITS-S, and the second ITS-S is an HC VRU ITS-S, a vehicle ITS-S, or a roadside ITS-S.

Example Z01 includes one or more computer readable media comprising instructions, wherein execution of the instructions by processor circuitry is to cause the processor circuitry to perform the method of any one of examples 1-25 and/or some other example(s) herein. Example Z02 includes a computer program comprising the instructions of example Z01. Example Z03a includes an Application Programming Interface defining functions, methods, variables, data structures, and/or protocols for the computer program of example Z02.

Example Z03b includes an API or specification defining functions, methods, variables, data structures, protocols, etc., defining or involving use of any of examples 1-25 or portions thereof, or otherwise related to any of examples 1-25 or portions thereof. Example Z04 includes an apparatus comprising circuitry loaded with the instructions of example Z01. Example Z05 includes an apparatus comprising circuitry operable to run the instructions of example Z01. Example Z06 includes an integrated circuit comprising one or more of the processor circuitry of example Z01 and the one or more computer readable media of example Z01. Example Z07 includes a computing system comprising the one or more computer readable media and the processor circuitry of example Z01.

Example Z08 includes an apparatus comprising means for executing the instructions of example Z01. Example Z09 includes a signal generated as a result of executing the instructions of example Z01. Example Z10 includes a data unit generated as a result of executing the instructions of example Z01. Example Z11 includes the data unit of example Z10 and/or some other example(s) herein, wherein the data unit is a datagram, network packet, data frame, data segment, a Protocol Data Unit (PDU), a Service Data Unit (SDU), a message, or a database object.

Example Z12 includes a signal encoded with the data unit of examples Z10 and/or Z11. Example Z13 includes an electromagnetic signal carrying the instructions of example Z01. Example Z14 includes an apparatus comprising means for performing the method of any one of examples 1-25 and/or some other example(s) herein. Example Z15, includes a Multi-access Edge Computing (MEC) host executing a service as part of one or more MEC applications instantiated on a virtualization infrastructure, the service being related to any of examples 1-25 or portions thereof and/or some other example(s) herein, and wherein the MEC host is configurable or operable to operate according to a standard from one or more ETSI MEC standards families.

Any of the above-described examples may be combined with any other example (or combination of examples), unless explicitly stated otherwise. Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

6. Terminology

The terminology used herein is for the purpose of describing particular embodiments only and is not intended to be limiting of the disclosure. The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including C-V2X), Dedicated Short Range Communications (DSRC) communication systems such as Intelligent-Transport-Systems (ITS) including the European ITS-G5, ITS-GSB, ITS-GSC, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element (s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

The term "ego" used with respect to an element or entity, such as "ego ITS-S" or the like, refers to an ITS-S that is under consideration, the term "ego vehicle" refers to a vehicle embedding an ITS-S being considered, and the term "neighbors" or "proximity" used to describe elements or entities refers to other ITS-Ss different than the ego ITS-S and/or ego vehicle.

The term "Geo-Area" refers to one or more geometric shapes such as circular areas, rectangular areas, and elliptical areas. A circular Geo-Area is described by a circular shape with a single point A that represents the center of the circle and a radius r. The rectangular Geo-Area is defined by a rectangular shape with a point A that represents the center of the rectangle and a parameter a which is the distance between the center point and the short side of the rectangle (perpendicular bisector of the short side, a parameter b which is the distance between the center point and the long side of the rectangle (perpendicular bisector of the long side, and a parameter θ which is the azimuth angle of the long side of the rectangle. The elliptical Geo-Area is defined by an elliptical shape with a point A that represents the center of the rectangle and a parameter a which is the length of the long semi-axis, a parameter b which is the length of the short semi-axis, and a parameter θ which is the azimuth angle of the long semi-axis. An ITS-S can use a function F to determine whether a point P(x,y) is located inside, outside, at the center, or at the border of a geographical area. The function F(x, y) assumes the canonical form of the geometric shapes: The Cartesian coordinate system has its origin in the center of the shape. Its abscissa is parallel to the long side of the shapes. Point P is defined relative to this coordinate system. The various properties and other aspects of function F(x, y) are discussed in ETSI EN 302 931 v1.1.1 (2011-07).

The term "Interoperability" refers to the ability of ITS-Ss utilizing one communication system or RAT to communicate with other ITS-Ss utilizing another communication system or RAT. The term "Coexistence" refers to sharing or allocating radiofrequency resources among ITS-Ss using either communication system or RAT.

The term "ITS data dictionary" refers to a repository of DEs and DFs used in the ITS applications and ITS facilities layer. The term "ITS message" refers to messages exchanged at ITS facilities layer among ITS stations or messages exchanged at ITS applications layer among ITS stations.

The term "Collective Perception" or "CP" refers to the concept of sharing the perceived environment of an ITS-S based on perception sensors, wherein an ITS-S broadcasts information about its current (driving) environment. CP is the concept of actively exchanging locally perceived objects between different ITS-Ss by means of a V2X RAT. CP decreases the ambient uncertainty of ITS-Ss by contributing information to their mutual FoVs. The term "Collective Perception basic service" (also referred to as CP service (CPS)) refers to a facility at the ITS-S facilities layer to receive and process CPMs, and generate and transmit CPMs. The term "Collective Perception Message" or "CPM" refers to a CP basic service PDU. The term "Collective Perception data" or "CPM data" refers to a partial or complete CPM payload. The term "Collective Perception protocol" or "CPM protocol" refers to an ITS facilities layer protocol for the operation of the CPM generation, transmission, and reception. The term "CP object" or "CPM object" refers to aggregated and interpreted abstract information gathered by perception sensors about other traffic participants and obstacles. CP/CPM Objects can be represented mathematically by a set of variables describing, amongst other, their dynamic state and geometric dimension. The state variables associated to an object are interpreted as an observation for a certain point in time and are therefore always accompanied by a time reference. The term "Environment Model" refers to a current representation of the immediate environment of an ITS-S, including all perceived objects perceived by either local perception sensors or received by V2X. The term "object", in the context of the CP Basic Service, refers to the state space representation of a physically detected object within a sensor's perception range. The term "object list" refers to a collection of objects temporally aligned to the same timestamp.

The term "ITS Central System" refers to an ITS system in the backend, for example, traffic control center, traffic management center, or cloud system from road authorities, ITS application suppliers or automotive OEMs (see e.g., clause 4.5.1.1 of [EN302665]).

The term "personal ITS-S" refers to an ITS-S in a nomadic ITS sub-system in the context of a portable device (e.g., a mobile device of a pedestrian).

The term "vehicle" may refer to road vehicle designed to carry people or cargo on public roads and highways such as AVs, busses, cars, trucks, vans, motor homes, and motorcycles; by water such as boats, ships, etc.; or in the air such as airplanes, helicopters, UAVs, satellites, etc.

The term "sensor measurement" refers to abstract object descriptions generated or provided by feature extraction algorithm(s), which may be based on the measurement principle of a local perception sensor mounted to an ITS-S. The feature extraction algorithm processes a sensor's raw data (e.g., reflection images, camera images, etc.) to generate an object description. The term "State Space Representation" is a mathematical description of a detected object, which includes state variables such as distance, speed, object dimensions, and the like. The state variables associated with/to an object are interpreted as an observation for a certain point in time, and therefore, are accompanied by a time reference.

The term "maneuvers" or "manoeuvres" refer to specific and recognized movements bringing an actor, e.g., pedestrian, vehicle or any other form of transport, from one position to another within some momentum (velocity, velocity variations and vehicle mass). The term "Maneuver Coordination" or "MC" refers to the concept of sharing, by means of a V2X RAT, an intended movement or series of intended movements of an ITS-S based on perception sensors, planned trajectories, and the like, wherein an ITS-S broadcasts information about its current intended maneuvers. The term "Maneuver Coordination basic service" (also referred to as Maneuver Coordination Service (MCS)) refers to a facility at the ITS-S facilities layer to receive and process MCMs, and generate and transmit MCMs. The term "Maneuver Coordination Message" or "MCM" refers to an MC basic service PDU. The term "Maneuver Coordination data" or "MCM data" refers to a partial or complete MCM payload. The term "Maneuver Coordination protocol" or "MCM protocol" refers to an ITS facilities layer protocol for the operation of the MCM generation, transmission, and reception. The term "MC object" or "MCM object" refers to aggregated and interpreted abstract information gathered by perception sensors about other traffic participants and obstacles, as well as information from applications and/or services operated or consumed by an ITS-S.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An originating Intelligent Transport System Station (ITS-S), comprising:

a memory; and at least one processor to execute instructions to:

collect and process sensor data from an environment;

generate a dynamic contextual road occupancy map (DCROM) based on the collected and processed sensor data, wherein the DCROM is a layered costmap including a base costmap and a plurality of layers, wherein each layer of the plurality of layers is generated from a different source or type of sensor that tracks objects in the environment, wherein the base costmap of the DCROM provides an occupancy map with a plurality of cells that combines data from the plurality of layers, wherein a respective cell of the plurality of cells includes an occupancy value and a corresponding confidence value, wherein the occupancy value defines a probability that the respective cell is occupied by an object, and wherein the corresponding confidence value defines a statistical confidence of the occupancy value for the respective cell at a corresponding time;

construct a vulnerable road user Awareness Message (VAM) including one or more data fields (DPs) for sharing DCROM information;

cause transmission or broadcast of the VAM to a set of ITS-Ss including one or more vulnerable road users (VRUs);

perform a collision risk analysis (CRA) based on the occupancy value and the corresponding confidence value of respective cells in the DCROM;

select a collision avoidance strategy based on the CRA; and cause transmission or broadcast of a second VAM to one or more of the VRUs that are external to the originating ITS-S, the second VAM to trigger execution of a collision risk avoidance action at the one or more of the VRUs based on the collision avoidance strategy, wherein the second VAM includes a Trajectory Interception Indicator (TII) and a Maneuver Identifier (MI), wherein the TII reflects how likely a trajectory of the originating ITS-S is going to be intercepted by one or more neighboring ITS-Ss and the MI indicates a type of maneuvering needed of the collision risk avoidance action.

2. The ITS-S of claim 1, wherein the DCROM information included in the one or more DPs of the VAM includes one or more of:

a reference point indicating a location of the originating ITS-S in an area covered by the DCROM;

a grid size indicating dimensions of a grid provided by the DCROM;

a cell size indicating dimensions of each cell of the plurality of cells;

a starting position indicating a starting cell of the grid, wherein other cells of the plurality of cells are to be labelled based on their relation to from the starting cell;

occupancy values including a respective occupancy value of each cell in the grid; and confidence values corresponding to the respective occupancy value of each cell in the grid.

3. The ITS-S of claim 1, wherein the VAM is a first VAM, wherein the first VAM includes an occupancy status indicator (OSI) data field (DF) including a first OSI value and a grid location indicator (GLI) field including a first GLI value, and the at least one processor is to execute the instructions to:

receive a second received VAM from at least a first ITS-S of the set of ITS-Ss, wherein the first ITS-Sis a VRU ITS-S, and the second received VAM includes an OSI field including a second OSI value and a GLI field includes a second GLI value;

receive a third received VAM or a Decentralized Environmental Notification Message (DENM) from at least a second ITS-S of the set of ITS-Ss, the second ITS-S being a VRU ITS-S or a non-VRU ITS-S, and the third received VAM or the DENM includes an OSI field including a third OSI value and a GLI field including a third GLI value; and update the DCROM based on the second OSI and GLI values or the third OSI and GLI values.

4. The ITS-S of claim 3, wherein:

the first GLI value indicates cells around a first reference cell of the plurality of cells, wherein the first reference cell is a cell in the DCROM occupied by the originating ITS-S, the second GLI value indicates relative cells around a second reference cell, wherein the second reference cell is a cell in the DCROM occupied by the first ITS-S, and the third GLI value indicates relative cells around a third reference cell, wherein the third reference cell is a cell in the DCROM occupied by the second ITS-S.

5. The ITS-S of claim 4, wherein the first OSI value is a probabilistic indicator indicating an estimated uncertainty of neighboring cells around the originating ITS-S, the second OSI value is a probabilistic indicator indicating an estimated uncertainty of neighboring cells around the first ITS-S, and the third OSI value is a probabilistic indicator indicating an estimated uncertainty of neighboring cells around the second ITS-S.

6. The ITS-S of claim 3, wherein the originating ITS-S is a VRU ITSS with sensors and perception capabilities, the first ITS-S is a VRU ITS-S without sensors and perception capabilities, and the second ITS-S is a VRU ITS-S with sensors and perception capabilities, a vehicle ITS-S, or a roadside ITS-S.

7. The ITS-S of claim 1, wherein the collected sensor data includes sensor data collected from sensors of the originating ITS-S.

8. The ITS-S of claim 1, wherein the sensor data includes one or more of an ego VRU identifier (ID), position data, profile data, speed data, direction data, orientation data, trajectory data, velocity data, and/or other sensor data.

9. The ITS-S of claim 1, wherein the CRA includes performance of trajectory interception probability (TIP) computations or performance of a time to collision (TTC) computation.

10. One or more non-transitory computer readable media (NTCRM) comprising instructions, wherein execution of the instructions by one or more processors of an ego intelligent transport system station (ITS-S) is to cause the ego ITS-S to:

obtain sensor data of an environment from one or more sensors of the ego ITS-S;

generate or update a dynamic contextual road occupancy map (DCROM) based on the obtained sensor data, wherein the DCROM is a layered costmap including a base costmap and a plurality of layers, wherein each layer of the plurality of layers is generated from a different source or type of sensor that tracks objects in the environment, wherein the base costmap of the DCROM provides an occupancy map with a plurality of cells that combines data from the plurality of layers, wherein a respective cell of the plurality of cells includes an occupancy value and a corresponding confidence value, wherein the occupancy value defines a probability that the respective cell is occupied by an object, and wherein the corresponding confidence value defines a statistical confidence of the occupancy value for the respective cell at a corresponding time;

generate a vulnerable road user awareness message (VAM) including a set of data fields (DPs), wherein a subset of DPs among the set of DPs include information of the DCROM;

cause transmission or broadcast of the VAM to a set of ITS-Ss, wherein the set of ITS-Ss includes at least one vulnerable road users (VRUs);

perform a collision risk analysis (CRA) based on the occupancy value and the corresponding confidence value of respective cells in the DCROM;

select a collision avoidance strategy based on the CRA; and cause transmission or broadcast of a second VAM to one or more of the VRUs that are external to the ego ITS-S, the second VAM to trigger execution of a collision risk avoidance action at the one or more of the VRUs based on the collision avoidance strategy, wherein the second VAM includes a Trajectory Interception Indicator (TII) and a Maneuver Identifier (MI), wherein the TII reflects how likely a trajectory of the ego ITS-S is going to be intercepted by one or more neighboring ITS-Ss and the MI indicates a type of maneuvering needed of the collision risk avoidance action.

11. The one or more NTCRM of claim 10, wherein, to generate the DCROM, execution of the instructions is to cause the ego ITS-S to:

track, for each layer of the plurality of layers, data related to a specific functionality or a specific sensor type; and accumulate the tracked data from each layer into the base costmap.

12. The one or more NTCRM of claim 11, wherein the plurality of layers includes a static map layer including a static map of one or more static objects in an area covered by the DCROM, and to wherein generate the DCROM, the execution of the instructions is to cause the ego ITS-S to:

generate the static map using a simultaneous localization and mapping (SLAM) algorithm; or generate the static map from an architectural diagram.

13. The one or more NTCRM of claim 12, wherein the plurality of layers includes an obstacles layer including an obstacles layer occupancy map with sensor data in cells of the plurality of cells with detected objects according to the sensor data, and to generate the DCROM, execution of the instructions is to cause the ego ITS-S to:

generate the obstacles layer occupancy map by overwriting the static map with the obtained sensor data.

14. The one or more NTCRM of claim 11, wherein the plurality of layers includes a proxemics layer including a proxemics layer occupancy map with detected VRUs and a space surrounding the detected VRUs in cells of the plurality of cells with detected objects according to the sensor data.

15. The one or more NTCRM of claim 14, wherein the plurality of layers includes an inflation layer including an inflation layer occupancy map with respective buffer zones surrounding ones of the detected objects determined to be lethal objects.

16. A method to be performed by an originating Intelligent Transport System Station (ITS-S), the method comprising:

collecting and processing sensor data from an environment;

generating a layered costmap based on the sensor data, the layered costmap including a base costmap and a plurality of layers, wherein each layer of the plurality of layers is generated from a different source or type of sensor that tracks objects in the environment, wherein the base costmap of the layered costmap provides an occupancy map with a plurality of cells that combines data from the plurality of layers, wherein a respective cell of the plurality of cells includes an occupancy value and a corresponding confidence value, wherein the occupancy value defines a probability that the respective cell is occupied by an object, and wherein the corresponding confidence value defines a statistical confidence of the occupancy value for the respective cell at a corresponding time;

generating a vulnerable road user awareness message (VAM) including one or more data fields (DPs) to include layered costmap information, wherein the layered costmap information includes one or more of a reference point indicating a location of the originating ITS-S in an area covered by the layered costmap, a grid size indicating dimensions of a grid, a cell size indicating dimensions of each cell of the plurality of cells, and a starting position indicating a starting cell of the grid, wherein other cells of the plurality of cells are to be labelled based on their relation to from the starting cell;

transmitting or broadcasting the VAM to a set of ITS-Ss including one or more vulnerable road users (VRUs);

performing a collision risk analysis (CRA) based on the occupancy values and the corresponding confidence values of respective cells in the layered costmap;

selecting a collision avoidance strategy based on the CRA; and transmitting or broadcasting a second VAM to one or more of the VRUs that are external to the originating ITS-S, the second VAM to trigger execution of a collision risk avoidance action at the one or more of the VRUs based on the collision avoidance strategy, wherein the second VAM includes a Trajectory Interception Indicator (TII) and a Maneuver Identifier (MI), wherein the TII reflects how likely a trajectory of the originating ITS-S is going to be intercepted by one or more neighboring ITS-Ss and the MI indicates a type of maneuvering needed of the collision risk avoidance action.

17. The method of claim 16, wherein the VAM is a first VAM, wherein the first VAM includes an occupancy status indicator (OSI) data field (DF) including a first OSI value and a grid location indicator (GLI) field including a first GLI value, and the method includes:

receiving a second received VAM from at least a first ITS-S of the set of ITS-Ss, wherein the first ITS-S is a VRU ITS-S, and the second received VAM includes an OSI field including a second OSI value and a GLI field including a second GLI value;

receiving a third received VAM or a Decentralized Environmental Notification Message (DENM) from at least a second ITS-S of the set of ITS-Ss, wherein the second ITS-S is a VRU ITSS or a non-VRU ITS-S, and the third received VAM or the DENM includes an OSI field including a third OSI value and a GLI field including a third GLI value; and updating the layered costmap based on the second OSI and GLI values or the third OSI and GLI values.

18. The method of claim 16, wherein the sensor data includes sensor data collected from sensors of the originating ITS-S and one or more of an ego VRU identifier (ID), position data, profile data, speed data, direction data, orientation data, trajectory data, velocity data, and/or other sensor data.

19. The method of claim 16, wherein the CRA includes one or both of performing Trajectory Interception Probability (TIP) computations and performing a Time To Collision (TTC) computation.

20. The method of claim 16, wherein the plurality of layers includes one or more of a static map layer, an obstacles layer, a proxemics layer, and an inflation layer.

* * * * *